United States Patent [19]
Kohno et al.

[11] Patent Number: 5,257,135
[45] Date of Patent: Oct. 26, 1993

[54] COMPACT ZOOM LENS SYSTEM

[75] Inventors: Tetsuo Kohno, Toyonaka; Takashi Okada; Tetsuya Arimoto, both of Osaka; Hiroyuki Matsumoto, Wakayama, all of Japan

[73] Assignee: Minolta Camera Kabushiki Kaisha, Osaka, Japan

[21] Appl. No.: 770,085

[22] Filed: Sep. 30, 1991

[30] Foreign Application Priority Data

| Oct. 2, 1990 | [JP] | Japan | 2-265513 |
| Oct. 2, 1990 | [JP] | Japan | 2-265514 |
| Apr. 16, 1991 | [JP] | Japan | 3-112446 |
| Apr. 16, 1991 | [JP] | Japan | 3-112447 |
| Apr. 19, 1991 | [JP] | Japan | 3-116734 |

[51] Int. Cl.$^5$ .................. G02B 15/14; G02B 13/18
[52] U.S. Cl. .................. 359/689; 359/690; 359/708; 359/713
[58] Field of Search ............. 359/689, 690, 713, 708

[56] References Cited

U.S. PATENT DOCUMENTS

| 4,465,342 | 8/1984 | Tanaka et al. | 359/690 |
| 4,653,874 | 3/1987 | Takahashi et al. | 359/690 |
| 4,666,257 | 5/1987 | Tanaka et al. | 359/690 X |
| 4,721,371 | 1/1988 | Imai | 359/690 |
| 4,810,071 | 3/1989 | Tsuchida et al. | 359/690 |
| 4,871,239 | 10/1989 | Masumoto et al. | 359/690 |
| 4,925,280 | 5/1990 | Hashimoto | 359/690 |

FOREIGN PATENT DOCUMENTS

| 57-27219 | 2/1982 | Japan . |
| 59-13212 | 1/1984 | Japan . |
| 913211 | 1/1984 | Japan . |
| 59-28120 | 2/1984 | Japan . |
| 59-28121 | 2/1984 | Japan . |
| 59-129818 | 7/1984 | Japan . |
| 62-910 | 1/1987 | Japan . |
| 239812 | 2/1987 | Japan . |
| 292909 | 4/1987 | Japan . |
| 62-198813 | 9/1987 | Japan . |
| 64-44907 | 2/1989 | Japan . |
| 201614 | 8/1989 | Japan . |
| 223408 | 9/1989 | Japan . |
| 148010 | 6/1990 | Japan . |

Primary Examiner—Scott J. Sugarman
Attorney, Agent, or Firm—Price, Gess & Ubell

[57] ABSTRACT

A compact zoom lens system comprises from the object side: a first lens component of a positive refractive power; a second lens component of a negative refractive power with a variable air space between the first and second lens components; and a third lens component of a positive refractive power with a variable air space between the second and third lens components. A plurality of aspherical surfaces are employed for the realization of a compact and low-cost zoom lens system. Furthermore, a focusing operation is carried out by both of the first and second lens components or third lens component.

28 Claims, 58 Drawing Sheets (W)

(T)

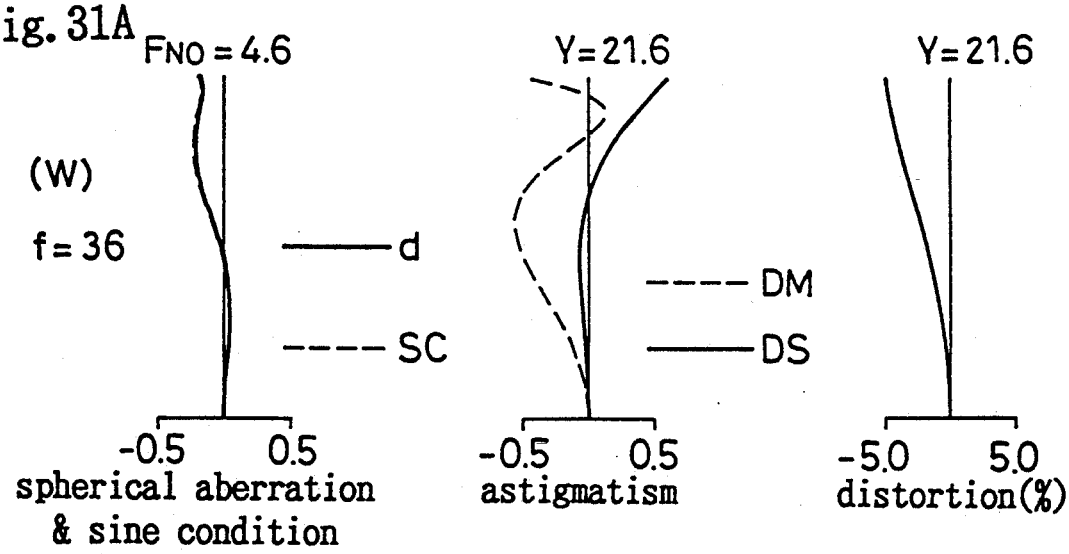
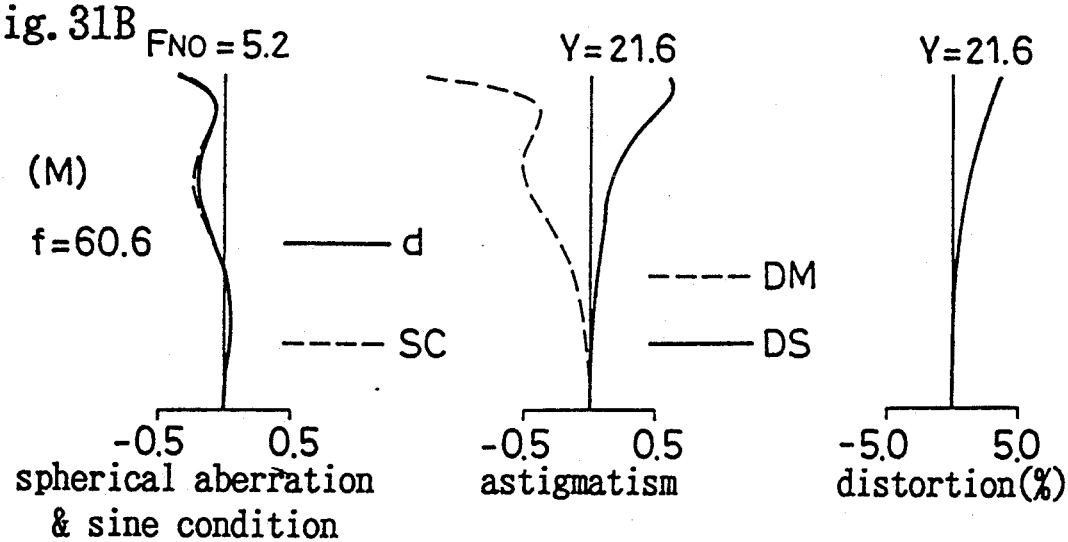
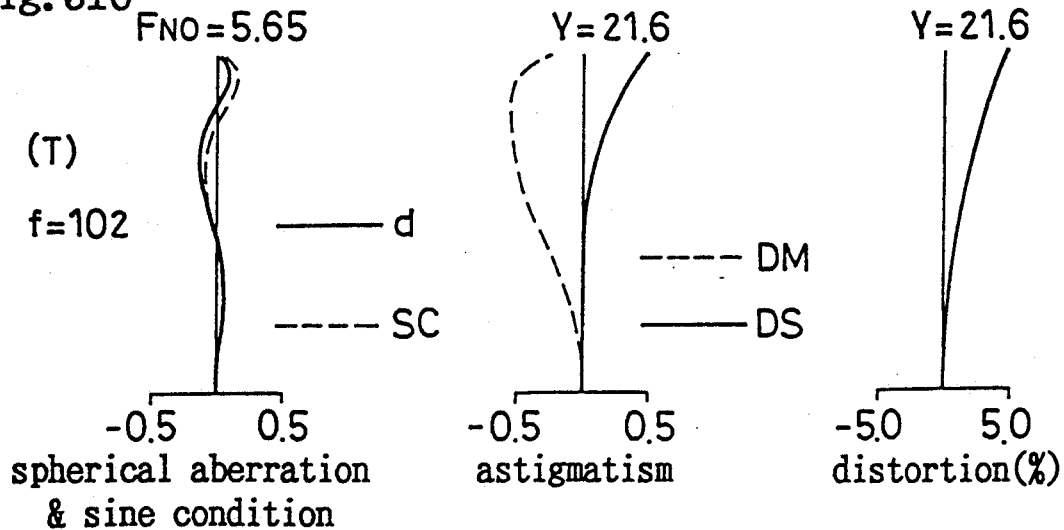

COMPACT ZOOM LENS SYSTEM

BACKGROUND OF THE INVENTION

1. Field of the Invention

The present invention relates to a compact zoom lens system. More particularly, the present invention relates to a zoom lens system employed for a single-lens reflex camera.

2. Description of the Prior Art

Presently, while a compact, low-cost taking lens system is demanded in order to realize a compact, low-cost singlelens reflex camera, a zoom lens system with a high zoom ratio is demanded. To decrease the size, including a movement amount in a zooming operation, of a zoom lens system while maintaining a required zoom ratio, it is necessary to increase the refractive power of each lens component. However, an increase in refractive power while maintaining a required performance leads to an increase in the number of lens elements. On the other hand, in order to decrease a cost, the number of lens elements should be decreased. As described above, the realization of a compact zoom lens and that of a low-cost zoom lens while maintaining a required performance conflict with each other.

SUMMARY OF THE INVENTION

An object of the present invention is to provide a compact zoom lens system having a fewer number of lens elements as well as a high zoom ratio by properly employing an aspherical surface.

Another object of the present invention is to provide a focusing format suitable for a zoom lens system whose compactness in size is realized by employing an aspherical surface.

BRIEF DESCRIPTION OF THE DRAWINGS

These and other objects and features of this invention will become clear from the following description taken in conjunction with the preferred embodiments with reference to the accompanied drawings in which:

FIGS. 28A, 28B and 28C to 48A, 48B and 48C show the aberrations of the first to twenty-first embodiments of the present invention;

DETAILED DESCRIPTION OF THE PREFERRED EMBODIMENT

Figure 1:
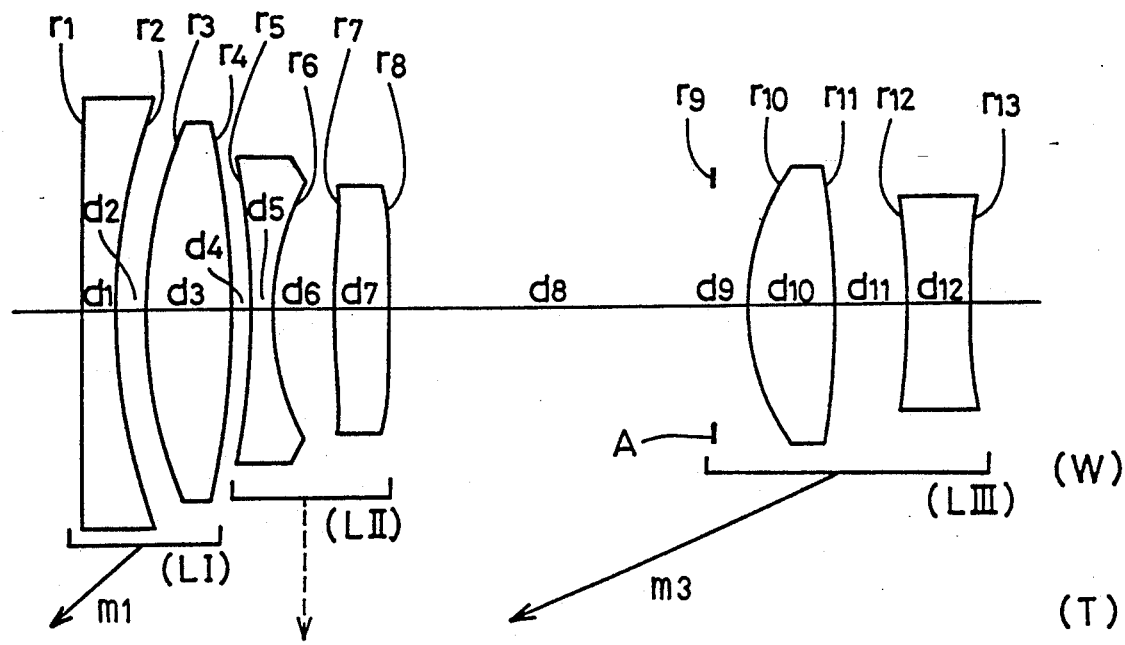
FIGS. 1 to 27 are cross-sectional views of the optical systems of a first to twenty-seventh embodiments of the present invention, respectively.

First, a first to third implementations of the present invention will be described.

The first implementation of a zoom lens system according to the present invention comprises from the object side a first lens component with a positive refractive power, a second lens component with a negative refractive power and a third lens component with a positive refractive power, and a focal length of the whole zoom lens system is changed by changing a distance between each lens component. At least two aspherical surfaces are employed for the third lens component, and the following conditions (1) and (2) are fulfilled:

$$0.3 < \phi_1/\phi_w < 1.0 \quad (1)$$

and $$0.8 < \phi_3/\phi_w < 1.8 \quad (2)$$

wherein:

$\phi_1$ represents a refractive power of the first lens component;

$\phi_3$ represents a refractive power of the third lens component; and $\phi_w$ represents a refractive power of the whole zoom lens system at a shortest focal length condition.

In the three-component zoom lens system, which is the first implementation of the present invention, consisting of a positive, a negative and a positive lens components, by employing at least two aspherical surfaces for the third lens component, the deterioration of various aberrations is restrained, and a high-performance zoom lens system is realized with a fewer number of lens elements. It is effective in correcting distortion and field curvature to employ an aspherical surface for the third lens component. Further, it is effective in correcting those aberrations while maintaining a good balance with other aberrations to employ two or more aspherical surfaces.

As then bi-aspherical lens element whose both side surfaces are aspherical is employed for the third lens component, aberrations which cannot be restrained only by the object side surface of the bi-aspherical lens element can be restrained by the image side surface thereof, which increases the above-described effect of aspherical surfaces.

More specifically, it is preferable that the third lens component comprises from the object side a positive lens element and a negative lens element, and that an aspherical surface is employed for the object-side surface of the positive lens element (for correcting spherical aberration) and for the image-side surface of the negative lens element (for correcting distortion).

Moreover, it is required that the zoom lens system fulfills the above-described conditions (1) and (2).

The above-described condition (1) stipulates a ratio of the refractive power of the first lens component to that of the whole zoom lens system at the shortest focal length condition. When the upper limit of the condition (1) is exceeded, the refractive power of the first lens component becomes excessive, so that it becomes difficult to correct aberrations produced therein, especially distortion and field curvature, even if an aspherical surface is employed for the first lens component. When the lower limit of the condition (1) is exceeded, a tendency remarkably increases that coma is generated on the periphery of the image plane.

The above-described condition (2) stipulates a ratio of a refractive power of the third lens component to that of the whole zoom lens system at the shortest focal length condition. When the upper limit of the condition (2) is exceeded, the refractive power of the third lens component becomes excessive, so that it becomes difficult to correct aberration generated therein, especially spherical aberration, even if an aspherical surface is employed for the third lens component. When the lower limit of the condition (2) is exceeded, a tendency remarkably increases that coma is generated on the periphery of the image plane.

Fulfillment of the conditions (1) and (2) enables the realization of a compact zoom lens system while maintaining a required performance.

A second implementation of a zoom lens system according to the present invention comprises from the object side a first lens component with a positive refractive power, a second lens component with a negative refractive power and a third lens component with a positive refractive power, and a focal length of the whole zoom lens system is changed by changing a distance between each lens component. At least a bi-aspherical lens element is employed for the lens component arranged on the object side of the third lens component.

In the three-component zoom lens system, which is the second implementation of the present invention, consisting of a positive, a negative and a positive lens elements, by employing at least one bi-aspherical lens element for a lens component provided in a comparatively front portion of the optical system, the deterioration of aberrations can be restrained and a high-performance zoom lens system can be realized with a fewer number of lens elements.

As the bi-aspherical lens element is employed, aberrations which cannot be restrained only by the object-side surface of the bi-aspherical lens element can be corrected by the image-side surface thereof. For example, when a bi-aspherical lens element is employed for the first lens component, particularly when a bi-aspherical lens element is employed for a most image side lens element of the first lens component, coma, on the periphery of the image plane, which cannot be restrained only by the front surface can be corrected by the rear surface. Moreover, it is effective to correct distortion in the vicinity of the shortest focal length condition. When a bi-aspherical surface is employed for the second lens component, particularly when a bi-aspherical surface is employed for a most image side lens element of the second lens component, spherical aberration which is inclined toward the under side by the front surface can be corrected so that it is inclined toward the over side. Moreover, the generation of higher-order coma which cannot be restrained by the first lens component can be prevented. In this case, the second lens component preferably comprises from the object side only two lens elements of a negative and a positive lens elements.

As described above, by employing at least a bi-aspherical lens element for a lens component arranged in a comparatively front portion of the zoom lens system, it becomes possible to reduce the number of lens elements and the size of a zoom lens system while maintaining a required performance.

The following third implementation of the present invention enables the realization of a zoom lens system with a higher performance. The third implementation of the present invention comprises from the object side a first lens component with a positive refractive power, a second lens component with a negative refractive power and a third lens component with a positive refractive power, and a focal length of the whole zoom lens system is changed by changing a distance between each lens component. Two or more aspherical surfaces are employed for at least one lens component located on the object side of the third lens component, and the above-described conditions (1) and (2) are fulfilled.

Now, preferable configurations of aspherical surfaces employed for the above first to third implementations will be described.

When aspherical surfaces are employed for the first lens component, all the aspherical surfaces of the first lens component preferably fulfill the following condition (3).

When an arbitrary height Y in a direction perpendicular to the optical axis is defined by $0<y<0.7_{max}$ where $Y_{max}$ represents a maximum effective aperture of an aspherical surface;

$$-0.03<\phi_1\cdot(N'-N)\cdot d/dy\cdot\{X(y)-X_o(y)\}<0.01 \quad (3)$$

wherein:

N represents a refractive index of an object side medium of an aspherical surface;

N' represents a refractive index of an image side medium of an aspherical surface;

X(y) represents a surface configuration of an aspherical surface; and $X_o(y)$ represents a reference surface configuration of an aspherical surface, where:

$$X(y) = r/\epsilon \cdot \{1-(1-\epsilon\cdot y^2/r^2)^{\frac{1}{2}}\} + \sum_{i\geq 2} A_i y^i;$$

and $$X_o(y) = {}^*r\cdot\{1-(1-y^2/{}^*r^2)^{\frac{1}{2}}\},$$

wherein:

r represents a reference radius of curvature of an aspherical surface;

$\epsilon$ rperesents a conic constant;

$A_i$ represents an aspherical coefficient; and

*r represents a paraxial radius of curvature of an aspherical surface $(1/{}^*r=1/r+2A_2)$.

When the upper limit of the condition (3) is exceeded, a tendency for positive distortion and field curvature to shift in a positive direction increases in the range between the shortest and the middle focal length conditions. When the lower limit of the condition (3) is exceeded, negative distortion increases in the range between the middle and a longest focal length conditions as well as a tendency for field curvature to shift in a negative direction remarkably increases.

When a bi-aspherical lens element is employed for the first lens component, it is preferable that one surface fulfills the following condition (4) and the other surface, the following condition (5).

When an arbitrary height Y in a direction perpendicular to the optical axis is defined by $0.7Y_{max}<y<Y_{max}$, $$-0.05<\phi_1\cdot(N'-N)\cdot d/dy\cdot\{X(y)-X_o(y)\}<0 \quad (4)$$

and $$0<\phi_1\cdot(N'-N)\cdot d/dy\cdot\{X(y)-X_o(y)\}<0.03 \quad (5)$$

In the first lens component, the condition (4) indicates that the negative refractive power of an aspherical surface fulfilling the condition (4) decreases (the positive refractive power increases) gradually along the height Y. Thereby, distortion in the vicinity of the shortest focal length condition is corrected. Further, by employing an aspherical surface fulfilling the condition (5), field curvature is excellently corrected.

When aspherical surfaces are employed for the second lens component, all the aspherical surfaces of the second lens component preferably fulfill the following condition (6).

When an arbitrary height Y in a direction perpendicular to the optical axis is defined by $0 < y < 0.7_{max}$, $$-0.02 < \phi_2 \cdot (N' - N) \cdot d/dy \cdot \{X(y) - X_0(y)\} < 0.01 \quad (6)$$

wherein:

$\phi_2$ represents a refractive power of the second lens component.

When the upper limit of the condition (6) is exceeded, zonal spherical aberration takes a high negative value, so that a deviation of a focusing unit caused by the closing of the aperture becomes a problem. When the lower limit of the condition (6) is exceeded, the aberration correction effect on spherical aberration to a zonal luminous flux becomes excessive, which makes it difficult to correct spherical aberration and other aberrations in a well-balanced condition. In this case, spherical aberration tends to have a wavy form.

When a bi-aspherical lens element is employed for the second lens component, it is preferable that one surface fulfills the following condition (7) and the other surface fulfills the following condition (8).

When an arbitrary height Y in a direction perpendicular to the optical axis is defined by $0.7 Y_{max} < y < Y_{max}$, $$-0.04 < \phi_2 \cdot (N' - N) \cdot d/dy \cdot \{X(y) - X_0(y)\} < 0 \quad (7)$$

and $$0 < \phi_2 \cdot (N' - N) \cdot d/dy \cdot \{X(y) - X_0(y)\} < 0.04 \quad (8)$$

In the second lens component, the condition (7) indicates that the positive refractive power of an aspherical surface fulfilling the condition (7) decreases (the negative refractive power increases) gradually along the height Y. Moreover, the condition (7) is a condition for correcting an inclination of spherical aberration toward the under side into that toward the over side in the third-order aberration area. In this case, aberrations are sometimes excessively corrected with respect to an axial luminous flux passing far away from the optical axis of the lens, so that spherical aberration inclines toward the over side. In order to return the inclination toward the over side to that toward the under side, an aspherical surface fulfilling the condition (8), that is, an aspherical surface whose negative refractive power decreases (positive refractive power increases) gradually along the height Y is employed for the the other surface.

Further, these aspherical surfaces prevent the generation of higher-order coma which cannot be restrained by the first lens component. For example, when the lower limit of the condition (7) is exceeded, off-axial peripheral coma and zonal coma become excessive, so that lateral aberration tends to have a wavy form.

When aspherical surfaces are employed for the third lens component, all the aspherical surfaces of the third lens component preferably fulfill the following condition (9).

When an arbitrary height Y in a direction perpendicular to the optical axis is defined by $0 < y < 0.7_{max}$, $$-0.01 < \phi_3 \cdot (N' - N) \cdot d/dy \cdot \{X(y) - X_0(y)\} < 0.02 \quad (9)$$

When the upper limit of the condition (9) is exceeded, a tendency for positive distortion and field curvature to shift in a positive direction increases in the range between the shortest and the middle focal length conditions. When the lower limit of the condition (9) is exceeded, negative distortion increases in the range between the middle and the longest focal length conditions, and a tendency for field curvature to shift in a positive direction remarkably increases in the whole focal length range.

When a bi-aspherical lens element is employed for the third lens component, it is preferable that one surface fulfills the following condition (10) and the other surface, the following condition (11).

The front aspherical surface of the above bi-aspherical surface should have a configuration where the negative refractive power decreases (the positive refractive power increases) gradually along the height Y.

When an arbitrary height Y in a direction perpendicular to the optical axis is defined by $0.7Y_{max} < y < Y_{max}$, $$-0.02 < \phi_3 \cdot (N' - N) \cdot d/dy \cdot \{X(y) - X_0(y)\} < 0 \quad (10)$$

and $$-0.01 < \phi_3 \cdot (N' - N) \cdot d/dy \cdot \{X(y) - X_0(y)\} < 0.04 \quad (11)$$

In the third lens component, the condition (10) indicates that the negative power of an aspherical surface fulfilling the condition (10) decreases (the positive refractive power increases) gradually along the height Y. Thereby, an increase of distortion in the vicinity of the shortest focal length condition and an inclination of field curvature toward the under side are prevented. Further, in this case, by employing an aspherical surface fulfilling the condition (11) for the rear surface, field curvature which cannot be restrained only by the front surface can excellently be corrected.

The first and third lens components are preferably constructed so as to fulfill the following conditions (12) and (13):

$$0.20 < (\phi_w \cdot \phi_T)^{\frac{1}{2}} / (\beta \cdot \phi_1) < 1.25 \quad (12)$$

$$0.08 < (\phi_w \cdot \phi_T)^{\frac{1}{2}} / (\beta \cdot \phi_3) < 0.40 \quad (13)$$

wherein:

$\phi_T$ represents a refractive power of the whole zoom lens system at the longest focal length condition; and $\beta$ represents a zoom ratio, where $\beta = \phi_w / \phi_T$.

These conditions (12) and (13) are conditions for maintaining the total length of a zoom lens system, the movement amount for zooming, the back focal distance and the correction of aberrations in a well-balanced condition.

When the lower limit of the condition (12) is exceeded, the refractive power of the first lens component becomes too strong, so that it becomes difficult to maintain the back focal distance at an appropriate value (15% of the focal length at the shortest focal length condition) at the shortest focal length condition. Consequently, the diameter of the third lens component increases. When the upper limit of the condition (12) is exceeded, the movement amount of each lens component in a zooming operation becomes excessive, which is disadvantageous in constructing a lens barrel.

When the lower limit of the condition (13) is exceeded, the Petzval sum takes a positive high value, so that the image plane remarkably inclines in a negative direction, and further, distortion at the shortest focal length condition takes a high negative value. When the upper limit of the condition (13) is exceeded, the change of the distance between the second and third lens components in a zooming operation is required to be large, so that the distance between the second and third lens components largely increases at the shortest focal length condition. Consequently, the total length of the zoom lens system increases.

Next, a fourth to eleventh implementations of the present invention will be described.

The fourth implementation of a zoom lens system according to the present invention comprises from the object side a first lens component with a positive refractive power, a second lens component with a negative refractive power and at least one succeeding lens component, and the first lens component monotonously shifts toward the object side at a zooming operation from a shorter focal length side to a longer focal length side. For the whole zoom lens system of the fourth implementation, at least three aspherical surfaces are employed, and the following conditions (14) and (15) are fulfilled:

$$-2.0 < fW/f12, W < -0.55 \quad (14)$$

and $$0.54 < B_{max}/fW < 0.91 \quad (15)$$

wherein:
- fW represents a focal length of the whole zoom lens system at the shortest focal length condition;
- f12,W represents a composite focal length of the first and third lens components at the shortest focal length condition; and
- $B_{max}$ represents the longest diagonal length of the image plane.

In the fourth implementation of the present invention, aberrations are corrected by the above-mentioned at least three aspherical surfaces. It is preferable to employ an aspherical surface for a surface comparatively close to a most object side in the zoom lens system to correct distortion at the shortest focal length condition, to employ an aspherical surface for a surface arranged in the vicinity of the aperture to correct spherical aberration, and to employ an aspherical surface for a surface comparatively close to a most image side in the zoom lens system to correct astigmatism.

The above condition (14) stipulates a lateral magnification of the succeeding lens component.

When the lower limit of the condition (14) is exceeded, the absolute value of the lateral magnification of the succeeding lens component excessively increases at the shortest focal length condition, so that it becomes difficult to reduce the size of the whole zoom lens system. Further, a movement amount of the succeeding lens component in a zooming operation excessively increases, so that it becomes difficult to correct aberrations.

When the upper limit of the condition (14) is exceeded, the absolute value of the lateral magnification of the succeeding lens component at the shortest focal length condition excessively decreases, so that it becomes difficult to secure a back focal distance required for a single-lens reflex camera.

The condition (14) has the same meaning for the subsequently described seventh to ninth implementations of the present invention.

The above condition (15) stipulates the maximum angle of view of a zoom lens system.

When the upper limit of the condition (15) is exceeded, an angle of view excessively increases at the shortest focal length condition, so that aberration correction is hindered or it becomes difficult to correct aberrations with a fewer number of lens elements.

When the lower limit of the condition (15) is exceeded, although aberration correction is easier, it is impossible to cover the wide angle area, so that an object of the present invention cannot be achieved.

Fulfillment of the above conditions (14) and (15) enable the realization of compactness and low cost not only for the above-described fourth implementation but also for the subsequently described implementations and zoom lens systems having structures other than those.

The fifth implementation of a zoom lens system according to the present invention comprises from the object side a first lens component with a positive refractive power, a second lens component with a negative refractive power and at least one succeeding lens component, the first lens component monotonously shifts toward the object side in a zooming operation from a shorter focal length side to a longer focal length side. At least two aspherical surfaces are employed for the second lens component, and at least two aspherical surfaces are employed for the succeeding lens component.

In a compact zoom lens system, the refractive power of the second lens component and that of the succeeding lens component are naturally strong. Because the deterioration of aberrations due to that should be prevented, it is difficult to reduce the number of lens elements. In the fifth implementation, aberrations are excellently corrected by the at least two aspherical surfaces employed for the second lens component or by the at least two aspherical surfaces employed for the succeeding lens component.

It is particularly preferable to employ an aspherical surface for a surface comparatively close to the most object side in the second lens component to correct distortion at the shortest focal length condition and to employ an aspherical surface for a surface, arranged in the vicinity of the aperture, of the second lens to correct negative aberration produced in the second lens component. For the succeeding lens component, it is preferable to employ an aspherical surface for a surface in the vicinity of the aperture to correct spherical aberration and to employ an aspherical surface for a surface comparatively close to the most image side in the second lens component to correct astigmatism.

The sixth implementation of a zoom lens system according to the present invention comprises from the object side a first lens component with a positive refractive power, a second lens component with a negative refractive power and a third lens component with a positive refractive power, the first and third lens components monotonously shift toward the object side in a zooming operation from a shorter focal length side to a longer focal length side. At least one bi-aspherical lens element is employed for the second lens component. The sixth implementation may have at least one succeeding lens component behind the third lens component.

As described above, in a compact zoom lens system, the refractive power of the second lens component is naturally strong. The second lens component resultingly has a single lens element with a strong refractive power. In the sixth implementation of the present invention, spherical aberration, coma and astigmatism caused by the single lens element are excellently corrected by the at least one bi-aspherical lens element employed for the second lens component.

The seventh implementation of a zoom lens system according to the present invention comprises from the object side a first lens component with a positive refractive power, a second lens component with a negative refractive power and a third lens component with a positive refractive power, and the first and third lens components monotonously shift toward the object side in a zooming operation from a shorter focal length side to a longer focal length side. At least one bi-aspherical lens element is employed for the third lens component, and the above-described condition (14) is fulfilled. The seventh implementation may have at least one succeeding lens component behind the third lens component.

As described above, in a compact zoom lens system, the refractive power of the third lens component is naturally strong. The third lens component resultingly has a single lens element with a strong refractive power. In the seventh implementation of the present invention, spherical aberration, coma and astigmatism caused by the single lens element are excellently corrected by the at least one bi-aspherical lens element employed for the third lens component.

The eighth implementation of a zoom lens system according to the present invention comprises from the object side a first lens component with a positive refractive power, a second lens component with a negative refractive power and at least one succeeding lens component, and the first lens component monotonously shifts toward the object side in a zooming operation from a shorter focal length side to a longer focal length side. At least one aspherical surface is employed for each of the first, second and succeeding lens components, and the above-described condition (14) is fulfilled.

In the eighth implementation of the present invention, aberrations are corrected by employing at least one aspherical surface for each of the first, second and succeeding lens components. It is particularly preferable to employ at least one aspherical surface for the first lens component to correct spherical aberration at the longest focal length condition, to employ at least one aspherical surface for the second lens component to correct distortion and astigmatism at the shortest focal length condition and to employ at least one aspherical surface for the succeeding lens component to correct spherical aberration and coma in the whole focal length range.

The ninth implementation of a zoom lens system according to the present invention comprises from the object side a first lens component with a positive refractive power, a second lens component with a negative refractive power and at least one succeeding lens component, and the first lens component monotonously shifts toward the object side in a zooming operation from a shorter focal length side to a longer focal length side. The second lens component consists of two lens elements, at least three aspherical surfaces are employed for the whole zoom lens system, and the above-described condition (14) is fulfilled.

The second lens component with a strong negative refractive power is frequently constituted by lens elements having a large curvature. Consequently, the size of the zoom lens system increases. If the second lens component were constituted by two lens elements, the size of the zoom lens system would be largely reduced.

In the ninth implementation of the present invention, as described above, the second lens component consists of two lens elements, and aberrations are corrected by employing at least three aspherical surfaces for the whole zoom lens system. For example, it is preferable to employ an aspherical surface for a surface comparatively close to the most object side in the second lens component to correct distortion at the shortest focal length condition and to employ an aspherical surface for a surface arranged in the vicinity of the aperture to correct spherical aberration. Moreover, it is preferable to employ an aspherical surface for a surface comparatively close to the image side in the second lens component to correct astigmatism. Further, it is preferable that the second lens component comprises from the object side a negative and positive lens elements, and that the negative lens element is a bi-concave lens element whose image side surface has a stronger refractive power or a meniscus lens element concave to the image side and the positive lens element is a bi-convex lens element whose object side surface has a stronger refractive power or a meniscus lens element convex to the object side.

The tenth implementation of a zoom lens system according to the present invention comprises from the object side a first lens component with a positive refractive power, a second lens component with a negative refractive power and a third lens component with a positive refractive power, and the first and third lens components monotonously shift toward the object side in a zooming operation from a shorter focal length side to a longer focal length side. The third lens component consists of three or fewer lens elements, and at least three aspherical surfaces are employed for the whole zoom lens system. The tenth implementation may have at least one succeeding lens component behind the third lens component. In this case, the third lens component and the succeeding lens component consists of three or fewer lens elements.

The third and succeeding lens components, which have a strong positive refractive power, are frequently constituted by lens elements having a high curvature. Consequently, a total length of the zoom lens system increases. If there lens components are constituted by two lens elements, the size of the zoom lens system will be largely reduced.

In the tenth implementation of the present invention, as described above, the third lens component and the succeeding lens component consist of three or fewer lens elements, and aberrations are corrected by employing at least three aspherical surfaces for the whole zoom lens system. For example, it is preferable to employ an aspherical surface for a surface, in the vicinity of the aperture, of the third lens component or the succeeding lens component to correct spherical aberration and to employ an aspherical surface for a surface comparatively close to the most image side in the third lens component to correct astigmatism. Moreover, it is preferable to employ an aspherical surface for the second lens component to correct distortion at the shortest focal length condition. Further, it is preferable that the third and succeeding lens components consist of from the object side a positive and negative lens elements, a positive, a positive and a negative lens elements, or a positive, a negative and a negative lens elements. Although these lens elements may be constructed as one lens component, the degree of freedom of aberration correction is higher with a plurality of lens conponents. When the third and succeeding lens components consist of from the object side a positive and a negative lens elements, the employment of a doublet lens element for the positive lens element is effective in correcting aberrations.

The eleventh implementation of a zoom lens system according to the present invention comprises from the object side a first lens component with a positive refractive power, a second lens component with a negative refractive power and at least one succeeding lens component, and the first lens component monotonously shifts toward the object side in a zooming operation from a shorter focal length side to a longer focal length side. At least one bi-aspherical lens element is employed for the first lens component.

In order to reduce the size, including a movement amount for zooming, of a zoom lens system, the refractive power of the first lens component should be increased. Because the deterioration of aberration due to that should be corrected, it is difficult to reduce the number of lens elements. The first lens component resultingly has a single lens element with a strong refractive power. In the eleventh implementation of the present invention, spherical aberration, coma and astigmatism caused by the single lens element at the longest focal length condition are excellently corrected by the at least one aspherical surface employed for the first lens component.

The above-described fourth to eleventh implementations of the present invention preferably fulfill the following conditions (16), (17) and (18):

$$0.8 < f_1/(f_W \cdot f_T)^{\frac{1}{2}} < 2.5 \qquad (16)$$

$$0.25 < |f_2|/(f_W \cdot f_T)^{\frac{1}{2}} < 0.7 \qquad (17)$$

and $$0.35 < |f_S|/(f_W \cdot f_T)^{\frac{1}{2}} < 0.8 \qquad (18),$$

wherein:

f1 represents a focal length of the first lens component;

f2 represents a focal length of the second lens component;

fT represents a focal length of the whole zoom lens system at the longest focal length condition; and fW represents a composite focal length of the third and succeeding lens components at the shortest focal length condition.

The condition (16) stipulates a focal length of the first lens component. When the lower limit of the condition (16) is exceeded, the refractive power of the first lens component becomes too strong, so that it becomes difficult to correct aberrations, particularly spherical aberration at the longest focal length condition. When the upper limit of the condition (16) is exceeded, it becomes difficult to reduce the size of the zoom lens system.

The condition (17) stipulates a focal length of the second lens component. When the lower limit of the condition (17) is exceeded, the refractive power of the second lens component becomes too strong, so that it becomes difficult to correct distortion and astigmatism at the shortest focal length condition. When the upper limit of the condition (17) is exceeded, a sufficient back focal distance cannot be secured at the shortest focal length condition.

The condition (18) stipulates a composite focal length of the third and succeeding lens components. When the lower limit of the condition (18) is exceeded, the refractive powers of the third and succeeding lens components become too strong, so that it becomes difficult to correct aberrations, particularly spherical aberration and coma, in the whole focal length range. When the upper limit of the condition (18) is exceeded, the movement amount of the third and succeeding lens components in a zooming operation becomes excessive, so that it becomes difficult to reduce the size of the zoom lens system.

Further, the following arrangement and configuration are preferable for the above-described fourth to eleventh lens components of the present invention. That is, the third lens component preferably consists of from the object side a positive and a negative lens elements and a positive and a positive lens elements, or of from the object side a positive, a positive and a negative lens elements and a positive, a negative and a positive lens elements.

In this case, a most object side lens element of a positive third lens component is preferably a positive single lens element having a comparatively large axial thickness, a doublet lens element consisting of a positive and negative lens elements or a compound lens element consisting of a positive and negative lens elements with a slight space therebetween. Further, the axial thicknesses of these lens elements preferably fulfills the following condition (19):

$$0.07 < t/\Sigma d < 0.19 \qquad (19)$$

wherein:

t represents an axial thickness of a positive single lens element, a doublet lens element of a positive and negative lens elements or a compound lens element of a positive and negative lens elements; and Σ d represents a total amount of the axial thickness of the whole zoom lens system at the shortest focal length condition.

When the lower limit of the condition (19) is exceeded, the axial thickness of the above lens elements is excessively large, so that it becomes difficult to reduce the size of the whole zoom lens system. When the upper limit of the condition (6) is exceeded, the axial thickness of the above lens elements is excessively small, so that the degree of freedom for aberration correction cannot satisfactorily be utilized. In a zoom lens system with a fewer number of lens elements like the zoom lens system according to the present invention, it is required to make the most of the working of aspherical surfaces and to provide an appropriate thickness to the zoom lens system.

Moreover, it is preferable that the most image side surface is concave to the image side. Thereby, the most image side surface becomes nearly concentric with the image point, and field curvature and distortion can be corrected without spherical aberration and coma being generated.

Further, a most image side lens element or a lens element comparatively close to the most image side lens element may be a negative meniscus lens element concave to the image side. Thereby, the above-described correction is more effectively performed. If an aspherical surface is employed for one of the surfaces which are nearly concentric with the image points, sagittal flare is effectively corrected.

Next, a twelfth and thirteenth implementations of the present invention will be described.

The twelfth implementation of a zoom lens system according to the present invention comprises from the object side a first lens component with a positive refractive power, a second lens component with a negative refractive power and a third lens component with a positive refractive power, and the first lens component monotonously shifts toward the object side in a zooming operation from a shorter focal length side to a longer focal length side. The first lens component consists of from the object side a negative and a positive lens elements. The second lens component consists of from the object side a negative and a positive lens elements. The third lens component consists of from the object side a positive and a negative lens elements. At least one aspherical surface is employed for the whole zoom lens system.

In the twelfth implementation of the present invention, aberrations are corrected by the at least one aspherical surface employed for the whole zoom lens system. The arrangement of each lens component can be simple as hereinafter described.

For example, the third lens component may consist of from the object side a positive single lens element and a negative single lens element (referred to as "C1" arrangement). It may consist of from the object side a positive lens element and a negative lens element, which form a doublet lens element having a positive refractive power as a whole, and a negative lens element (referred to as "C2" arrangement). Further it may consist of from the object side a positive lens element and a negative lens element with a slight axial distance therebetween, which form a compound lens element having a positive refractive power as a whole, and a negative lens element (referred to as "C3" arrangement).

If the first lens component consists of from the object side a negative and a positive lens elements and the second lens component consists of from the object side a negative and a positive lens elements, since the principal point of the first lens component is located on the image side and that of the second lens component is located on the object side, the space between the first and second lens components is small and the zoom ratio is secured therein.

If the third lens component consists of the abovedescribed C1, C2 or C3 arrangement, the third lens component becomes a lens component of so-called telephoto type, which contributes to the reduction of the size of the whole zoom lens system.

If an object side lens element is a doublet lens element, axial chromatic aberration is effectively corrected. This is because the doublet lens element has the highest axial chromatic aberration coefficient. In this case, spherical aberration and coma are effectively corrected by generating higher-order aberration by providing different refractive indices to different portions of the glass of the doublet lens element. If the object side lens is a compound lens element consisting of a positive and negative lens elements with a slight axial distance therebetween, the aberration correction is more effectively performed.

The arrangement of the thirteenth implementation of the present invention is the same as that of the above-described twelfth implementation except that the second lens component consists of three lens elements, that is, of from the object side a negative, a negative and a positive lens elements.

In a zoom lens system whose first lens component has a positive refractive power, the refractive power of the negative lens element of the second lens component can generally be increased. The reduction of the size, including the movement amount for zooming, of the whole zoom lens system depends on that how much the refractive power can be increased.

As is generally known, aspherical surfaces have no effect on the Petzval sum. The Petzval sum shifts in a negative direction as the refractive power of the second lens component increases. In that case, field curvature cannot be corrected even if aspherical surfaces are employed. When a large zoom ratio is required, it is preferable that the second lens component consists of three lens elements, that is, of a negative, a negative and a positive lens elements, since it is possible to provide an appropriate space between the negative lens elements as a degree of freedom for the Petzval sum. The positive lens elements are successively provided in order to move the principal point toward the object side. This has an effect the same as that of the above-described twelfth implementation.

The above-described twelfth and thirteenth implementations preferably fulfill the above-described conditions (14) to (18).

Lastly, a fourteenth to sixteenth implementations of the present invention will be described.

The fourteenth implementation of a zoom lens system according to the present invention comprises from the object side a first lens component with a positive refractive power, a second lens component with a negative refractive power and at least one succeeding lens component, and the first lens component monotonously shifts toward the object side in a zooming operation from a shorter focal length side to a longer focal length side. At least three aspherical surfaces are employed for the whole zoom lens system, and the first and second lens components shift toward the object side in a focusing operation from infinite object distance side to a nearer object distance side.

In a focusing operation, generally the first and second lens components are moved in a linked body toward the object side. In order to effectively correct aberrations, the movement amount of the first lens component and that of the second lens component may be different.

In the fourteenth implementation of the present invention, aberrations are corrected by the at least three aspherical surfaces employed for the whole zoom lens system. It is particularly preferable to employ an aspherical surface for a surface comparatively close to the most object side in the zoom lens system to correct distortion at the shortest focal length condition, to employ an aspherical surface for a surface arranged in the vicinity of the aperture to correct spherical aberration and to employ an aspherical surface for a surface comparatively close to the most image side in the zoom lens system to correct astigmatism.

The focusing method of the zoom lens system has the following advantages. Since the absolute value of the compound refractive power of the focusing lens components is larger than that in the normal focusing method where the first lens component is moved out, a smaller movement amount is required for focusing. Further, the minimum object distance can be further decreased without the size of the front lens element being increased. At least one of the aspherical surfaces is preferably arranged for the focusing lens component, since the aspherical surface effectively corrects the deterioration of aberrations due to focusing.

Moreover, the following condition (20) is preferably fulfilled:

$$0.7 < |f12, W|/fW < < 1.2 \tag{20}$$

wherein:
- f12,W represents a composite focal length of the first and third lens components at the shortest focal length condition; and
- fW represents a focal length of the whole zoom lens system at the shortest focal length condition.

When the lower limit of the condition (20) is exceeded, the compound refractive power of the first and second lens components becomes too strong, so that the variation in aberration due to focusing increases. When the upper limit of the condition (20) is exceeded, the compound refractive power of the first and second lens components becomes too weak, so that a movement amount for focusing increases. Consequently, the size of the zoom lens system cannot be reduced.

The fifteenth implementation of a zoom lens system according to the present invention comprises from the object side a first lens component with a positive refractive power, a second lens component with a negative refractive power and at least one succeeding lens component, and the first lens component monotonously shifts toward the object side in a zooming operation from a shorter focal length to a longer focal length side. At least three aspherical surfaces are employed for the whole zoom lens system, and the second lens components shifts toward the object side in a focusing operation from infinite object distance side to a nearer object distance side.

In the fifteen implementation of the present invention, aberrations are also corrected by the at least three aspherical surfaces employed for the whole zoom lens system. It is particularly preferable to employ an aspherical surface for a surface comparatively close to the most object side in the zoom lens system to correct distortion at the shortest focal length condition, to employ an aspherical surface for a surface arranged in the vicinity of the aperture to correct spherical aberration and to employ an aspherical surface for a surface comparatively close to the most image side in the zoom lens system to correct astigmatism.

Moreover, the focusing method of the zoom lens system has the following advantages. In a zoom lens system including the first and second lens components having a positive refractive power and a negative refractive power, respectively, the refractive power of the second lens component can be increased. Therefore, if focusing is performed with such a lens component, the movement amount thereof is extremely small. Further, since the absolute value of the lateral aberration of the lens component is comparatively small, variation in aberration due to focusing can be reduced. Thus, the size of the zoom lens system is not increased.

It is preferable that at least one of the aspherical surfaces is employed for the focusing lens component, since the aspherical surface effectively corrects the deterioration of aberrations due to focusing.

Moreover, the following condition (21) is preferably fulfilled:

$$0.2 < |\beta 2, W| < 0.6 \tag{21}$$

wherein:
- $\beta 2$, W represents a lateral magnification of the second lens component when the camera is in-focus on infinity at the shortest focal length condition.

When the lower limit of the condition (21) is exceeded, the absolute value of the lateral magnification of the second lens component when the camera is in-focus on infinity at the shortest focal length condition becomes too low. In this case, although the movement amount for focusing is relatively small, the focal length of the first lens component or the absolute value of the lateral magnification of the third lens component increases, so that the size of the zoom lens system cannot be reduced.

When the upper limit of the condition (21) is exceeded, the absolute value of the lateral magnification of the second lens component when the camera is in-focus on infinity at the shortest focal length condition becomes too high, with which the movement amount for focusing increases. Hence, it is required to increase the air space between the first and second lens components, which makes it impossible to reduce the size of the zoom lens system.

The sixteenth implementation of a zoom lens system according to the present invention comprises from the object side a first lens component with a positive refractive power, a second lens component with a negative refractive power and at least one succeeding lens component, and the first lens component monotonously shifts toward the object side in a zooming operation from a shorter focal length side to a longer focal length side. At least three aspherical surfaces are employed for the whole zoom lens system, a part or the whole of the succeeding lens component moves toward the image side in a focusing operation, and at least one of the aspherical surfaces is employed for a lens component which is moved for focusing.

In a focusing operation, generally, lens components employed for focusing are moved in a linked body toward the object side. In order to effectively correct aberrations, a plurality of lens components may be moved by different amounts.

In the sixteenth implementation of the present invention, aberrations are corrected by the at least three aspherical surfaces employed for the whole zoom lens system like in the above-described fourteenth implementation. It is particularly preferable to employ an aspherical surface for a surface comparatively close to the most object side in the zoom lens system to correct distortion at the shortest focal length condition, to employ an aspherical surface for a surface arranged in the vicinity of the aperture to correct spherical aberration and to employ an aspherical surface for a surface comparatively close to the most image side in the zoom lens system to correct astigmatism.

In this focusing method, since the focusing lens component is located close to the most image side in the zoom lens system, it largely affects the variation in aberration in the whole zooming range. For this reason, at least one of the aspherical surfaces is employed for the focusing lens component. That is, aberrations are improved by employing aspherical surfaces for the focusing lens component.

Moreover, this focusing method has the following advantage. In a zoom lens system including the first and second lens components having a positive and a negative refractive powers, respectively, the refractive power of the succeeding lens component is generally stronger than that of the first lens component. Further, when focusing is performed with a part or the whole of the succeeding lens component, the position where luminous flux passes is comparatively fixed. Therefore, by this focusing method, focusing can be performed, without any aberration deterioration, with a less movement amount and to a shorter distance than those required in a method where the front lens component is moved out. Thus, the size of the zoom lens system can be reduced.

Moreover, the following condition (22) is preferably fulfilled:

$$1.1 < |\beta S, W| < 1.6 \tag{22}$$

wherein:

$\beta$ S, W represents a lateral magnification of a focusing lens component when the zoom lens system is in-focus on infinity at the shortest focal length condition.

When the lower limit of the condition (22) is exceeded, the absolute value of the lateral magnification of the focusing lens component when the zoom lens system is in-focus on infinity at the shortest focal length condition decreases, so that an object distance cannot be decreased with which focusing can be performed at the shortest focal length condition. Or, a movement amount for focusing at the longest focal length condition becomes excessive, so that it becomes difficult to restrain the variation in aberration in a focusing operation.

When the upper limit of the condition (22) is exceeded, the absolute value of the lateral magnification of the focusing lens component when the camera is in-focus on infinity at the shortest focal length condition is excessively high, so that the movement amount of the succeeding lens components (including the focusing lens component) for focusing increases. Consequently, in trying to restrain the variation in aberration in the whole focal length range, it becomes difficult to correct aberrations of the succeeding lens components, so that the zoom lens system cannot be constructed with a fewer number of lens elements. Thus, an object of the present invention cannot be achieved.

Figure 2:
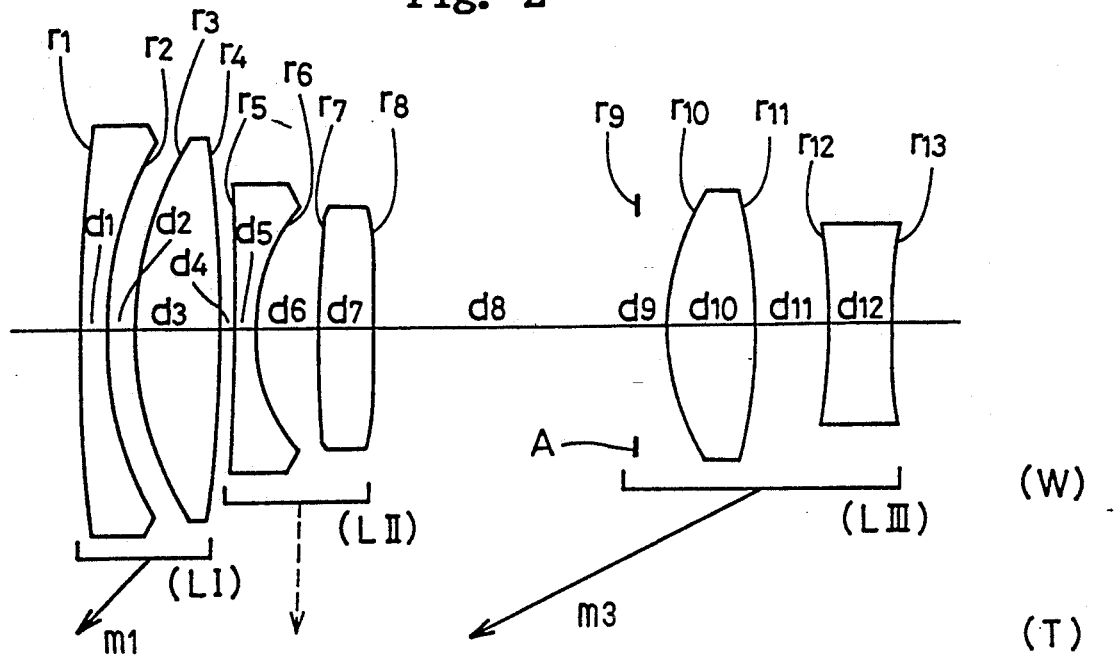
Figure 3:
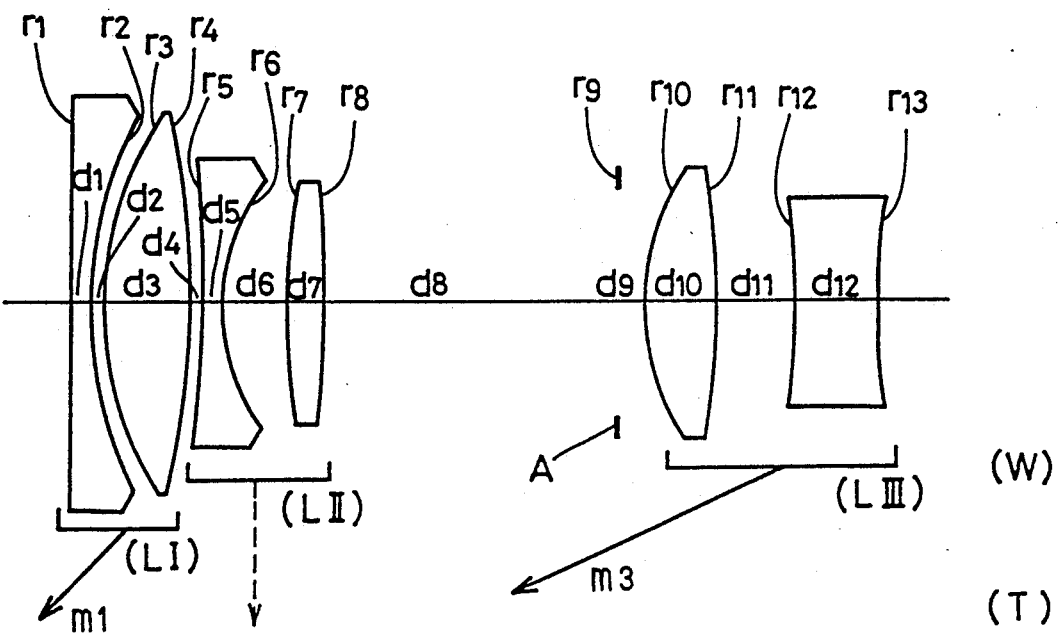
Figure 4:
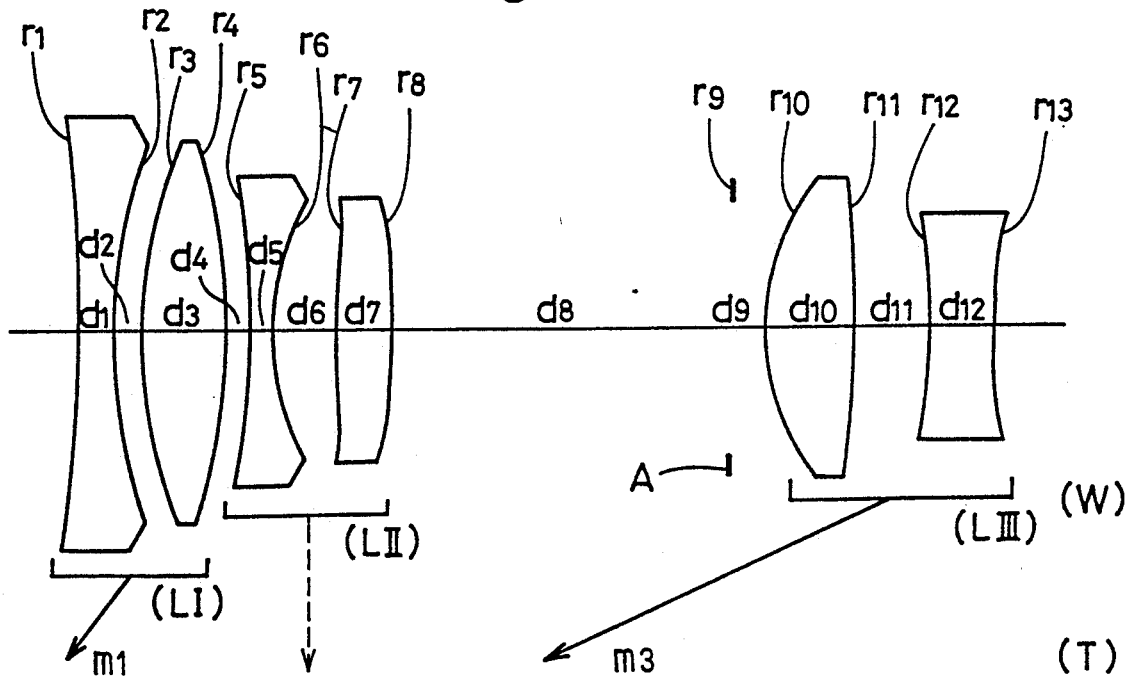
Figure 5:
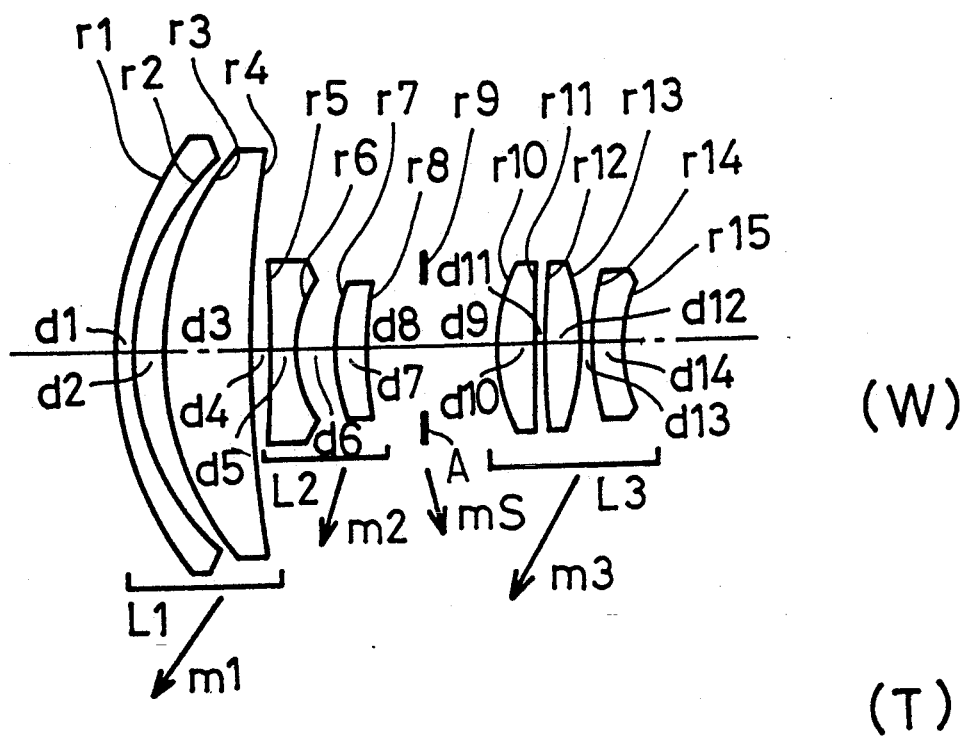
Figure 6:
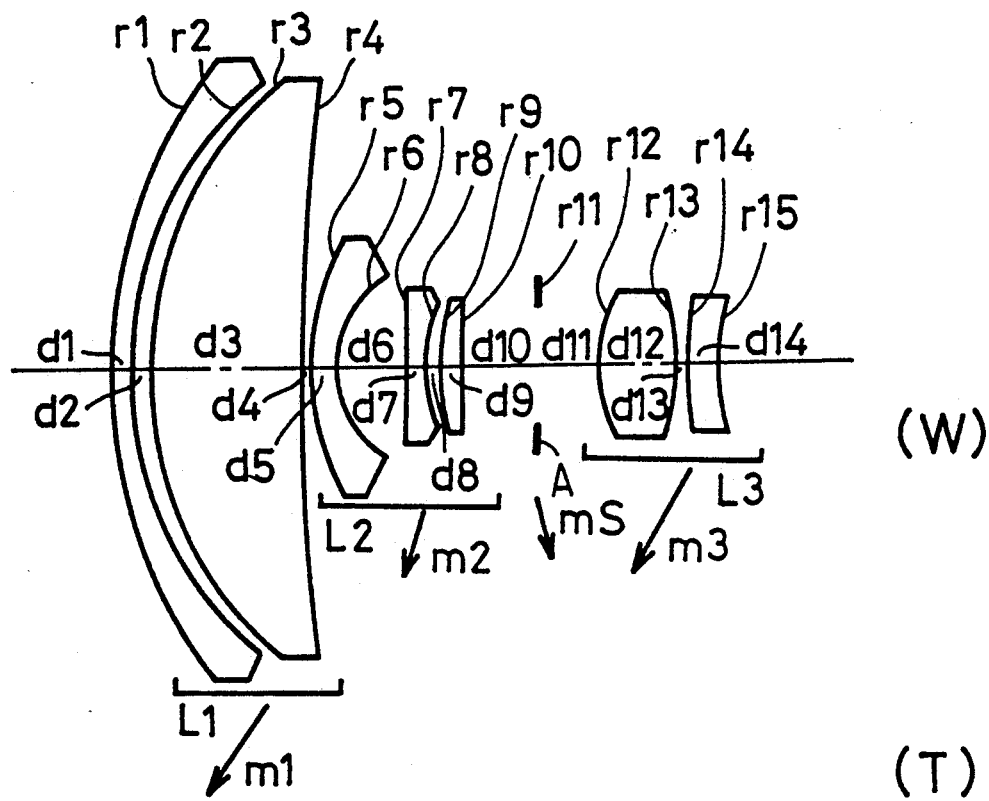
Figure 7:
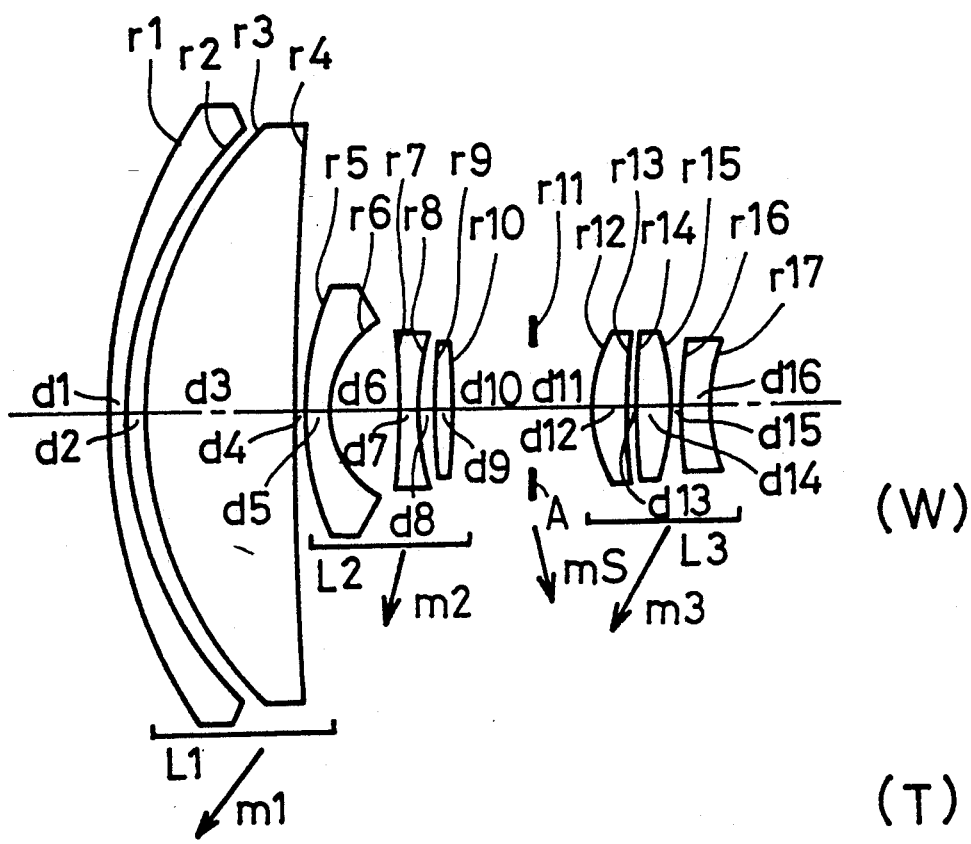
Figure 8:
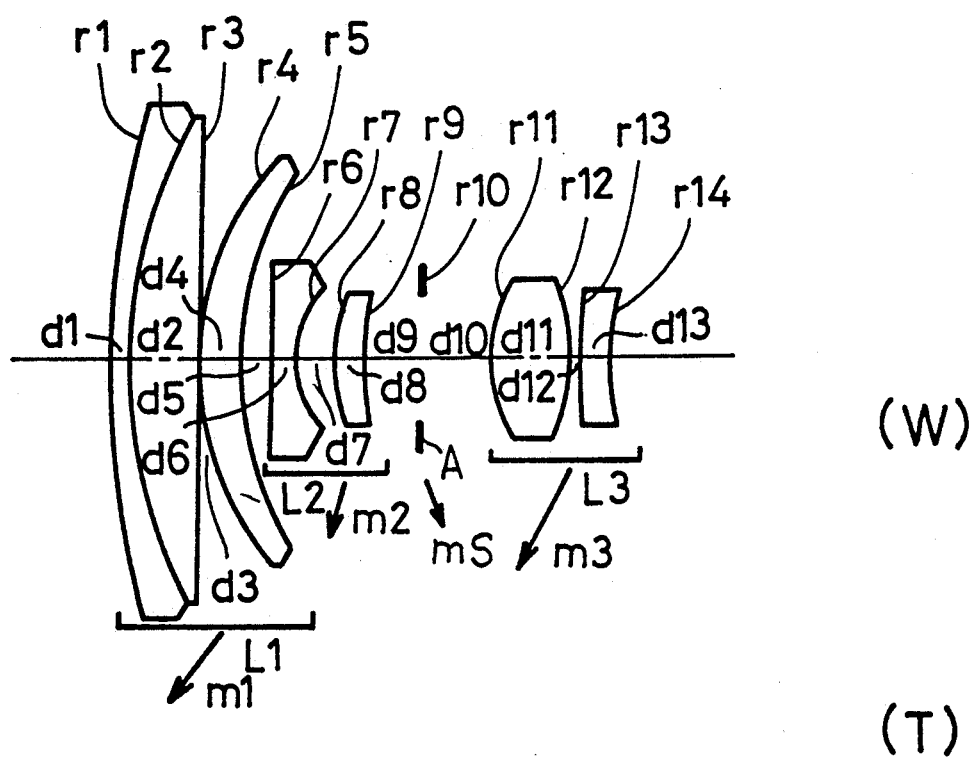
Figure 9:
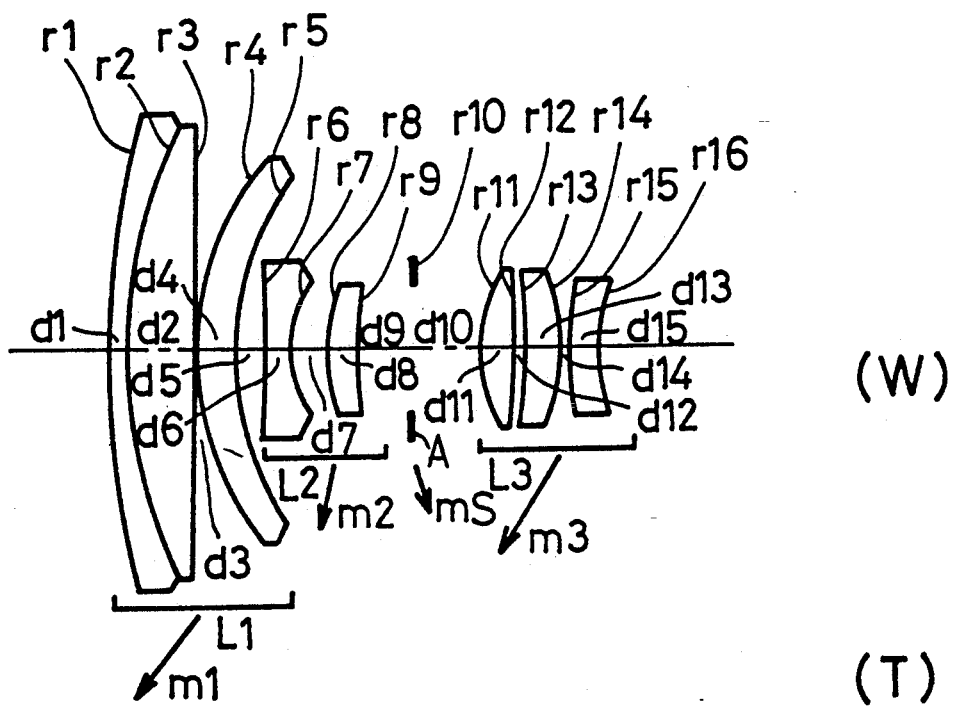
Figure 10:
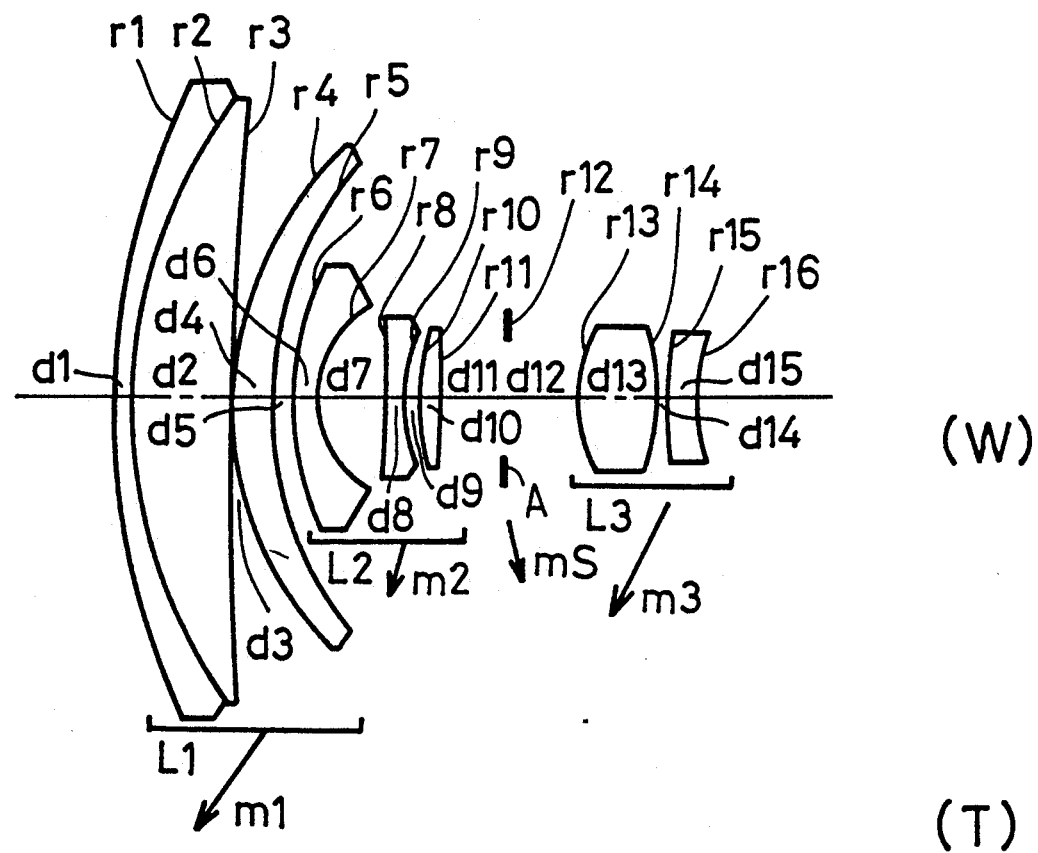
Figure 11:
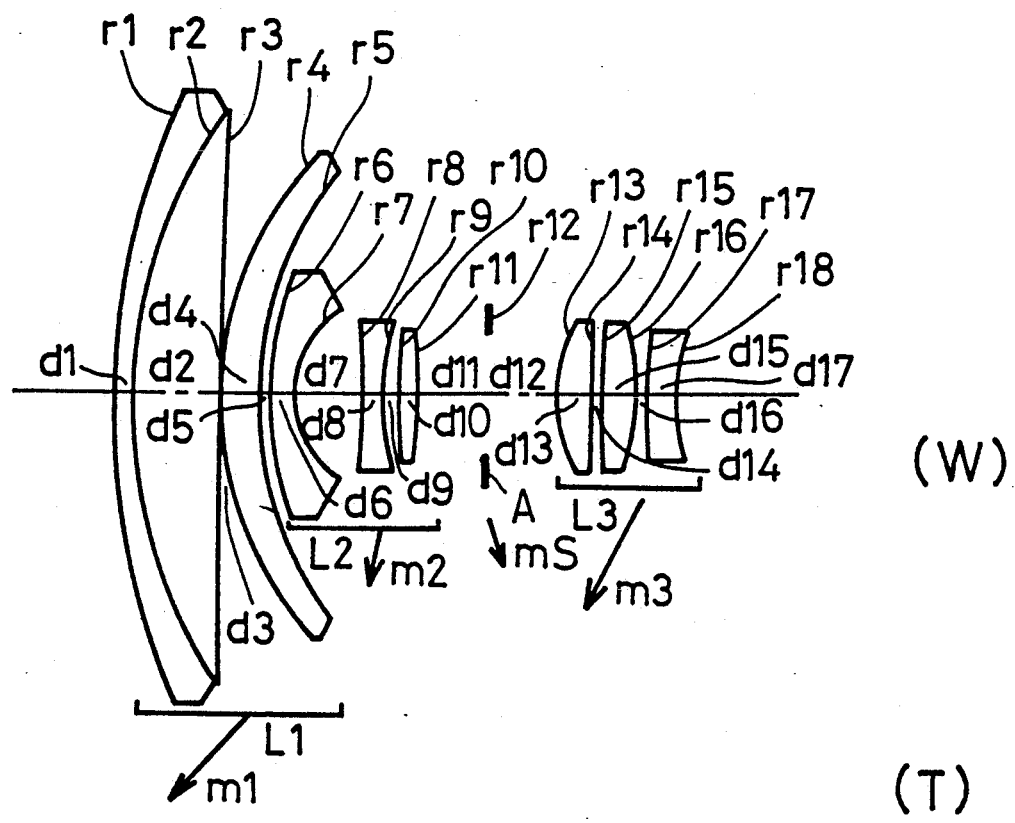
Figure 12:
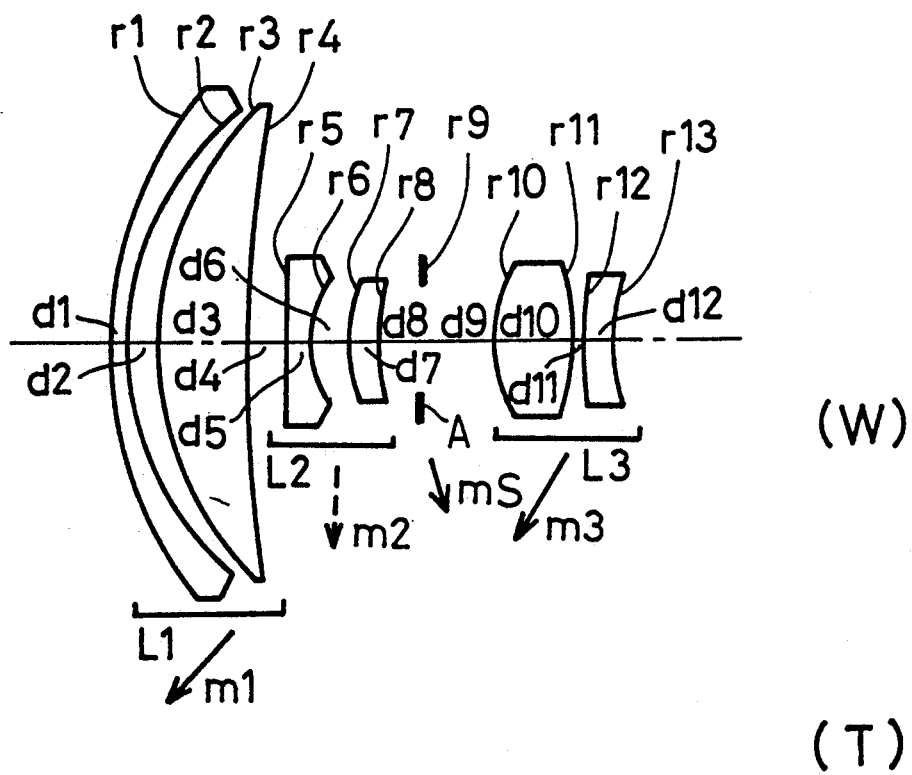
Figure 13:
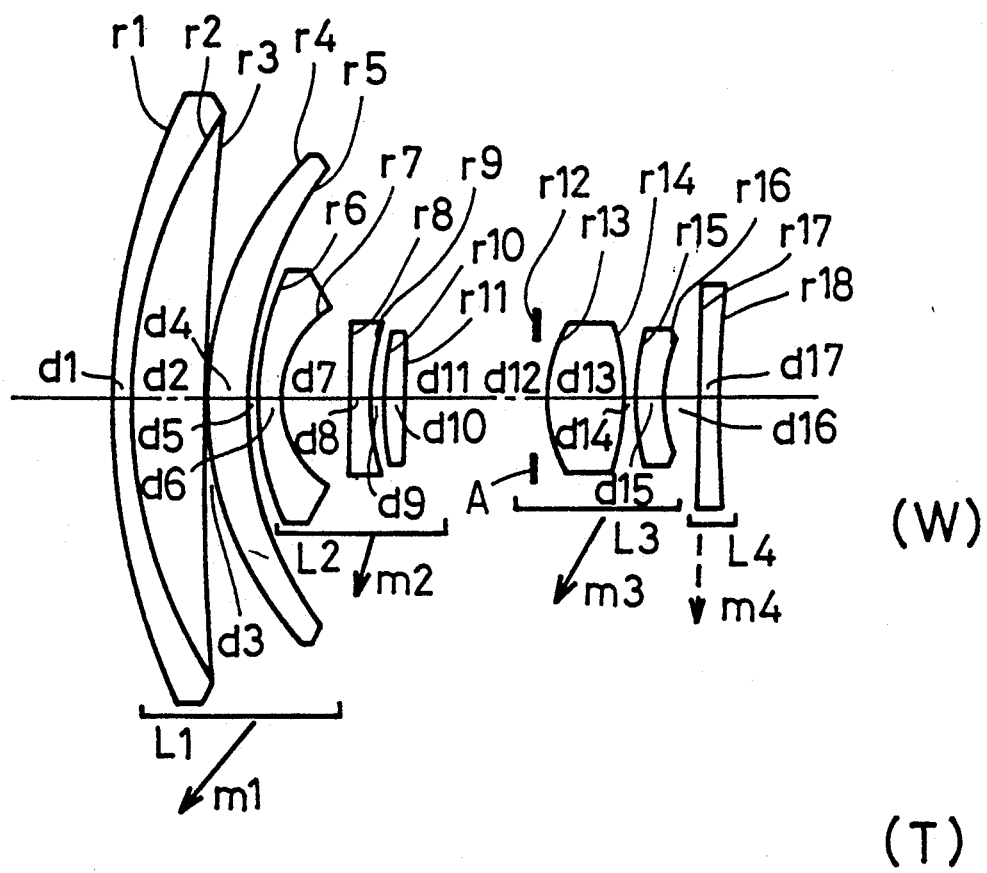
Figure 14:
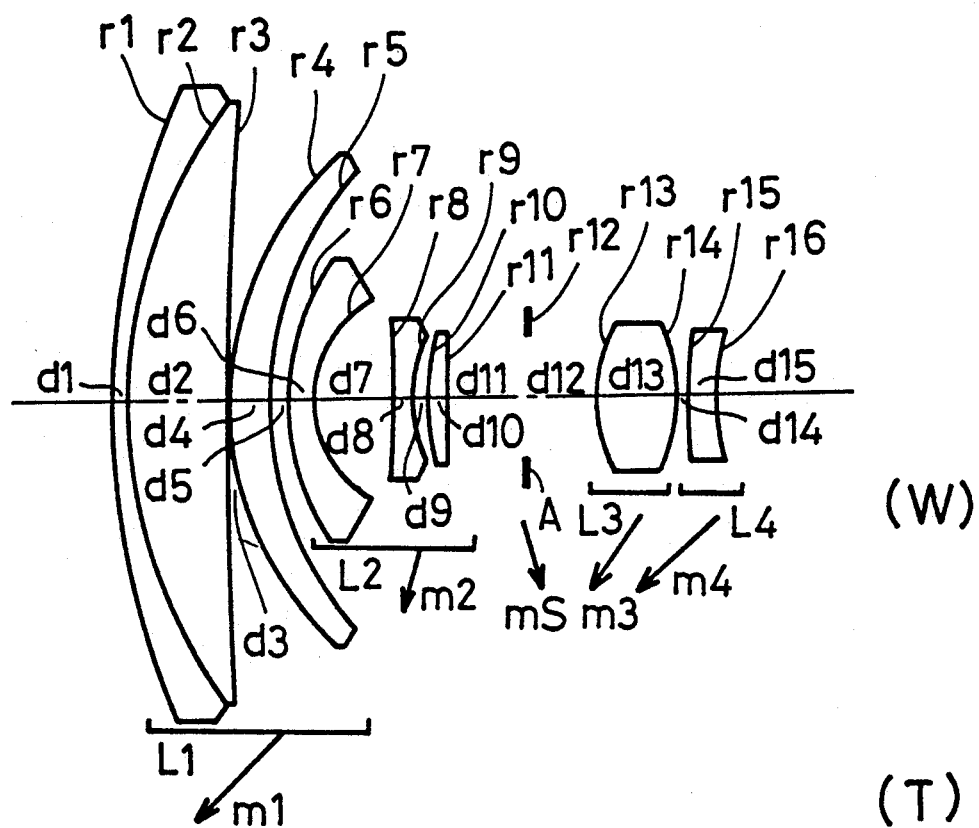
Figure 15:
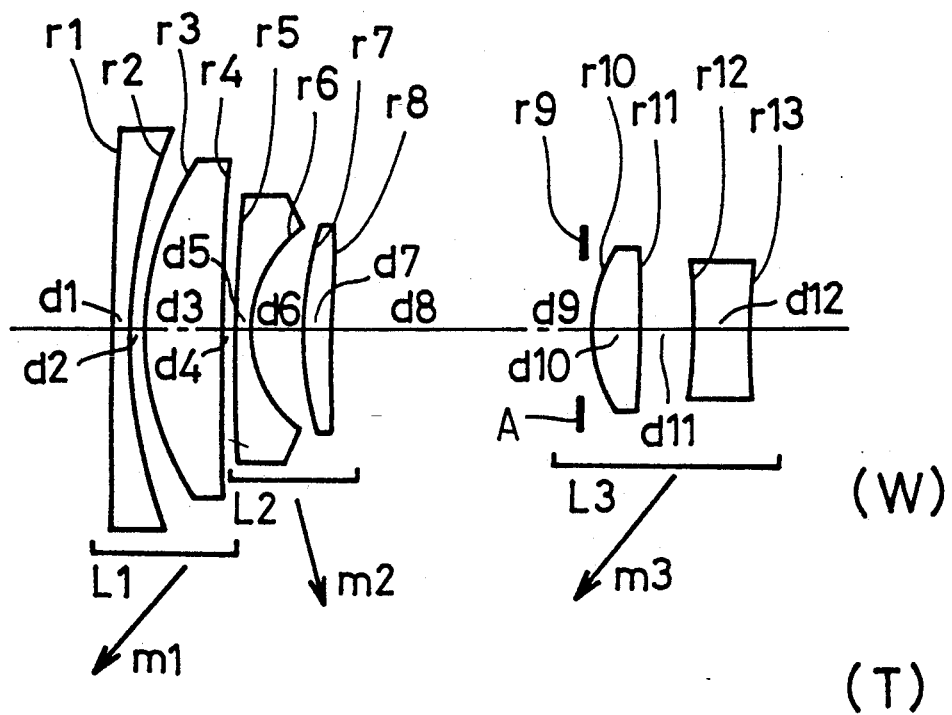
Figure 16:
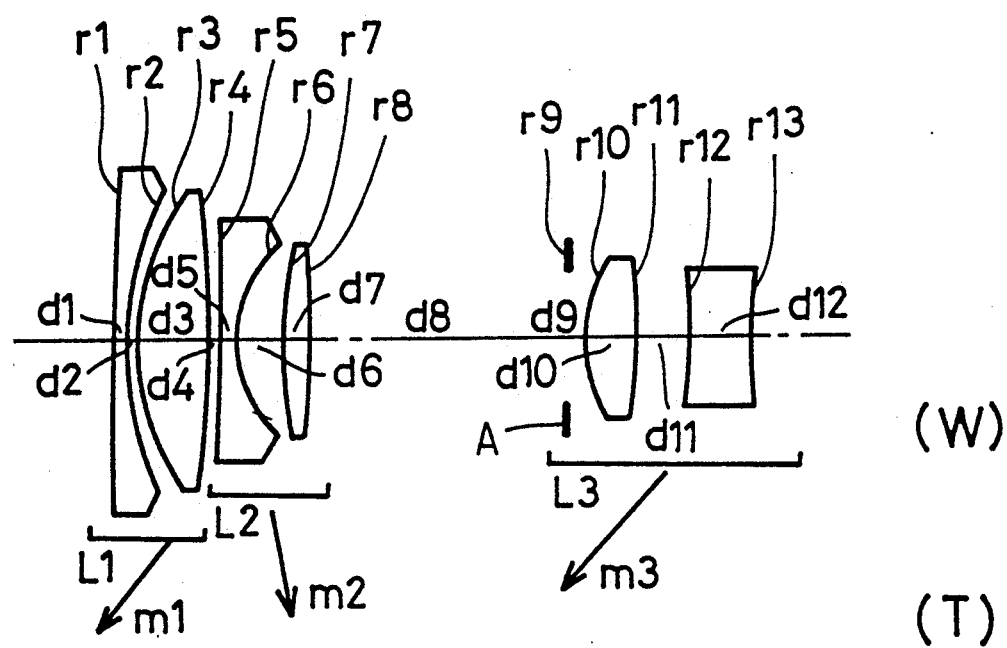
Figure 17:
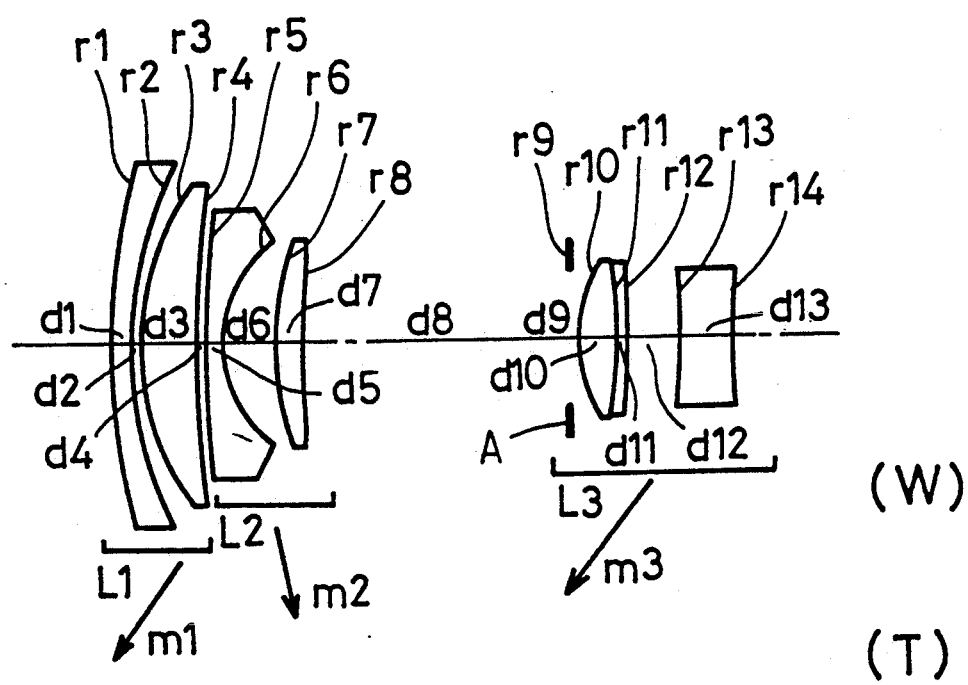
Figure 18:
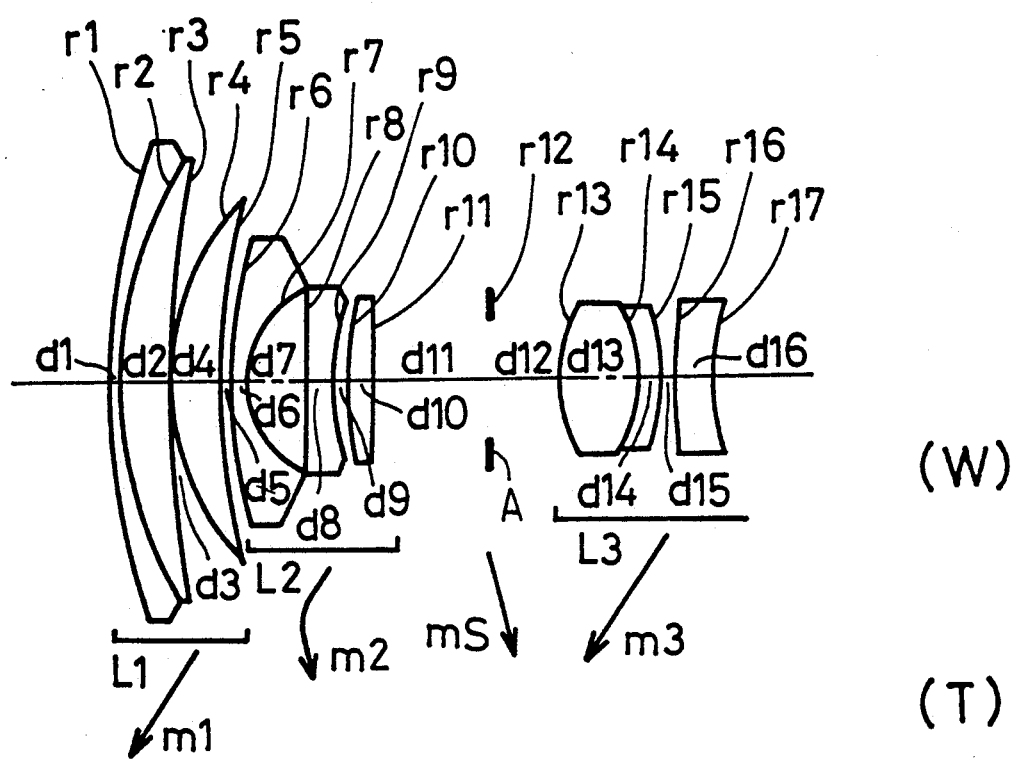
Figure 19:
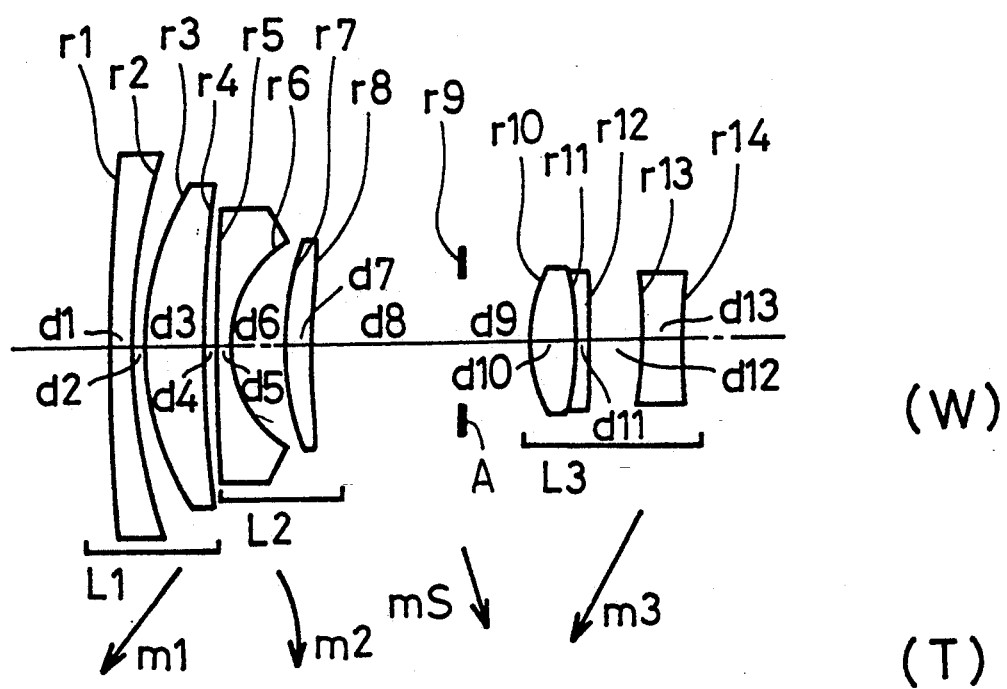
Figure 20:
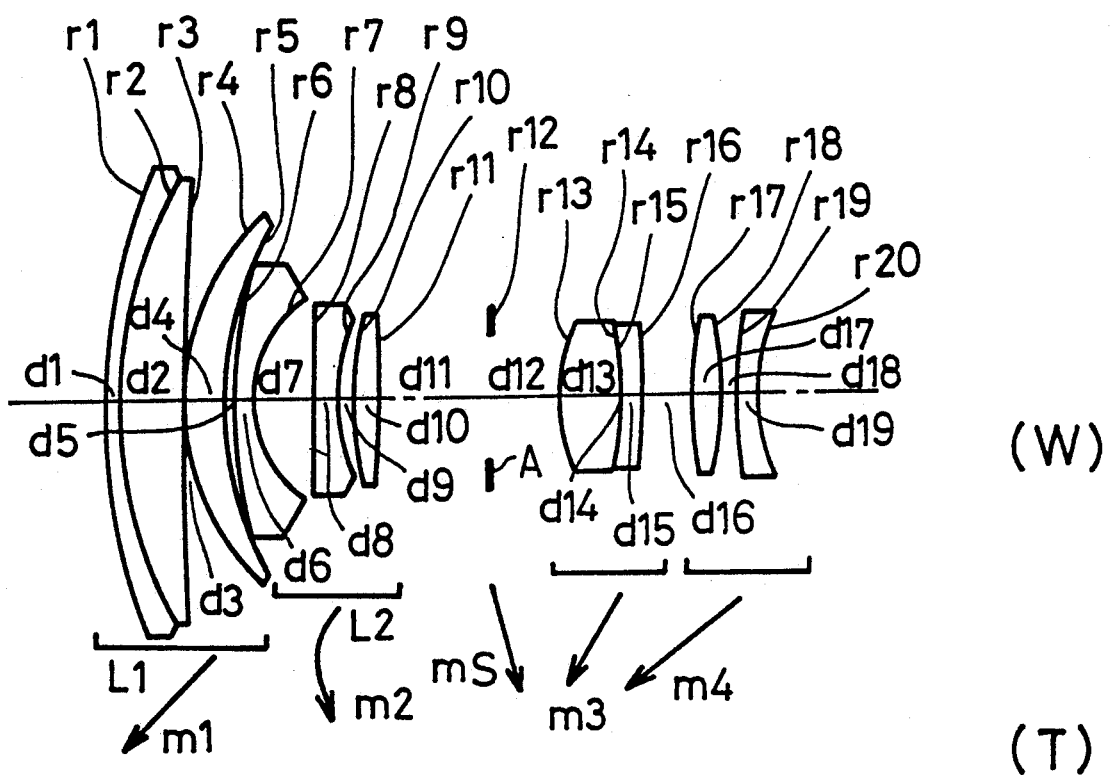
Figure 21:
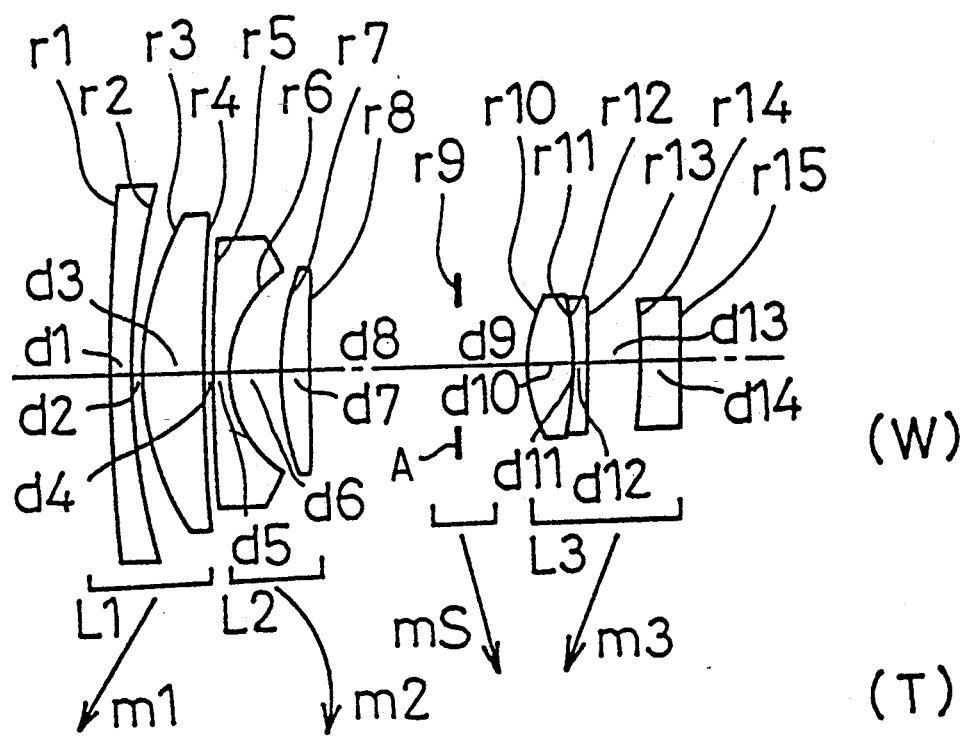
Figure 22:
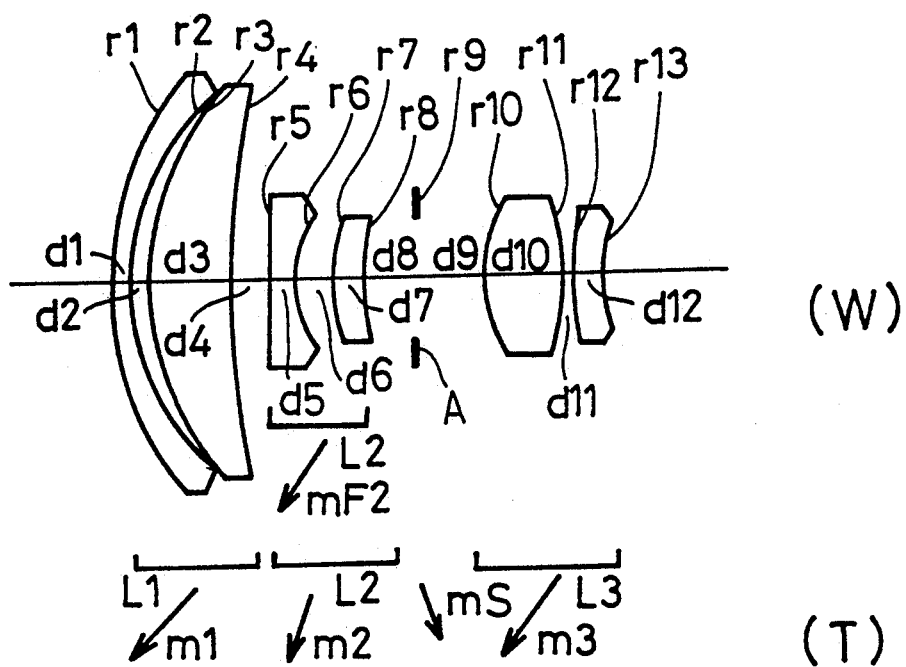
Figure 23:
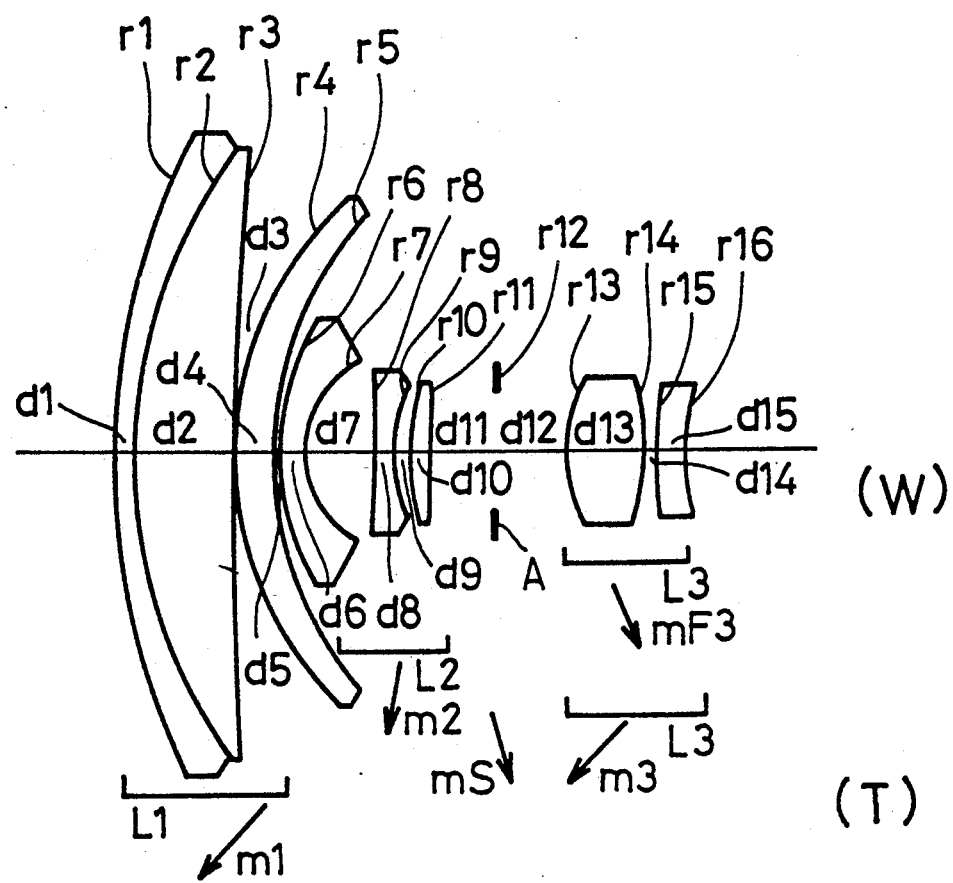
Figure 24:
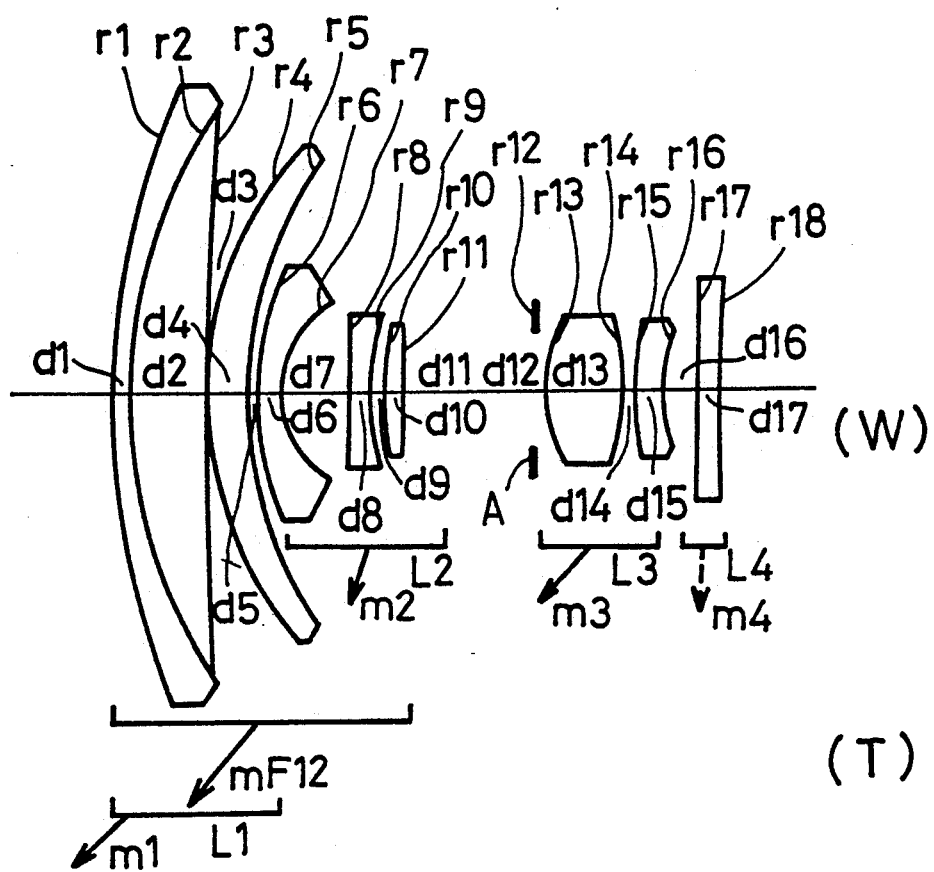
Figure 25:
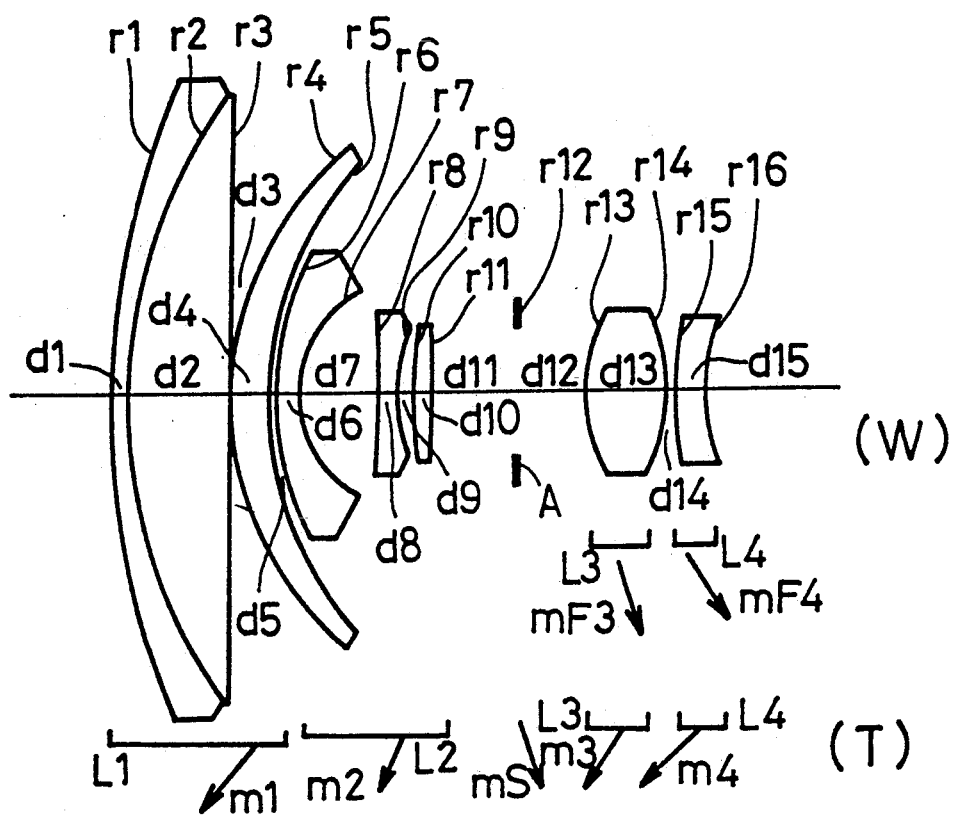
Figure 26:
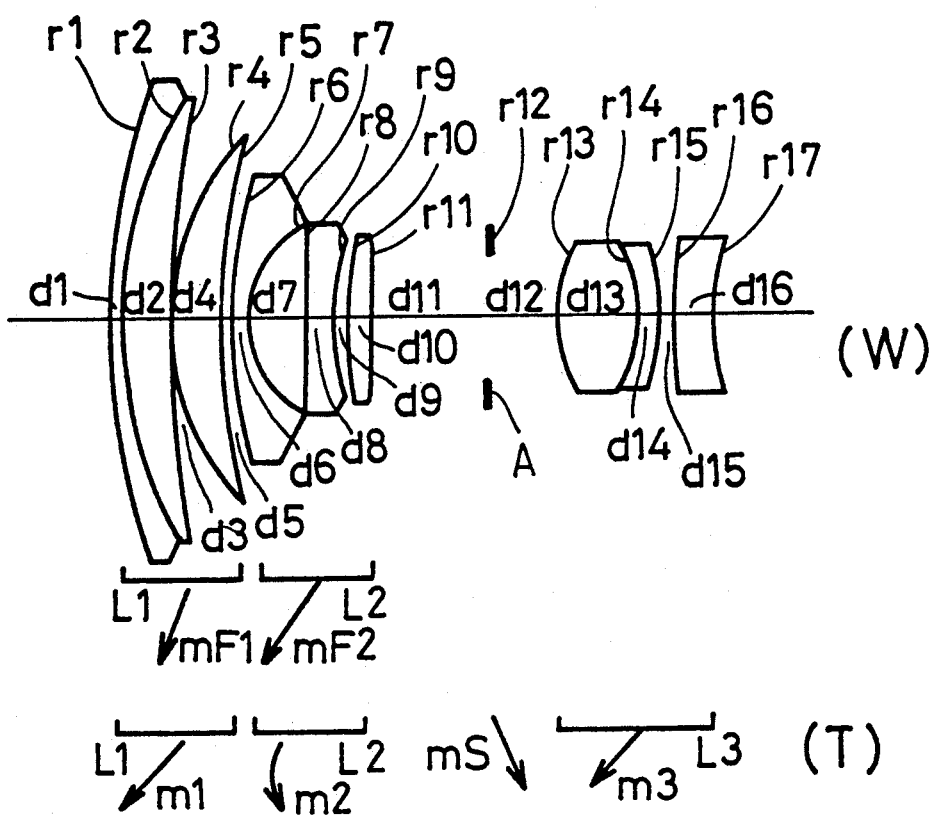
Figure 27:
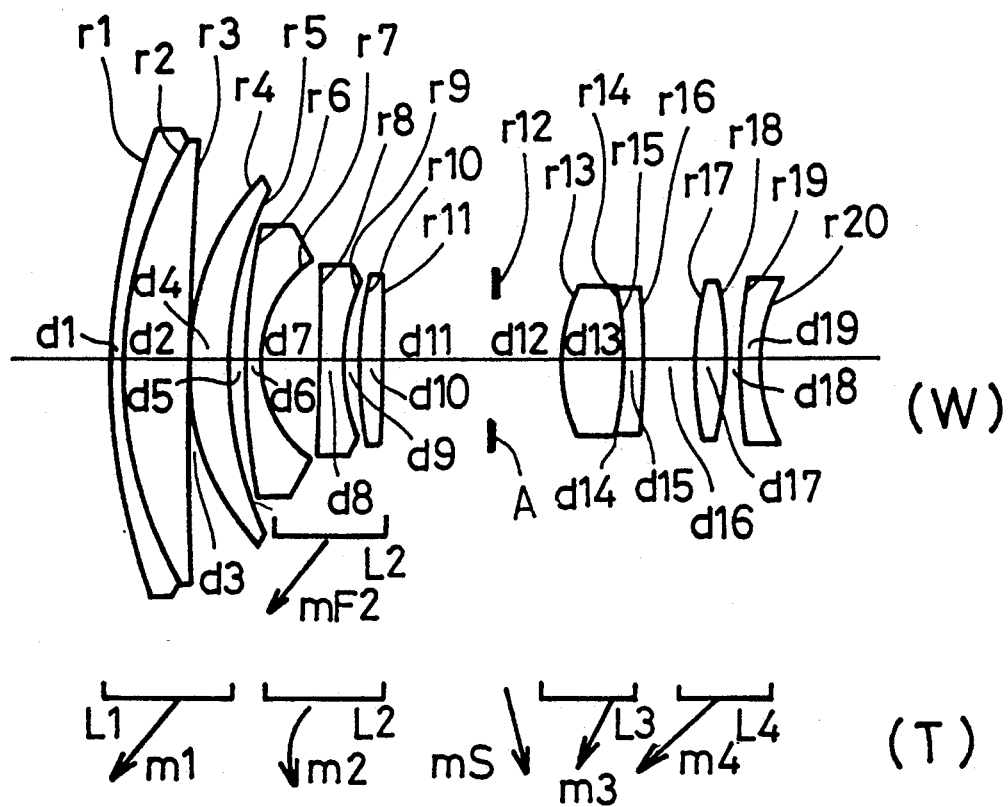

FIGS. 1 to 27 are cross-sectional views of the optical systems of a first to twenty-seventh embodiments of the present invention. In the figures, lens arrangements at the shortest focal length condition (W) are shown. Arrows m1 to m4 and mS show movements of a first to fourth lens components L1 to L4 and an aperture S from the shortest focal length condition (W) to the longest focal length condition (L). The dotted lines indicate that the lens components are fixed. In FIGS. 5 to 21, the first and third lens units L1 and L3 monotonously shift toward the object side.

Figure 28A:
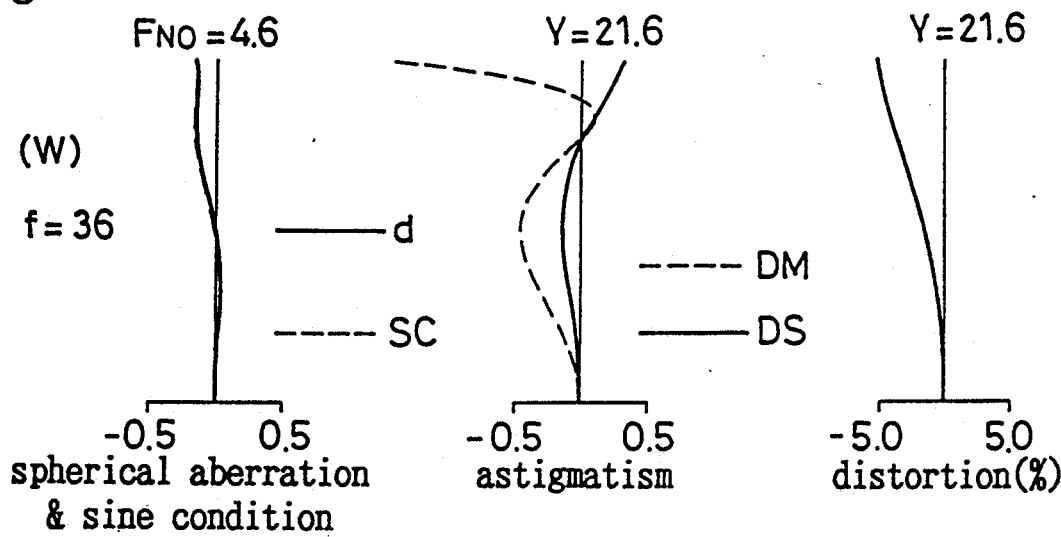
Figure 28B:
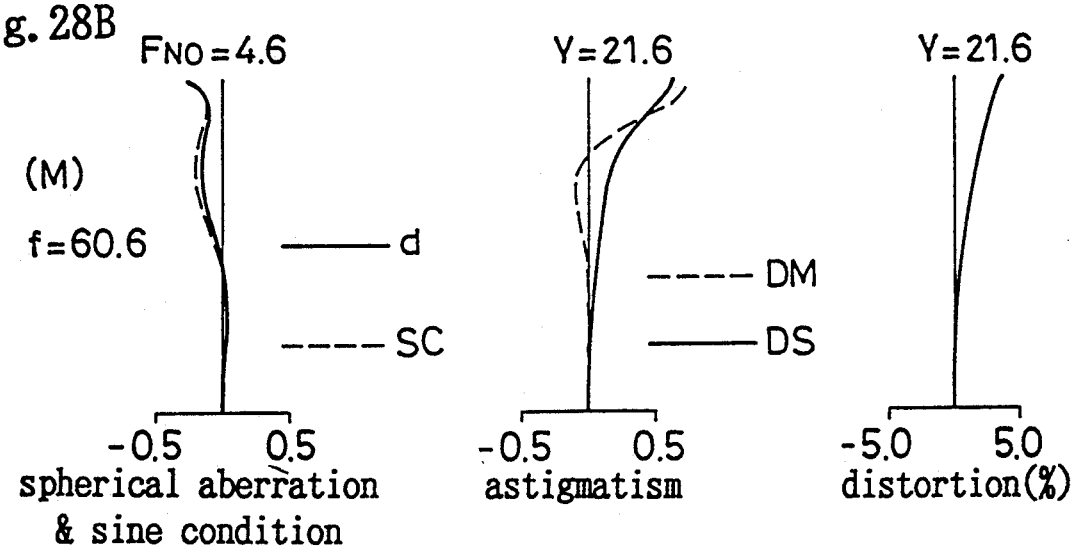
Figure 28C:
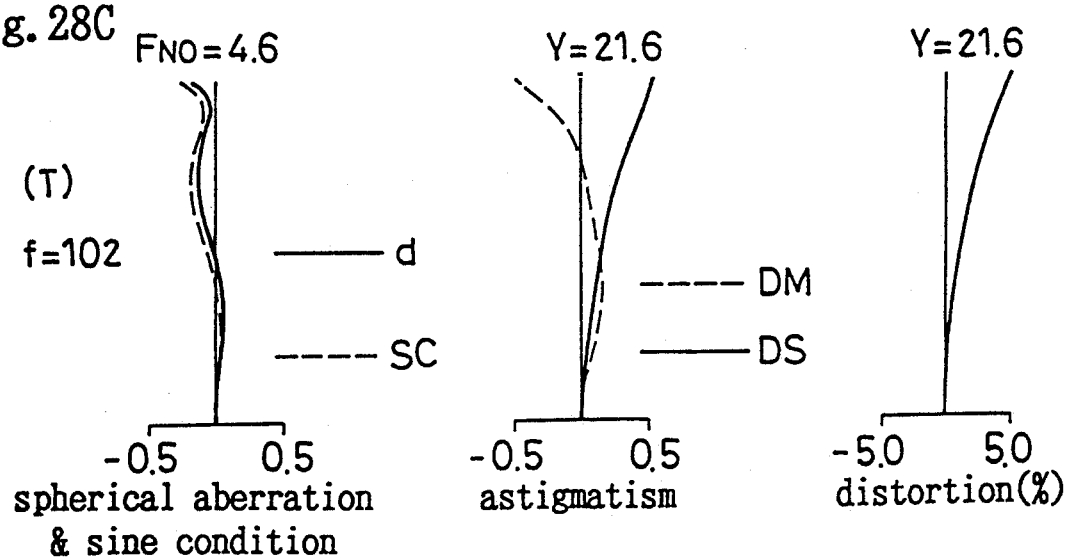
Figure 29A:
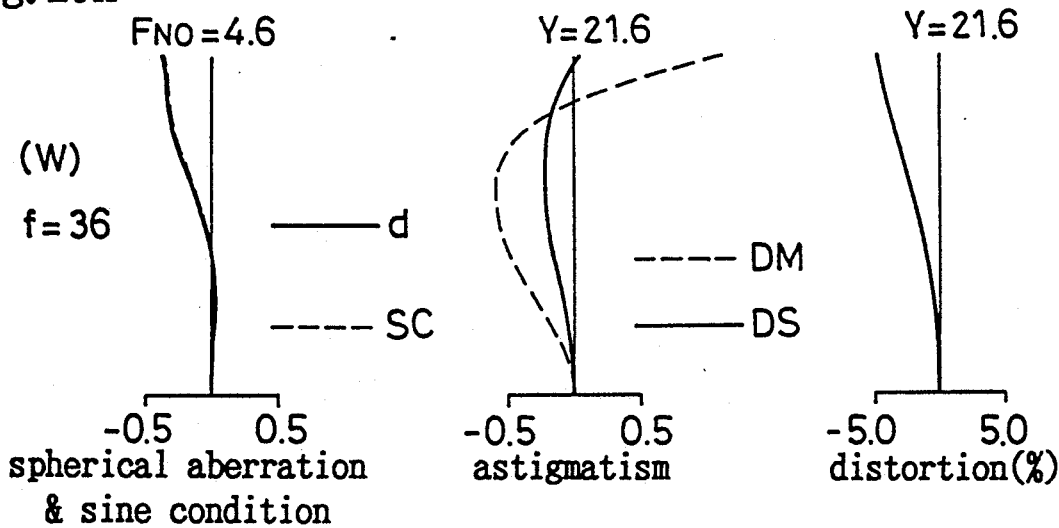
Figure 29B:
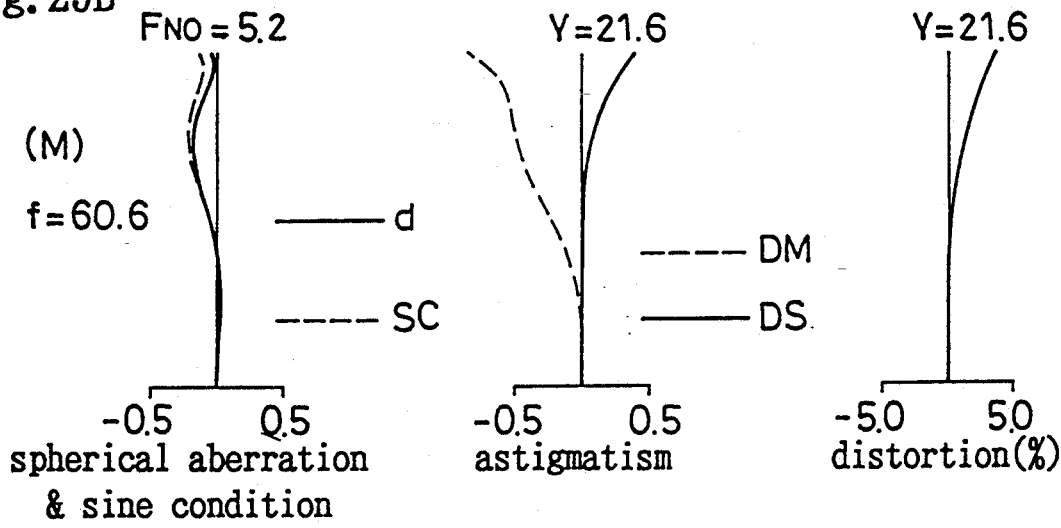
Figure 29C:
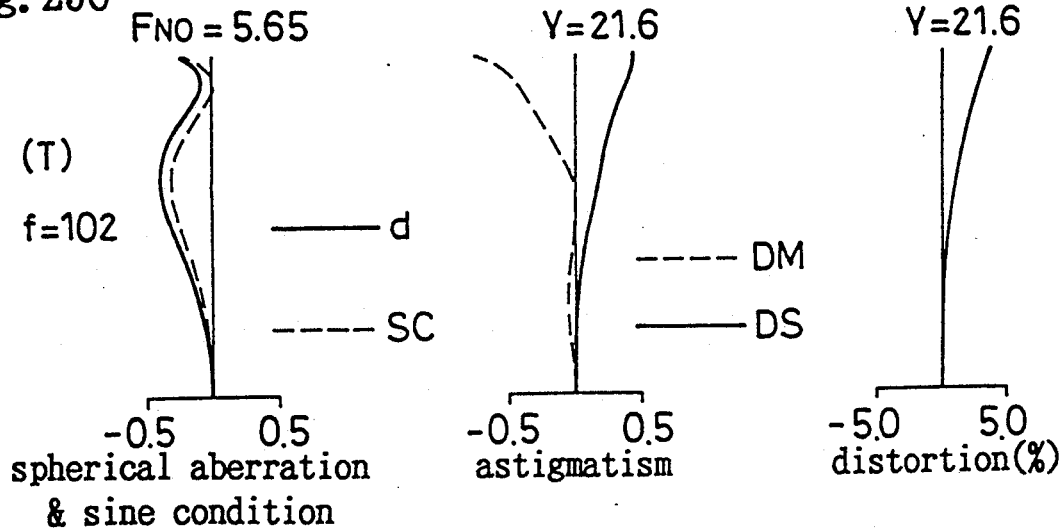
Figure 30A:
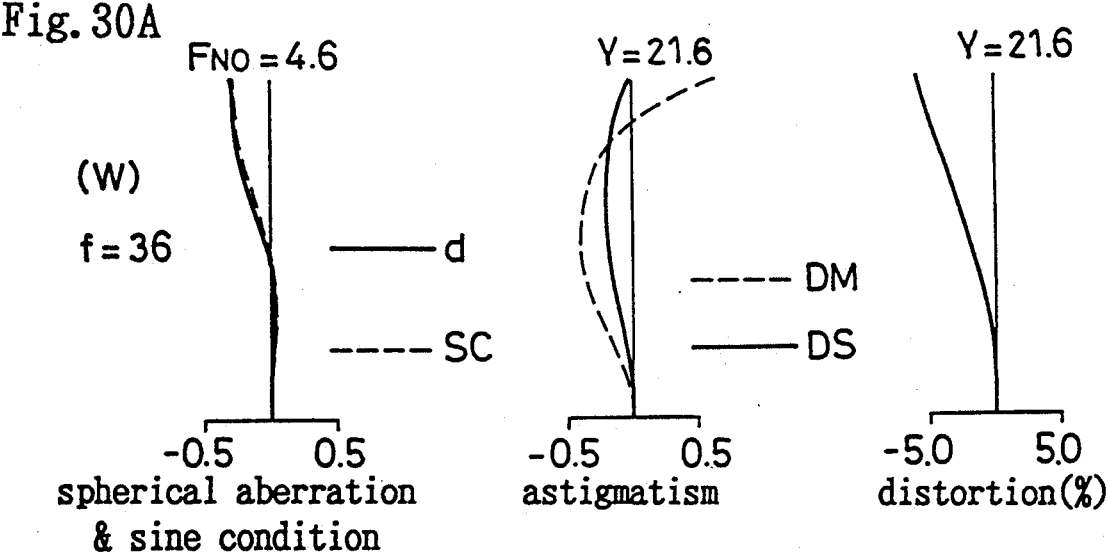
Figure 30B:
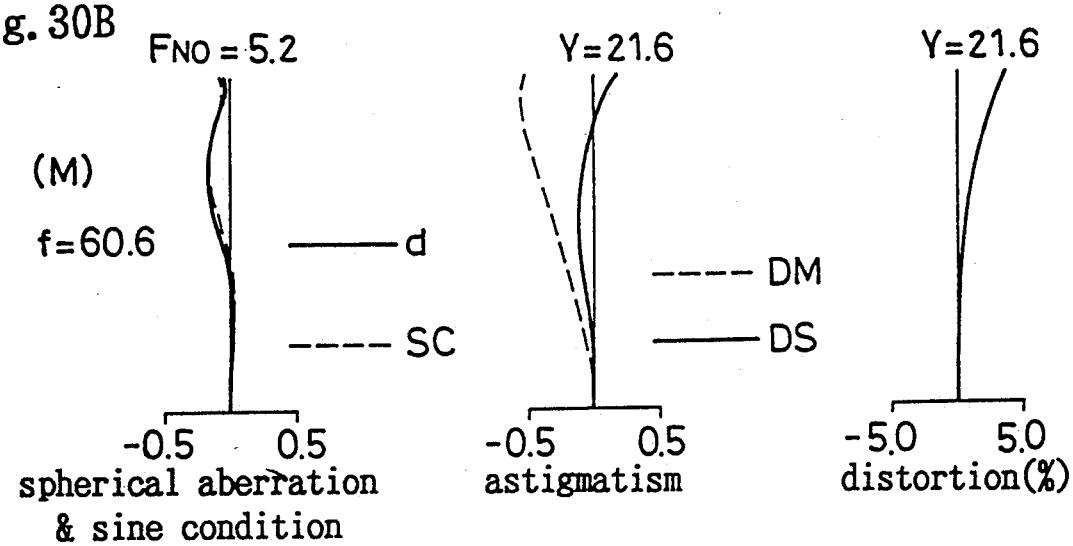
Figure 30C:
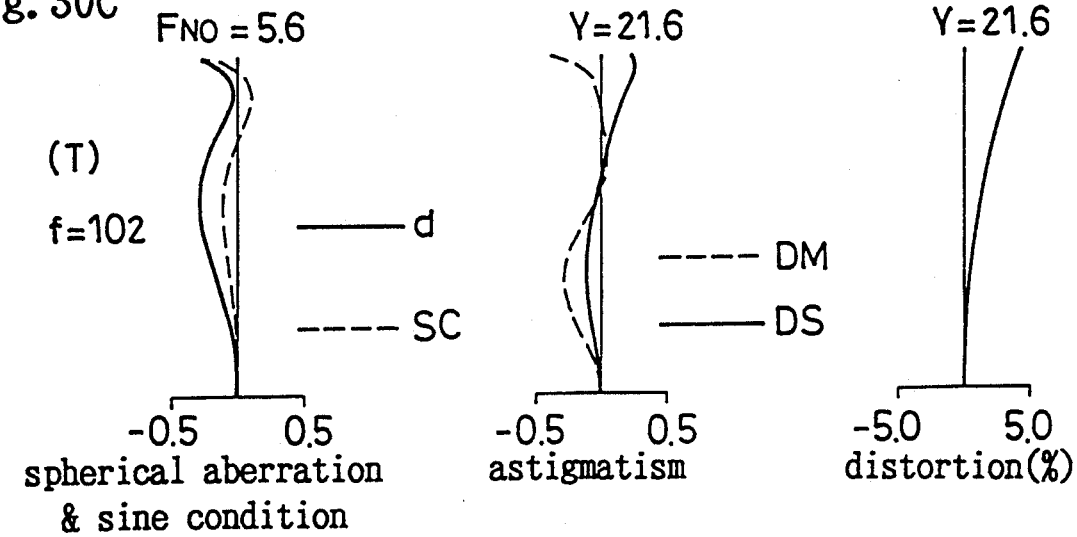
Figure 32A:
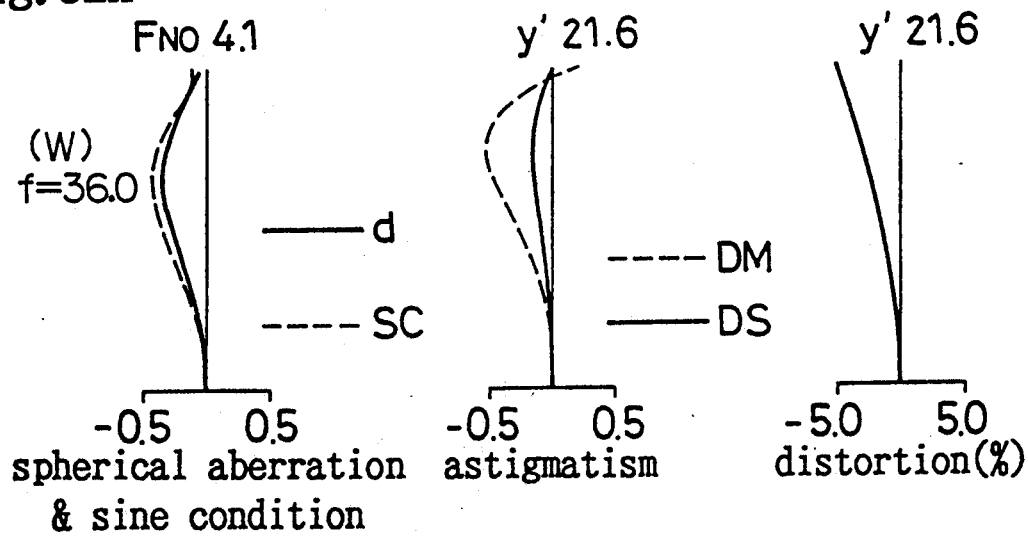
Figure 32B:
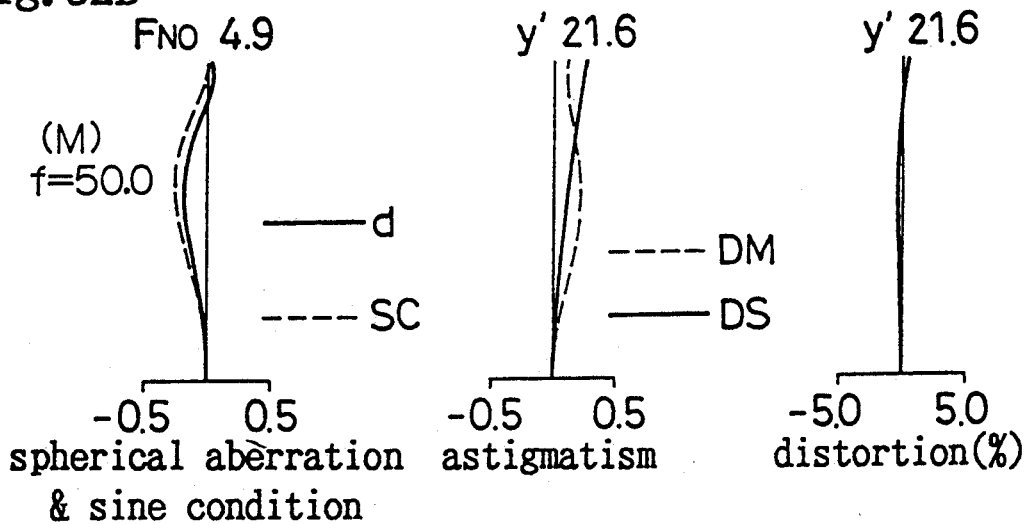
Figure 32C:
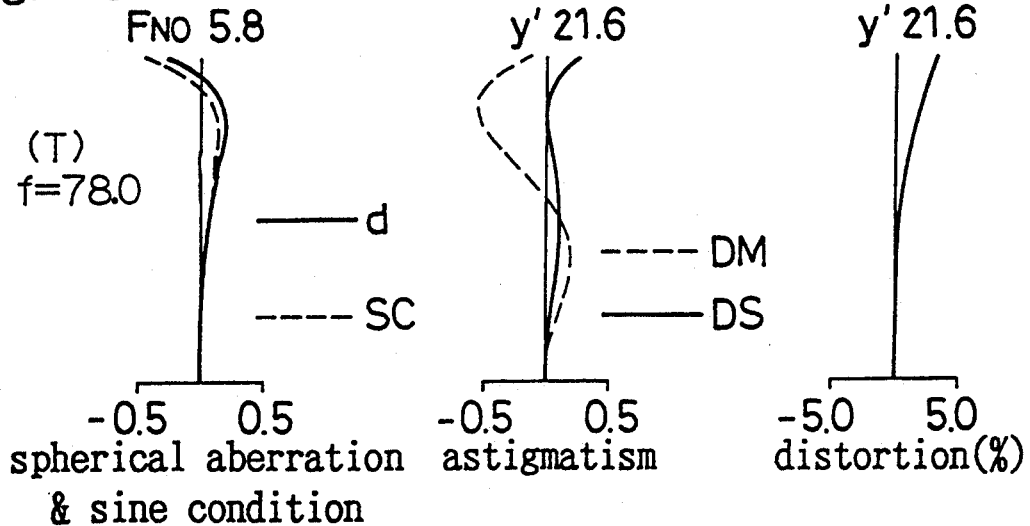
Figure 33A:
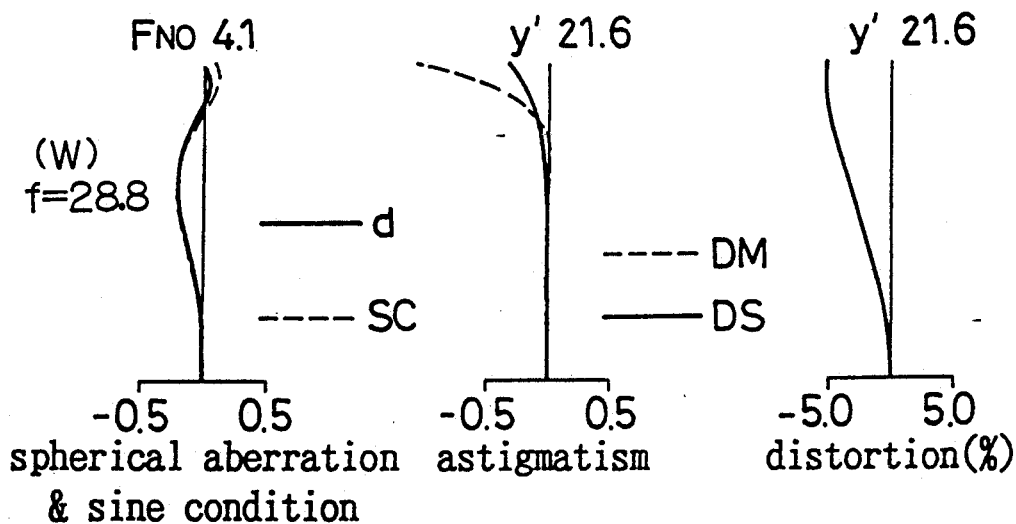
Figure 33B:
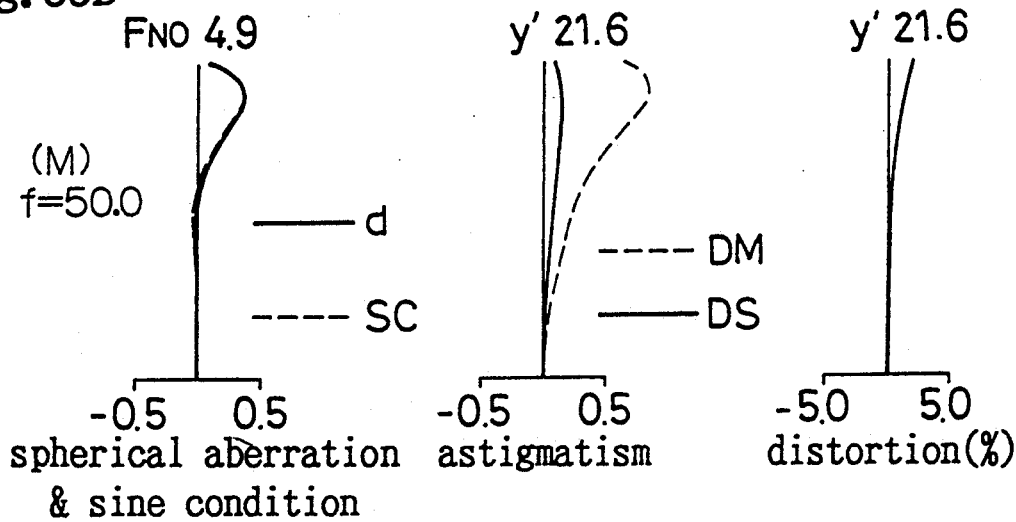
Figure 33C:
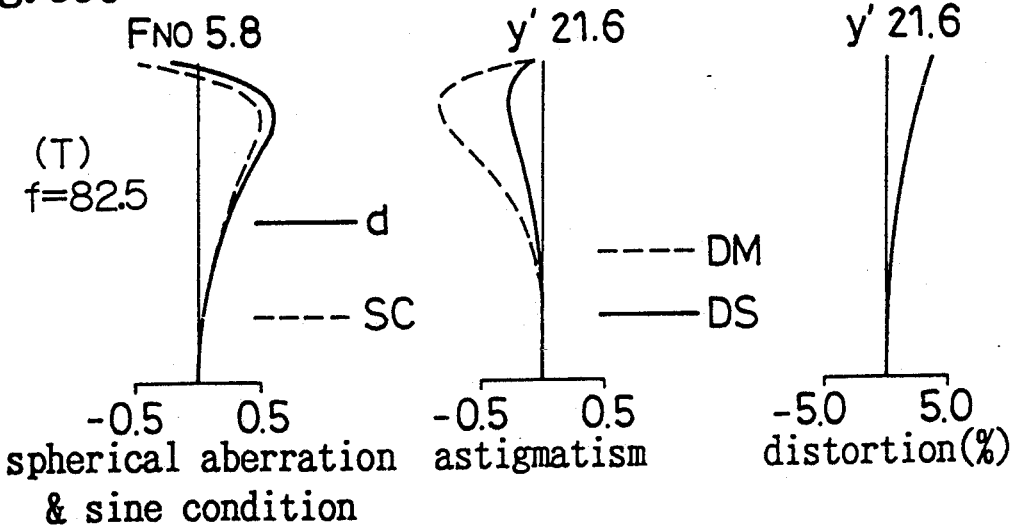
Figure 34A:
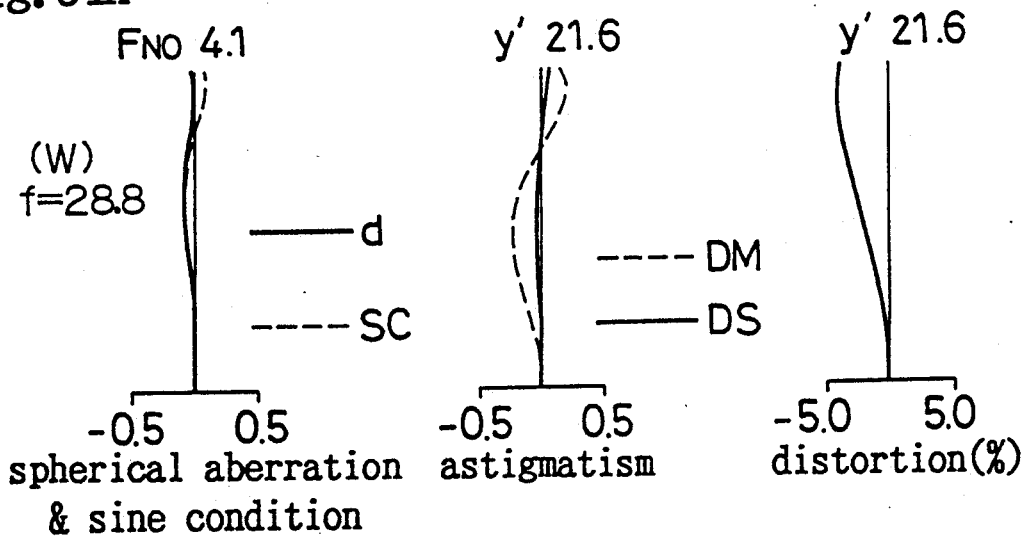
Figure 34B:
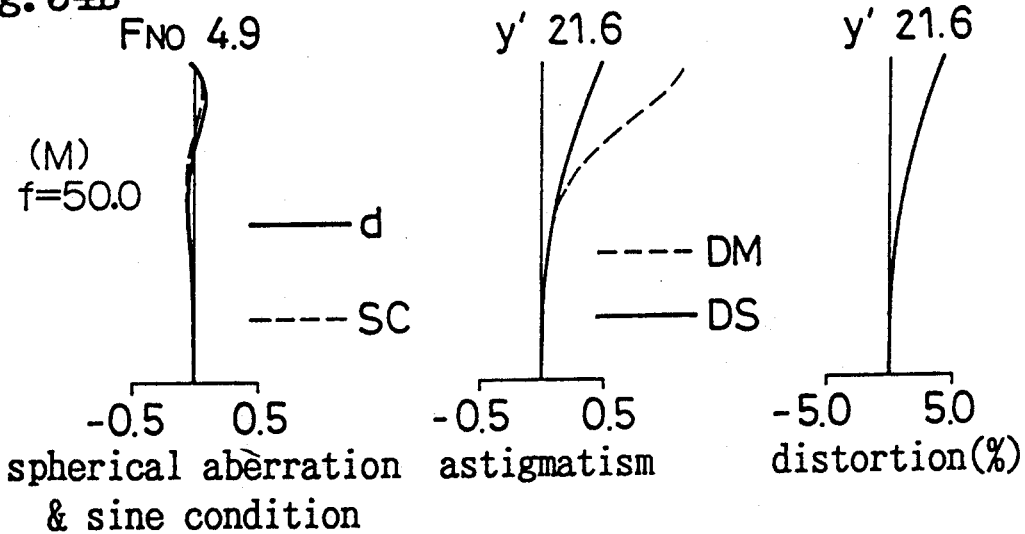
Figure 34C:
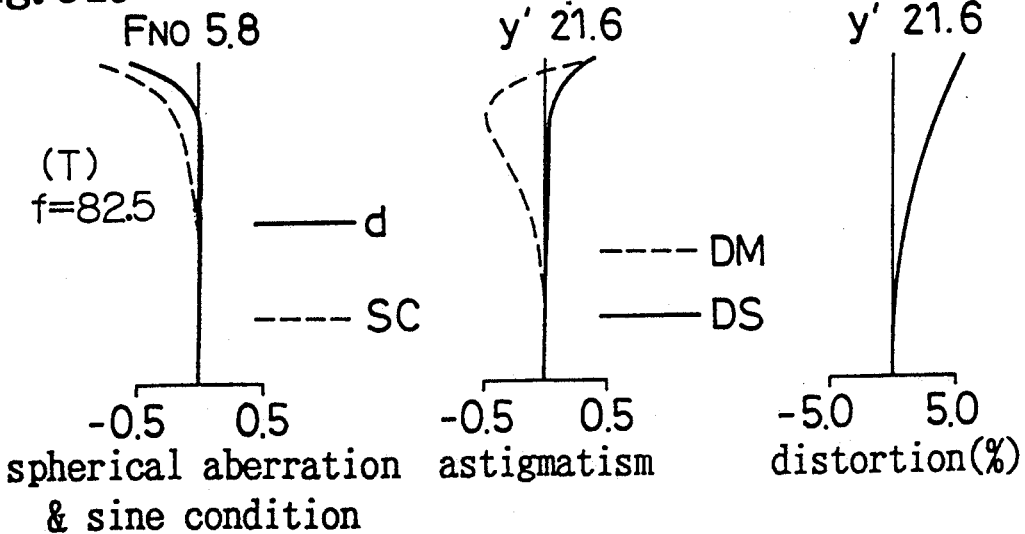
Figure 35A:
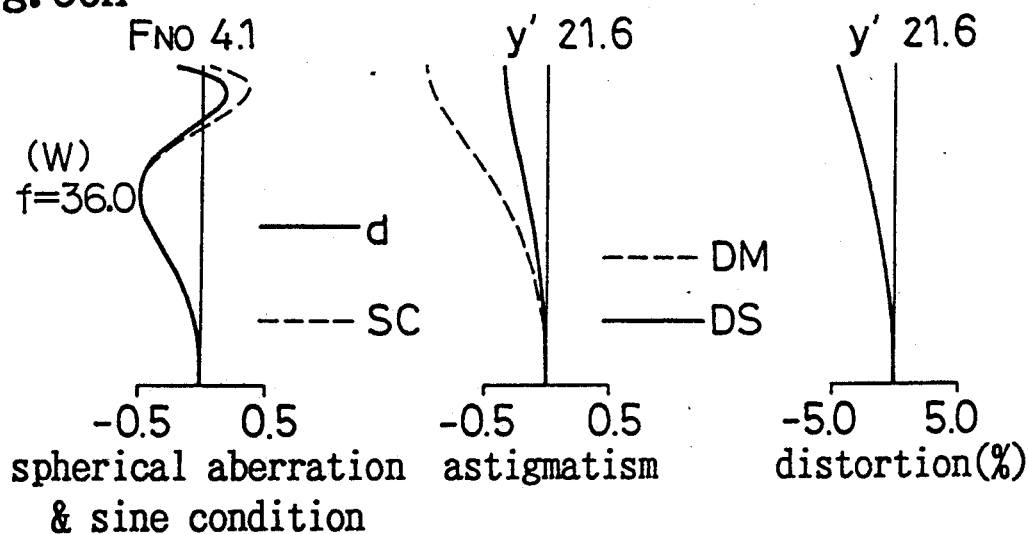
Figure 35B:
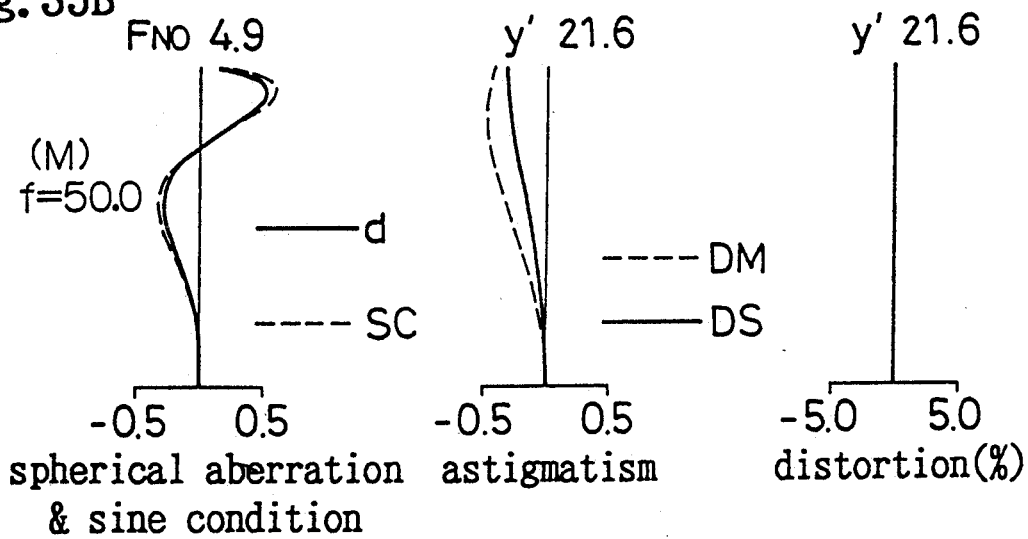
Figure 35C:
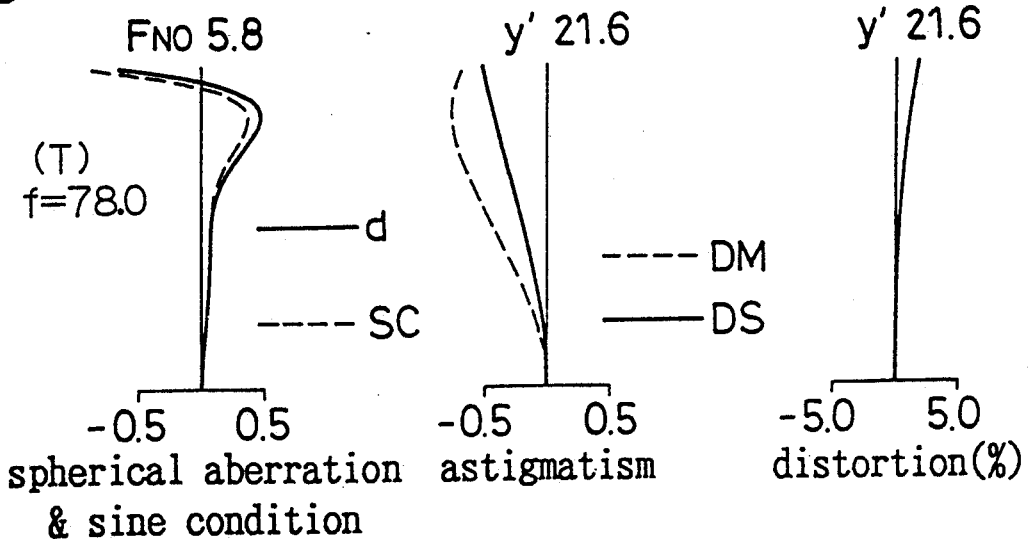
Figure 36A:
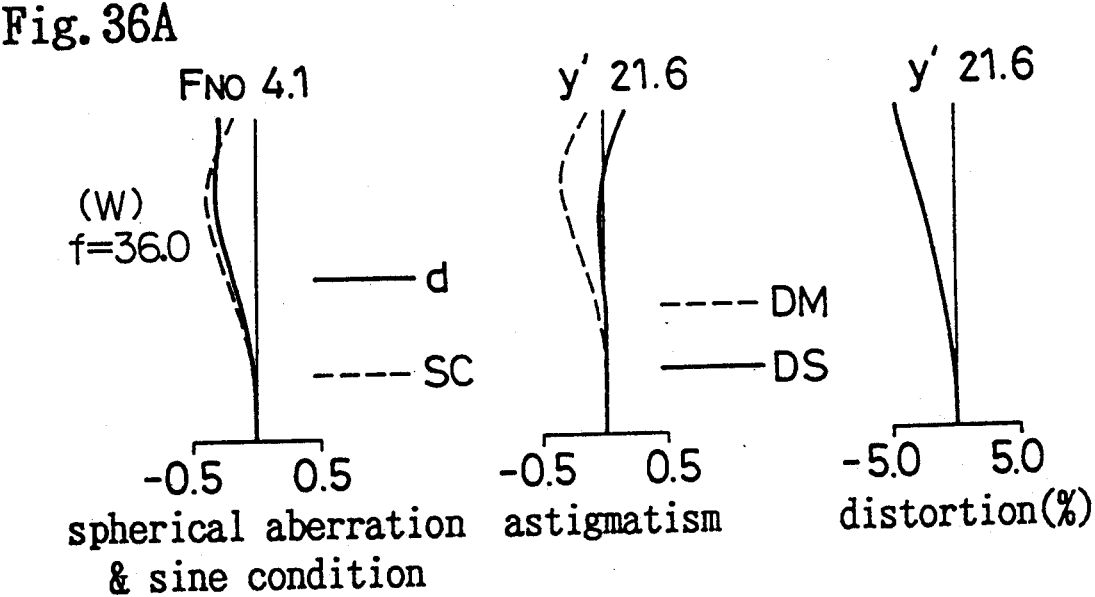
Figure 36B:
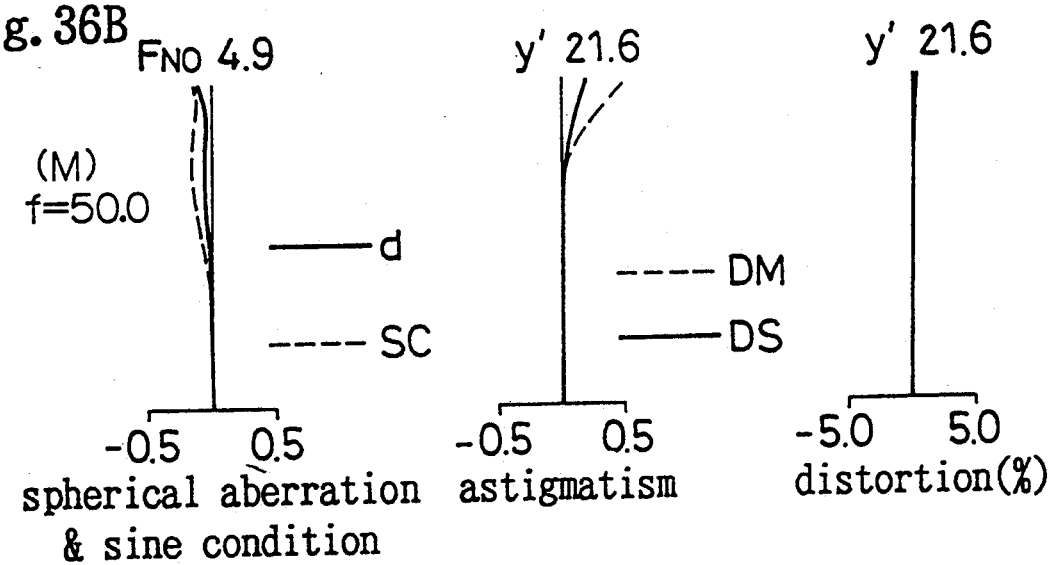
Figure 36C:
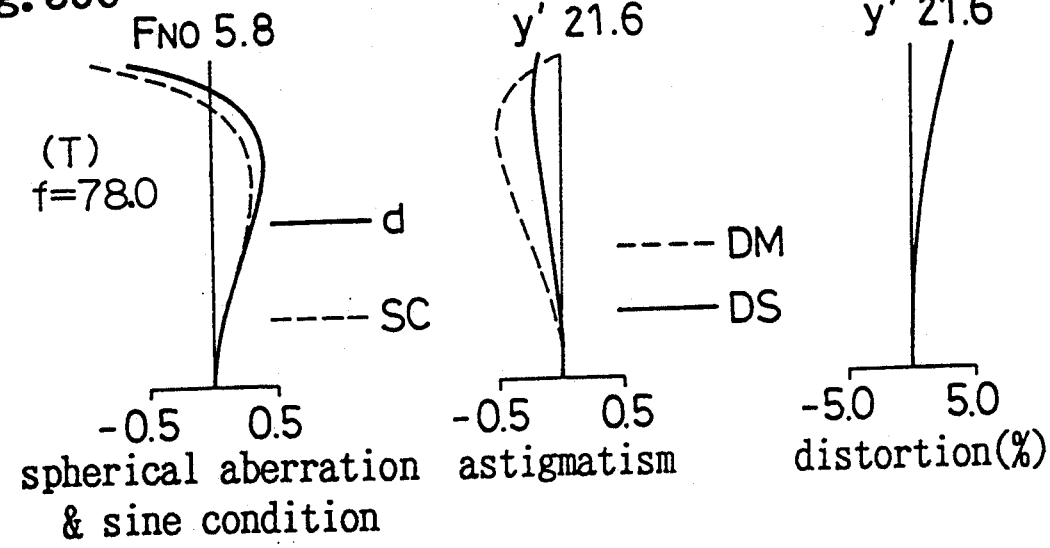
Figure 37A:
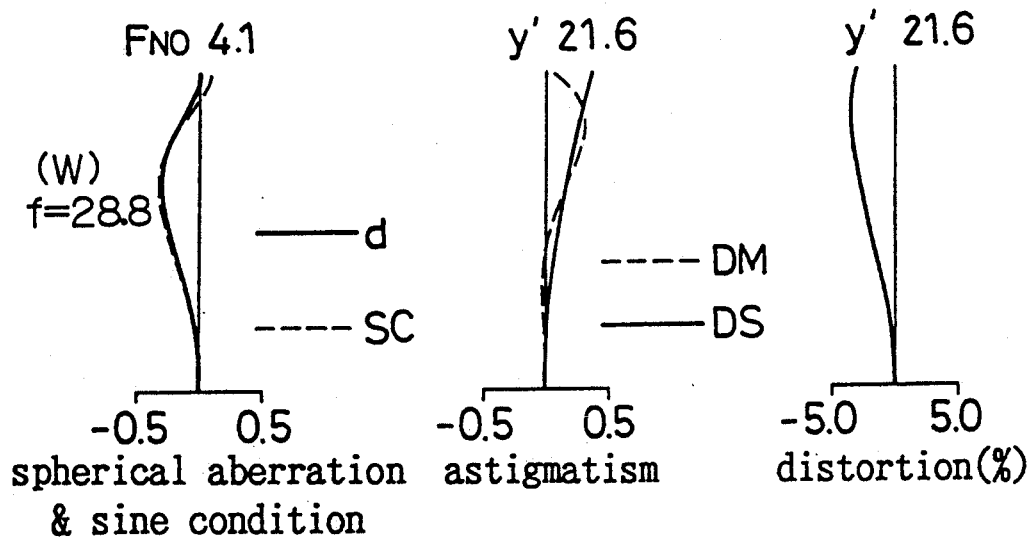
Figure 37B:
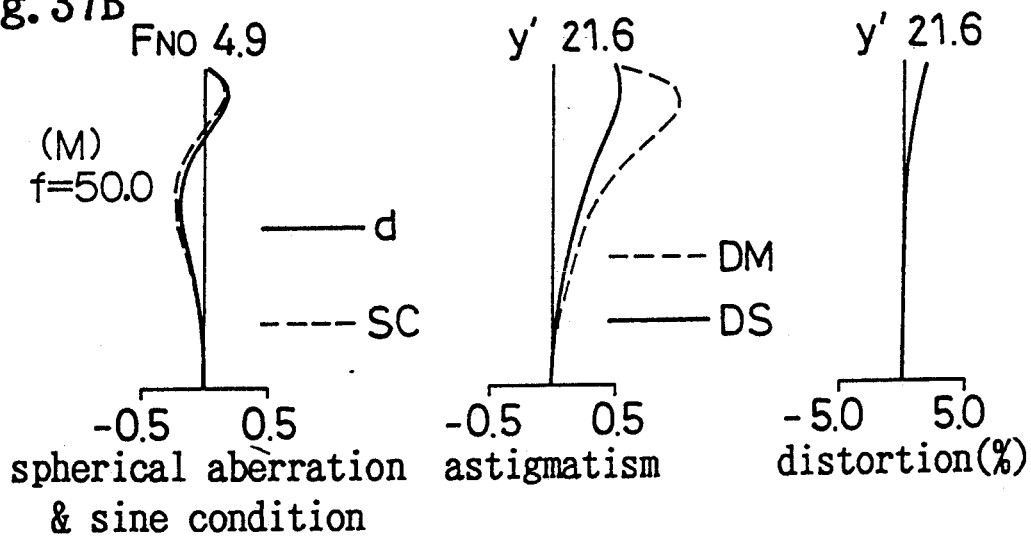
Figure 37C:
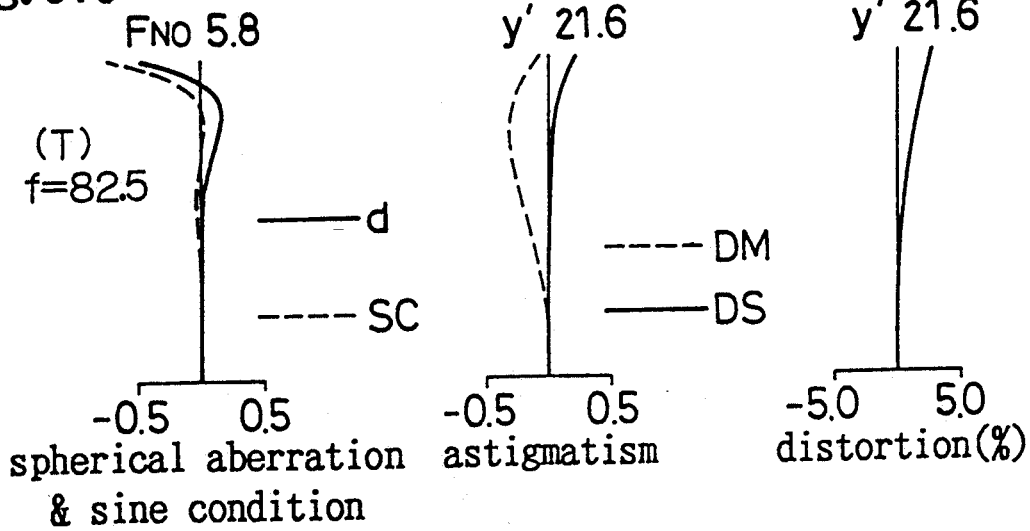
Figure 38A:
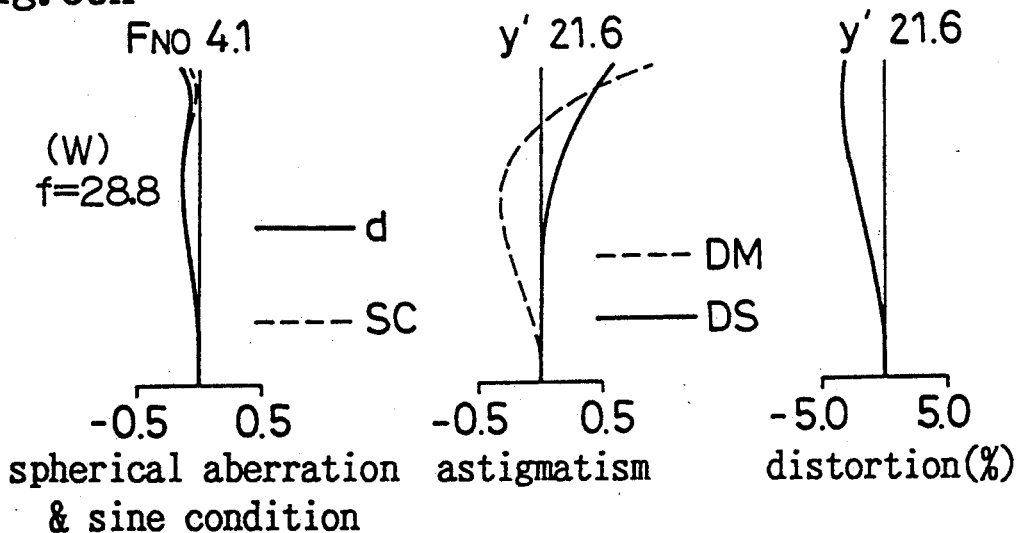
Figure 38B:
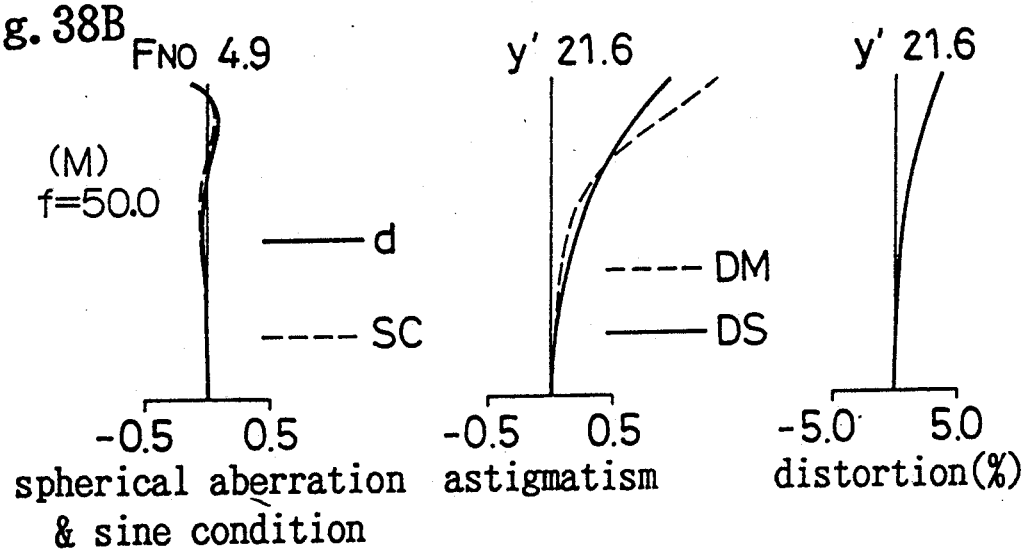
Figure 38C:
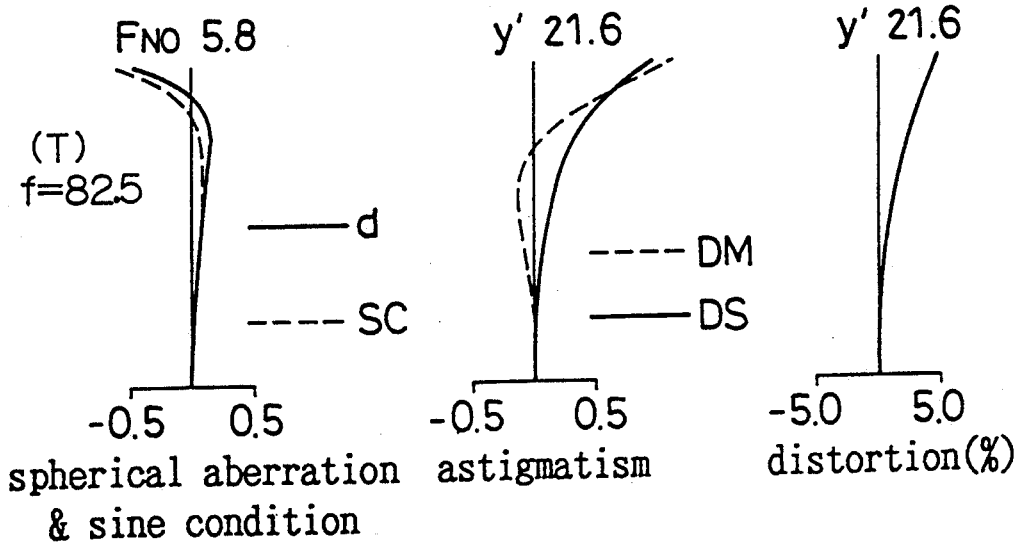
Figure 39A:
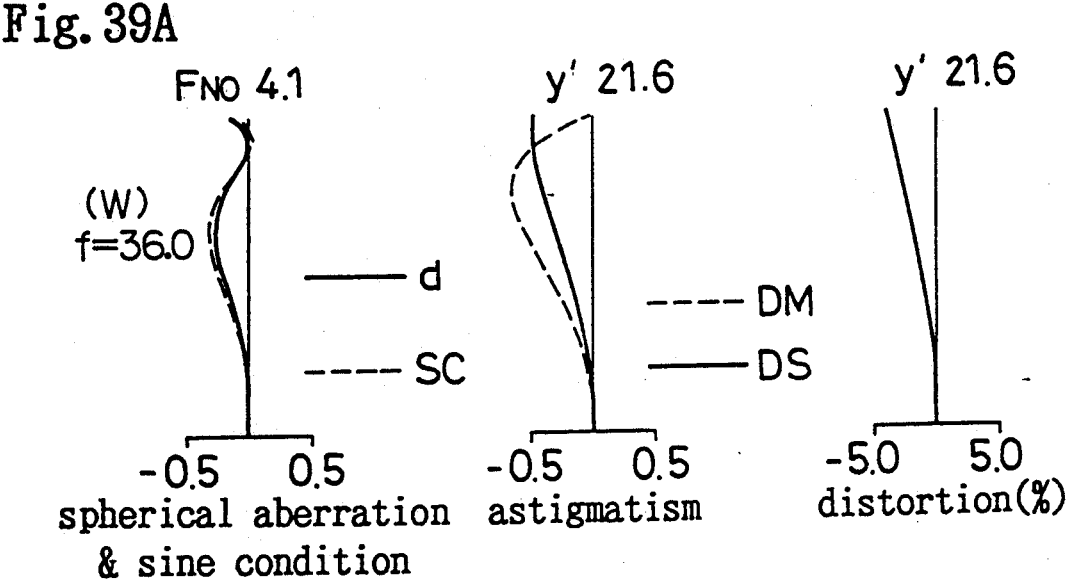
Figure 39B:
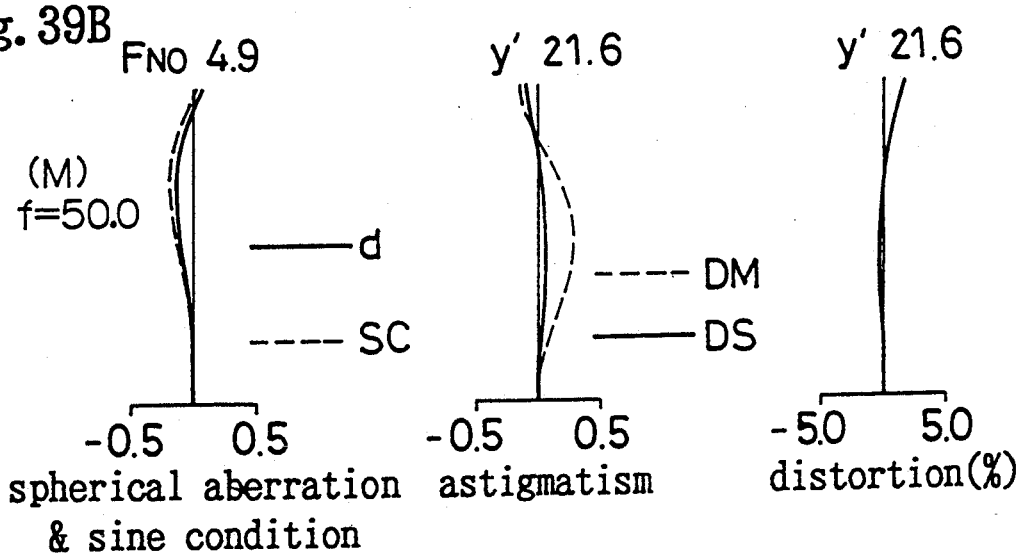
Figure 39C:
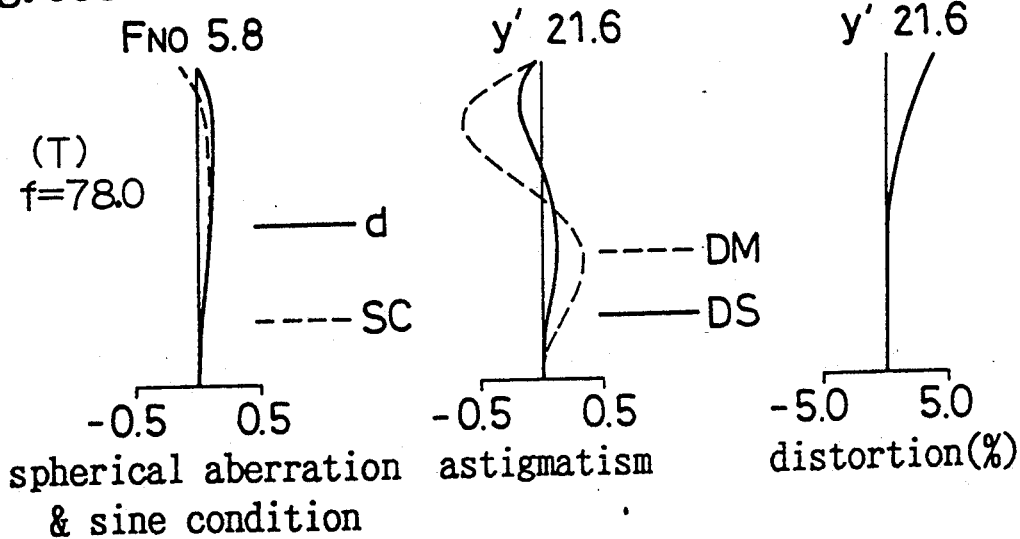
Figure 40A:
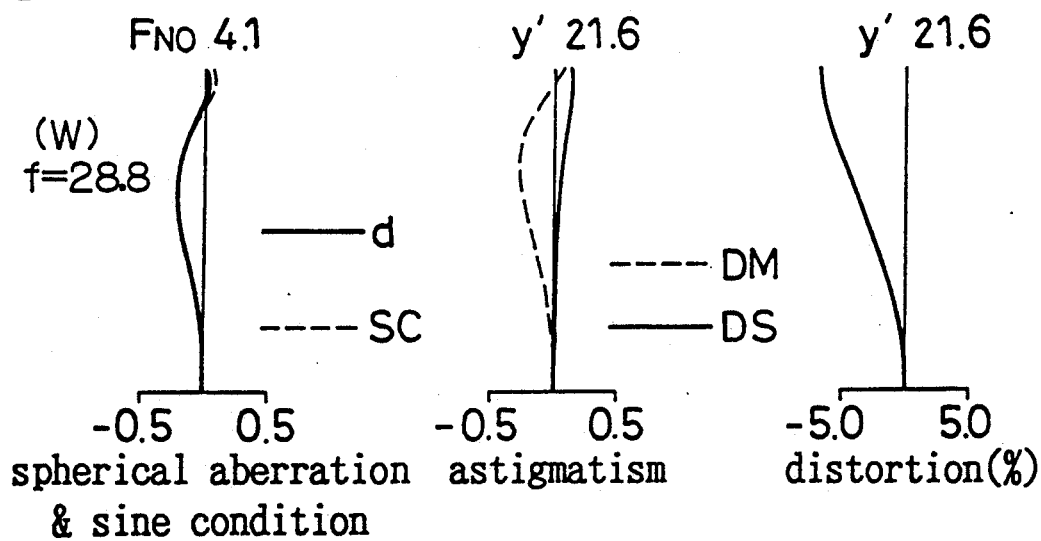
Figure 40B:
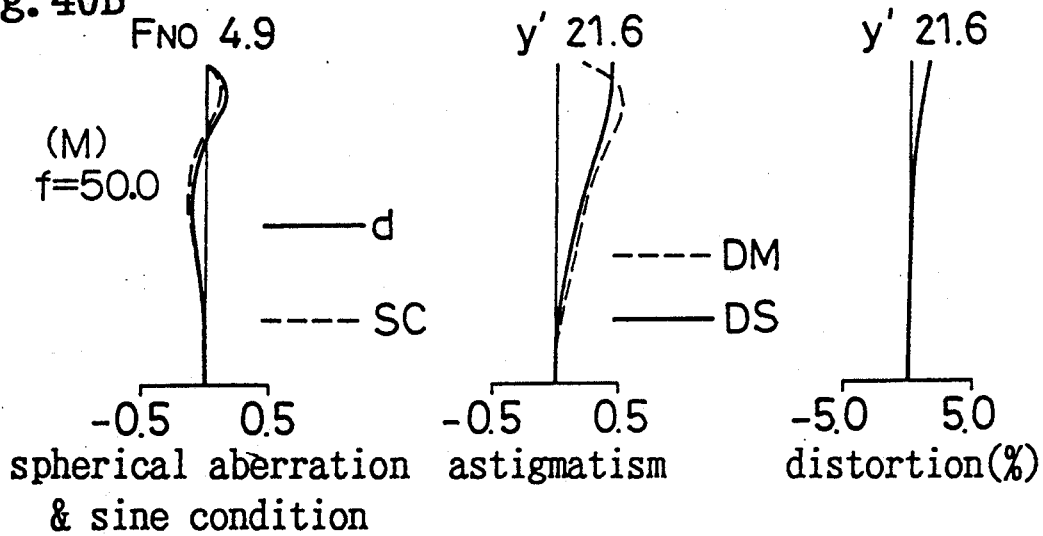
Figure 40C:
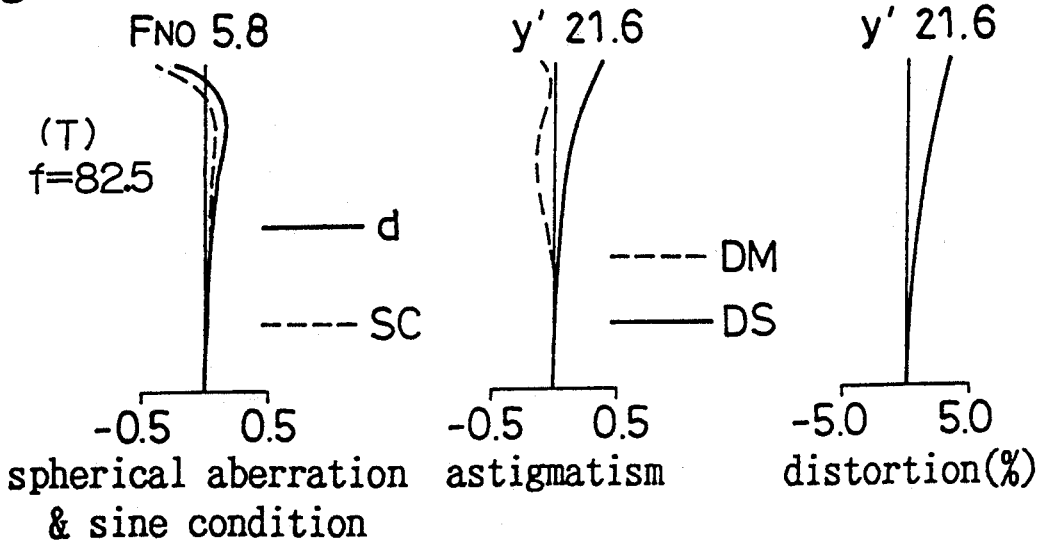
Figure 41A:
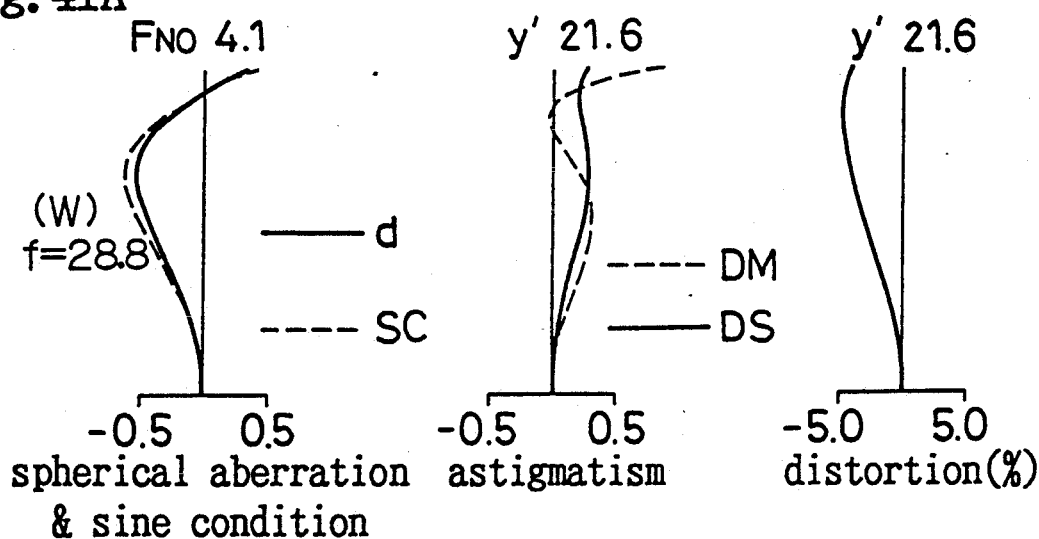
Figure 41B:
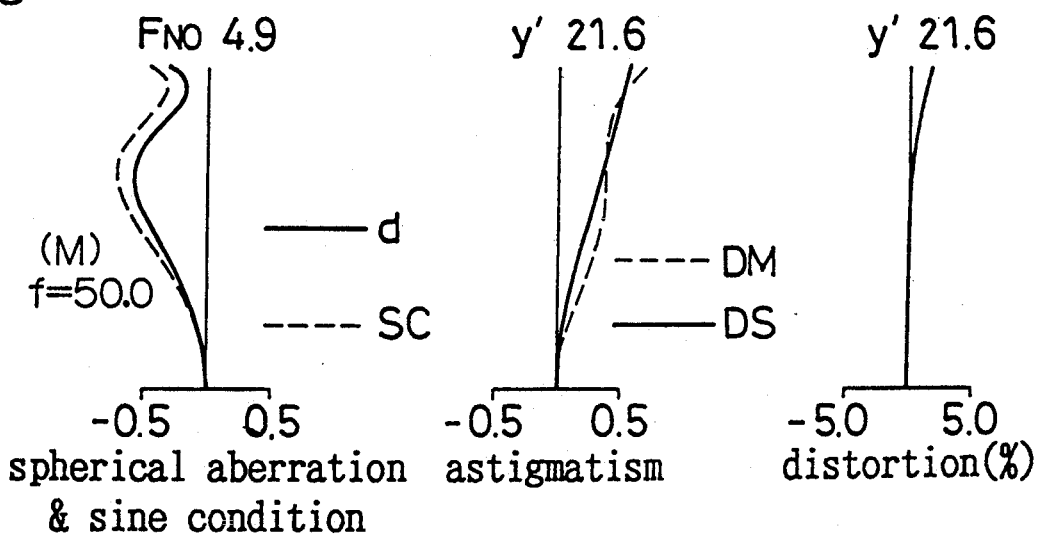
Figure 41C:
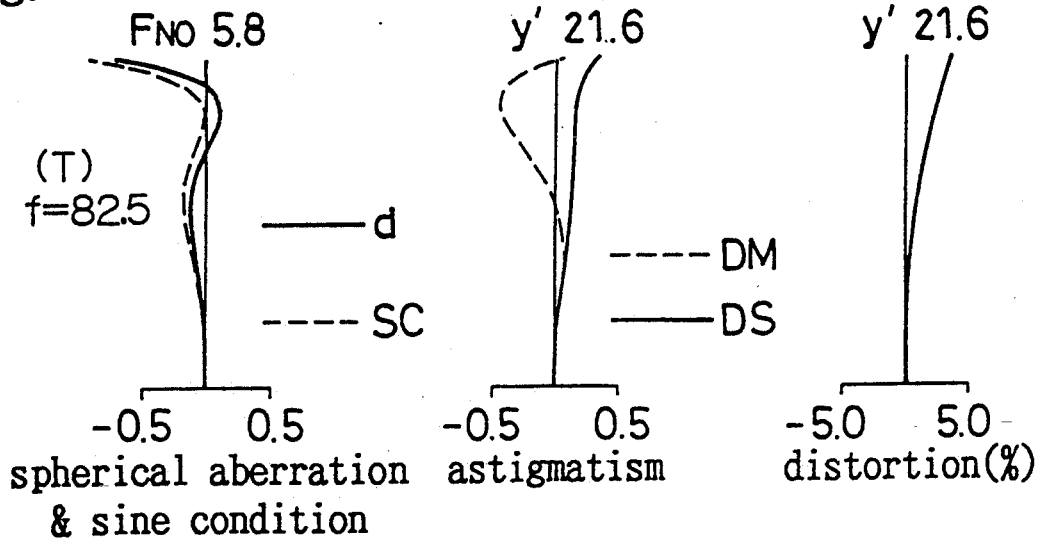
Figure 42A:
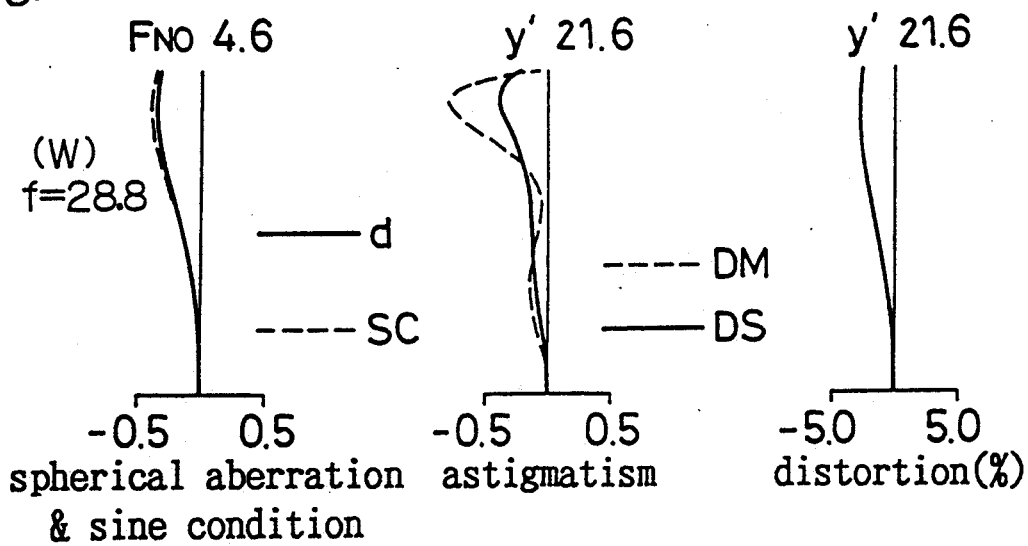
Figure 42B:
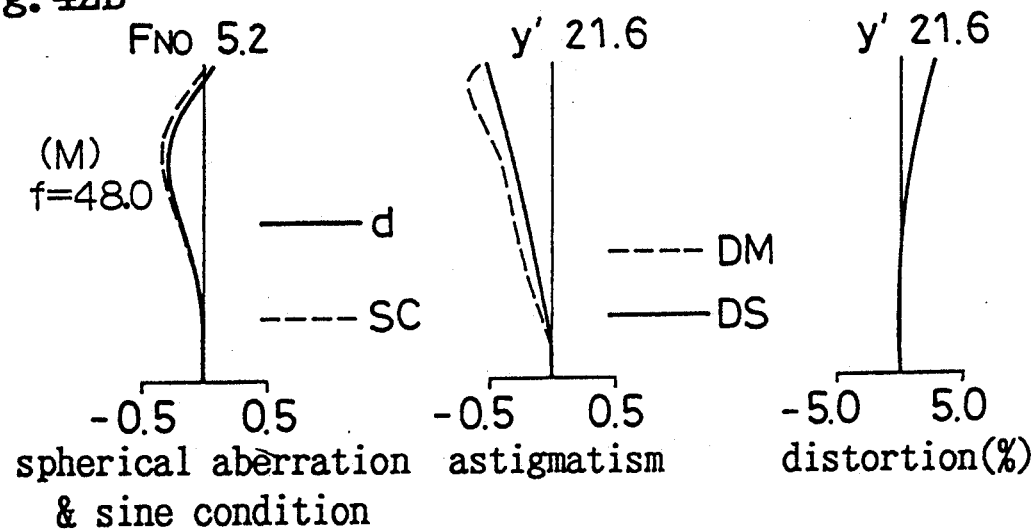
Figure 42C:
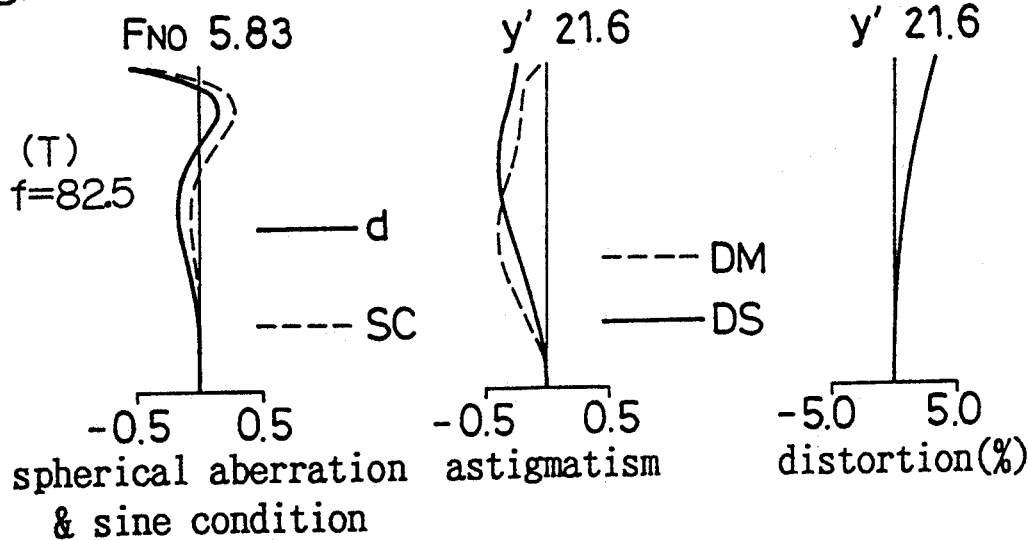
Figure 43A:
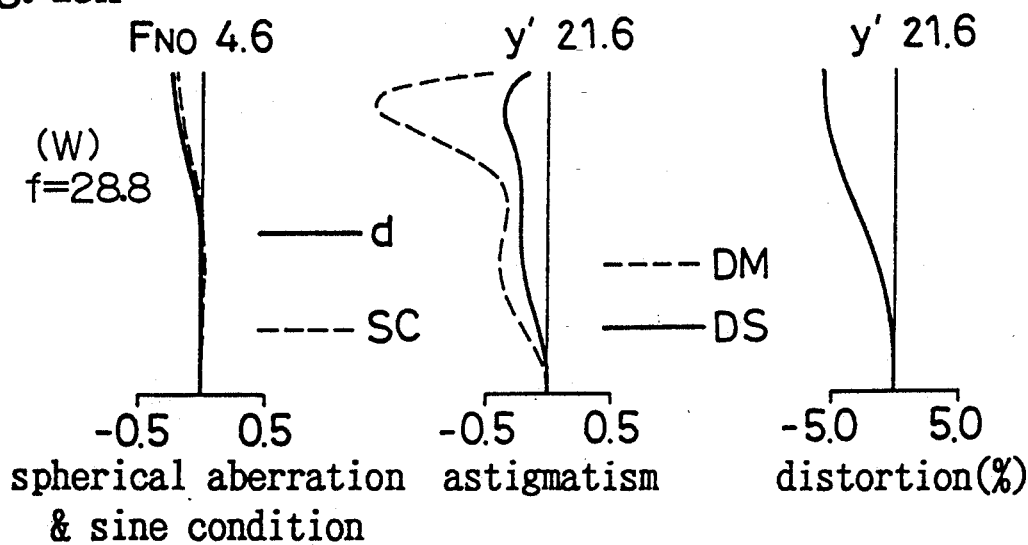
Figure 43B:
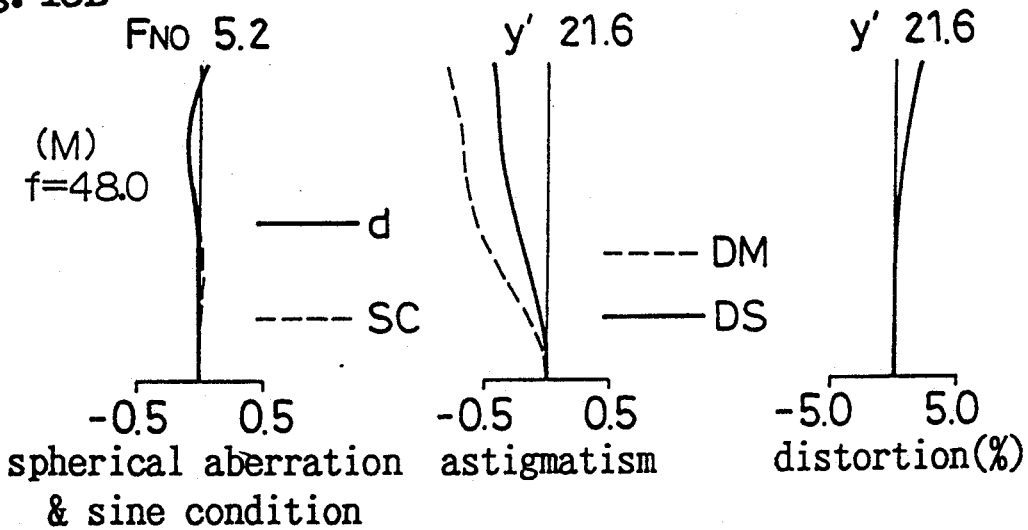
Figure 43C:
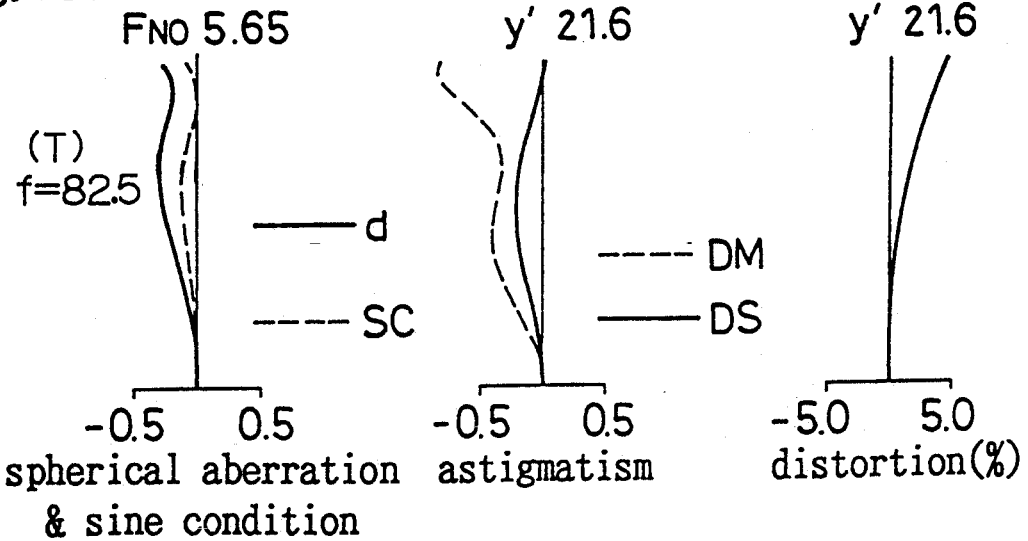
Figure 44A:
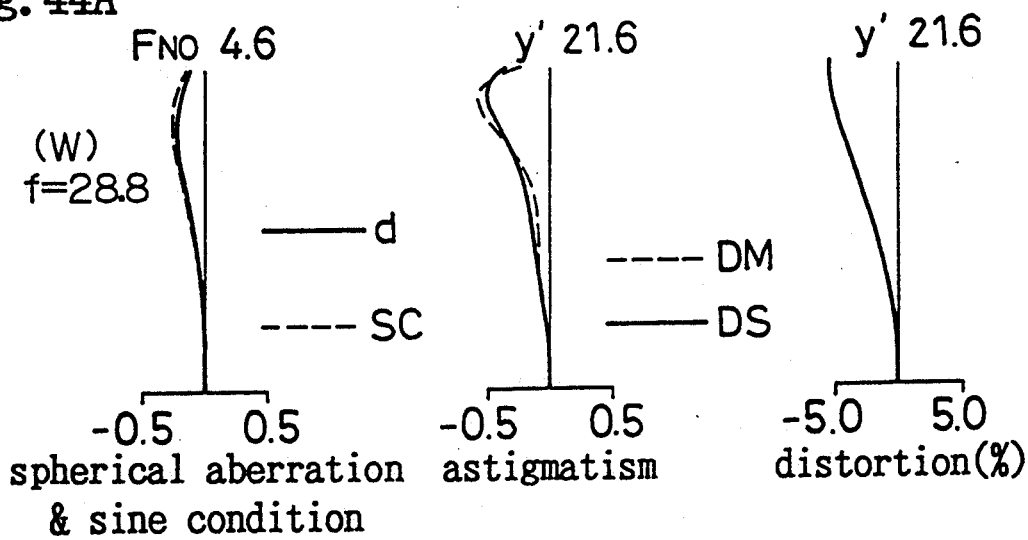
Figure 44B:
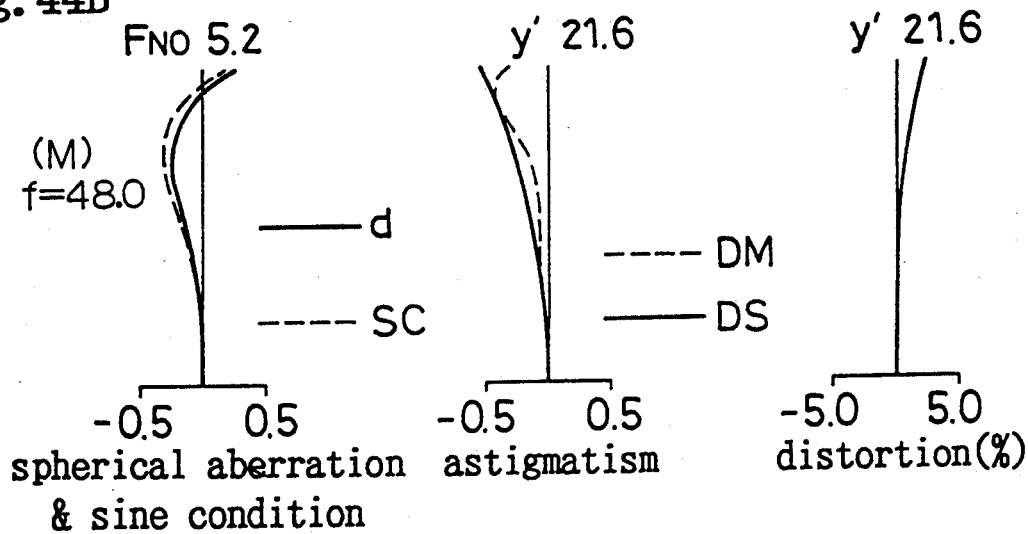
Figure 44C:
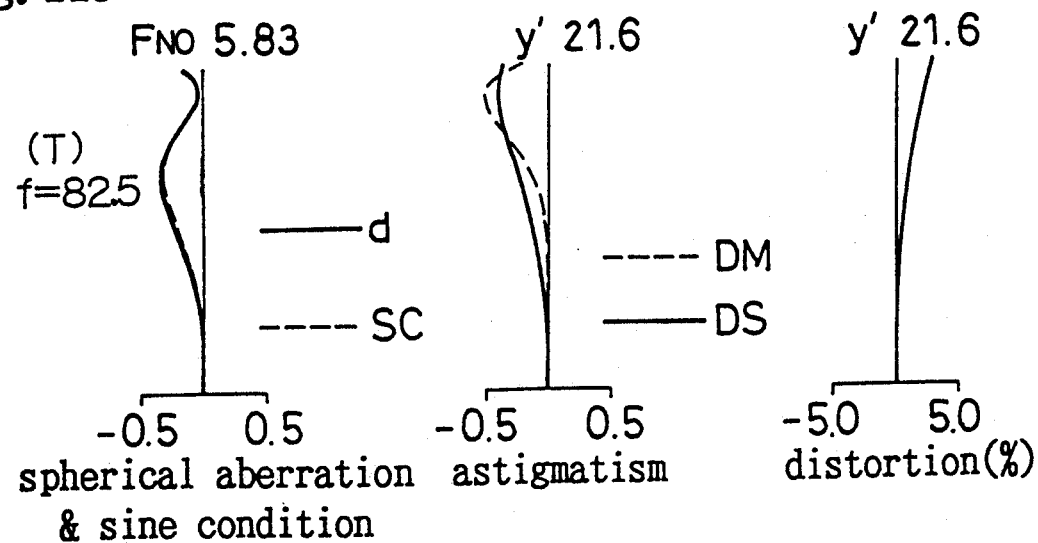
Figure 45A:
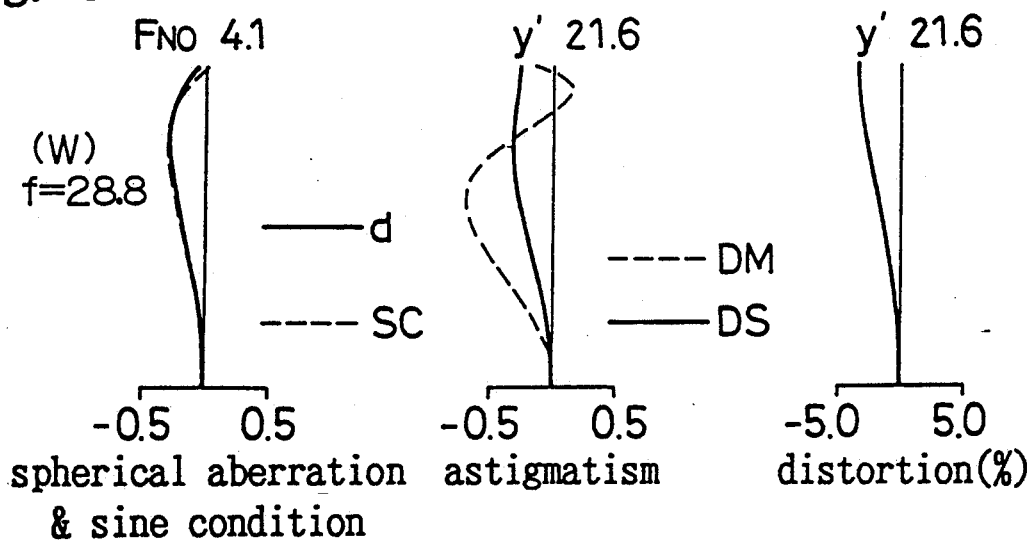
Figure 45B:
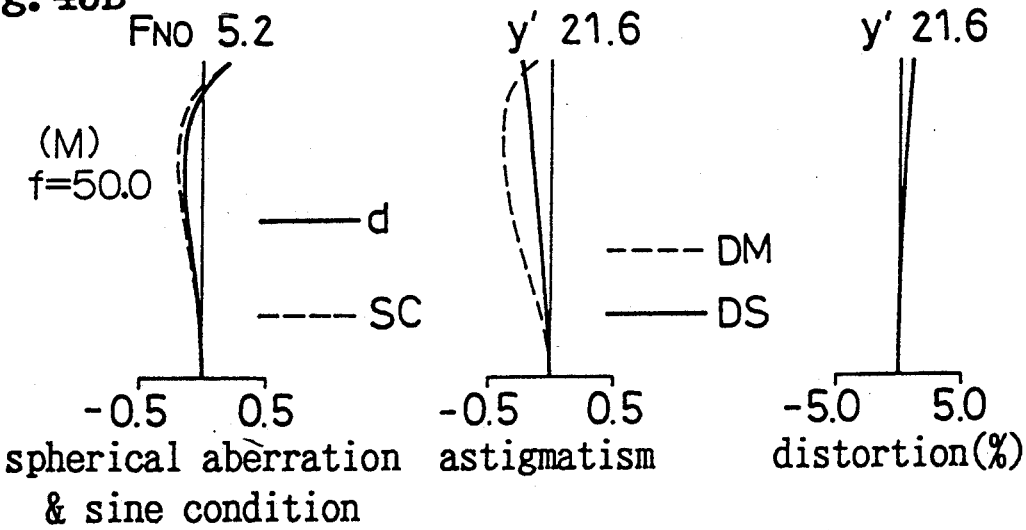
Figure 45C:
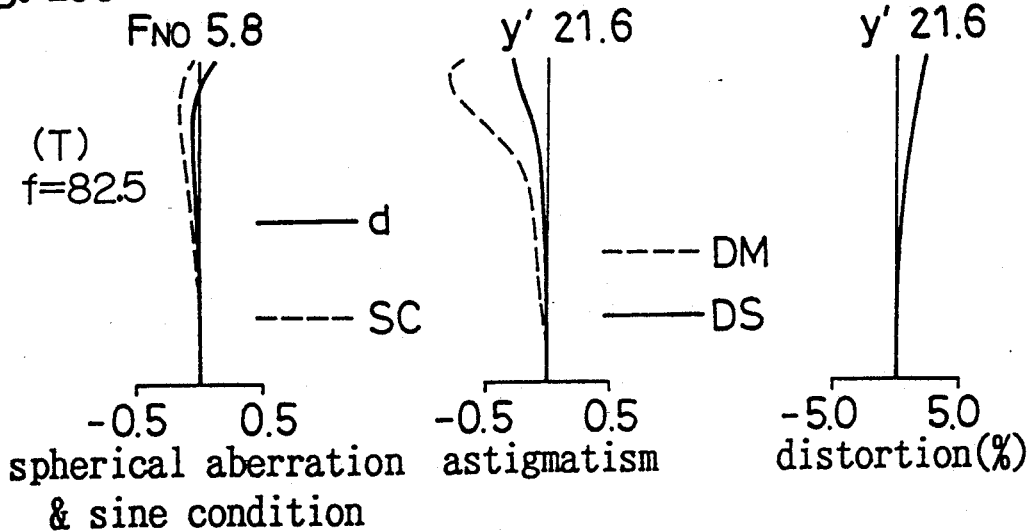
Figure 46A:
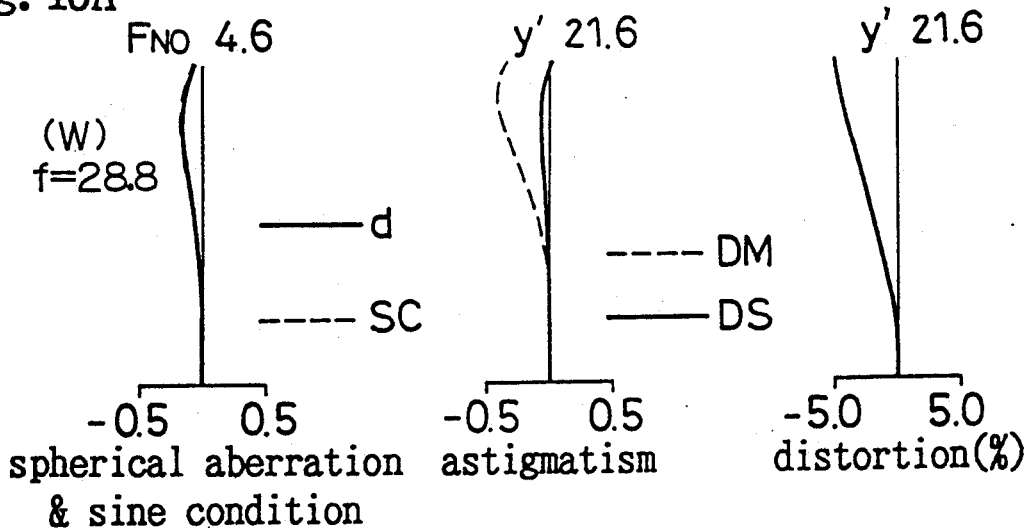
Figure 46B:
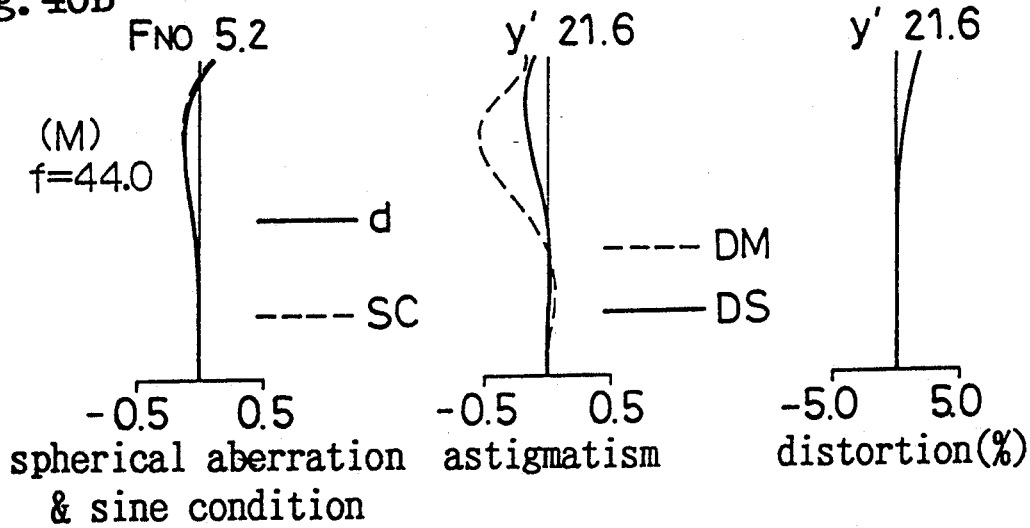
Figure 46C:
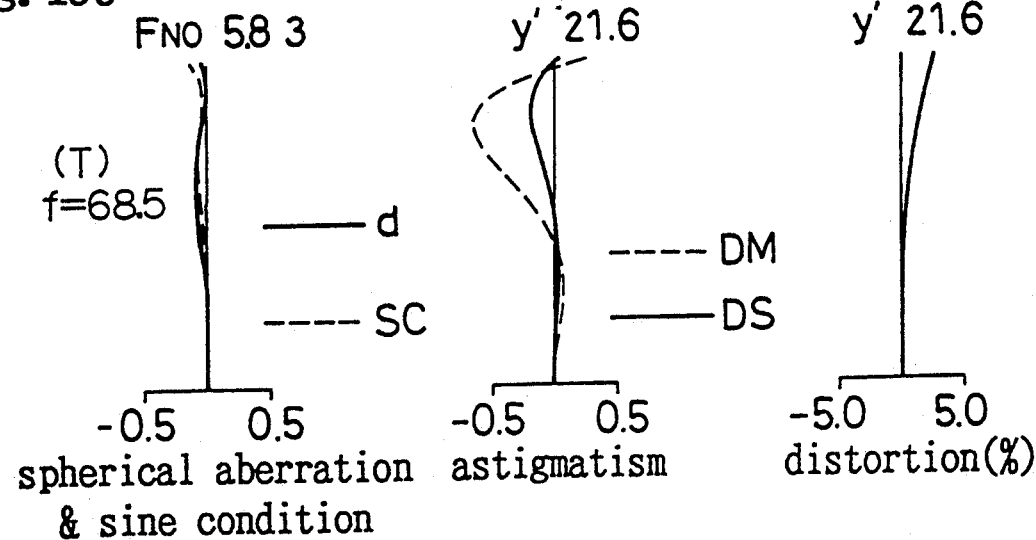
Figure 47A:
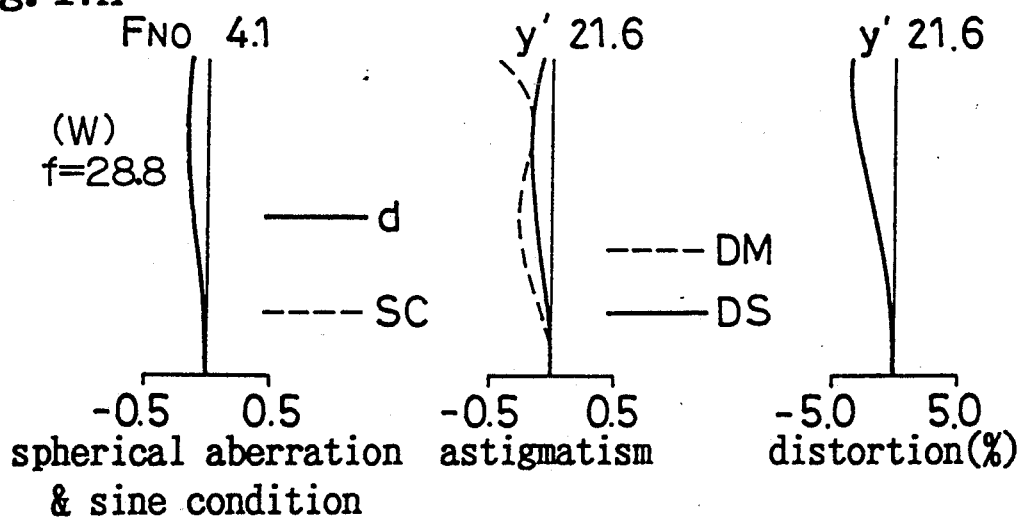
Figure 47B:
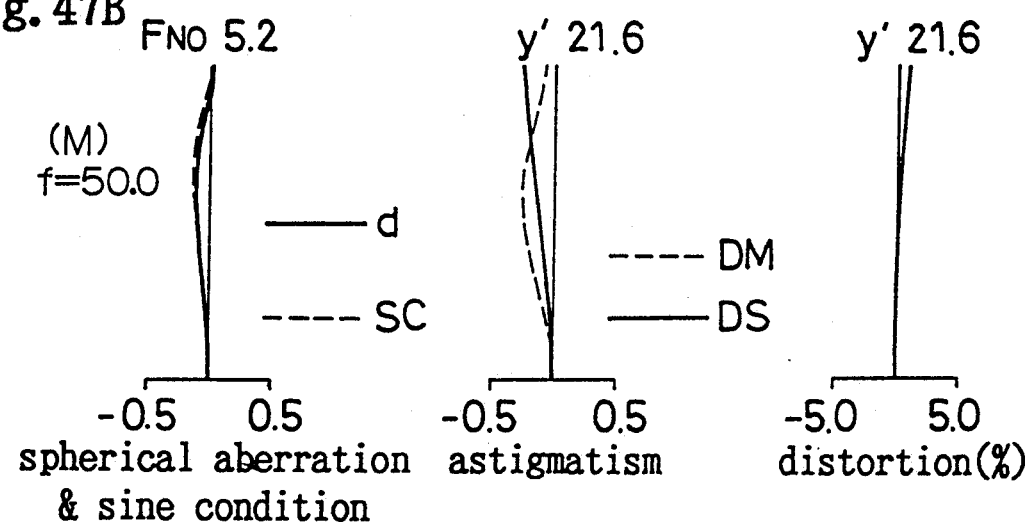
Figure 47C:
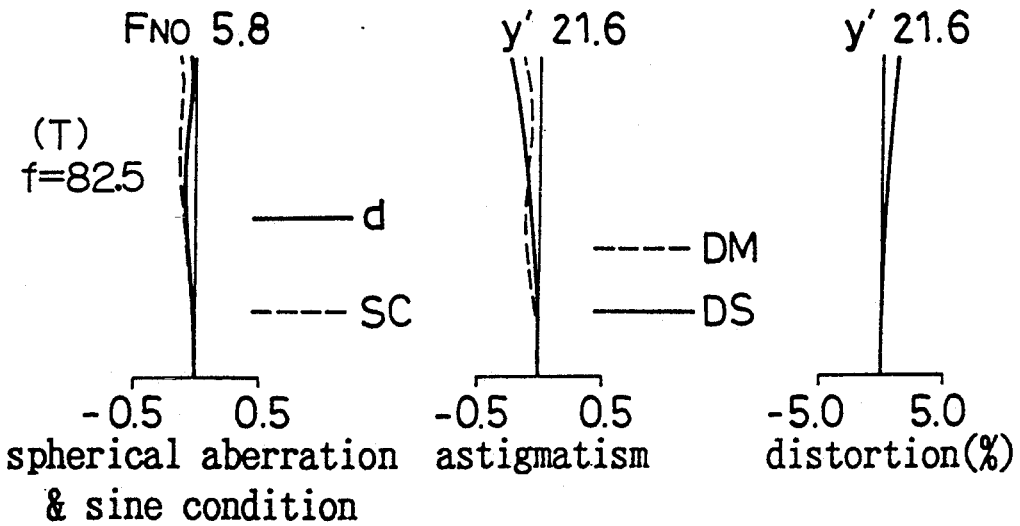
Figure 48A:
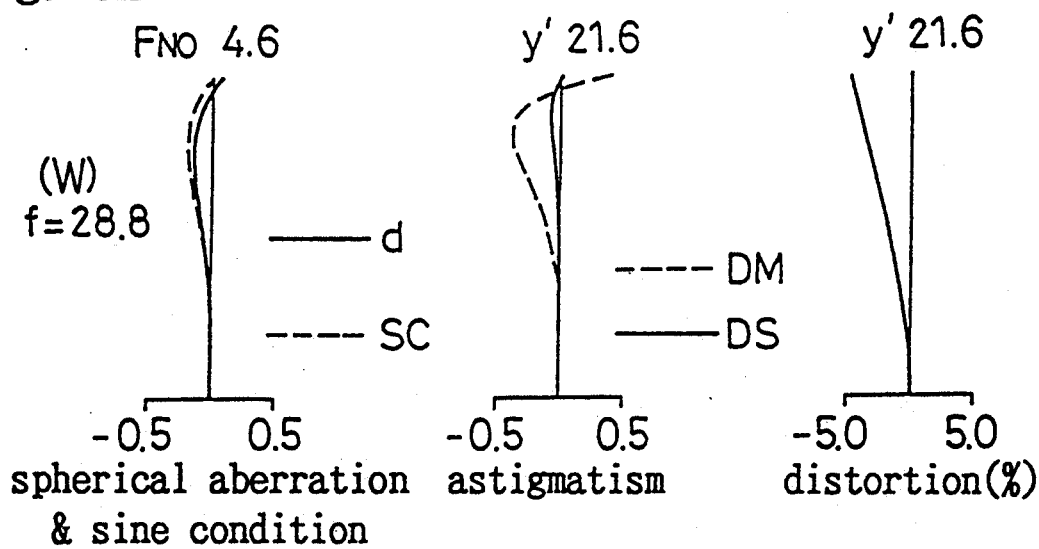
Figure 48B:
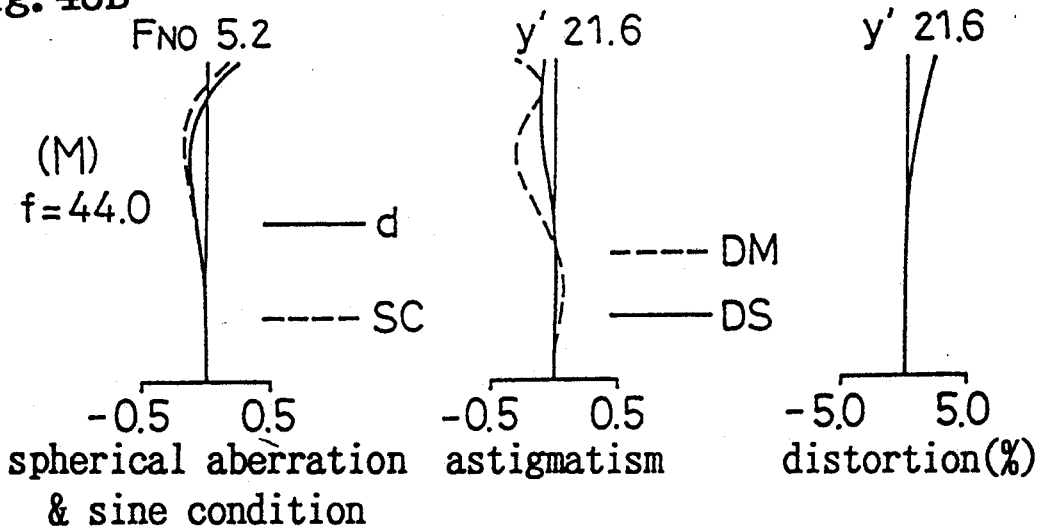
Figure 48C:
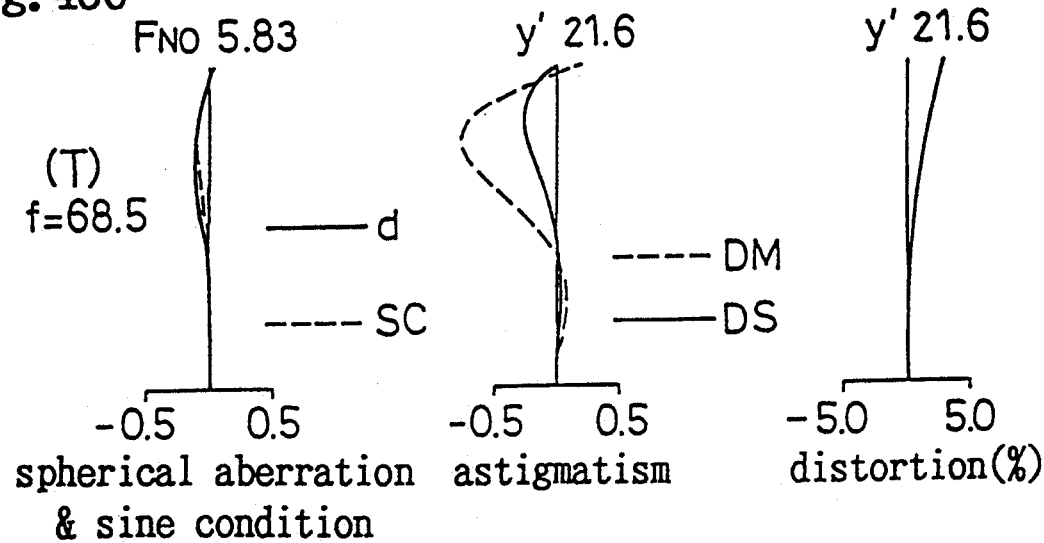

FIGS. 28A, 28B and 28C to 48A, 48B and 48C show aberrations, of the first to twenty-first embodiments of the present invention, at the shortest focal length condition, at the middle focal length condition and at the longest focal length condition.

Figure 49A:
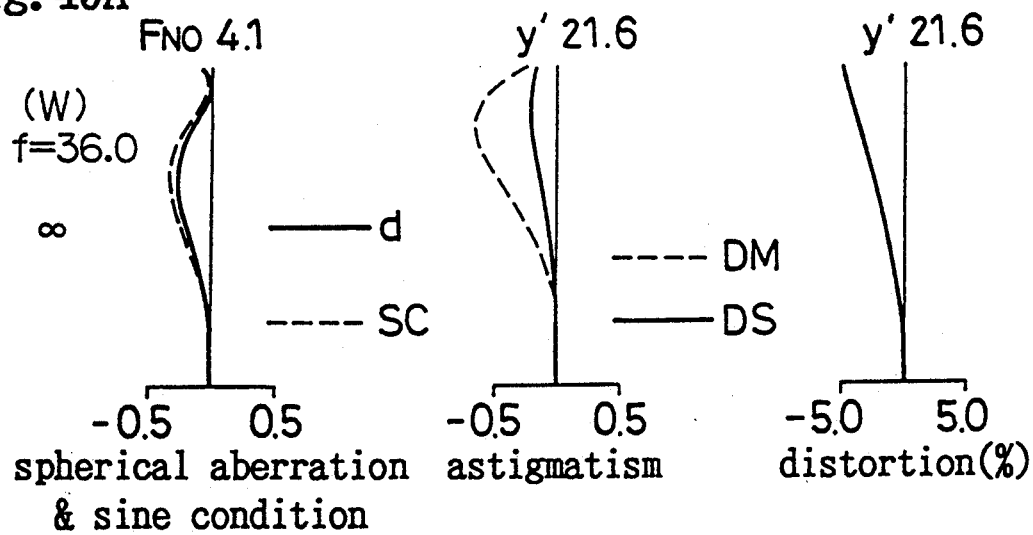
FIGS. 49A, 49B, 49C, 51A, 51B, 51C, 53A, 53B, 53C, 55A, 55B, 55C, 57A, 57B, 57C, 59A, 59B and 59C show aberrations, with respect to an object at infinity, of the twenty-second to twenty-seventh embodiments.
Figure 49B:
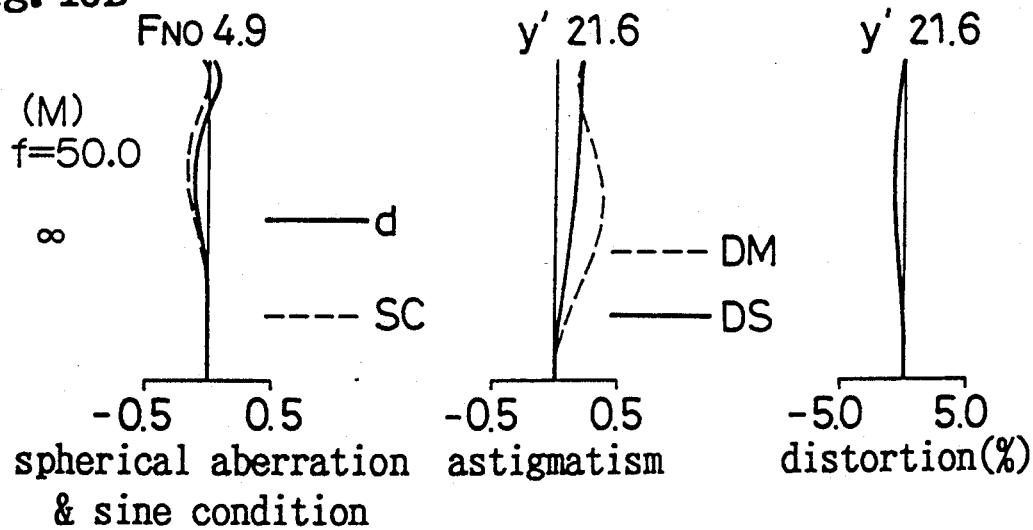
Figure 49C:
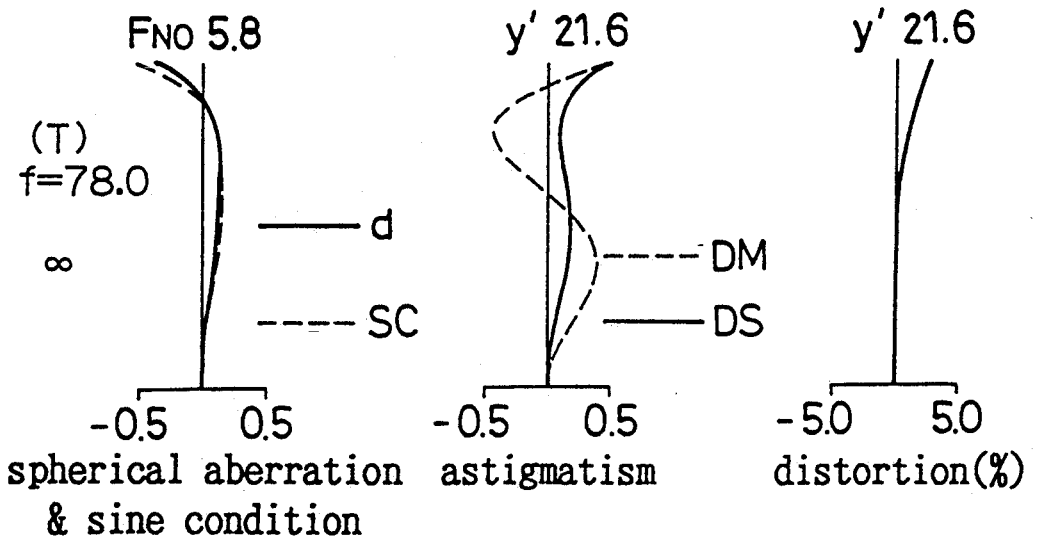
Figure 51A:
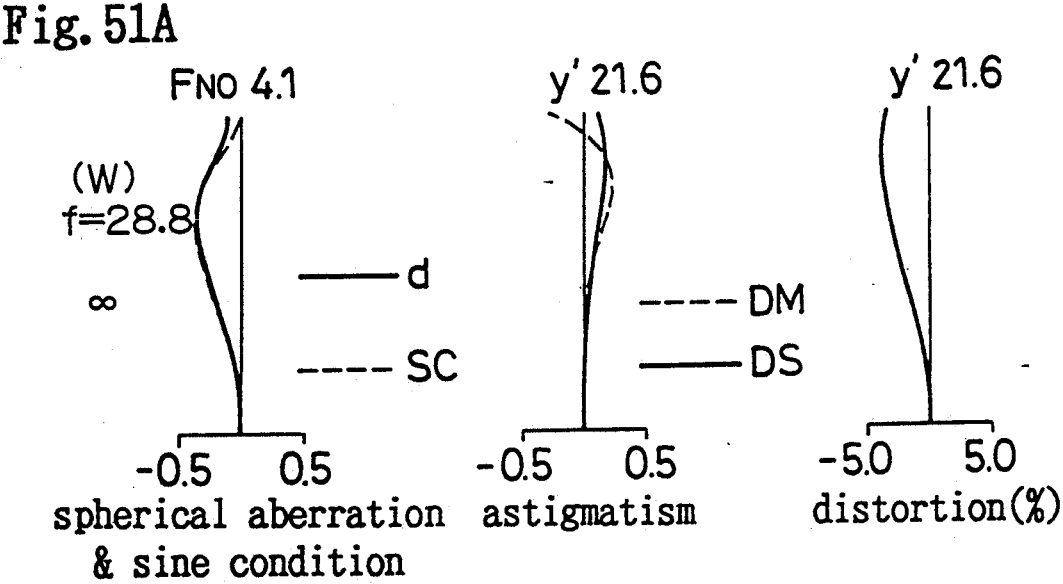
Figure 51B:
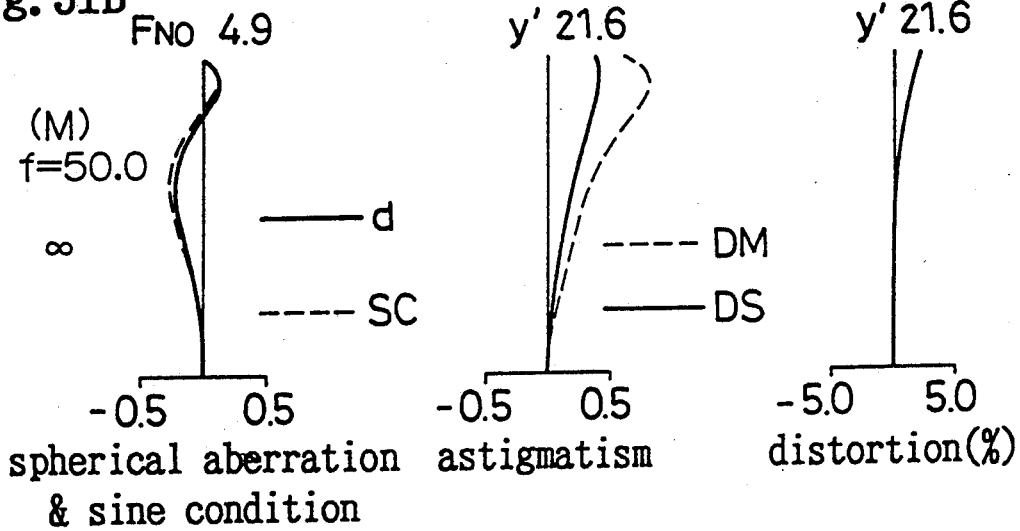
Figure 51C:
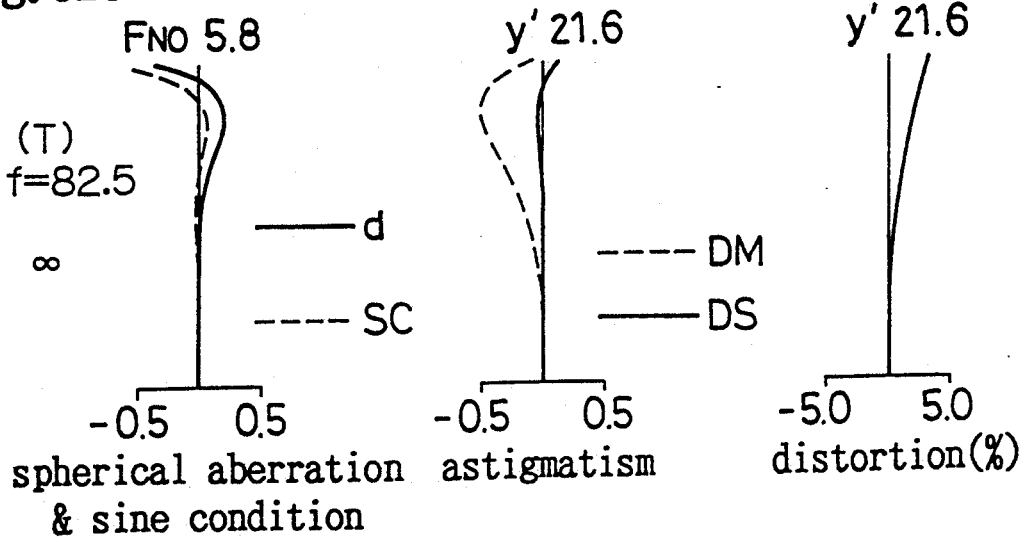
Figure 53A:
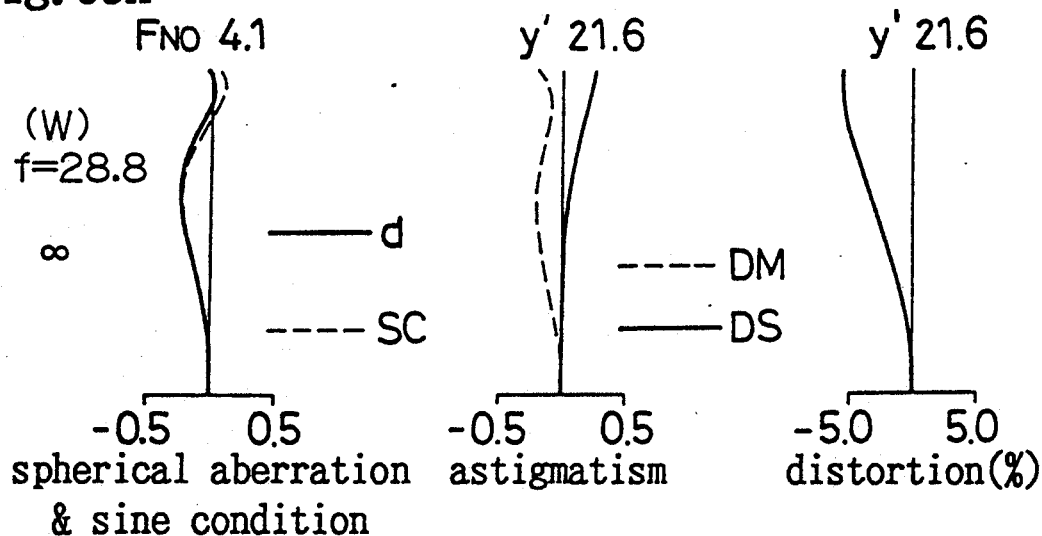
Figure 53B:
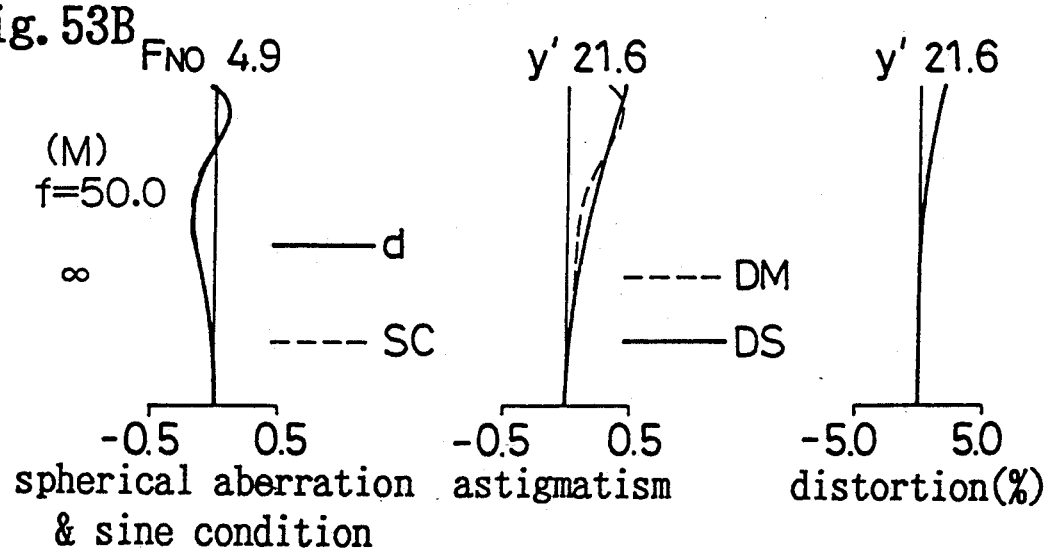
Figure 53C:
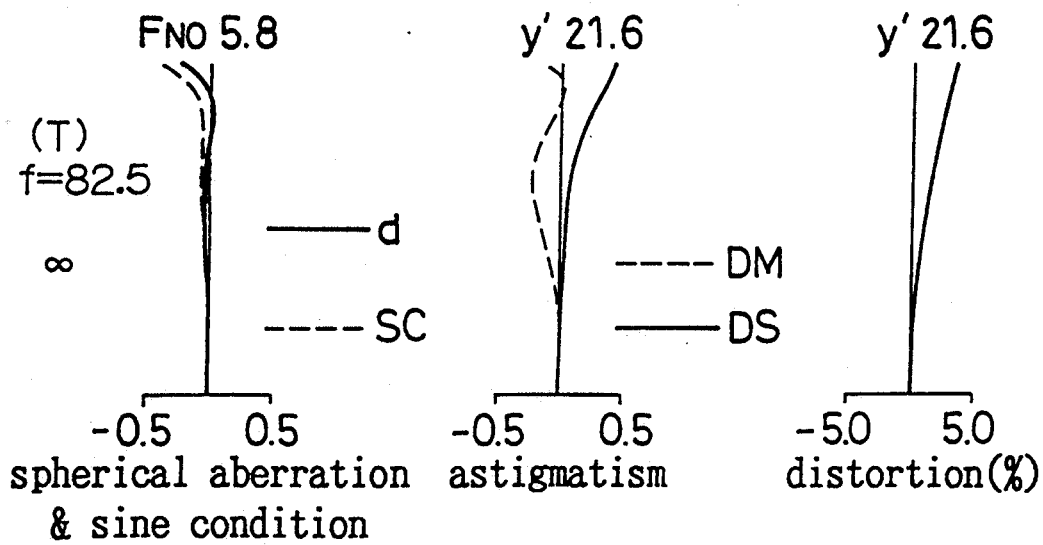
Figure 55A:
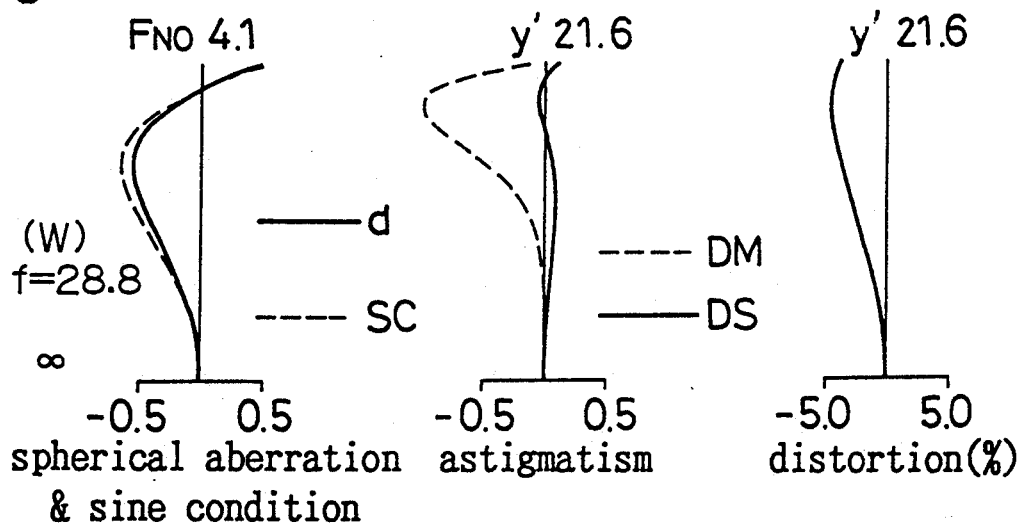
Figure 55B:
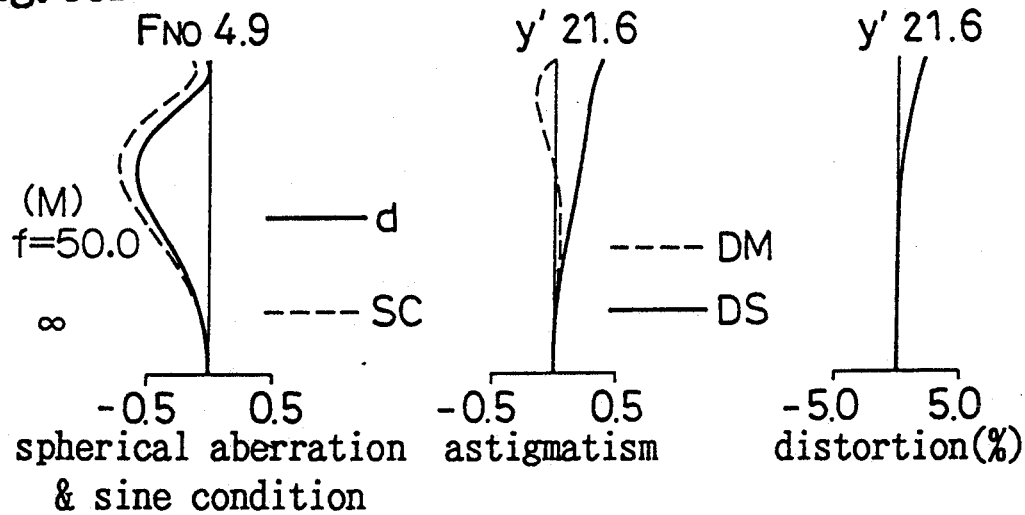
Figure 55C:
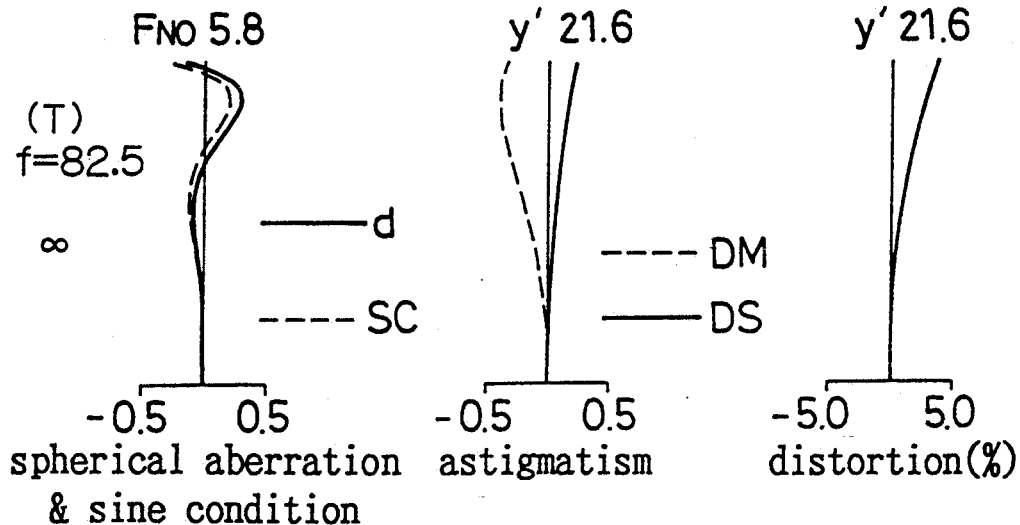
Figure 57A:
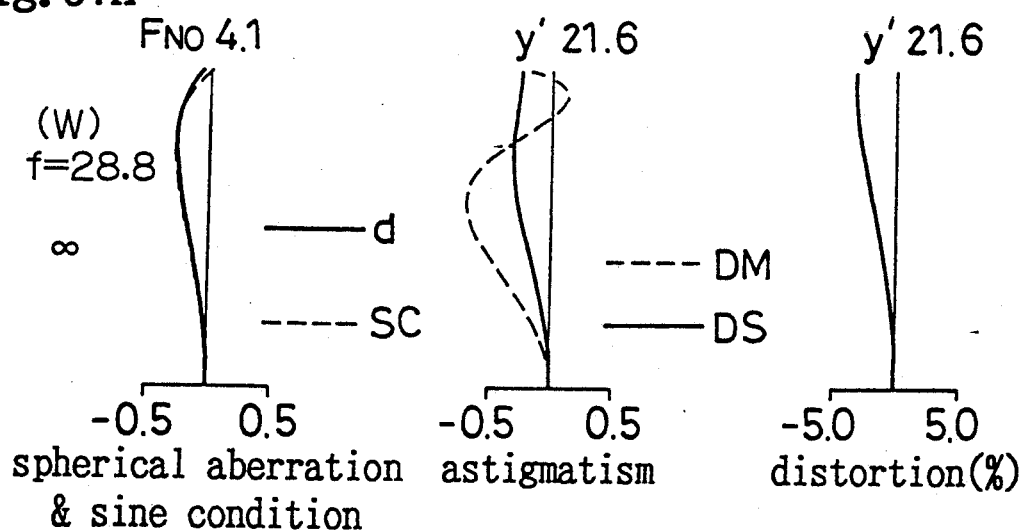
Figure 57B:
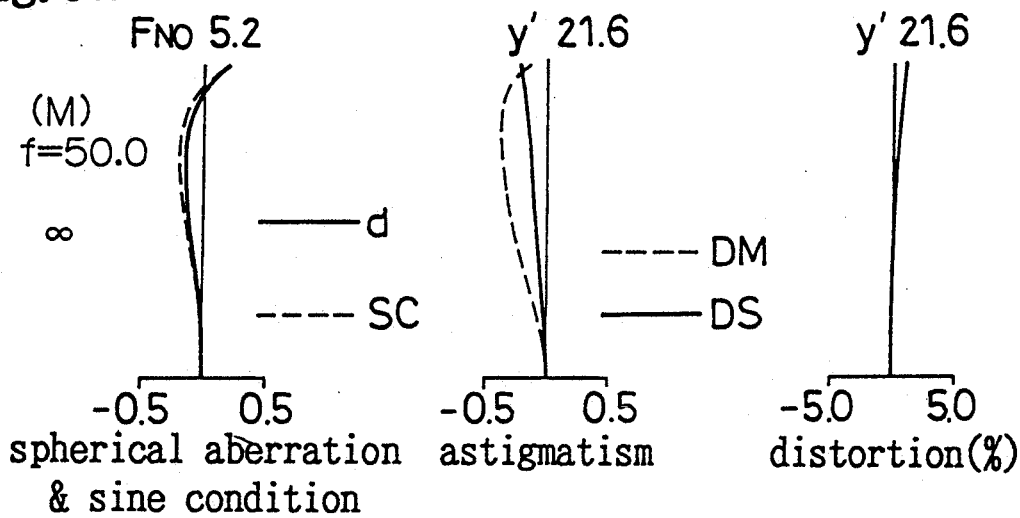
Figure 57C:
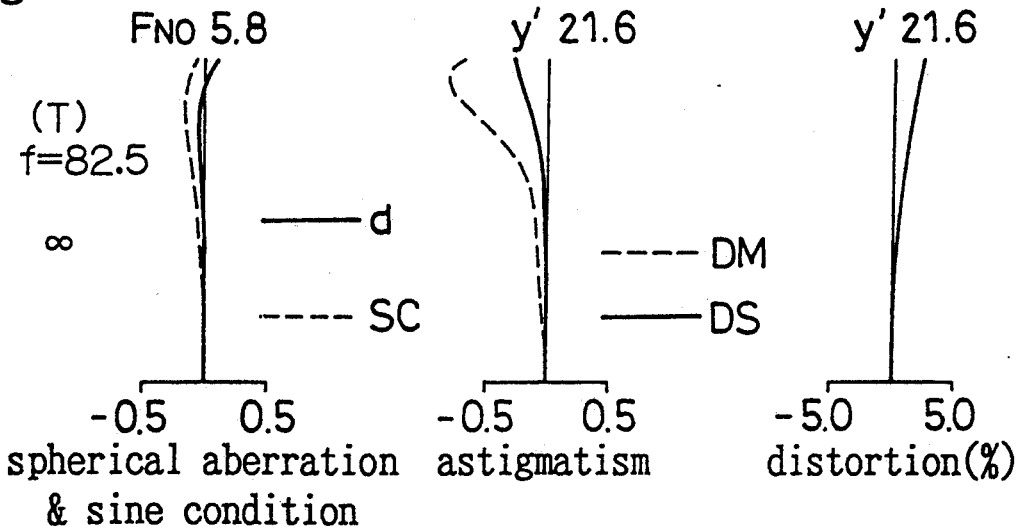
Figure 59A:
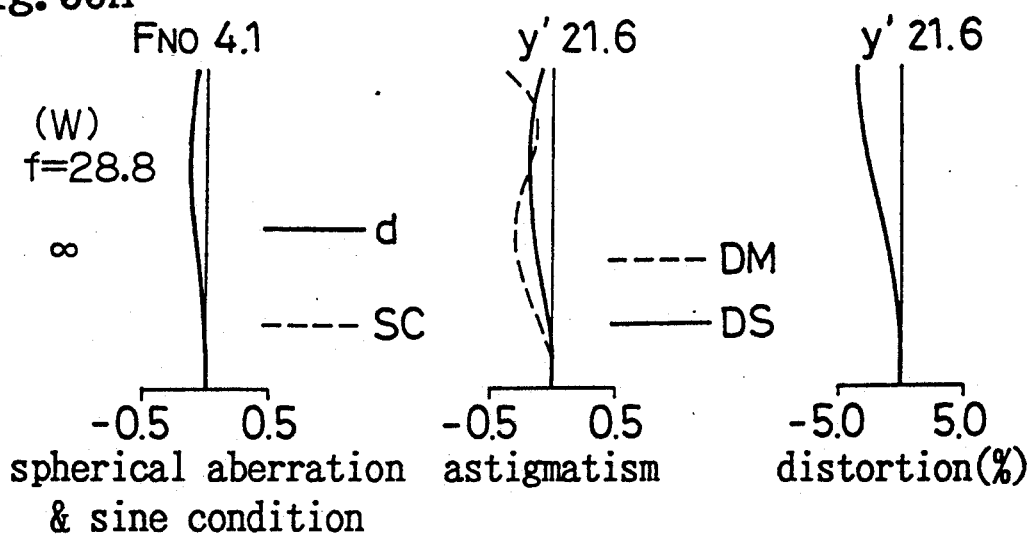
Figure 59B:
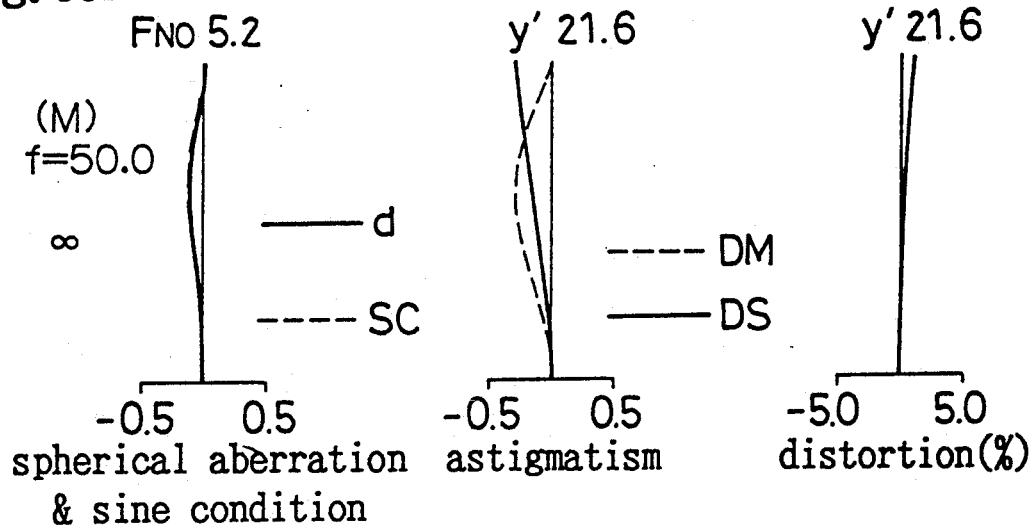
Figure 59C:
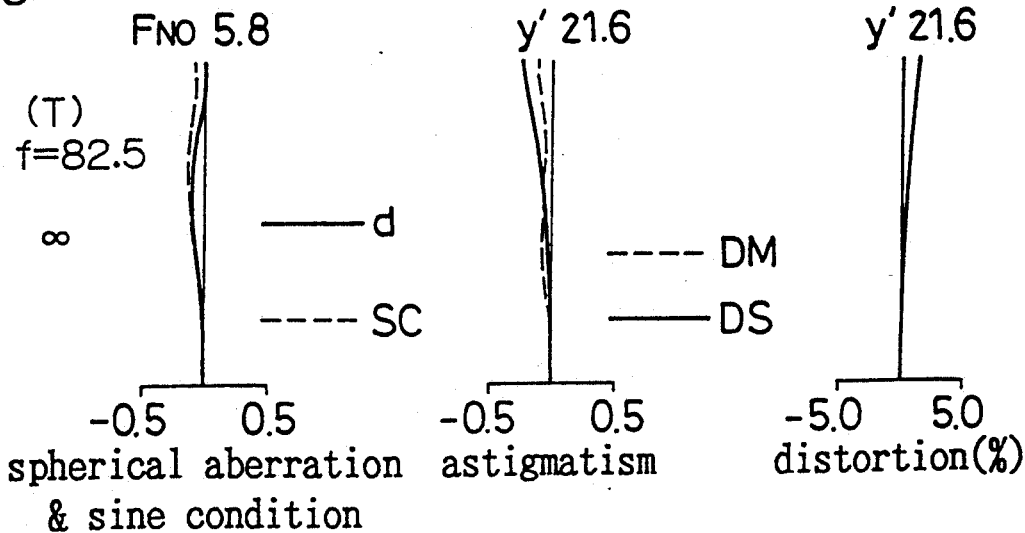

FIGS. 49A, 49B, 49C, 51A, 51B, 51C, 53A, 53B, 53C, 55A, 55B, 55C, 57A, 57B, 57C, 59A, 59B and 59C show aberrations, of the twenty-second to twenty-seventh embodiments of the present invention, with respect to an object at infinity ($\infty$) at the shortest focal length condition (W), at the middle focal length condition (M) and at the longest focal length condition (T).

Figure 50A:
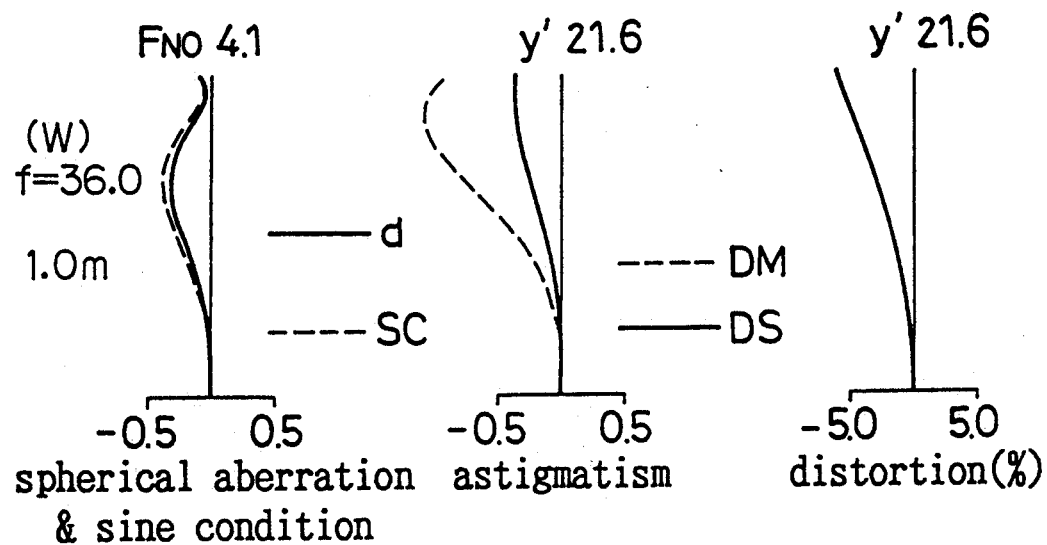
FIGS. 50A, 50B, 52A, 52B, 54A, 54B, 56A, 56B, 58A, 58B, 60A and 60B show aberrations, with respect to a nearer object, of the twenty-second to twenty-seventh embodiments of the present invention.
Figure 50B:
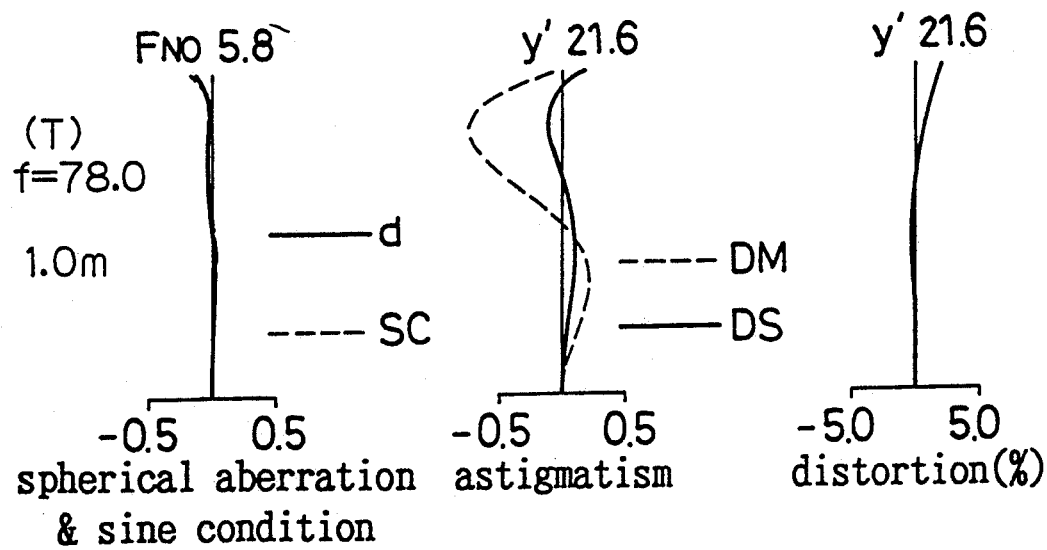
Figure 52A:
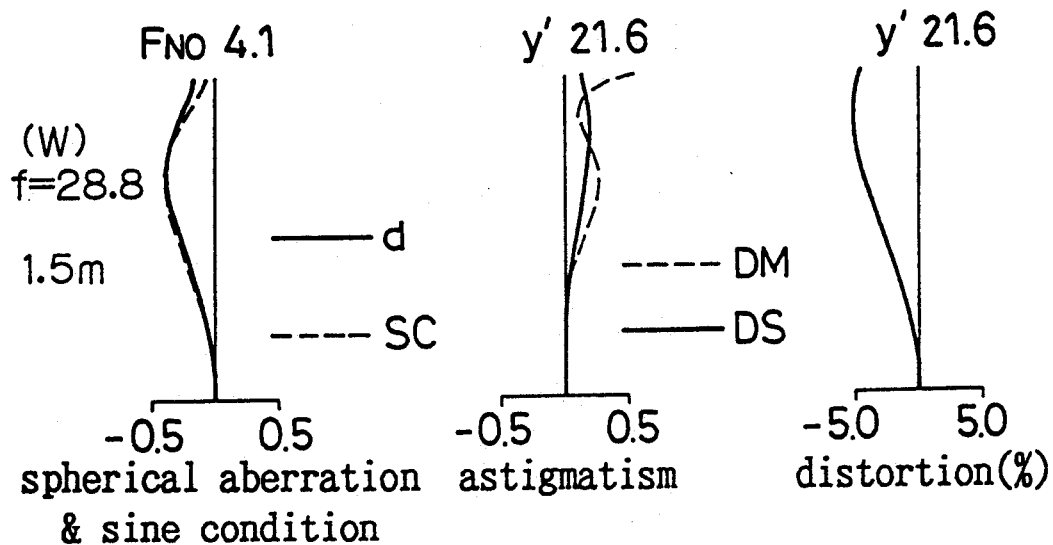
Figure 52B:
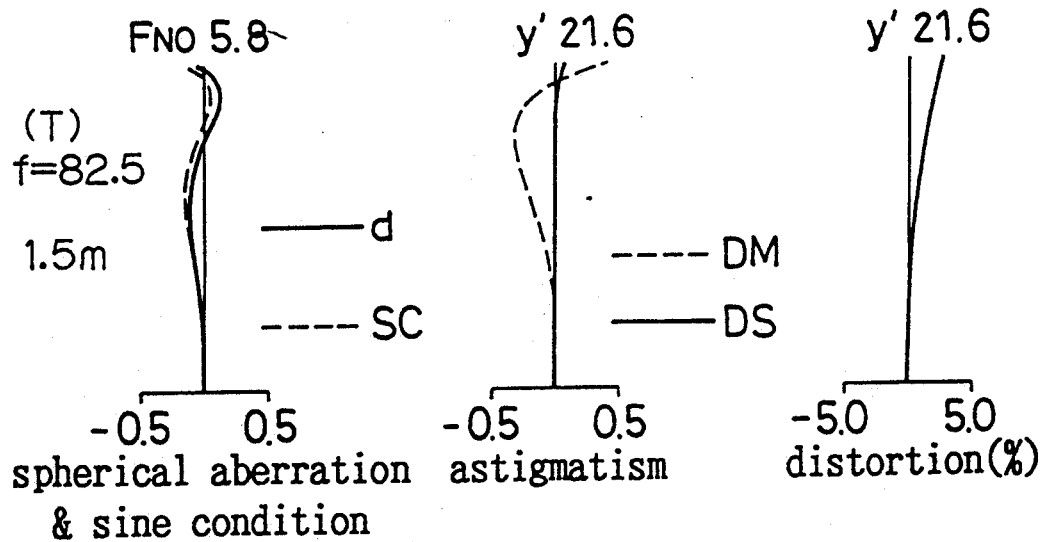
Figure 54A:
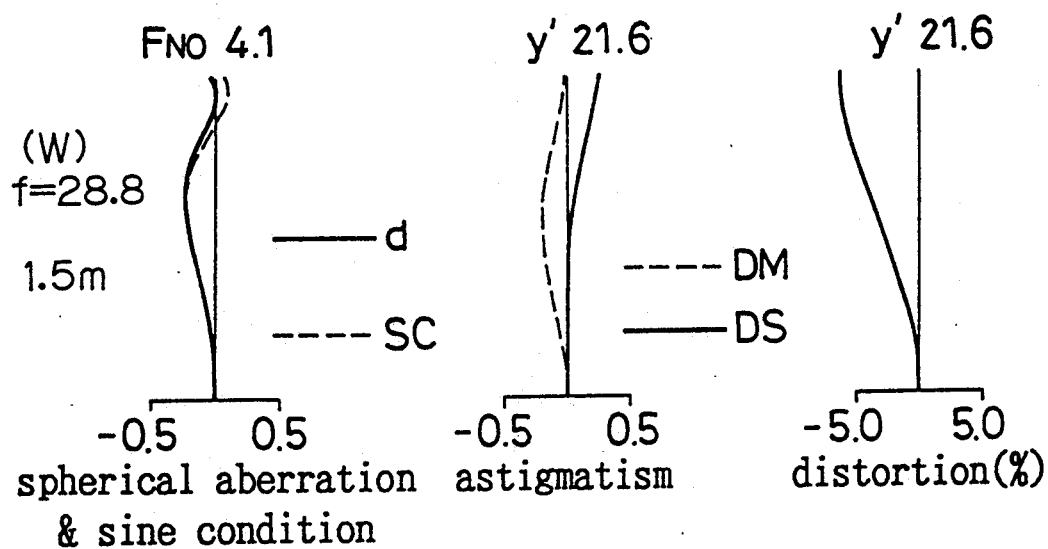
Figure 54B:
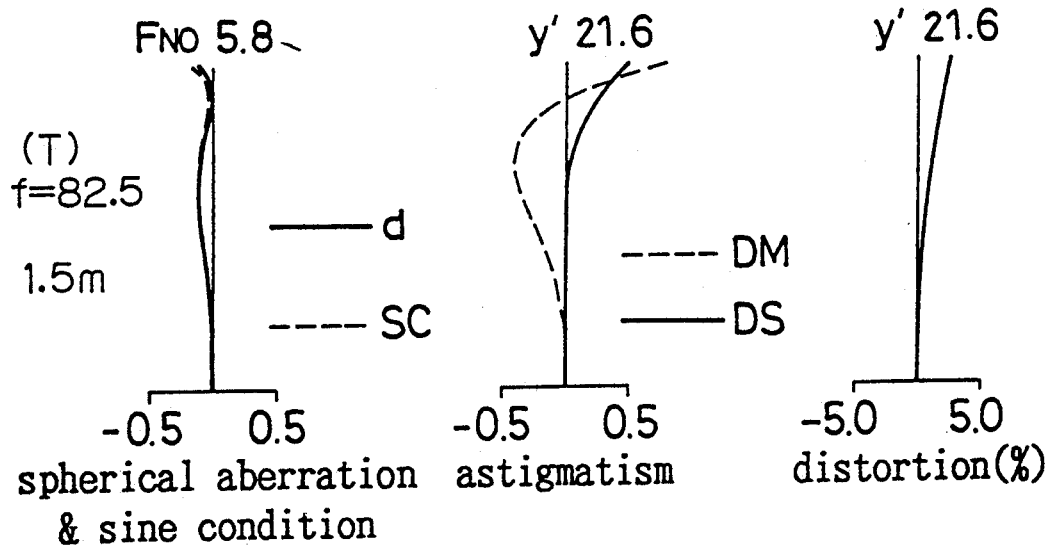
Figure 56A:
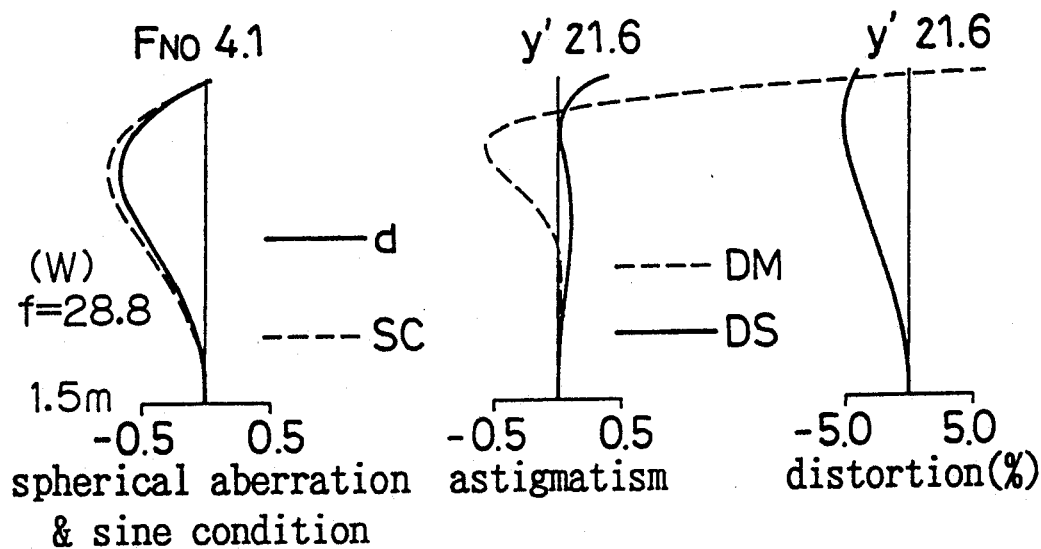
Figure 56B:
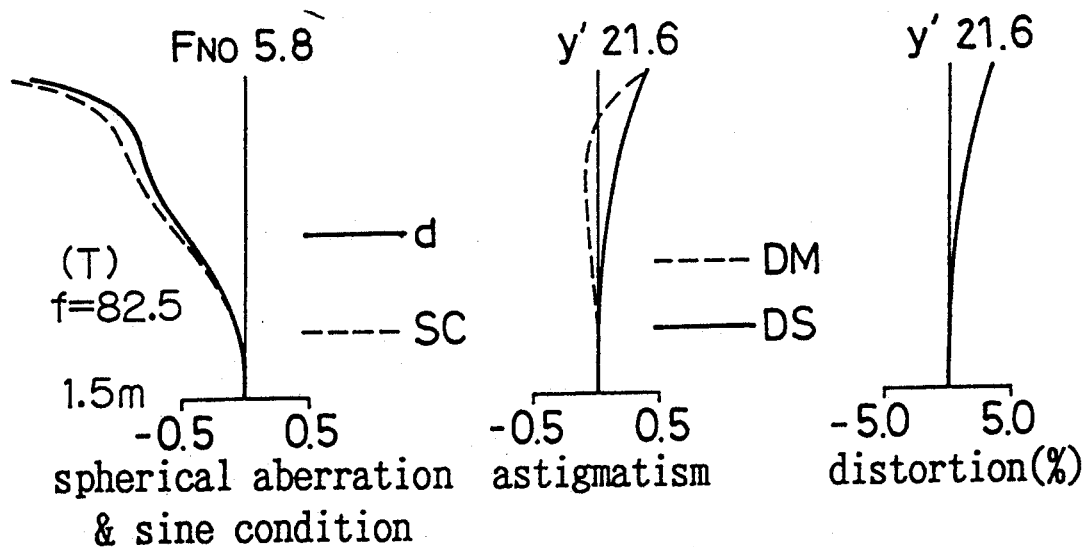
Figure 58A:
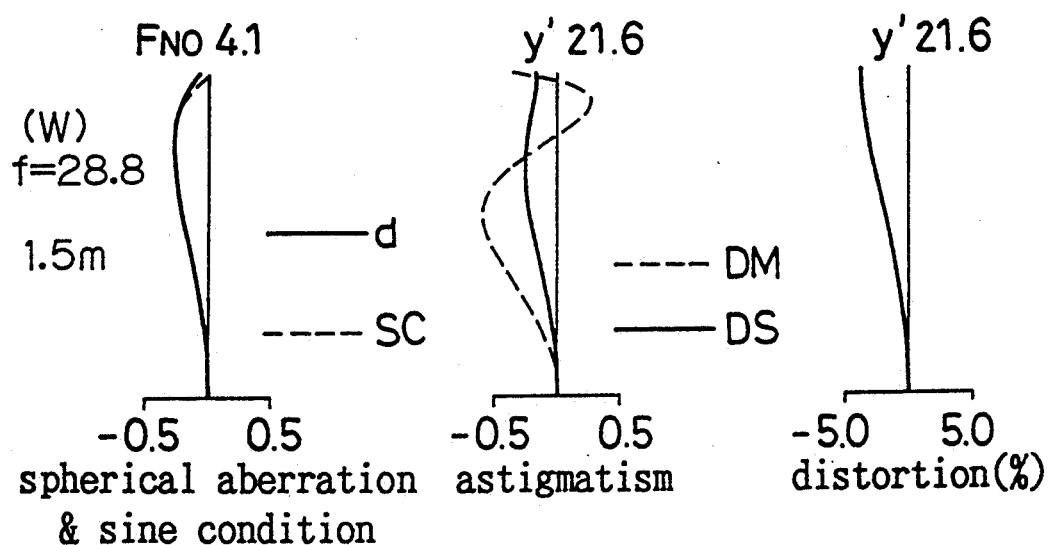
Figure 58B:
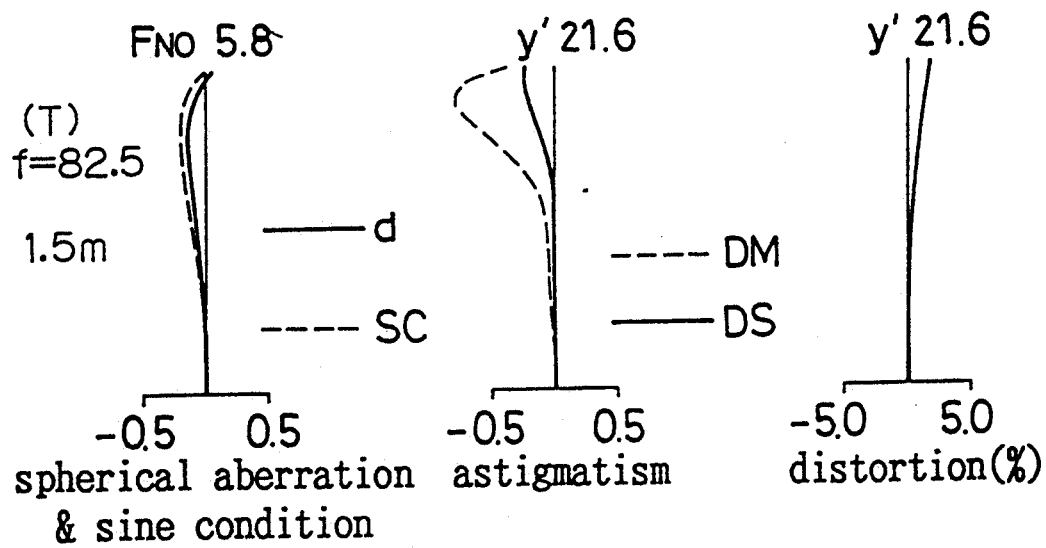
Figure 60A:
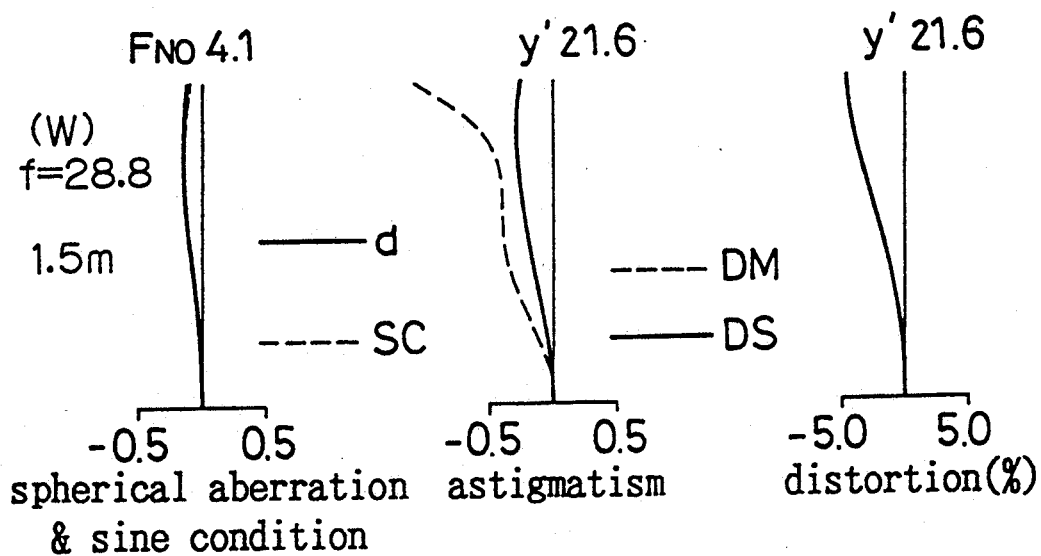
Figure 60B:
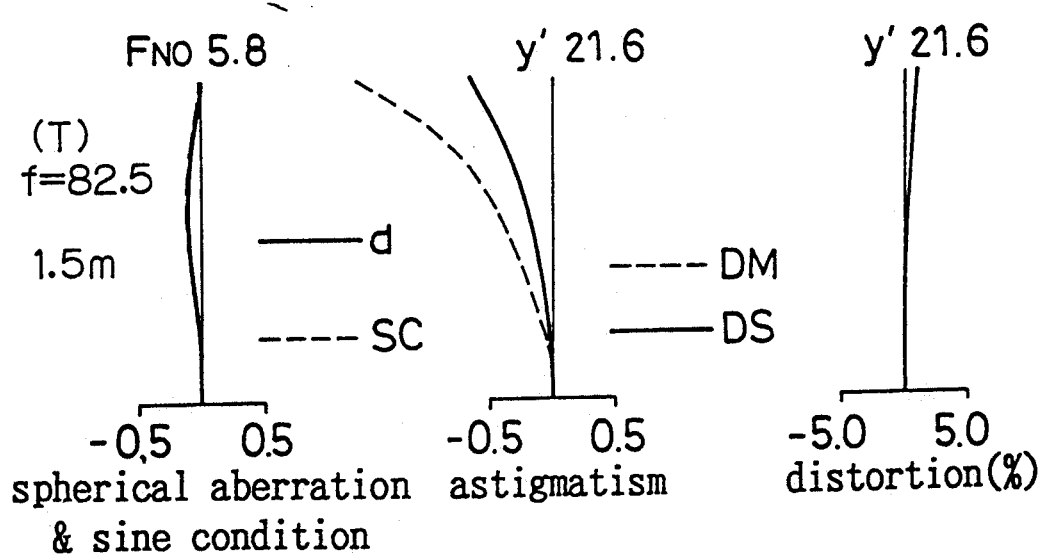

FIGS. 50A, 50B, 52A, 52B, 54A, 54B, 56A, 56B, 58A, 58B, 60A, and 60B show aberrations, of the twenty-second to twenty-seventh embodiments of the present invention, with respect to a nearer object at the shortest focal length condition (W) and at the longest focal length condition (T) (the object distance of the twenty-second embodiment is 1.0 m, and that of the twenty-third to twenty-seventh embodiments is 1.5 m).

In FIGS. 28A, 28B and 28C to 60A, 60B and 60C, a solid line d shows aberration to the d-line, a dotted line SC show the sine condition, and dotted lines DM and DS show astigmatism on a meridional and a sagittal image planes, respectively.

The numerical data of the first to twenty-seventh embodiments of the present invention are shown in Tables 1 to 27. In each table, $r_i$ ($i=1, 2, 3, \ldots$) represents the radius of curvature of the ith lens surface counted from the object side, $d_i$ ($i=1, 2, 3, \ldots$) represents the ith axial distance counted from the object side, $N_i$ ($i=1, 2, 3, \ldots$) represents the refractive index, to the d-line, of the ith lens counted from the object side, $\nu_i$ represents the Abbe number of the ith lens counted from the object side, f represents the focal length of the whole zoom lens system and F represents the minimum F-number. The asterisks in radius of curvature columns indicate that the surfaces are aspherical. The aspherical surfaces are defined by the above-described expressions which define X(y).

The first embodiment of the present invention comprises from the object side: a first lens component L1 having a first lens element consisting of a negative meniscus lens element concave to the image side and a second lens element consisting of a positive bi-convex lens element; a second lens component L2 having a third lens element consisting of a negative bi-concave lens element and a fourth lens element consisting of a positive bi-convex lens element; an aperture A; and a third lens component L3 having a fifth lens element consisting of a positive bi-convex lens element and a sixth lens element consisting of a negative bi-concave lens element. In the first embodiment, an image side surface of the first lens element, an object side surface of the third lens element, both surfaces of the fourth lens element, an object side surface of the fifth lens element and both surfaces of the sixth lens element are aspherical.

The second and third embodiments of the present invention comprise from the object side: a first lens component L1 having a first lens element consisting of a negative meniscus lens element concave to the image side and a second lens element consisting of a positive bi-convex lens element; a second lens component L2 having a third lens element consisting of a negative bi-concave lens element and a fourth lens element consisting of a positive meniscus lens element convex to the object side; an aperture A; and a third lens component L3 having a fifth lens element consisting of a positive bi-convex lens element and sixth lens element consisting of a negative bi-concave lens element. In the second and third embodiments, an image side surface of the first lens element, both surfaces of the second lens element, an object side surface of the third lens element, both surfaces of the fourth lens element, an object side surface of the fifth lens element and both surfaces of the sixth lens elements are aspherical.

The fourth embodiment of the present invention comprises from the object side: a first lens component L1 having a first lens element consisting of a negative bi-concave lens element and a second lens element consisting of a positive bi-convex lens element; a second lens component L2 having a third lens element consisting of a negative bi-concave lens element and a fourth lens element consisting of a positive bi-convex lens element; an aperture A; and a third lens component L3 having a fifth lens element consisting of a positive bi-convex lens element and a sixth lens element consisting of a negative bi-concave lens element. In the fourth embodiment, an image side surface of the first lens element, an object side surface of the third lens element, both surfaces of the fourth lens element, an object side surface of the fifth lens element and both surfaces of the sixth lens element are aspherical.

The fifth embodiment of the present invention comprises from the object side: a first lens component L1 having a negative meniscus lens element concave to the image side and a positive meniscus lens element convex to the object side; a second lens component L2 having a negative bi-concave lens element and a positive meniscus lens element convex to the object side; an aperture A; and a third lens component L3 having two positive bi-convex lens elements and a negative meniscus lens element concave to the image side.

In the fifth embodiment, the following surfaces are aspherical: in the first lens component L1, an image side surface of the negative meniscus lens element concave to the image side and both surfaces of the positive meniscus lens element convex to the object side; in the second lens component L2, an object side surface of the negative bi-concave lens element and both surfaces of the positive meniscus lens element convex to the object side; and in the third lens component L3, both surfaces of the object side positive bi-convex lens element, an object side surface of the image side positive bi-convex lens element and an object side surface of the negative meniscus lens element concave to the image side.

The sixth embodiment of the present invention comprises from the object side: a first lens component L1 having a negative meniscus lens element concave to the image side and a positive meniscus lens element convex to the object side; a second lens component L2 having two negative meniscus lens elements concave to the image side and a positive meniscus lens element convex to the object side; an aperture A; and a third lens component L3 having a positive bi-convex lens element and a negative meniscus lens element concave to the image side.

In the sixth embodiment, the following surfaces are aspherical: in the first lens component L1, an image side surface of the positive meniscus lens element convex to the object side; in the second lens component L2, an object side surface of the object side negative meniscus lens element concave to the image side, both surfaces of the image side negative meniscus lens element concave to the image side and both surfaces of the positive meniscus lens element convex to the object side; and in the third lens component L3, both surfaces of the positive bi-convex lens element and an object side surface of the negative meniscus lens element concave to the image side.

The seventh embodiment of the present invention comprises from the object side: a first lens component L1 having a negative meniscus lens element concave to the image side and a positive meniscus lens element convex to the object side; a second lens component L2 having a negative meniscus lens element concave to the image side, a negative bi-concave lens element, and a positive bi-convex lens element; an aperture A; and a third lens component L3 having a positive meniscus lens element convex to the object side, a positive bi-convex lens element and a negative meniscus lens element concave to the image side.

In the seventh embodiment, the following surfaces are aspherical: in the first lens component L1, an image side surface of the positive meniscus lens element convex to the image side; in the second lens component L2, an object side surface of the negative meniscus lens element concave to the image side, both surfaces of the negative bi-concave lens element and both surfaces of the positive bi-convex lens element; and in the third lens component L3, both surfaces of the positive meniscus lens element convex to the object side, an object side surface of the positive bi-convex lens element and an object side surface of the negative meniscus lens element concave to the image side.

The eighth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having a negative bi-concave lens element and a positive meniscus lens element convex to the object side; an aperture A; and a third lens component L3 having a positive bi-convex lens element and a negative meniscus lens element concave to the image side.

In the eighth embodiment, the following surfaces are aspherical: in the second lens component L2, an object side surface of the negative bi-concave lens element and both surfaces of the positive meniscus lens element convex to the object side; and in the third lens component L3, both surfaces of each of the lens elements.

The ninth embodiment of the present invention comprises from the object side: a first lens component L1 having a doublet lens element consisting of a negative meniscus lens element concave to the image side and a positive bi-convex lens element, and a positive meniscus lens element convex to the object side; a second lens component L2 having a negative bi-concave lens element and a positive meniscus lens element convex to the object side; an aperture A; a third lens component L3 having a positive bi-convex lens element, a negative meniscus lens element concave to the object side and a negative meniscus lens element concave to the image side.

In the ninth embodiment, the following surfaces are aspherical: in the second lens component L2, an object side surface of the negative bi-concave lens element and both surfaces of the positive menisus lens element convex to the object side; and in the third lens component L3, both surfaces of the positive bi-convex lens element, both surfaces of the negative meniscus lens element concave to the object side and an object side surface of the negative meniscus lens element concave to the image side.

The tenth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having a negative meniscus lens element concave to the image side, a negative bi-concave lens element and a positive meniscus lens element convex to the object side; an aperture A; and a third lens component L3 having a positive bi-convex lens element and a negative meniscus lens element concave to the image side.

In the tenth embodiment, the following surfaces are aspherical: in the second lens component L2, an object side surface of the negative meniscus lens element concave to the image side, both surfaces of the negative bi-concave lens element and both surfaces of the positive meniscus lens element convex to the object side; and in the third lens component L3, both surfaces of the positive bi-convex lens element and an object side surface of the negative meniscus lens element concave to the image side.

The eleventh embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having a negative meniscus lens element concave to the image side, a negative bi-concave lens element and a positive bi-convex lens element; an aperture A; and a third lens component L3 having two positive bi-convex lens elements and a negative meniscus lens element concave to the image side.

In the eleventh embodiment, the following surfaces are aspherical: in the second lens component L2, an object side surface of the negative meniscus lens element concave to the image side, both surfaces of the negative bi-concave lens element and both surfaces of the positive bi-convex lens element; and in the third lens component L3, the both surfaces of the two positive bi-convex lens elements and an object side surface of the negative meniscus lens element concave to the image side.

The twelfth embodiment of the present invention comprises from the object side: a first lens component L1 having a negative meniscus lens element concave to the image side and a positive meniscus lens element convex to the object side; a second lens component L2 having a negative bi-concave lens element and a positive meniscus lens element convex to the object side; an aperture A; and a third lens component L3 having a positive bi-convex lens element and a negative meniscus lens element concave to the image side.

In the twelfth embodiment, the following surfaces are aspherical: in the first lens component L1, an image side surface of the negative meniscus lens element concave to the image side and both surfaces of the positive meniscus lens element convex to the object side; in the second lens component L2, an object side surface of the negative bi-concave lens element and both surfaces of the positive meniscus lens element convex to the object side; and in the third lens component L3, both surfaces of each of the lens elements.

The thirteenth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having two negative meniscus lens elements concave to the image side and a positive meniscus lens element convex to the object side; an aperture A; a third lens component L3 having a positive bi-convex lens element and a negative meniscus lens element concave to the image side; and a fourth lens component L4 having a negative meniscus lens element concave to the image side.

In the thirteen embodiment, the following surfaces are aspherical: in the second lens component L2, an object side surface of each of the two negative meniscus lens elements concave to the image side and both surfaces of the positive meniscus lens element convex to the object side; in the third lens component L3, both surfaces of the positive bi-convex lens element and an object side surface of the negative meniscus lens element concave to the image side; and in the fourth lens component L4, an object side surface of the negative meniscus lens element concave to the image side.

The fourteenth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having a negative meniscus lens element concave to the image side, a negative bi-concave lens element and a positive meniscus lens element convex to the object side; an aperture A; a third lens component L3 having a positive bi-convex lens element; and a fourth lens component L4 having a negative meniscus lens element concave to the image side.

In the fourteenth embodiment, the following surfaces are aspherical: in the second lens component L2, an object side surface of the negative meniscus lens element concave to the image side, both surfaces of the negative bi-concave lens element and both surfaces of the positive meniscus lens element convex to the object side; in the third lens component L3, both surfaces of the positive bi-convex lens element; and in the fourth lens component L4, an object side surface of the negative meniscus lens element concave to the image side.

The fifteenth embodiment of the present invention comprises from the object side: a first lens component L1 having a negative meniscus lens element concave to the image side and a positive bi-convex lens element; a second lens component L2 having a negative meniscus lens element concave to the image side and a positive meniscus lens element convex to the object side; an aperture A; and a third lens component L3 having a positive bi-convex lens element and a negative bi-concave lens element.

In the fifteenth embodiment, the following surfaces are aspherical: in the first lens component L1, an image side surface of the negative meniscus lens element concave to the image side and both surfaces of the positive bi-convex lens element; in the second lens component L2, an object side surface of the negative meniscus lens element concave to the image side and both surfaces of the positive meniscus lens element convex to the object side; and in the third lens component L3, an object side surface of the positive bi-convex lens element and both surfaces of the negative bi-concave lens element.

The sixteenth embodiment of the present invention comprises from the object side: a first lens component L1 having a negative meniscus lens element concave to the image side and a positive bi-convex lens element; a second lens component L2 having a negative meniscus lens element concave to the image side and a positive bi-convex lens element; an aperture A; and a third lens component L3 having a positive bi-convex lens element and a negative bi-concave lens element.

In the sixteenth embodiment, the following surfaces are aspherical: in the first lens component L1, an image side surface of the negative meniscus lens element concave to the image side and both surfaces of the positive bi-convex lens element; in the second lens component L2, an object side surface of the negative meniscus lens element concave to the image side and both surfaces of the positive bi-convex lens element; and in the third lens component L3, an object side surface of the positive bi-convex lens element and both surfaces of the negative bi-concave lens element.

The seventeenth embodiment of the present invention comprises from the object side: a first lens component L1 having a negative meniscus lens element concave to the image side and a positive meniscus lens element convex to the object side; a second lens component L2 having a negative meniscus lens element concave to the image side and a positive meniscus lens element convex to the object side; an aperture A; and a third lens component L3 having a doublet lens element consisting of a positive bi-convex lens element and a negative meniscus lens element concave to the object side, and a negative meniscus lens element concave to the object side.

In the seventeenth embodiment, the following surfaces are aspherical: in the first lens component L1, an image side surface of the negative meniscus lens element concave to the image side and both surfaces of the positive meniscus lens element convex to the object side; in the second lens component L2, an object side surface of the negative meniscus lens element concave to the image side and both surfaces of the positive meniscus lens element convex to the object side; and in the third lens component L3, an object side surface of the positive bi-convex lens element and both surfaces of the image side negative meniscus lens element concave to the object side.

The eighteenth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having two negative meniscus lens elements concave to the image side and a positive meniscus lens element convex to the object side; an aperture A; and a third lens component L3 having a doublet lens element consisting of a positive bi-convex lens element and a negative meniscus lens element concave to the object side, and a negative meniscus lens element concave to the image side.

In the eighteenth embodiment, the following surfaces are aspherical: in the first lens component L1, an image side surface of the positive meniscus lens element convex to the object side; in the second lens component L2, an object side surface of the object side negative meniscus lens element concave to the image side, both surfaces of the negative meniscus lens element concave to the image side, and both surfaces of the positive meniscus lens element convex to the object side; and in the third lens component L3, an object side surface of the positive bi-concave lens element, an image side surface of the negative meniscus lens element concave to the object side and an object side surface of the negative meniscus lens element concave to the image side.

The nineteenth embodiment of the present invention comprises from the object side: a first lens component L1 having a negative meniscus lens element concave to the image side and a positive meniscus lens element convex to the object side; a second lens component L2 having a negative meniscus lens element concave to the image side and a positive meniscus lens element convex to the object side; an aperture A; and a third lens component L3 having a doublet lens element consisting of a positive bi-convex lens element and a negative meniscus lens element concave to the object side, and a negative meniscus lens element concave to the object side.

In the nineteenth embodiment, the following surfaces are aspherical: in the first lens component L1, an image side surface of the negative meniscus lens element concave to the image side and both surfaces of the positive meniscus lens element convex to the object side; in the second lens component L2, an object side surface of the negative meniscus lens element concave to the image side and both surfaces of the positive meniscus lens element convex to the object side; and in the third lens component L3, an object side surface of the positive bi-convex lens element and both surfaces of the negative meniscus lens element concave to the object side.

The twentieth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having two negative meniscus lens elements concave to the image side and a positive meniscus lens element convex to the object side; an aperture A; a third lens component L3 having a positive bi-convex lens element and a negative meniscus lens element concave to the object side; and a fourth lens component L4 having a positive bi-convex lens element and a negative meniscus lens element concave to the image side.

In the twentieth embodiment, the following surfaces are aspherical: in the first lens component L1, an image side surface of the positive meniscus lens element convex to the object side; in the second lens component L2, an object side surface of the object side negative meniscus lens element concave to the image side, both surfaces of the image side negative meniscus lens element concave to the image side and both surfaces of the positive meniscus lens element convex to the object side; in the third lens component L3, an object side surface of the positive bi-convex lens element and an image side surface of the negative meniscus lens element concave to the object side; and in the fourth lens component L4, an object side surface of the positive bi-convex lens element.

The twenty-first embodiment of the present invention comprises from the object side: a first lens component L1 having a negative meniscus lens element concave to the image side and a positive meniscus lens element convex to the object side; a second lens component L2 having a negative meniscus lens element concave to the image side and a positive meniscus lens element convex to the object side; an aperture A; and a third lens component L3 having a positive bi-convex lens element, a negative meniscus lens element concave to the object side and a negative meniscus lens element concave to the object side.

In the twenty-first embodiment, the following surfaces are aspherical: in the first lens component L1, an image side surface of the negative meniscus lens element concave to the image side and both surfaces of the positive meniscus lens element convex to the object side; in the second lens component L2, an object side surface of the negative meniscus lens element concave to the image side and both surfaces of the positive meniscus lens element convex to the object side; and in the third lens component L3, an object side surface of the positive bi-convex lens element and both surfaces of the negative meniscus lens element concave to the object side.

The twenty-second embodiment of the present invention comprises from the object side: a first lens component L1 having a negative meniscus lens element concave to the image side and a positive meniscus lens element convex to the object side; a second lens component L2 having a negative bi-concave lens element and a positive meniscus lens element convex to the object side; an aperture A; and a third lens component L3 having a positive bi-convex lens element and a negative meniscus lens element concave to the image side.

In the twenty-second embodiment, the following surfaces are aspherical: in the first lens component L1, an image side surface of the negative meniscus lens element concave to the image side and both surfaces of the positive meniscus lens element convex to the object side; in the second lens component L2, an object side surface of the negative bi-concave lens element and both surfaces of the positive meniscus lens element convex to the object side; and in the third lens component L3, both surfaces of each of the lens elements.

The twenty-second embodiment employs the focusing method of the fifteenth implementation. That is, in a focusing operation from infinite object distance side to a nearer object distance side, the second lens component L2 shifts toward the object side (shown by an arrow mF2 in FIG. 22).

The twenty-third embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having two negative meniscus lens elements concave to the image side and a positive meniscus lens element convex to the object side; an aperture A; and a third lens component L3 having a positive bi-convex lens element and a negative meniscus lens element concave to the image side.

In the twenty-third embodiment, the following surfaces are aspherical: in the second lens component L2, an object side surface of the object side negative meniscus lens element concave to the image side, both surfaces of the negative meniscus lens element concave to the image side and both surfaces of the positive meniscus lens element convex to the object side; and in the third lens component L3, both surfaces of the positive bi-convex lens element and an object side surface of the negative meniscus lens element concave to the image side.

The twenty-third embodiment employs the focusing method of the sixteenth implementation. That is, in a focusing operation from infinite object distance side to a nearer object distance side, the third lens component L3 which is a succeeding lens component shifts toward the image side (shown by an arrow mF3 in FIG. 23).

The twenty-fourth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having two negative meniscus lens elements concave to the image side and a positive meniscus lens element convex to the object side; an aperture A; a third lens component L3 having a positive bi-convex lens element and a negative meniscus lens element concave to the image side; and a fourth lens component L4 having a negative meniscus lens element concave to the image side.

In the twenty-fourth embodiment, the following surfaces are aspherical: in the second lens component L2, an object side surface of the object side negative meniscus lens element concave to the image side, an object side surface of the image side negative meniscus lens element concave to the image side and both surfaces of the positive meniscus lens element convex to the object side; in the third lens component L3, both surfaces of the positive bi-convex lens element and an object side surface of the negative meniscus lens element concave to the images side; and in the fourth lens component L4, an object side surface of the negative meniscus lens element concave to the image side.

The twenty-fourth embodiment employs the focusing method of the fourteenth implementation. That is, in a focusing operation from infinite object distance side to a nearer object distance side, the first and second lens components L1 and L2 shift toward the object side in a linked body (shown by an arrow mF12 in FIG. 24).

The twenty-fifth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having a negative meniscus lens element concave to the image side, a negative bi-concave lens element and a positive bi-convex lens element; an aperture A; a third lens component L3 having a positive bi-convex lens element; and a fourth lens component L4 having a negative meniscus lens element concave to the image side.

In the twenty-fifth embodiment, the following surfaces are aspherical: in the second lens component L2, an object side surface of the negative meniscus lens element concave to the image side, both surfaces of the negative bi-concave lens element and both surfaces of the positive bi-convex lens element; in the third lens component L3, both surfaces of the positive bi-convex lens element; and in the fourth lens component L4, an object side surface of the negative meniscus lens element concave to the image side.

The twenty-fifth embodiment employs the focusing method of the sixteenth implementation. That is, in a focusing operation from infinite object distance side to a nearer object distance side, the third and fourth lens components L3 and L4 which are succeeding lens components respectively shift toward the image side (shown by arrows mF3 and mF4 in FIG. 25). By employing a floating as described above, aberration correction is effectively made.

The twenty-sixth embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having two negative meniscus lens elements concave to the image side and a positive meniscus lens element convex to the object side; an aperture A; and a third lens component L3 having a doublet lens element consisting of a positive bi-convex lens element and a negative meniscus lens element concave to the object side, and a negative meniscus lens element concave to the image side.

In the twenty-sixth embodiment, the following surfaces are aspherical: in the first lens component L1, an image side surface of the positive meniscus lens element convex to the object side; in the second lens component L2, an object side surface of the object side negative meniscus lens element concave to the image side, both surfaces of the image side negative meniscus lens element concave to the image side and both surfaces of the positive meniscus lens element convex to the object side; and in the third lens component L3, an object side surface of the positive bi-convex lens element, an image side surface of the negative meniscus lens element concave to the object side and an object side surface of the negative meniscus lens element concave to the image side.

The twenty-sixth embodiment employs the focusing method of the fourteenth implementation. That is, in a focusing operation from infinite object distance side to a nearer object distance side, the first and second lens components L1 and L2 respectively shift toward the object side, (shown by arrows mF1 and mF2 in FIG. 26). By employing a floating as described above, aberration correction is effectively made.

The twenty-seventh embodiment of the present invention comprises from the object side: a first lens component L1 having a doublet lens element consisting of a negative meniscus lens element concave to the image side and a positive meniscus lens element convex to the object side, and a positive meniscus lens element convex to the object side; a second lens component L2 having two negative meniscus lens elements concave to the image side and a positive meniscus lens element convex to the object side; an aperture A; a third lens component L3 having a positive bi-convex lens element and a negative meniscus lens element concave to the object side; and a fourth lens component L4 having a positive bi-convex lens element and a negative meniscus lens element concave to the image side.

In the twenty-seventh embodiment, the following surfaces are aspherical: in the first lens component L1, an image side surface of the positive meniscus lens element convex to the object side; in the second lens component L2, an object side surface of the object side negative meniscus lens element concave to the image side, both surfaces of the image side negative meniscus lens element concave to the image side and both surfaces of the positive meniscus lens element convex to the object side; in the third lens component L3, an object side surface of the positive bi-convex lens element and an image side surface of the negative meniscus lens element concave to the object side; and in the fourth lens component L4, an object side surface of the positive bi-convex lens element.

The twenty-seventh embodiment employs the focusing method of the fifteenth implementation. That is, in a focusing operation from infinite object distance side to a nearer object distance side, the second lens component L2 shifts toward the object side (shown by an arrow mF2 in FIG. 27).

Table 28 shows values of $\phi_1/\phi_w$ of the condition (1) and those of $\phi_3/\phi_w$ of the condition (2) for the first to fourth embodiments.

Table 29 shows values of $(\phi_w \cdot \phi_T)^{\frac{1}{2}}/(\beta \cdot \phi_1)$ of the condition (12) and those of $(\phi_w \cdot \phi_T)^{\frac{1}{2}}/(\beta \cdot \phi_3)$ of the condition (13) for the first to fourth embodiments.

In Tables 30 to 33, I, II and III respectively represent values of $\phi_1 \cdot (N'-N) \cdot d/dy \cdot \{X(y)-X_o(y)\}$ of the conditions (3) to (5), those of $\phi_2 \cdot (N'-N) \cdot d/dy \cdot \{X(y)-X_o(y)\}$ of the conditions (6) to (8) and those of $\phi_3 \cdot (N'-N) \cdot d/dy \cdot \{X(y)-X_o(y)\}$ of the condition (9) to (11) for the first to fourth embodiments. The value of y is as described above. The aspherical surfaces are counted from the object side excluding an aperture.

Table 34 shows values of fW/f12, W of the condition (14), those of $B_{max}/fW$ of the condition (15), those of $f1/(fW \cdot fT)^{\frac{1}{2}}$ of the condition (16), those of $|f2|/(fW \cdot fT)^{\frac{1}{2}}$ of the condition (17), those of $|fS|/(fW \cdot fT)^{\frac{1}{2}}$ of the condition (18) and t/Σd of the condition (19) for the fifth to twenty-first embodiments.

Table 35 shows values of |f12, W|/fW of the condition (20), those of $|\beta 2, W|$ of the condition (21) and those of $|\beta S, W|$ of the condition (22) for the twenty-second to twenty-seventh embodiments.

Table 36 shows a movement amount at a minimum object distance and at the shortest focal length condition, and a movement amount (m) of a focusing lens component at the longest focal length condition for the twenty-second to twenty-seventh embodiments. A ratio of a movement amount of the third lens component L3 to that of the fourth lens component L4 of the twenty-fifth embodiment and a ratio of a movement amount of the first lens component L1 to that of the second lens component L2 of the twenty-sixth embodiment are 1:1.1.

TABLE 1

Embodiment 1
f = 36.0~60.6~102.0    $F_{NO}$ = 4.6~5.2~5.65

| | Radius of Curvature | | Axial Distance | | Refractive Index | | Abbe Number |
|---|---|---|---|---|---|---|---|
| $r_1$ | 1065.382 | | | | | | |
| | | $d_1$ | 2.500 | | $N_1$ 1.76200 | $v_1$ | 40.36 |
| $r_2^*$ | 46.461 | | | | | | |
| | | $d_2$ | 2.200 | | | | |
| $r_3$ | 36.078 | | | | | | |
| | | $d_3$ | 6.300 | | $N_2$ 1.65830 | $v_2$ | 58.52 |
| $r_4$ | −69.949 | | | | | | |
| | | $d_4$ | 1.500~11.191~23.087 | | | | |
| $r_5^*$ | −42.412 | | | | | | |
| | | $d_5$ | 1.500 | | $N_3$ 1.75450 | $v_3$ | 51.57 |
| $r_6$ | 18.355 | | | | | | |
| | | $d_6$ | 4.700 | | | | |
| $r_7^*$ | 50.487 | | | | | | |
| | | $d_7$ | 4.000 | | $N_4$ 1.75520 | $v_4$ | 27.51 |
| $r_8^*$ | −762.230 | | | | | | |
| | | $d_8$ | 23.746~11.644~1.500 | | | | |
| $r_9$ | ∞ (Aperture) | | | | | | |
| | | $d_9$ | 2.500 | | | | |
| $r_{10}^*$ | 15.990 | | | | | | |
| | | $d_{10}$ | 6.500 | | $N_5$ 1.61800 | $v_5$ | 63.39 |
| $r_{11}$ | −72.840 | | | | | | |
| | | $d_{11}$ | 5.450 | | | | |
| $r_{12}^*$ | −37.494 | | | | | | |
| | | $d_{12}$ | 4.700 | | $N_6$ 1.84666 | $v_6$ | 23.82 |
| $r_{13}^*$ | 219.147 | | | | | | |

TABLE 1-continued

Embodiment 1
$f = 36.0 \sim 60.6 \sim 102.0$   $F_{NO} = 4.6 \sim 5.2 \sim 5.65$ Aspherical coefficient $r_2:\epsilon = 0.10000 \times 10$
$A_4 = 0.33544 \times 10^{-5}$
$A_6 = 0.78484 \times 10^{-9}$
$A_8 = 0.53597 \times 10^{-11}$
$r_5:\epsilon = 0.10000 \times 10$
$A_4 = 0.50819 \times 10^{-4}$
$A_6 = -0.38338 \times 10^{-6}$
$A_8 = 0.25316 \times 10^{-8}$
$A_{10} = -0.10100 \times 10^{-10}$
$A_{12} = 0.25200 \times 10^{-13}$
$r_7:\epsilon = 0.10000 \times 10$
$A_4 = -0.83211 \times 10^{-4}$
$A_6 = 0.12892 \times 10^{-6}$
$A_8 = -0.13908 \times 10^{-8}$
$A_{10} = -0.23400 \times 10^{-10}$
$A_{12} = 0.49500 \times 10^{-13}$
$r_8:\epsilon = 0.10000 \times 10$
$A_4 = -0.66437 \times 10^{-4}$
$A_6 = 0.54445 \times 10^{-7}$
$A_8 = -0.22886 \times 10^{-8}$
$A_{10} = -0.40326 \times 10^{-12}$
$A_{12} = 0.13579 \times 10^{-13}$
$r_{10}:\epsilon = 0.10000 \times 10$
$A_4 = -0.15813 \times 10^{-4}$
$A_6 = 0.32660 \times 10^{-7}$
$A_8 = -0.16036 \times 10^{-8}$
$A_{10} = 0.10807 \times 10^{-10}$
$A_{12} = -0.29497 \times 10^{-13}$
$r_{12}:\epsilon = 0.10000 \times 10$
$A_4 = 0.63377 \times 10^{-4}$
$A_6 = -0.53618 \times 10^{-7}$
$A_8 = -0.10424 \times 10^{-8}$
$r_{13}:\epsilon = 0.10000 \times 10$
$A_4 = 0.11598 \times 10^{-3}$
$A_6 = 0.27162 \times 10^{-6}$
$A_8 = 0.12312 \times 10^{-9}$

TABLE 2

Embodiment 2
$f = 36.0 \sim 60.6 \sim 102.0$   $F_{NO} = 4.6 \sim 5.2 \sim 5.65$

| | Radius of Curvature | | Axial Distance | | Refractive Index | | Abbe Number |
|---|---|---|---|---|---|---|---|
| $r_1$ | 123.882 | | | | | | |
| | | $d_1$ | 1.900 | $N_1$ | 1.76200 | $\nu_1$ | 40.36 |
| $r_2^*$ | 28.691 | | | | | | |
| | | $d_2$ | 2.200 | | | | |
| $r_3^*$ | 25.391 | | | | | | |
| | | $d_3$ | 6.300 | $N_2$ | 1.65830 | $\nu_2$ | 58.52 |
| $r_4^*$ | −97.697 | | | | | | |
| | | $d_4$ | 0.950~13.217~24.172 | | | | |
| $r_5^*$ | −301.618 | | | | | | |
| | | $d_5$ | 1.500 | $N_3$ | 1.75450 | $\nu_3$ | 51.57 |
| $r_6$ | 13.366 | | | | | | |
| | | $d_6$ | 4.700 | | | | |
| $r_7^*$ | 56.455 | | | | | | |
| | | $d_7$ | 4.000 | $N_4$ | 1.75520 | $\nu_4$ | 27.51 |
| $r_8^*$ | 639.492 | | | | | | |
| | | $d_8$ | 19.654~10.438~1.500 | | | | |
| $r_9$ | ∞ (Aperture) | | | | | | |
| | | $d_9$ | 2.000 | | | | |
| $r_{10}^*$ | 17.150 | | | | | | |
| | | $d_{10}$ | 6.500 | $N_5$ | 1.61800 | $\nu_5$ | 63.39 |
| $r_{11}$ | −42.545 | | | | | | |
| | | $d_{11}$ | 5.450 | | | | |
| $r_{12}^*$ | −46.238 | | | | | | |
| | | $d_{12}$ | 4.700 | $N_6$ | 1.84666 | $\nu_6$ | 23.82 |
| $r_{13}^*$ | 101.481 | | | | | | |

Aspherical coefficient $r_2:\epsilon = 0.10000 \times 10$
$A_4 = 0.64627 \times 10^{-5}$
$A_6 = 0.81225 \times 10^{-8}$
$A_8 = -0.30097 \times 10^{-10}$
$r_3:\epsilon = 0.10000 \times 10$
$A_4 = -0.12816 \times 10^{-5}$
$A_6 = 0.36498 \times 10^{-8}$

TABLE 2-continued

Embodiment 2
$f = 36.0 \sim 60.6 \sim 102.0$   $F_{NO} = 4.6 \sim 5.2 \sim 5.65$ $A_8 = -0.42964 \times 10^{-10}$
$r_4:\epsilon = 0.10000 \times 10$
$A_4 = -0.46096 \times 10^{-5}$
$A_6 = 0.91871 \times 10^{-8}$
$A_8 = -0.12292 \times 10^{-10}$
$r_5:\epsilon = 0.10000 \times 10$
$A_4 = 0.17482 \times 10^{-4}$
$A_6 = -0.30678 \times 10^{-6}$
$A_8 = 0.20730 \times 10^{-8}$
$A_{10} = -0.10100 \times 10^{-10}$
$A_{12} = 0.25200 \times 10^{-13}$
$r_7:\epsilon = 0.10000 \times 10$
$A_4 = -0.70220 \times 10^{-4}$
$A_6 = 0.26665 \times 10^{-6}$
$A_8 = -0.13127 \times 10^{-9}$
$A_{10} = -0.23400 \times 10^{-10}$
$A_{12} = 0.49500 \times 10^{-13}$
$r_8:\epsilon = 0.10000 \times 10$
$A_4 = -0.84297 \times 10^{-4}$
$A_6 = 0.18892 \times 10^{-6}$
$A_8 = -0.21607 \times 10^{-8}$
$A_{10} = -0.30123 \times 10^{-11}$
$A_{12} = -0.35247 \times 10^{-14}$
$r_{10}:\epsilon = 0.10000 \times 10$
$A_4 = -0.18252 \times 10^{-4}$
$A_6 = 0.25899 \times 10^{-7}$
$A_8 = -0.18000 \times 10^{-8}$
$A_{10} = 0.10313 \times 10^{-10}$
$A_{12} = -0.16795 \times 10^{-13}$
$r_{12}:\epsilon = 0.10000 \times 10$
$A_4 = 0.26200 \times 10^{-4}$
$A_6 = 0.98210 \times 10^{-7}$
$A_8 = 0.27905 \times 10^{-9}$
$r_{13}:\epsilon = 0.10000 \times 10$
$A_4 = 0.80376 \times 10^{-4}$
$A_6 = 0.26250 \times 10^{-6}$
$A_8 = 0.14932 \times 10^{-8}$

TABLE 3

Embodiment 3
$f = 36.0 \sim 60.6 \sim 102.0$   $F_{NO} = 4.6 \sim 5.2 \sim 5.65$

| | Radius of Curvature | | Axial Distance | | Refractive Index | | Abbe Number |
|---|---|---|---|---|---|---|---|
| $r_1$ | 2186.987 | | | | | | |
| | | $d_1$ | 1.528 | $N_1$ | 1.78560 | $\nu_1$ | 42.81 |
| $r_2^*$ | 31.123 | | | | | | |
| | | $d_2$ | 0.966 | | | | |
| $r_3^*$ | 24.393 | | | | | | |
| | | $d_3$ | 6.183 | $N_2$ | 1.64250 | $\nu_2$ | 58.04 |
| $r_4^*$ | −59.821 | | | | | | |
| | | $d_4$ | 0.950~12.246~23.835 | | | | |
| $r_5^*$ | −91.063 | | | | | | |
| | | $d_5$ | 1.500 | $N_3$ | 1.77250 | $\nu_3$ | 49.77 |
| $r_6$ | 14.604 | | | | | | |
| | | $d_6$ | 4.700 | | | | |
| $r_7^*$ | 40.291 | | | | | | |
| | | $d_7$ | 2.603 | $N_4$ | 1.70055 | $\nu_4$ | 27.58 |
| $r_8^*$ | 639.492 | | | | | | |
| | | $d_8$ | 21.587~11.033~1.500 | | | | |
| $r_9$ | ∞ (Aperture) | | | | | | |
| | | $d_9$ | 2.000 | | | | |
| $r_{10}^*$ | 16.912 | | | | | | |
| | | $d_{10}$ | 5.233 | $N_5$ | 1.61800 | $\nu_5$ | 63.39 |
| $r_{11}$ | −58.011 | | | | | | |
| | | $d_{11}$ | 5.717 | | | | |
| $r_{12}^*$ | −52.884 | | | | | | |
| | | $d_{12}$ | 6.087 | $N_6$ | 1.84666 | $\nu_6$ | 23.82 |
| $r_{13}^*$ | 105.345 | | | | | | |

Aspherical coefficient $r_2:\epsilon = 0.10000 \times 10$
$A_4 = 0.69005 \times 10^{-5}$
$A_6 = 0.40223 \times 10^{-8}$
$A_8 = -0.83837 \times 10^{-10}$
$r_3:\epsilon = 0.10000 \times 10$
$A_4 = -0.15797 \times 10^{-5}$
$A_6 = -0.76416 \times 10^{-9}$

TABLE 3-continued

Embodiment 3
$f = 36.0 \sim 60.6 \sim 102.0 \quad F_{NO} = 4.6 \sim 5.2 \sim 5.65$

| | |
|---|---|
| $A_8 =$ | $-0.57177 \times 10^{-10}$ |
| $r_4:\epsilon =$ | $0.10000 \times 10$ |
| $A_4 =$ | $-0.22329 \times 10^{-5}$ |
| $A_6 =$ | $0.17361 \times 10^{-7}$ |
| $A_8 =$ | $-0.55543 \times 10^{-11}$ |
| $r_5:\epsilon =$ | $0.10000 \times 10$ |
| $A_4 =$ | $0.16382 \times 10^{-4}$ |
| $A_6 =$ | $-0.31417 \times 10^{-6}$ |
| $A_8 =$ | $0.21757 \times 10^{-8}$ |
| $A_{10} =$ | $-0.10100 \times 10^{-10}$ |
| $A_{12} =$ | $0.25200 \times 10^{-13}$ |
| $r_7:\epsilon =$ | $0.10000 \times 10$ |
| $A_4 =$ | $-0.57908 \times 10^{-4}$ |
| $A_6 =$ | $0.38554 \times 10^{-6}$ |
| $A_8 =$ | $0.10642 \times 10^{-8}$ |
| $A_{10} =$ | $-0.23400 \times 10^{-10}$ |
| $A_{12} =$ | $0.49500 \times 10^{-13}$ |
| $r_8:\epsilon =$ | $0.10000 \times 10$ |
| $A_4 =$ | $-0.73171 \times 10^{-4}$ |
| $A_6 =$ | $0.27232 \times 10^{-6}$ |
| $A_8 =$ | $-0.12718 \times 10^{-8}$ |
| $A_{10} =$ | $-0.60352 \times 10^{-12}$ |
| $A_{12} =$ | $-0.21775 \times 10^{-13}$ |
| $r_{10}:\epsilon =$ | $0.10000 \times 10$ |
| $A_4 =$ | $-0.15354 \times 10^{-4}$ |
| $A_6 =$ | $0.28167 \times 10^{-7}$ |
| $A_8 =$ | $-0.16810 \times 10^{-8}$ |
| $A_{10} =$ | $0.12133 \times 10^{-10}$ |
| $A_{12} =$ | $-0.36572 \times 10^{-13}$ |
| $r_{12}:\epsilon =$ | $0.10000 \times 10$ |
| $A_4 =$ | $0.23886 \times 10^{-4}$ |
| $A_6 =$ | $0.64483 \times 10^{-7}$ |
| $A_8 =$ | $-0.13893 \times 10^{-9}$ |
| $r_{13}:\epsilon =$ | $0.10000 \times 10$ |
| $A_4 =$ | $0.78663 \times 10^{-4}$ |
| $A_6 =$ | $0.20154 \times 10^{-6}$ |
| $A_8 =$ | $0.17815 \times 10^{-8}$ |

TABLE 4

Embodiment 4
$f = 36.0 \sim 60.6 \sim 102.0 \quad F_{NO} = 4.6 \sim 5.2 \sim 5.65$

| | Radius of Curvature | Axial Distance | Refractive Index | Abbe Number |
|---|---|---|---|---|
| $r_1$ | $-117.881$ | | | |
| | | $d_1$ 2.500 | $N_1$ 1.76200 | $\nu_1$ 40.36 |
| $r_2^*$ | 40.885 | | | |
| | | $d_2$ 2.100 | | |
| $r_3$ | 34.061 | | | |
| | | $d_3$ 6.300 | $N_2$ 1.65830 | $\nu_2$ 58.52 |
| $r_4$ | $-43.513$ | | | |
| | | $d_4$ 1.800~13.240~27.783 | | |
| $r_5^*$ | $-39.460$ | | | |
| | | $d_5$ 1.500 | $N_3$ 1.75450 | $\nu_3$ 51.57 |
| $r_6$ | 18.195 | | | |
| | | $d_6$ 4.700 | | |
| $r_7^*$ | 50.487 | | | |
| | | $d_7$ 4.000 | $N_4$ 1.75520 | $\nu_4$ 27.51 |
| $r_8^*$ | $-155.711$ | | | |
| | | $d_8$ 24.914~12.024~1.500 | | |
| $r_9$ | ∞ (Aperture) | | | |
| | | $d_9$ 2.500 | | |
| $r_{10}^*$ | 15.844 | | | |
| | | $d_{10}$ 6.500 | $N_5$ 1.61800 | $\nu_5$ 63.39 |
| $r_{11}$ | $-89.936$ | | | |
| | | $d_{11}$ 5.450 | | |
| $r_{12}^*$ | $-38.140$ | | | |
| | | $d_{12}$ 4.700 | $N_6$ 1.84666 | $\nu_6$ 23.82 |
| $r_{13}^*$ | 156.985 | | | |

| Aspherical coefficient | |
|---|---|
| $r_2:\epsilon =$ | $0.10000 \times 10$ |
| $A_4 =$ | $0.60811 \times 10^{-5}$ |
| $A_6 =$ | $0.53548 \times 10^{-8}$ |
| $A_8 =$ | $0.46696 \times 10^{-11}$ |
| $r_5:\epsilon =$ | $0.10000 \times 10$ |
| $A_4 =$ | $0.55742 \times 10^{-4}$ |
| $A_6 =$ | $-0.39986 \times 10^{-6}$ |

TABLE 4-continued

Embodiment 4
$f = 36.0 \sim 60.6 \sim 102.0 \quad F_{NO} = 4.6 \sim 5.2 \sim 5.65$

| | |
|---|---|
| $A_8 =$ | $0.24204 \times 10^{-8}$ |
| $A_{10} =$ | $-0.10100 \times 10^{-10}$ |
| $A_{12} =$ | $0.25200 \times 10^{-13}$ |
| $r_7:\epsilon =$ | $0.10000 \times 10$ |
| $A_4 =$ | $-0.81496 \times 10^{-4}$ |
| $A_6 =$ | $0.12724 \times 10^{-6}$ |
| $A_8 =$ | $-0.16510 \times 10^{-8}$ |
| $A_{10} =$ | $-0.23400 \times 10^{-10}$ |
| $A_{12} =$ | $0.49500 \times 10^{-13}$ |
| $r_8:\epsilon =$ | $0.10000 \times 10$ |
| $A_4 =$ | $-0.63147 \times 10^{-4}$ |
| $A_6 =$ | $0.38948 \times 10^{-7}$ |
| $A_8 =$ | $-0.24566 \times 10^{-8}$ |
| $A_{10} =$ | $-0.16357 \times 10^{-11}$ |
| $A_{12} =$ | $0.71514 \times 10^{-14}$ |
| $r_{10}:\epsilon =$ | $0.10000 \times 10$ |
| $A_4 =$ | $-0.13730 \times 10^{-4}$ |
| $A_6 =$ | $0.43733 \times 10^{-7}$ |
| $A_8 =$ | $-0.16005 \times 10^{-8}$ |
| $A_{10} =$ | $0.10247 \times 10^{-10}$ |
| $A_{12} =$ | $-0.28777 \times 10^{-13}$ |
| $r_{12}:\epsilon =$ | $0.10000 \times 10$ |
| $A_4 =$ | $0.63464 \times 10^{-4}$ |
| $A_6 =$ | $-0.62425 \times 10^{-7}$ |
| $A_8 =$ | $-0.94682 \times 10^{-9}$ |
| $r_{13}:\epsilon =$ | $0.10000 \times 10$ |
| $A_4 =$ | $0.11940 \times 10^{-3}$ |
| $A_6 =$ | $0.31156 \times 10^{-6}$ |
| $A_8 =$ | $0.28779 \times 10^{-9}$ |

TABLE 5

Embodiment 5
$f = 36.0 \sim 50.0 \sim 78.0 \quad F_{NO} = 4.1 \sim 4.9 \sim 5.8$

| | Radius of Curvature | Axial Distance | Refractive Index | Abbe Number |
|---|---|---|---|---|
| $r_1$ | 32.996 | | | |
| | | $d_1$ 1.700 | $N_1$ 1.84666 | $\nu_1$ 23.83 |
| $r_2^*$ | 26.111 | | | |
| | | $d_2$ 3.000 | | |
| $r_3^*$ | 31.621 | | | |
| | | $d_3$ 8.000 | $N_2$ 1.67100 | $\nu_2$ 51.73 |
| $r_4^*$ | 101.413 | | | |
| | | $d_4$ 2.000~11.568~28.334 | | |
| $r_5^*$ | $-219.890$ | | | |
| | | $d_5$ 2.500 | $N_3$ 1.77250 | $\nu_3$ 49.77 |
| $r_6$ | 11.489 | | | |
| | | $d_6$ 3.914 | | |
| $r_7^*$ | 19.208 | | | |
| | | $d_7$ 3.000 | $N_4$ 1.78472 | $\nu_4$ 25.75 |
| $r_8^*$ | 34.080 | | | |
| | | $d_8$ 5.453~4.308~3.000 | | |
| $r_9$ | ∞ (Aperture) | | | |
| | | $d_9$ 7.000~4.000~1.000 | | |
| $r_{10}^*$ | 17.484 | | | |
| | | $d_{10}$ 3.500 | $N_5$ 1.51680 | $\nu_5$ 64.20 |
| $r_{11}^*$ | $-337.908$ | | | |
| | | $d_{11}$ 1.000 | | |
| $r_{12}^*$ | 105.888 | | | |
| | | $d_{12}$ 3.500 | $N_6$ 1.51680 | $\nu_6$ 64.20 |
| $r_{13}$ | $-20.285$ | | | |
| | | $d_{13}$ 1.000 | | |
| $r_{14}^*$ | 27.001 | | | |
| | | $d_{14}$ 2.868 | $N_7$ 1.84666 | $\nu_6$ 23.83 |
| $r_{15}$ | 14.169 | | | |

| Aspherical coefficient | |
|---|---|
| $r_2:\epsilon =$ | $0.10000 \times 10$ |
| $A_4 =$ | $0.15971 \times 10^{-5}$ |
| $r_3:\epsilon =$ | $0.10000 \times 10$ |
| $A_4 =$ | $0.14024 \times 10^{-5}$ |
| $r_4:\epsilon =$ | $0.10000 \times 10$ |
| $A_4 =$ | $-0.21367 \times 10^{-5}$ |
| $r_5:\epsilon =$ | $0.10000 \times 10$ |
| $A_4 =$ | $0.27943 \times 10^{-5}$ |
| $r_7:\epsilon =$ | $0.10000 \times 10$ |
| $A_4 =$ | $0.78582 \times 10^{-5}$ |
| $A_6 =$ | $0.76711 \times 10^{-7}$ |

TABLE 5-continued

Embodiment 5
$f = 36.0 \sim 50.0 \sim 78.0 \qquad F_{NO} = 4.1 \sim 4.9 \sim 5.8$ $A_8 = -0.51895 \times 10^{-10}$
$A_{10} = -0.84987 \times 10^{-12}$
$A_{12} = -0.93335 \times 10^{-15}$
$r_8 : \epsilon = 0.10000 \times 10$
$A_4 = -0.13219 \times 10^{-4}$
$A_6 = -0.50028 \times 10^{-7}$
$A_8 = -0.32688 \times 10^{-10}$
$A_{10} = -0.74483 \times 10^{-12}$
$A_{12} = -0.18717 \times 10^{-13}$
$r_{10} : \epsilon = 0.10000 \times 10$
$A_4 = -0.33231 \times 10^{-4}$
$A_6 = -0.17431 \times 10^{-6}$
$A_8 = -0.94308 \times 10^{-9}$
$A_{10} = 0.14556 \times 10^{-11}$
$A_{12} = 0.12436 \times 10^{-13}$
$r_{11} : \epsilon = 0.10000 \times 10$
$A_4 = 0.36552 \times 10^{-4}$
$A_6 = 0.77927 \times 10^{-7}$
$A_8 = -0.16128 \times 10^{-8}$
$A_{10} = -0.95807 \times 10^{-12}$
$A_{12} = -0.90646 \times 10^{-14}$
$r_{12} : \epsilon = 0.10000 \times 10$
$A_4 = -0.29043 \times 10^{-5}$
$A_6 = -0.31139 \times 10^{-8}$
$A_8 = -0.36333 \times 10^{-10}$
$A_{10} = -0.45526 \times 10^{-12}$
$A_{12} = 0.11594 \times 10^{-15}$
$r_{14} : \epsilon = 0.10000 \times 10$
$A_4 = -0.87740 \times 10^{-5}$
$A_6 = -0.64534 \times 10^{-8}$
$A_8 = -0.48452 \times 10^{-9}$
$A_{10} = -0.28426 \times 10^{-11}$
$A_{12} = -0.15759 \times 10^{-13}$

TABLE 6

Embodiment 6
$f = 28.8 \sim 50.0 \sim 82.5 \qquad F_{NO} = 4.1 \sim 4.9 \sim 5.8$

| | Radius of Curvature | | Axial Distance | | Refractive Index | | Abbe Number |
|---|---|---|---|---|---|---|---|
| $r_1$ | 52.658 | | | | | | |
| | | $d_1$ | 1.700 | $N_1$ | 1.84666 | $\nu_1$ | 23.83 |
| $r_2$ | 37.780 | | | | | | |
| | | $d_2$ | 2.000 | | | | |
| $r_3$ | 38.283 | | | | | | |
| | | $d_3$ | 15.000 | $N_2$ | 1.67100 | $\nu_2$ | 51.73 |
| $r_4{}^*$ | 242.104 | | | | | | |
| | | $d_4$ | 0.890~18.275~34.261 | | | | |
| $r_5{}^*$ | 23.724 | | | | | | |
| | | $d_5$ | 2.500 | $N_3$ | 1.77250 | $\nu_3$ | 49.77 |
| $r_6$ | 10.575 | | | | | | |
| | | $d_6$ | 7.000 | | | | |
| $r_7{}^*$ | 211.394 | | | | | | |
| | | $d_7$ | 2.000 | $N_4$ | 1.77250 | $\nu_4$ | 49.77 |
| $r_8{}^*$ | 16.698 | | | | | | |
| | | $d_8$ | 1.520 | | | | |
| $r_9{}^*$ | 25.139 | | | | | | |
| | | $d_9$ | 2.000 | $N_5$ | 1.80518 | $\nu_5$ | 25.43 |
| $r_{10}{}^*$ | 81.018 | | | | | | |
| | | $d_{10}$ | 7.720~4.513~3.001 | | | | |
| $r_{11}$ | ∞ (Aperture) | | | | | | |
| | | $d_{11}$ | 6.000~3.500~1.000 | | | | |
| $r_{12}{}^*$ | 13.819 | | | | | | |
| | | $d_{12}$ | 8.000 | $N_6$ | 1.49310 | $\nu_6$ | 83.58 |
| $r_{13}{}^*$ | −19.659 | | | | | | |
| | | $d_{13}$ | 1.000 | | | | |
| $r_{14}{}^*$ | 39.526 | | | | | | |
| | | $d_{14}$ | 2.868 | $N_7$ | 1.84666 | $\nu_6$ | 23.83 |
| $r_{15}$ | 20.319 | | | | | | |

Aspherical coefficient

$r_4 : \epsilon = 0.10000 \times 10$
$A_4 = 0.18278 \times 10^{-7}$
$r_5 : \epsilon = 0.10000 \times 10$
$A_4 = -0.22818 \times 10^{-4}$
$r_7 : \epsilon = 0.10000 \times 10$
$A_4 = -0.68635 \times 10^{-5}$
$A_6 = -0.46873 \times 10^{-6}$

TABLE 6-continued

Embodiment 6
$f = 28.8 \sim 50.0 \sim 82.5 \qquad F_{NO} = 4.1 \sim 4.9 \sim 5.8$ $A_8 = -0.99452 \times 10^{-9}$
$A_{10} = 0.12230 \times 10^{-10}$
$A_{12} = 0.14053 \times 10^{-12}$
$r_8 : \epsilon = 0.10000 \times 10$
$A_4 = 0.11462 \times 10^{-5}$
$A_6 = 0.10111 \times 10^{-7}$
$A_8 = 0.39871 \times 10^{-10}$
$A_{10} = 0.11321 \times 10^{-12}$
$A_{12} = 0.28142 \times 10^{-15}$
$r_9 : \epsilon = 0.10000 \times 10$
$A_4 = 0.33050 \times 10^{-4}$
$A_6 = 0.96637 \times 10^{-7}$
$A_8 = 0.71135 \times 10^{-9}$
$A_{10} = 0.78628 \times 10^{-12}$
$A_{12} = -0.41659 \times 10^{-13}$
$r_{10} : \epsilon = 0.10000 \times 10$
$A_4 = -0.27761 \times 10^{-4}$
$A_6 = -0.20910 \times 10^{-6}$
$A_8 = -0.18536 \times 10^{-8}$
$A_{10} = -0.44169 \times 10^{-11}$
$A_{12} = 0.35600 \times 10^{-13}$
$r_{12} : \epsilon = 0.10000 \times 10$
$A_4 = -0.31429 \times 10^{-4}$
$A_6 = -0.18195 \times 10^{-6}$
$A_8 = -0.86470 \times 10^{-9}$
$A_{10} = -0.95502 \times 10^{-11}$
$A_{12} = -0.69719 \times 10^{-13}$
$r_{13} : \epsilon = 0.10000 \times 10$
$A_4 = 0.32433 \times 10^{-4}$
$A_6 = 0.53725 \times 10^{-7}$
$A_8 = -0.18230 \times 10^{-8}$
$A_{10} = -0.34886 \times 10^{-10}$
$A_{12} = -0.29725 \times 10^{-12}$
$r_{14} : \epsilon = 0.10000 \times 10$
$A_4 = -0.46766 \times 10^{-4}$
$A_6 = -0.18834 \times 10^{-6}$
$A_8 = -0.48992 \times 10^{-8}$
$A_{10} = -0.13229 \times 10^{-10}$
$A_{12} = 0.78330 \times 10^{-13}$

TABLE 7

Embodiment 7
$f = 28.8 \sim 50.0 \sim 82.5 \qquad F_{NO} = 4.1 \sim 4.9 \sim 5.8$

| | Radius of Curvature | | Axial Distance | | Refractive Index | | Abbe Number |
|---|---|---|---|---|---|---|---|
| $r_1$ | 57.778 | | | | | | |
| | | $d_1$ | 1.700 | $N_1$ | 1.84666 | $\nu_1$ | 23.83 |
| $r_2$ | 40.440 | | | | | | |
| | | $d_2$ | 2.000 | | | | |
| $r_3$ | 40.791 | | | | | | |
| | | $d_3$ | 15.000 | $N_2$ | 1.67100 | $\nu_2$ | 51.73 |
| $r_4{}^*$ | 426.085 | | | | | | |
| | | $d_4$ | 0.890~19.038~35.435 | | | | |
| $r_5{}^*$ | 25.827 | | | | | | |
| | | $d_5$ | 2.500 | $N_3$ | 1.77250 | $\nu_3$ | 49.77 |
| $r_6$ | 10.215 | | | | | | |
| | | $d_6$ | 7.000 | | | | |
| $r_7{}^*$ | −349.705 | | | | | | |
| | | $d_7$ | 2.000 | $N_4$ | 1.77250 | $\nu_4$ | 49.77 |
| $r_8{}^*$ | 24.658 | | | | | | |
| | | $d_8$ | 1.600 | | | | |
| $r_9{}^*$ | 64.525 | | | | | | |
| | | $d_9$ | 2.000 | $N_5$ | 1.80518 | $\nu_5$ | 25.43 |
| $r_{10}{}^*$ | −132.307 | | | | | | |
| | | $d_{10}$ | 8.019~4.655~3.000 | | | | |
| $r_{11}$ | ∞ (Aperture) | | | | | | |
| | | $d_{11}$ | 6.000~3.500~1.000 | | | | |
| $r_{12}{}^*$ | 13.586 | | | | | | |
| | | $d_{12}$ | 3.500 | $N_6$ | 1.51680 | $\nu_6$ | 64.20 |
| $r_{13}{}^*$ | 110.242 | | | | | | |
| | | $d_{13}$ | 1.000 | | | | |
| $r_{14}{}^*$ | 131.240 | | | | | | |
| | | $d_{14}$ | 3.500 | $N_7$ | 1.51680 | $\nu_7$ | 64.20 |
| $r_{15}$ | −20.738 | | | | | | |
| | | $d_{15}$ | 1.000 | | | | |
| $r_{16}{}^*$ | 41.365 | | | | | | |
| | | $d_{16}$ | 2.868 | $N_8$ | 1.84666 | $\nu_8$ | 23.83 |

TABLE 7-continued

Embodiment 7
$f = 28.8 \sim 50.0 \sim 82.5$  $F_{NO} = 4.1 \sim 4.9 \sim 5.8$

| | |
|---|---|
| $r_{17}$ | 18.627 |

Aspherical coefficient $r_4:\epsilon = 0.10000 \times 10$
$A_4 = 0.57239 \times 10^{-7}$
$r_5:\epsilon = 0.10000 \times 10$
$A_4 = -0.24420 \times 10^{-4}$
$r_7:\epsilon = 0.10000 \times 10$
$A_4 = -0.67230 \times 10^{-5}$
$A_6 = -0.47091 \times 10^{-6}$
$A_8 = -0.10775 \times 10^{-8}$
$A_{10} = 0.11603 \times 10^{-10}$
$r_8:\epsilon = 0.10000 \times 10$
$A_4 = 0.10459 \times 10^{-5}$
$A_6 = 0.14173 \times 10^{-7}$
$A_8 = 0.11350 \times 10^{-9}$
$A_{10} = 0.57606 \times 10^{-12}$
$r_9:\epsilon = 0.10000 \times 10$
$A_4 = 0.33383 \times 10^{-4}$
$A_6 = 0.83366 \times 10^{-7}$
$A_8 = 0.56963 \times 10^{-9}$
$A_{10} = 0.18951 \times 10^{-13}$
$r_{10}:\epsilon = 0.10000 \times 10$
$A_4 = -0.29986 \times 10^{-4}$
$A_6 = -0.19254 \times 10^{-6}$
$A_8 = -0.16833 \times 10^{-8}$
$A_{10} = -0.34740 \times 10^{-10}$
$r_{12}:\epsilon = 0.10000 \times 10$
$A_4 = -0.21525 \times 10^{-4}$
$A_6 = -0.16523 \times 10^{-6}$
$A_8 = -0.12504 \times 10^{-8}$
$A_{10} = 0.24548 \times 10^{-12}$
$r_{13}:\epsilon = 0.10000 \times 10$
$A_4 = 0.36943 \times 10^{-4}$
$A_6 = 0.86997 \times 10^{-7}$
$A_8 = -0.14067 \times 10^{-8}$
$A_{10} = -0.33103 \times 10^{-12}$
$r_{14}:\epsilon = 0.10000 \times 10$
$A_4 = -0.27071 \times 10^{-5}$
$A_6 = 0.36859 \times 10^{-7}$
$A_8 = 0.24030 \times 10^{-9}$
$A_{10} = 0.55078 \times 10^{-12}$
$r_{16}:\epsilon = 0.10000 \times 10$
$A_4 = -0.54653 \times 10^{-4}$
$A_6 = -0.14525 \times 10^{-6}$
$A_8 = -0.44242 \times 10^{-8}$
$A_{10} = 0.55565 \times 10^{-12}$

TABLE 8

Embodiment 8
$f = 36.0 \sim 50.0 \sim 78.0$  $F_{NO} = 4.1 \sim 4.9 \sim 5.8$

| Radius of Curvature | | Axial Distance | Refractive Index | Abbe Number |
|---|---|---|---|---|
| $r_1$ | 99.977 | | | |
| | | $d_1$ 1.700 | $N_1$ 1.84666 | $v_1$ 23.83 |
| $r_2$ | 51.000 | | | |
| | | $d_2$ 7.000 | $N_2$ 1.67100 | $v_2$ 51.73 |
| $r_3$ | 3209.345 | | | |
| | | $d_3$ 0.100 | | |
| $r_4$ | 31.351 | | | |
| | | $d_4$ 4.000 | $N_3$ 1.77250 | $v_3$ 49.77 |
| $r_5$ | 35.400 | | | |
| | | $d_5$ 3.000~9.890~26.032 | | |
| $r_6^*$ | −2379.422 | | | |
| | | $d_6$ 2.500 | $N_4$ 1.77250 | $v_4$ 49.77 |
| $r_7$ | 10.357 | | | |
| | | $d_7$ 3.992 | | |
| $r_8^*$ | 18.202 | | | |
| | | $d_8$ 3.000 | $N_5$ 1.78472 | $v_5$ 25.75 |
| $r_9^*$ | 33.249 | | | |
| | | $d_9$ 5.654~4.186~3.000 | | |
| $r_{10}^*$ | ∞ (Aperture) | | | |
| | | $d_{10}$ 7.000~4.000~1.000 | | |
| $r_{11}^*$ | 14.730 | | | |
| | | $d_{11}$ 8.000 | $N_6$ 1.51680 | $v_6$ 64.20 |
| $r_{12}^*$ | −18.742 | | | |
| | | $d_{12}$ 1.000 | | |

TABLE 8-continued

Embodiment 8
$f = 36.0 \sim 50.0 \sim 78.0$  $F_{NO} = 4.1 \sim 4.9 \sim 5.8$

| | | | | |
|---|---|---|---|---|
| $r_{13}^*$ | 68.896 | | | |
| | | $d_{13}$ 2.868 | $N_7$ 1.84666 | $v_7$ 23.83 |
| $r_{14}^*$ | 22.178 | | | |

Aspherical coefficient $r_6:\epsilon = 0.10000 \times 10$
$A_4 = 0.27937 \times 10^{-5}$
$r_8:\epsilon = 0.10000 \times 10$
$A_4 = 0.13547 \times 10^{-4}$
$A_6 = 0.90872 \times 10^{-7}$
$A_8 = 0.81940 \times 10^{-11}$
$A_{10} = -0.50521 \times 10^{-12}$
$A_{12} = 0.79520 \times 10^{-15}$
$r_9:\epsilon = 0.10000 \times 10$
$A_4 = -0.15157 \times 10^{-4}$
$A_6 = -0.59136 \times 10^{-7}$
$A_8 = -0.10434 \times 10^{-9}$
$A_{10} = -0.11108 \times 10^{-11}$
$A_{12} = -0.19732 \times 10^{-13}$
$r_{12}:\epsilon = 0.10000 \times 10$
$A_4 = -0.27335 \times 10^{-4}$
$A_6 = -0.13721 \times 10^{-6}$
$A_8 = -0.10661 \times 10^{-8}$
$A_{10} = -0.12969 \times 10^{-10}$
$A_{12} = -0.10546 \times 10^{-12}$
$r_{12}:\epsilon = 0.10000 \times 10$
$A_4 = 0.32152 \times 10^{-4}$
$A_6 = 0.66105 \times 10^{-7}$
$A_8 = -0.15678 \times 10^{-8}$
$A_{10} = -0.31317 \times 10^{-10}$
$A_{12} = -0.27964 \times 10^{-12}$
$r_{13}:\epsilon = 0.10000 \times 10$
$A_4 = -0.43836 \times 10^{-4}$
$A_6 = -0.18729 \times 10^{-6}$
$A_8 = -0.50600 \times 10^{-8}$
$A_{10} = -0.14052 \times 10^{-10}$
$A_{12} = 0.76948 \times 10^{-13}$
$r_{14}:\epsilon = 0.10000 \times 10$
$A_4 = 0.74836 \times 10^{-6}$
$A_6 = 0.51282 \times 10^{-8}$
$A_8 = 0.38429 \times 10^{-9}$
$A_{10} = 0.24264 \times 10^{-11}$
$A_{12} = 0.10234 \times 10^{-13}$

TABLE 9

Embodiment 9
$f = 36.0 \sim 50.0 \sim 78.0$  $F_{NO} = 4.1 \sim 4.9 \sim 5.8$

| Radius of Curvature | | Axial Distance | Refractive Index | Abbe Number |
|---|---|---|---|---|
| $r_1$ | 96.615 | | | |
| | | $d_1$ 1.700 | $N_1$ 1.84666 | $v_1$ 23.82 |
| $r_2$ | 51.000 | | | |
| | | $d_2$ 7.000 | $N_2$ 1.67100 | $v_2$ 51.73 |
| $r_3$ | −967.305 | | | |
| | | $d_3$ 0.100 | | |
| $r_4$ | 29.237 | | | |
| | | $d_4$ 4.000 | $N_3$ 1.77250 | $v_3$ 49.77 |
| $r_5$ | 30.653 | | | |
| | | $d_5$ 3.000~9.764~25.784 | | |
| $r_6^*$ | −124.534 | | | |
| | | $d_6$ 2.500 | $N_4$ 1.77250 | $v_4$ 49.77 |
| $r_7$ | 11.234 | | | |
| | | $d_7$ 3.919 | | |
| $r_8^*$ | 19.450 | | | |
| | | $d_8$ 3.000 | $N_5$ 1.78472 | $v_5$ 25.75 |
| $r_9^*$ | 37.962 | | | |
| | | $d_9$ 5.590~4.151~3.000 | | |
| $r_{10}$ | ∞ (Aperture) | | | |
| | | $d_{10}$ 7.000~4.000~1.000 | | |
| $r_{11}^*$ | 14.768 | | | |
| | | $d_{11}$ 3.500 | $N_6$ 1.51680 | $v_6$ 64.20 |
| $r_{12}^*$ | −56.111 | | | |
| | | $d_{12}$ 1.000 | | |
| $r_{13}^*$ | −49.257 | | | |
| | | $d_{13}$ 3.500 | $N_7$ 1.51680 | $v_7$ 64.20 |
| $r_{14}^*$ | −19.546 | | | |
| | | $d_{14}$ 1.000 | | |

TABLE 9-continued

Embodiment 9
$f = 36.0 \sim 50.0 \sim 78.0$ $\quad F_{NO} = 4.1 \sim 4.9 \sim 5.8$

| | | | | | |
|---|---|---|---|---|---|
| $r_{15}^*$ | 40.339 | | | | |
| | | $d_{15}$ | 2.868 | $N_8$ 1.84666 | $v_8$ 23.83 |
| $r_{16}$ | 18.679 | | | | |

Aspherical coefficient

$r_6: \epsilon = 0.10000 \times 10$
$A_4 = 0.61440 \times 10^{-5}$
$r_8: \epsilon = 0.10000 \times 10$
$A_4 = 0.78125 \times 10^{-5}$
$A_6 = 0.87052 \times 10^{-7}$
$A_8 = -0.52325 \times 10^{-10}$
$A_{10} = -0.68731 \times 10^{-12}$
$A_{12} = 0.73651 \times 10^{-15}$
$r_9: \epsilon = 0.10000 \times 10$
$A_4 = -0.12638 \times 10^{-4}$
$A_6 = -0.55086 \times 10^{-7}$
$A_8 = -0.42420 \times 10^{-10}$
$A_{10} = -0.82369 \times 10^{-12}$
$A_{12} = -0.18985 \times 10^{-13}$
$r_{11}: \epsilon = 0.10000 \times 10$
$A_4 = -0.21071 \times 10^{-4}$
$A_6 = -0.12531 \times 10^{-6}$
$A_8 = -0.11741 \times 10^{-8}$
$A_{10} = -0.26426 \times 10^{-11}$
$A_{12} = -0.23986 \times 10^{-13}$
$r_{12}: \epsilon = 0.10000 \times 10$
$A_4 = 0.33198 \times 10^{-4}$
$A_6 = 0.57320 \times 10^{-7}$
$A_8 = -0.14246 \times 10^{-8}$
$A_{10} = 0.21759 \times 10^{-11}$
$A_{12} = 0.18895 \times 10^{-13}$
$r_{13}: \epsilon = 0.10000 \times 10$
$A_4 = 0.16847 \times 10^{-5}$
$A_6 = 0.47239 \times 10^{-7}$
$A_8 = 0.14594 \times 10^{-9}$
$A_{10} = -0.70998 \times 10^{-12}$
$A_{12} = -0.84718 \times 10^{-14}$
$r_{14}: \epsilon = 0.10000 \times 10$
$A_4 = 0.11271 \times 10^{-5}$
$A_6 = -0.28136 \times 10^{-7}$
$A_8 = -0.23782 \times 10^{-9}$
$A_{10} = -0.50993 \times 10^{-13}$
$A_{12} = 0.22578 \times 10^{-14}$
$r_{15}: \epsilon = 0.10000 \times 10$
$A_4 = -0.44157 \times 10^{-4}$
$A_6 = -0.18505 \times 10^{-6}$
$A_8 = -0.47560 \times 10^{-8}$
$A_{10} = 0.56939 \times 10^{-12}$
$A_{12} = 0.18370 \times 10^{-14}$

TABLE 10

Embodiment 10
$f = 28.8 \sim 50.0 \sim 82.5$ $\quad F_{NO} = 4.1 \sim 4.9 \sim 5.8$

| | Radius of Curvature | | Axial Distance | Refractive Index | Abbe Number |
|---|---|---|---|---|---|
| $r_1$ | 75.303 | | | | |
| | | $d_1$ | 1.700 | $N_1$ 1.84666 | $v_1$ 23.82 |
| $r_2$ | 51.000 | | | | |
| | | $d_2$ | 10.000 | $N_2$ 1.67000 | $v_2$ 57.07 |
| $r_3$ | 433.124 | | | | |
| | | $d_3$ | 0.100 | | |
| $r_4$ | 34.647 | | | | |
| | | $d_4$ | 4.000 | $N_3$ 1.77250 | $v_3$ 49.77 |
| $r_5$ | 37.036 | | | | |
| | | $d_5$ | $2.000 \sim 19.033 \sim 34.671$ | | |
| $r_6^*$ | 23.933 | | | | |
| | | $d_6$ | 2.500 | $N_4$ 1.77250 | $v_4$ 49.77 |
| $r_7$ | 10.249 | | | | |
| | | $d_7$ | 7.000 | | |
| $r_8^*$ | −764.965 | | | | |
| | | $d_8$ | 2.000 | $N_5$ 1.77250 | $v_5$ 49.77 |
| $r_9^*$ | 17.142 | | | | |
| | | $d_9$ | 1.571 | | |
| $r_{10}^*$ | 27.933 | | | | |
| | | $d_{10}$ | 2.000 | $N_6$ 1.80518 | $v_6$ 25.43 |
| $r_{11}^*$ | 261.492 | | | | |
| | | $d_{11}$ | $6.646 \sim 3.972 \sim$ | | |

TABLE 10-continued

Embodiment 10
$f = 28.8 \sim 50.0 \sim 82.5$ $\quad F_{NO} = 4.1 \sim 4.9 \sim 5.8$

| | | | | | |
|---|---|---|---|---|---|
| $r_{12}$ | ∞ (Aperture) | | 3.000 | | |
| | | $d_{12}$ | $7.000 \sim 4.000 \sim$ | | |
| $r_{13}^*$ | 13.670 | | 1.000 | | |
| | | $d_{13}$ | 8.000 | $N_7$ 1.49310 | $v_7$ 83.58 |
| $r_{14}^*$ | −19.825 | | | | |
| | | $d_{14}$ | 1.000 | | |
| $r_{15}^*$ | 34.896 | | | | |
| | | $d_{15}$ | 2.868 | $N_8$ 1.84666 | $v_8$ 23.83 |
| $r_{16}$ | 18.585 | | | | |

Aspherical coefficient

$r_6: \epsilon = 0.10000 \times 10$
$A_4 = -0.21123 \times 10^{-4}$
$r_8: \epsilon = 0.10000 \times 10$
$A_4 = -0.74980 \times 10^{-5}$
$A_6 = -0.46684 \times 10^{-6}$
$A_8 = -0.99534 \times 10^{-9}$
$A_{10} = 0.12148 \times 10^{-10}$
$A_{12} = 0.13980 \times 10^{-12}$
$r_9: \epsilon = 0.10000 \times 10$
$A_4 = 0.13222 \times 10^{-5}$
$A_6 = 0.75786 \times 10^{-8}$
$A_8 = 0.45692 \times 10^{-10}$
$A_{10} = 0.19353 \times 10^{-12}$
$A_{12} = 0.78471 \times 10^{-15}$
$r_{10}: \epsilon = 0.10000 \times 10$
$A_4 = 0.32493 \times 10^{-4}$
$A_6 = 0.94900 \times 10^{-7}$
$A_8 = 0.67364 \times 10^{-9}$
$A_{10} = 0.58229 \times 10^{-12}$
$A_{12} = -0.42438 \times 10^{-13}$
$r_{11}: \epsilon = 0.10000 \times 10$
$A_4 = -0.28703 \times 10^{-4}$
$A_6 = -0.20502 \times 10^{-6}$
$A_8 = -0.17964 \times 10^{-8}$
$A_{10} = -0.41216 \times 10^{-11}$
$A_{12} = 0.36848 \times 10^{-13}$
$r_{13}: \epsilon = 0.10000 \times 10$
$A_4 = -0.32731 \times 10^{-4}$
$A_6 = -0.19731 \times 10^{-6}$
$A_8 = -0.95636 \times 10^{-9}$
$A_{10} = -0.99800 \times 10^{-11}$
$A_{12} = -0.71499 \times 10^{-13}$
$r_{14}: \epsilon = 0.10000 \times 10$
$A_4 = 0.32340 \times 10^{-4}$
$A_6 = 0.66706 \times 10^{-7}$
$A_8 = -0.17053 \times 10^{-8}$
$A_{10} = -0.34175 \times 10^{-10}$
$A_{12} = -0.29365 \times 10^{-12}$
$r_{15}: \epsilon = 0.10000 \times 10$
$A_4 = -0.46422 \times 10^{-4}$
$A_6 = -0.19787 \times 10^{-6}$
$A_8 = -0.49944 \times 10^{-8}$
$A_{10} = -0.13816 \times 10^{-10}$
$A_{12} = 0.75508 \times 10^{-13}$

TABLE 11

Embodiment 11
$f = 28.8 \sim 50.0 \sim 82.5$ $\quad F_{NO} = 4.1 \sim 4.9 \sim 5.8$

| | Radius of Curvature | | Axial Distance | Refractive Index | Abbe Number |
|---|---|---|---|---|---|
| $r_1$ | 77.043 | | | | |
| | | $d_1$ | 1.700 | $N_1$ 1.84666 | $v_1$ 23.82 |
| $r_2$ | 51.000 | | | | |
| | | $d_2$ | 8.700 | $N_2$ 1.67000 | $v_2$ 57.07 |
| $r_3$ | 832.827 | | | | |
| | | $d_3$ | 0.100 | | |
| $r_4$ | 35.347 | | | | |
| | | $d_4$ | 4.000 | $N_3$ 1.77250 | $v_3$ 49.77 |
| $r_5$ | 37.098 | | | | |
| | | $d_5$ | $0.890 \sim 18.665 \sim 34.819$ | | |
| $r_6^*$ | 27.459 | | | | |
| | | $d_6$ | 2.500 | $N_4$ 1.77250 | $v_4$ 49.77 |
| $r_7$ | 10.177 | | | | |
| | | $d_7$ | 7.000 | | |
| $r_8^*$ | −122.699 | | | | |
| | | $d_8$ | 2.000 | $N_5$ 1.77250 | $v_5$ 49.77 |

TABLE 11-continued

Embodiment 11
$f = 28.8 \sim 50.0 \sim 82.5 \qquad F_{NO} = 4.1 \sim 4.9 \sim 5.8$

| | | | | | |
|---|---|---|---|---|---|
| $r_9^*$ | 25.879 | | | | |
| | | $d_9$ | 1.607 | | |
| $r_{10}^*$ | 86.483 | | | | |
| | | $d_{10}$ | 2.000 | $N_6$ 1.80518 | $\nu_6$ 25.43 |
| $r_{11}^*$ | −66.698 | | | | |
| | | $d_{11}$ | 6.890~4.092~3.000 | | |
| $r_{12}$ | ∞ (Aperture) | | | | |
| | | $d_{12}$ | 7.000~4.000~1.000 | | |
| $r_{13}^*$ | 13.990 | | | | |
| | | $d_{13}$ | 3.500 | $N_7$ 1.51680 | $\nu_7$ 64.20 |
| $r_{14}^*$ | −260.050 | | | | |
| | | $d_{14}$ | 1.000 | | |
| $r_{15}^*$ | 118.546 | | | | |
| | | $d_{15}$ | 3.500 | $N_8$ 1.51680 | $\nu_8$ 64.20 |
| $r_{16}^*$ | −22.353 | | | | |
| | | $d_{16}$ | 1.000 | | |
| $r_{17}^*$ | 42.106 | | | | |
| | | $d_{17}$ | 2.868 | $N_9$ 1.84666 | $\nu_8$ 23.83 |
| $r_{18}$ | 16.572 | | | | |

Aspherical coefficient

$r_6:\epsilon = 0.10000 \times 10$
$A_4 = -0.23597 \times 10^{-4}$
$r_8:\epsilon = 0.10000 \times 10$
$A_4 = -0.88303 \times 10^{-5}$
$A_6 = -0.46071 \times 10^{-6}$
$A_8 = -0.92640 \times 10^{-9}$
$r_9:\epsilon = 0.10000 \times 10$
$A_4 = 0.22869 \times 10^{-5}$
$A_6 = 0.18932 \times 10^{-8}$
$A_8 = -0.15505 \times 10^{-10}$
$r_{10}:\epsilon = 0.10000 \times 10$
$A_4 = 0.31762 \times 10^{-4}$
$A_6 = 0.94956 \times 10^{-7}$
$A_8 = 0.73385 \times 10^{-9}$
$r_{11}:\epsilon = 0.10000 \times 10$
$A_4 = -0.29549 \times 10^{-4}$
$A_6 = -0.20095 \times 10^{-6}$
$A_8 = -0.18182 \times 10^{-8}$
$r_{13}:\epsilon = 0.10000 \times 10$
$A_4 = -0.21763 \times 10^{-4}$
$A_6 = -0.15108 \times 10^{-6}$
$A_8 = -0.12117 \times 10^{-8}$
$r_{14}:\epsilon = 0.10000 \times 10$
$A_4 = 0.36167 \times 10^{-4}$
$A_6 = 0.76303 \times 10^{-7}$
$A_8 = -0.14218 \times 10^{-8}$
$r_{15}:\epsilon = 0.10000 \times 10$
$A_4 = -0.14608 \times 10^{-5}$
$A_6 = 0.40970 \times 10^{-7}$
$A_8 = 0.21406 \times 10^{-9}$
$r_{16}:\epsilon = 0.10000 \times 10$
$A_4 = 0.59524 \times 10^{-5}$
$A_6 = -0.32820 \times 10^{-7}$
$A_8 = -0.39589 \times 10^{-9}$
$r_{17}:\epsilon = 0.10000 \times 10$
$A_4 = -0.50851 \times 10^{-4}$
$A_6 = -0.16328 \times 10^{-6}$
$A_8 = -0.45463 \times 10^{-8}$

TABLE 12

Embodiment 12
$f = 36.0 \sim 50.0 \sim 78.0 \qquad F_{NO} = 4.1 \sim 4.9 \sim 5.8$

| | Radius of Curvature | | Axial Distance | Refractive Index | Abbe Number |
|---|---|---|---|---|---|
| $r_1$ | 41.484 | | | | |
| | | $d_1$ | 1.700 | $N_1$ 1.84666 | $\nu_1$ 23.83 |
| $r_2^*$ | 31.457 | | | | |
| | | $d_2$ | 3.000 | | |
| $r_3^*$ | 34.612 | | | | |
| | | $d_3$ | 9.000 | $N_2$ 1.67100 | $\nu_2$ 51.73 |
| $r_4^*$ | 142.340 | | | | |
| | | $d_4$ | 4.000~19.873~36.700 | | |
| $r_5^*$ | −1099.892 | | | | |
| | | $d_5$ | 2.500 | $N_3$ 1.77250 | $\nu_3$ 49.77 |
| $r_6$ | 11.077 | | | | |
| | | $d_6$ | 3.939 | | |

TABLE 12-continued

Embodiment 12
$f = 36.0 \sim 50.0 \sim 78.0 \qquad F_{NO} = 4.1 \sim 4.9 \sim 5.8$

| | | | | | |
|---|---|---|---|---|---|
| $r_7^*$ | 17.438 | | | | |
| | | $d_7$ | 3.000 | $N_4$ 1.78472 | $\nu_4$ 25.75 |
| $r_8^*$ | 27.707 | | | | |
| | | $d_8$ | 4.443~4.385~3.000 | | |
| $r_9$ | ∞ (Aperture) | | | | |
| | | $d_9$ | 7.000~4.000~1.000 | | |
| $r_{10}^*$ | 13.622 | | | | |
| | | $d_{10}$ | 8.000 | $N_5$ 1.51680 | $\nu_5$ 64.20 |
| $r_{11}^*$ | −21.377 | | | | |
| | | $d_{11}$ | 1.000 | | |
| $r_{12}^*$ | 38.698 | | | | |
| | | $d_{12}$ | 2.868 | $N_6$ 1.84666 | $\nu_6$ 23.83 |
| $r_{13}$ | 17.961 | | | | |

Aspherical coefficient

$r_2:\epsilon = 0.10000 \times 10$
$A_4 = 0.15802 \times 10^{-5}$
$r_3:\epsilon = 0.10000 \times 10$
$A_4 = 0.16485 \times 10^{-5}$
$r_4:\epsilon = 0.10000 \times 10$
$A_4 = -0.64444 \times 10^{-6}$
$r_5:\epsilon = 0.10000 \times 10$
$A_4 = -0.26967 \times 10^{-6}$
$r_7:\epsilon = 0.10000 \times 10$
$A_4 = 0.10238 \times 10^{-4}$
$A_6 = 0.69817 \times 10^{-7}$
$A_8 = -0.43795 \times 10^{-10}$
$A_{10} = -0.59622 \times 10^{-12}$
$A_{12} = 0.88122 \times 10^{-15}$
$r_8:\epsilon = 0.10000 \times 10$
$A_4 = -0.13214 \times 10^{-4}$
$A_6 = -0.50811 \times 10^{-7}$
$A_8 = -0.75223 \times 10^{-10}$
$A_{10} = -0.10203 \times 10^{-11}$
$A_{12} = -0.19776 \times 10^{-13}$
$r_{10}:\epsilon = 0.10000 \times 10$
$A_4 = -0.31185 \times 10^{-4}$
$A_6 = -0.11489 \times 10^{-6}$
$A_8 = -0.94553 \times 10^{-9}$
$A_{10} = -0.12912 \times 10^{-10}$
$A_{12} = -0.10962 \times 10^{-12}$
$r_{11}:\epsilon = 0.10000 \times 10$
$A_4 = 0.32059 \times 10^{-4}$
$A_6 = 0.59924 \times 10^{-7}$
$A_8 = -0.15392 \times 10^{-8}$
$A_{10} = -0.30909 \times 10^{-10}$
$A_{12} = -0.27685 \times 10^{-12}$
$r_{12}:\epsilon = 0.10000 \times 10$
$A_4 = -0.45835 \times 10^{-4}$
$A_6 = -0.20291 \times 10^{-6}$
$A_8 = -0.52258 \times 10^{-8}$
$A_{10} = -0.15030 \times 10^{-10}$
$A_{12} = 0.72496 \times 10^{-13}$
$r_{13}:\epsilon = 0.10000 \times 10$
$A_4 = 0.17395 \times 10^{-5}$
$A_6 = 0.21583 \times 10^{-7}$
$A_8 = 0.53292 \times 10^{-9}$
$A_{10} = 0.32210 \times 10^{-11}$
$A_{12} = 0.13377 \times 10^{-13}$

TABLE 13

Embodiment 13
$f = 28.8 \sim 50.0 \sim 82.5 \qquad F_{NO} = 4.1 \sim 4.9 \sim 5.8$

| | Radius of Curvature | | Axial Distance | Refractive Index | Abbe Number |
|---|---|---|---|---|---|
| $r_1$ | 73.684 | | | | |
| | | $d_1$ | 1.700 | $N_1$ 1.84666 | $\nu_1$ 23.82 |
| $r_2$ | 51.000 | | | | |
| | | $d_2$ | 7.700 | $N_2$ 1.67000 | $\nu_2$ 57.07 |
| $r_3$ | 382.387 | | | | |
| | | $d_3$ | 0.100 | | |
| $r_4$ | 35.423 | | | | |
| | | $d_4$ | 4.000 | $N_3$ 1.77250 | $\nu_3$ 49.77 |
| $r_5$ | 37.901 | | | | |
| | | $d_5$ | 0.890~18.824~35.656 | | |
| $r_6^*$ | 24.778 | | | | |
| | | $d_6$ | 2.500 | $N_4$ 1.77250 | $\nu_4$ 49.77 |

TABLE 13-continued

Embodiment 13
$f = 28.8 \sim 50.0 \sim 82.5$    $F_{NO} = 4.1 \sim 4.9 \sim 5.8$

| | | | | | | |
|---|---|---|---|---|---|---|
| $r_7$ | 10.421 | | | | | |
| | | $d_7$ | 7.000 | | | |
| $r_8^*$ | 220.607 | | | | | |
| | | $d_8$ | 2.000 | $N_5$ 1.77250 | $v_5$ | 49.77 |
| $r_9$ | 21.768 | | | | | |
| | | $d_9$ | 1.500 | | | |
| $r_{10}^*$ | 38.520 | | | | | |
| | | $d_{10}$ | 2.000 | $N_6$ 1.80518 | $v_6$ | 25.43 |
| $r_{11}^*$ | 128.741 | | | | | |
| | | $d_{11}$ | 13.265~7.154~3.000 | | | |
| $r_{12}$ | ∞ (Aperture) | | | | | |
| | | $d_{12}$ | 1.000 | | | |
| $r_{13}^*$ | 13.488 | | | | | |
| | | $d_{13}$ | 8.000 | $N_7$ 1.49310 | $v_7$ | 83.58 |
| $r_{14}^*$ | −20.998 | | | | | |
| | | $d_{14}$ | 1.000 | | | |
| $r_{15}^*$ | 26.171 | | | | | |
| | | $d_{15}$ | 2.868 | $N_8$ 1.84666 | $v_8$ | 23.83 |
| $r_{16}$ | 16.775 | | | | | |
| | | $d_{16}$ | 3.415~10.526~15.680 | | | |
| $r_{17}^*$ | 16369.289 | | | | | |
| | | $d_{17}$ | 2.000 | $N_9$ 1.77250 | $v_8$ | 49.77 |
| $r_{18}$ | 153.047 | | | | | |

Aspherical coefficient $r_6$: $\epsilon = 0.10000 \times 10$
$A_4 = -0.24754 \times 10^{-4}$
$r_8$: $\epsilon = 0.10000 \times 10$
$A_4 = -0.57448 \times 10^{-5}$
$A_6 = -0.47067 \times 10^{-6}$
$A_8 = -0.11961 \times 10^{-8}$
$A_{10} = 0.10254 \times 10^{-10}$
$A_{12} = 0.12715 \times 10^{-12}$
$r_{10}$: $\epsilon = 0.10000 \times 10$
$A_4 = 0.33877 \times 10^{-4}$
$A_6 = 0.11068 \times 10^{-6}$
$A_8 = 0.82852 \times 10^{-9}$
$A_{10} = 0.14787 \times 10^{-11}$
$A_{12} = -0.38213 \times 10^{-13}$
$r_{11}$: $\epsilon = 0.10000 \times 10$
$A_4 = -0.25593 \times 10^{-4}$
$A_6 = -0.22357 \times 10^{-6}$
$A_8 = -0.20054 \times 10^{-8}$
$A_{10} = -0.53249 \times 10^{-11}$
$A_{12} = 0.31232 \times 10^{-13}$
$r_{13}$: $\epsilon = 0.10000 \times 10$
$A_4 = -0.32277 \times 10^{-4}$
$A_6 = -0.18024 \times 10^{-6}$
$A_8 = -0.95816 \times 10^{-9}$
$A_{10} = -0.10725 \times 10^{-10}$
$A_{12} = -0.78771 \times 10^{-13}$
$r_{14}$: $\epsilon = 0.10000 \times 10$
$A_4 = 0.32602 \times 10^{-4}$
$A_6 = 0.65356 \times 10^{-7}$
$A_8 = -0.16840 \times 10^{-8}$
$A_{10} = -0.33672 \times 10^{-10}$
$A_{12} = -0.28847 \times 10^{-12}$
$r_{15}$: $\epsilon = 0.10000 \times 10$
$A_4 = -0.45092 \times 10^{-4}$
$A_6 = -0.20606 \times 10^{-6}$
$A_8 = -0.50083 \times 10^{-8}$
$A_{10} = -0.13599 \times 10^{-10}$
$A_{12} = 0.77067 \times 10^{-13}$
$r_{17}$: $\epsilon = 0.10000 \times 10$
$A_4 = -0.25638 \times 10^{-6}$
$A_6 = 0.20962 \times 10^{-8}$
$A_8 = 0.96998 \times 10^{-10}$

TABLE 14

Embodiment 14
$f = 28.8 \sim 50.0 \sim 82.5$    $F_{NO} = 4.1 \sim 4.9 \sim 5.8$

| | Radius of Curvature | | Axial Distance | Refractive Index | Abbe Number |
|---|---|---|---|---|---|
| $r_1$ | 76.323 | | | | |
| | | $d_1$ | 1.700 | $N_1$ 1.84666 | $v_1$ 23.82 |
| $r_2$ | 51.000 | | | | |
| | | $d_2$ | 10.000 | $N_2$ 1.67000 | $v_2$ 57.07 |

TABLE 14-continued

Embodiment 14
$f = 28.8 \sim 50.0 \sim 82.5$    $F_{NO} = 4.1 \sim 4.9 \sim 5.8$

| | | | | | | |
|---|---|---|---|---|---|---|
| $r_3$ | 662.273 | | | | | |
| | | $d_3$ | 0.100 | | | |
| $r_4$ | 33.271 | | | | | |
| | | $d_4$ | 4.000 | $N_3$ 1.77250 | $v_3$ | 49.77 |
| $r_5$ | 34.614 | | | | | |
| | | $d_5$ | 2.000~15.228~30.283 | | | |
| $r_6^*$ | 22.720 | | | | | |
| | | $d_6$ | 2.500 | $N_4$ 1.77250 | $v_4$ | 49.77 |
| $r_7$ | 11.418 | | | | | |
| | | $d_7$ | 8.000 | | | |
| $r_8^*$ | −207.477 | | | | | |
| | | $d_8$ | 2.000 | $N_5$ 1.77250 | $v_5$ | 49.77 |
| $r_9^*$ | 14.772 | | | | | |
| | | $d_9$ | 1.566 | | | |
| $r_{10}^*$ | 29.588 | | | | | |
| | | $d_{10}$ | 2.000 | $N_6$ 1.80518 | $v_6$ | 25.43 |
| $r_{11}^*$ | 808.662 | | | | | |
| | | $d_{11}$ | 7.942~4.212~3.000 | | | |
| $r_{12}$ | ∞ (Aperture) | | | | | |
| | | $d_{12}$ | 7.000~4.000~1.000 | | | |
| $r_{13}^*$ | 15.080 | | | | | |
| | | $d_{13}$ | 8.000 | $N_7$ 1.49310 | $v_7$ | 83.58 |
| $r_{14}^*$ | −18.223 | | | | | |
| | | $d_{14}$ | 1.000~2.000~3.000 | | | |
| $r_{15}^*$ | 41.174 | | | | | |
| | | $d_{15}$ | 2.868 | $N_8$ 1.84666 | $v_8$ | 23.83 |
| $r_{16}$ | 21.225 | | | | | |

Aspherical coefficient $r_6$: $\epsilon = 0.10000 \times 10$
$A_4 = -0.17223 \times 10^{-4}$
$r_8$: $\epsilon = 0.10000 \times 10$
$A_4 = -0.10855 \times 10^{-4}$
$A_6 = -0.48642 \times 10^{-6}$
$A_8 = -0.12234 \times 10^{-8}$
$A_{10} = 0.10028 \times 10^{-10}$
$A_{12} = 0.12280 \times 10^{-12}$
$r_9$: $\epsilon = 0.10000 \times 10$
$A_4 = 0.21348 \times 10^{-5}$
$A_6 = -0.90820 \times 10^{-8}$
$A_8 = -0.57728 \times 10^{-10}$
$A_{10} = -0.28445 \times 10^{-12}$
$A_{12} = -0.10617 \times 10^{-14}$
$r_{10}$: $\epsilon = 0.10000 \times 10$
$A_4 = 0.29328 \times 10^{-4}$
$A_6 = 0.11012 \times 10^{-6}$
$A_8 = 0.81032 \times 10^{-9}$
$A_{10} = 0.14206 \times 10^{-11}$
$A_{12} = -0.37911 \times 10^{-13}$
$r_{11}$: $\epsilon = 0.10000 \times 10$
$A_4 = -0.25594 \times 10^{-4}$
$A_6 = -0.22314 \times 10^{-6}$
$A_8 = -0.19274 \times 10^{-8}$
$A_{10} = -0.48535 \times 10^{-11}$
$A_{12} = 0.33129 \times 10^{-13}$
$r_{13}$: $\epsilon = 0.10000 \times 10$
$A_4 = -0.30480 \times 10^{-4}$
$A_6 = -0.16447 \times 10^{-6}$
$A_8 = -0.10615 \times 10^{-8}$
$A_{10} = -0.12352 \times 10^{-10}$
$A_{12} = -0.92825 \times 10^{-13}$
$r_{14}$: $\epsilon = 0.10000 \times 10$
$A_4 = 0.26167 \times 10^{-4}$
$A_6 = 0.80291 \times 10^{-7}$
$A_8 = -0.13279 \times 10^{-8}$
$A_{10} = -0.30354 \times 10^{-10}$
$A_{12} = -0.26509 \times 10^{-12}$
$r_{15}$: $\epsilon = 0.10000 \times 10$
$A_4 = -0.35017 \times 10^{-4}$
$A_6 = -0.17316 \times 10^{-6}$
$A_8 = -0.49302 \times 10^{-8}$
$A_{10} = -0.13495 \times 10^{-10}$
$A_{12} = 0.77195 \times 10^{-13}$

TABLE 15

<Embodiment 15>

| f = 28.8~48.0~82.5 | | | $F_{NO}$ = 4.6~5.2~5.83 | |
|---|---|---|---|---|
| Radius of Curvature | | Axial Distance | Refractive Index | Abbe Number |
| $r_1$ | 405.408 | | | |
| | | $d_1$ 2.000 | $N_1$ 1.77551 | $\nu_1$ 37.90 |
| $r_2$* | 50.266 | | | |
| | | $d_2$ 1.200 | | |
| $r_3$* | 30.026 | | | |
| | | $d_3$ 8.000 | $N_2$ 1.64250 | $\nu_2$ 58.04 |
| $r_4$* | −715.584 | | | |
| | | $d_4$ 1.000~7.656~23.356 | | |
| $r_5$* | 141.354 | | | |
| | | $d_5$ 1.700 | $N_3$ 1.77250 | $\nu_3$ 49.77 |
| $r_6$ | 12.667 | | | |
| | | $d_6$ 5.300 | | |
| $r_7$* | 28.492 | | | |
| | | $d_7$ 2.900 | $N_4$ 1.70055 | $\nu_4$ 27.58 |
| $r_8$* | 74.913 | | | |
| | | $d_8$ 25.753~11.149~1.500 | | |
| $r_9$ | ∞ (Aperture) | | | |
| | | $d_9$ 1.000 | | |
| $r_{10}$* | 15.511 | | | |
| | | $d_{10}$ 4.800 | $N_5$ 1.61800 | $\nu_5$ 63.39 |
| $r_{11}$ | −97.241 | | | |
| | | $d_{11}$ 5.300 | | |
| $r_{12}$* | −50.963 | | | |
| | | $d_{12}$ 5.600 | $N_6$ 1.84666 | $\nu_6$ 23.83 |
| $r_{13}$* | 448.797 | | | |

| Aspherical coefficient | |
|---|---|
| $r_2$: | $\epsilon = 0.10000 \times 10$ |
| | $A_4 = 0.14308 \times 10^{-7}$ |
| | $A_6 = -0.78440 \times 10^{-8}$ |
| | $A_8 = -0.20536 \times 10^{-11}$ |
| $r_3$: | $\epsilon = 0.10000 \times 10$ |
| | $A_4 = -0.16640 \times 10^{-5}$ |
| | $A_6 = -0.88888 \times 10^{-8}$ |
| | $A_8 = 0.30593 \times 10^{-10}$ |
| $r_4$: | $\epsilon = 0.10000 \times 10$ |
| | $A_4 = 0.90826 \times 10^{-6}$ |
| | $A_6 = 0.11064 \times 10^{-7}$ |
| | $A_8 = 0.17615 \times 10^{-10}$ |
| $r_5$: | $\epsilon = 0.10000 \times 10$ |
| | $A_4 = 0.15776 \times 10^{-4}$ |
| | $A_6 = -0.12957 \times 10^{-6}$ |
| | $A_8 = 0.24863 \times 10^{-9}$ |
| $r_7$: | $\epsilon = 0.10000 \times 10$ |
| | $A_4 = -0.43133 \times 10^{-4}$ |
| | $A_6 = 0.13659 \times 10^{-6}$ |
| | $A_8 = 0.10589 \times 10^{-8}$ |
| | $A_{10} = 0.77077 \times 10^{-11}$ |
| $r_8$: | $\epsilon 0.10000 \times 10$ |
| | $A_4 = -0.60242 \times 10^{-4}$ |
| | $A_6 = 0.10352 \times 10^{-6}$ |
| | $A_8 = -0.11022 \times 10^{-8}$ |
| | $A_{10} = -0.26664 \times 10^{-11}$ |
| $r_{10}$: | $\epsilon 0.10000 \times 10$ |
| | $A_4 = -0.11383 \times 10^{-4}$ |
| | $A_6 = 0.58691 \times 10^{-7}$ |
| | $A_8 = -0.29413 \times 10^{-8}$ |
| | $A_{10} = 0.25035 \times 10^{-10}$ |
| $r_{12}$: | $\epsilon 0.10000 \times 10$ |
| | $A_4 = 0.38401 \times 10^{-4}$ |
| | $A_6 = -0.56513 \times 10^{-7}$ |
| | $A_8 = -0.15405 \times 10^{-8}$ |
| $r_{13}$: | $\epsilon = 0.10000 \times 10$ |
| | $A_4 = 0.10034 \times 10^{-3}$ |
| | $A_6 = 0.25007 \times 10^{-6}$ |
| | $A_8 = 0.26140 \times 10^{-8}$ |

TABLE 16

<Embodiment 16>

| f = 28.8~48.0~82.5 | | | $F_{NO}$ = 4.6~5.2~5.65 | |
|---|---|---|---|---|
| Radius of Curvature | | Axial Distance | Refractive Index | Abbe Number |
| $r_1$ | 500.000 | | | |
| | | $d_1$ 1.547 | $N_1$ 1.77551 | $\nu_1$ 37.90 |
| $r_2$* | 36.223 | | | |
| | | $d_2$ 0.987 | | |
| $r_3$* | 26.954 | | | |
| | | $d_3$ 7.000 | $N_2$ 1.69680 | $\nu_2$ 56.47 |
| $r_4$* | −115.007 | | | |
| | | $d_4$ 1.000~5.858~21.834 | | |
| $r_5$* | 2459.963 | | | |
| | | $d_5$ 1.567 | $N_3$ 1.77250 | $\nu_3$ 49.77 |
| $r_6$ | 12.547 | | | |
| | | $d_6$ 4.910 | | |
| $r_7$* | 42.165 | | | |
| | | $d_7$ 2.675 | $N_4$ 1.70055 | $\nu_4$ 27.58 |
| $r_8$* | −1399.991 | | | |
| | | $d_8$ 26.237~11.564~1.500 | | |
| $r_9$ | ∞ (Aperture) | | | |
| | | $d_9$ 1.901 | | |
| $r_{10}$* | 15.852 | | | |
| | | $d_{10}$ 4.987 | $N_5$ 1.61800 | $\nu_5$ 63.39 |
| $r_{11}$ | −59.042 | | | |
| | | $d_{11}$ 5.372 | | |
| $r_{12}$* | −46.398 | | | |
| | | $d_{12}$ 5.824 | $N_6$ 1.84666 | $\nu_6$ 23.83 |
| $r_{13}$* | 125.497 | | | |

| Aspherical coefficient | |
|---|---|
| $r_2$: | $\epsilon = 0.10000 \times 10$ |
| | $A_4 = 0.57271 \times 10^{-5}$ |
| | $A_6 = -0.12040 \times 10^{-7}$ |
| | $A_8 = 0.30524 \times 10^{-10}$ |
| $r_3$: | $\epsilon = 0.10000 \times 10$ |
| | $A_4 = -0.12070 \times 10^{-5}$ |
| | $A_6 = -0.26380 \times 10^{-7}$ |
| | $A_8 = 0.69558 \times 10^{-10}$ |
| $r_4$: | $\epsilon 0.10000 \times 10$ |
| | $A_4 = -0.36144 \times 10^{-5}$ |
| | $A_6 = 0.16815 \times 10^{-8}$ |
| | $A_8 = 0.28233 \times 10^{-10}$ |
| $R_5$: | $\epsilon 0.10000 \times 10$ |
| | $A_4 = 0.10896 \times 10^{-4}$ |
| | $A_6 = -0.27661 \times 10^{-6}$ |
| | $A_8 = 0.16531 \times 10^{-8}$ |
| | $A_{10} = -0.68196 \times 10^{-11}$ |
| | $A_{12} = 0.15593 \times 10^{--}$ |
| $r_7$: | $\epsilon = 0.10000 \times 10$ |
| | $A_4 = -0.43856 \times 10^{-4}$ |
| | $A_6 = 0.32427 \times 10^{-6}$ |
| | $A_8 = 0.19815 \times 10^{-8}$ |
| | $A_{10} = -0.15800 \times 10^{-10}$ |
| | $A_{12} = 0.30629 \times 10^{-13}$ |
| $r_8$: | $\epsilon = 0.10000 \times 10$ |
| | $A_4 = -0.73641 \times 10^{-4}$ |
| | $A_6 = 0.22588 \times 10^{-6}$ |
| | $A_8 = -10888 \times 10^{-8}$ |
| | $A_{10} = -0.12742 \times 10^{-11}$ |
| | $A_{12} = -0.27488 \times 10^{-13}$ |
| $r_{10}$: | $\epsilon 0.10000 \times 10$ |
| | $A_4 = -0.17075 \times 10^{-4}$ |
| | $A_6 = 0.47819 \times 10^{-7}$ |
| | $A_8 = -0.24037 \times 10^{-8}$ |
| | $A_{10} = 0.19222 \times 10^{-10}$ |
| | $A_{12} = -0.54054 \times 10^{-13}$ |
| $r_{12}$: | $\epsilon 0.10000 \times 10$ |
| | $A_4 = 0.32772 \times 10^{-4}$ |
| | $A_6 = 0.23001 \times 10^{-7}$ |
| | $A_8 = -0.10506 \times 10^{-8}$ |
| $r_{13}$: | $\epsilon = 0.10000 \times 10$ |
| | $A_4 = 0.98033 \times 10^{-4}$ |
| | $A_6 = 0.22288 \times 10^{-6}$ |
| | $A_8 = 0.26523 \times 10^{-8}$ |

TABLE 17

<Embodiment 17>

$f = 28.8 \sim 48.0 \sim 82.5$　　$F_{NO} = 4.6 \sim 5.2 \sim 5.83$

| Radius of Curvature | Axial Distance | Refractive Index | Abbe Number |
|---|---|---|---|
| $r_1$ 76.020 | | | |
| | $d_1$ 2.000 | $N_1$ 1.77551 | $\nu_1$ 37.90 |
| $r_2^*$ 38.391 | | | |
| | $d_2$ 1.000 | | |
| $r_3^*$ 27.207 | | | |
| | $d_3$ 5.500 | $N_2$ 1.64250 | $\nu_2$ 58.04 |
| $r_4^*$ 129.682 | | | |
| | $d_4$ 1.000~8.945~20.204 | | |
| $r_5^*$ 133.378 | | | |
| | $d_5$ 1.700 | $N_3$ 1.77250 | $\nu_3$ 49.77 |
| $r_6$ 12.949 | | | |
| | $d_6$ 5.300 | | |
| $r_7^*$ 27.498 | | | |
| | $d_7$ 2.900 | $N_4$ 1.70055 | $\nu_4$ 27.58 |
| $r_8^*$ 61.472 | | | |
| | $d_8$ 27.031~12.157~1.500 | | |
| $r_9$ ∞ (Aperture) | | | |
| | $d_9$ 1.000 | | |
| $r_{10}^*$ 15.463 | | | |
| | $d_{10}$ 3.800 | $N_5$ 1.62280 | $\nu_5$ 56.88 |
| $r_{11}$ −40.000 | | | |
| | $d_{11}$ 1.000 | $N_6$ 1.80518 | $\nu_6$ 25.43 |
| $r_{12}$ −88.138 | | | |
| | $d_{12}$ 5.300 | | |
| $r_{13}^*$ −50.377 | | | |
| | $d_{13}$ 5.200 | $N_7$ 1.84666 | $\nu_7$ 23.82 |
| $r_{14}^*$ −1878.322 | | | |

| Aspherical coefficient |
|---|
| $r_2$:　$\epsilon = 0.10000 \times 10$<br>　　$A_4 = 0.40994 \times 10^{-7}$<br>　　$A_6 = -0.10122 \times 10^{-7}$<br>　　$A_8 = -0.95172 \times 10^{-11}$ |
| $r_3$:　$\epsilon = 0.10000 \times 10$<br>　　$A_4 = -0.18878 \times 10^{-5}$<br>　　$A_6 = -0.13878 \times 10^{-7}$<br>　　$A_8 = 0.83605 \times 10^{-11}$ |
| $r_4$:　$\epsilon = 0.10000 \times 10$<br>　　$A_4 = -0.65350 \times 10^{-6}$<br>　　$A_6 = 0.40395 \times 10^{-8}$<br>　　$A_8 = 0.21922 \times 10^{-10}$ |
| $r_5$:　$\epsilon = 0.10000 \times 10$<br>　　$A_4 = 0.12076 \times 10^{-4}$<br>　　$A_6 = -0.10788 \times 10^{-6}$<br>　　$A_8 = 0.19551 \times 10^{-9}$ |
| $r_7$:　$\epsilon = 0.10000 \times 10$<br>　　$A_4 = -0.42889 \times 10^{-4}$<br>　　$A_6 = 0.13451 \times 10^{-6}$<br>　　$A_8 = 0.96534 \times 10^{-9}$<br>　　$A_{10} = -0.77077 \times 10^{-77}$ |
| $r_8$:　$\epsilon = 0.10000 \times 10$<br>　　$A_4 = -0.61065 \times 10^{-4}$<br>　　$A_6 = 0.10665 \times 10^{-6}$<br>　　$A_8 = -0.98517 \times 10^{-9}$<br>　　$A_{10} = -0.26664 \times 10^{-11}$ |
| $r_{10}$:　$\epsilon = 0.10000 \times 10$<br>　　$A_4 = -0.10323 \times 10^{-4}$<br>　　$A_6 = 0.80193 \times 10^{-7}$<br>　　$A_8 = -0.30957 \times 10^{-8}$<br>　　$A_{10} = 0.24281 \times 10^{-10}$<br>　　$A_{12} = 0.95055 \times 10^{-14}$ |
| $r_{13}$:　$\epsilon\ 0.10000 \times 10$<br>　　$A_4 = 0.41021 \times 10^{-4}$<br>　　$A_6 = -0.41253 \times 10^{-7}$<br>　　$A_8 = -0.15615 \times 10^{-8}$ |
| $r_{14}$:　$\epsilon\ 0.10000 \times 10$<br>　　$A_4 = 0.99108 \times 10^{-4}$<br>　　$A_6 = 0.23415 \times 10^{-6}$<br>　　$A_8 = 0.25357 \times 10^{-8}$ |

TABLE 18

<Embodiment 18>

$f = 28.8 \sim 50.0 \sim 82.5$　　$F_{NO} = 4.1 \sim 5.2 \sim 5.8$

| Radius of Curvature | Axial Distance | Refractive Index | Abbe Number |
|---|---|---|---|
| $r_1$ 71.675 | | | |
| | $d_1$ 1.200 | $N_1$ 1.84666 | $\nu_1$ 23.82 |
| $r_2$ 42.000 | | | |
| | $d_2$ 5.000 | $N_2$ 1.67000 | $\nu_2$ 57.07 |
| $r_3$ 125.852 | | | |
| | $d_3$ 0.100 | | |
| $r_4$ 26.552 | | | |
| | $d_4$ 5.000 | $N_3$ 1.69680 | $\nu_3$ 56.47 |
| $r_5^*$ 78.114 | | | |
| | $d_5$ 1.000~6.099~12.334 | | |
| $r_6^*$ 45.000 | | | |
| | $d_6$ 1.700 | $N_4$ 1.77250 | $\nu_4$ 49.77 |
| $r_7$ 10.502 | | | |
| | $d_7$ 6.000 | | |
| $r_8^*$ 1009.448 | | | |
| | $d_8$ 2.500 | $N_5$ 1.72000 | $\nu_5$ 54.71 |
| $r_9^*$ 22.719 | | | |
| | $d_9$ 1.500 | | |
| $r_{10}^*$ 32.155 | | | |
| | $d_{10}$ 2.500 | $N_6$ 1.84666 | $\nu_6$ 23.82 |
| $r_{11}^*$ 161.420 | | | |
| | $d_{11}$ 11.810~6.506~1.500 | | |
| $r_{12}$ ∞ (Aperture) | | | |
| | $d_{12}$ 7.000~3.000~1.000 | | |
| $r_{13}^*$ 16.164 | | | |
| | $d_{13}$ 8.000 | $N_7$ 1.51680 | $\nu_7$ 64.20 |
| $r_{14}$ −13.000 | | | |
| | $d_{14}$ 2.000 | $N_8$ 1.65446 | $\nu_8$ 33.86 |
| $r_{15}^*$ −22.970 | | | |
| | $d_{15}$ 1.336 | | |
| $r_{16}^*$ 41.902 | | | |
| | $d_{16}$ 3.830 | $N_9$ 1.84666 | $\nu_9$ 23.83 |
| $r_{17}$ 23.835 | | | |

| Aspherical coefficient |
|---|
| $r_5$:　$\epsilon = 0.10000 \times 10$<br>　　$A_4 = 0.87525 \times 10^{-6}$<br>　　$A_6 = -0.12522 \times 10^{-8}$<br>　　$A_8 = 0.17622 \times 10^{-11}$ |
| $r_6$:　$\epsilon = 0.10000 \times 10$<br>　　$A_4 = -0.62897 \times 10^{-5}$ |
| $r_8$:　$\epsilon = 0.10000 \times 10$<br>　　$A_4 = -0.27685 \times 10^{-4}$<br>　　$A_6 = 0.28012 \times 10^{-7}$<br>　　$A_8 = 0.72178 \times 10^{-9}$ |
| $r_9$:　$\epsilon = 0.10000 \times 10$<br>　　$A_4 = -0.24353 \times 10^{-4}$<br>　　$A_6 = 0.30564 \times 10^{-7}$<br>　　$A_8 = 0.28151 \times 10^{-8}$ |
| $r_{10}$:　$\epsilon = 0.10000 \times 10$<br>　　$A_4 = -0.17878 \times 10^{-4}$<br>　　$A_6 = 0.30626 \times 10^{-7}$<br>　　$A_8 = -0.13977 \times 10^{-8}$ |
| $r_{11}$:　$\epsilon = 0.10000 \times 10$<br>　　$A_4 = -0.50621 \times 10^{-4}$<br>　　$A_6 = -0.69757 \times 10^{-7}$<br>　　$A_8 = -0.22206 \times 10^{-8}$ |
| $r_{13}$:　$\epsilon = 0.10000 \times 10$<br>　　$A_4 = -0.15004 \times 10^{-4}$<br>　　$A_6 = -0.14956 \times 10^{-6}$<br>　　$A_8 = -0.21809 \times 10^{-9}$ |
| $r_{15}$:　$\epsilon = 0.10000 \times 10$<br>　　$A_4 = -0.30893 \times 10^{-4}$<br>　　$A_6 = 0.35523 \times 10^{-7}$<br>　　$A_8 = 0.55764 \times 10^{-9}$ |
| $r_{16}$:　$\epsilon = 0.10000 \times 10$<br>　　$A_4 = -0.63055 \times 10^{-4}$<br>　　$A_6 = -0.19109 \times 10^{-6}$<br>　　$A_8 = 0.21114 \times 10^{-9}$ |

TABLE 19

<Embodiment 19>

$f = 28.8 \sim 44.0 \sim 68.5$   $F_{NO} = 4.6 \sim 5.2 \sim 5.83$

| | Radius of Curvature | Axial Distance | Refractive Index | Abbe Number |
|---|---|---|---|---|
| $r_1$ | 244.499 | | | |
| | | $d_1$ 2.000 | $N_1$ 1.80741 | $v_1$ 31.59 |
| $r_2^*$ | 56.843 | | | |
| | | $d_2$ 1.200 | | |
| $r_3^*$ | 29.494 | | | |
| | | $d_3$ 6.000 | $N_2$ 1.69100 | $v_2$ 54.75 |
| $r_4^*$ | 179.688 | | | |
| | | $d_4$ 1.000~9.388~17.164 | | |
| $r_5^*$ | 248.050 | | | |
| | | $d_5$ 1.700 | $N_3$ 1.72000 | $v_3$ 54.71 |
| $r_6$ | 12.103 | | | |
| | | $d_6$ 5.300 | | |
| $r_7^*$ | 25.589 | | | |
| | | $d_7$ 2.900 | $N_4$ 1.70055 | $v_4$ 27.58 |
| $r_8^*$ | 57.892 | | | |
| | | $d_8$ 15.154~7.249~1.500 | | |
| $r_9$ | ∞ (Aperture) | | | |
| | | $d_9$ 7.000~4.000~1.000 | | |
| $r_{10}^*$ | 16.522 | | | |
| | | $d_{10}$ 4.500 | $N_5$ 1.69680 | $v_5$ 56.47 |
| $r_{11}$ | −30.000 | | | |
| | | $d_{11}$ 1.300 | $N_6$ 1.70055 | $v_6$ 30.11 |
| $r_{12}$ | −320.581 | | | |
| | | $d_{12}$ 5.300 | | |
| $r_{13}^*$ | −54.723 | | | |
| | | $d_{13}$ 4.000 | $N_7$ 1.84666 | $v_7$ 23.82 |
| $r_{14}^*$ | −319.955 | | | |

Aspherical coefficient $r_2$: $\epsilon = 0.10000 \times 10$
$A_4 = -0.14892 \times 10^{-6}$
$A_6 = -0.79441 \times 10^{-8}$
$A_8 = -0.67699 \times 10^{-11}$ $r_3$: $\epsilon = 0.10000 \times 10$
$A_4 = -0.23461 \times 10^{-5}$
$A_6 = 0.64955 \times 10^{-8}$
$A_8 = 0.26292 \times 10^{-11}$ $r_4$: $\epsilon$ 0.10000 × 10
$A_4 = -0.23299 \times 10^{-6}$
$A_6 = 0.26581 \times 10^{-7}$
$A_8 = -0.60970 \times 10^{31\ 11}$ $r_5$: $\epsilon = 0.10000 \times 10$
$A_4 = 0.17919 \times 10^{-4}$
$A_6 = -0.13684 \times 10^{-6}$
$A_8 = 0.46166 \times 10^{-9}$
$A_{10} = 0.13383 \times 10^{-11}$
$A_{12} = 0.22808 \times 10^{-14}$ $r_7$: $\epsilon = 0.10000 \times 10$
$A_4 = -0.40149 \times 10^{-4}$
$A_6 = 0.13416 \times 10^{-6}$
$A_8 = 0.11024 \times 10^{-8}$
$A_{10} = -0.77077 \times 10^{-11}$ $r_8$: $\epsilon = 0.10000 \times 10$
$A_4 = -0.59924 \times 10^{-4}$
$A_6 = 0.12559 \times 10^{-6}$
$A_8 = -0.14616 \times 10^{-8}$
$A_{10} = -0.26664 \times 10^{-11}$ $r_{10}$: $\epsilon = 0.10000 \times 10$
$A_4 = -0.56070 \times 10^{-5}$
$A_6 = 0.85473 \times 10^{-7}$
$A_8 = -0.30729 \times 10^{-8}$
$A_{10} = 0.25035 \times 10^{-10}$ $r_{13}$: $\epsilon = 0.10000 \times 10$
$A_4 = 0.47665 \times 10^{-4}$
$A_6 = -0.56217 \times 10^{-7}$
$A_8 = -0.16761 \times 10^{-8}$ $r_{14}$: $\epsilon = 0.10000 \times 10$
$A_4 = 0.11266 \times 10^{-3}$
$A_6 = 0.18300 \times 10^{-6}$
$A_8 = 0.21481 \times 10^{-8}$

TABLE 20

<Embodiment 20>

$f = 28.8 \sim 50.0 \sim 82.5$   uz,17/32 $F_{NO} = 4.1 \sim 5.2 \sim 5.8$

| | Radius of Curvature | Axial Distance | Refractive Index | Abbe Number |
|---|---|---|---|---|
| $r_1$ | 63.587 | | | |
| | | $d_1$ 1.200 | $N_1$ 1.84666 | $v_1$ 23.82 |
| $r_2$ | 42.778 | | | |
| | | $d_2$ 6.500 | $N_2$ 1.67000 | $v_2$ 57.07 |
| $r_3$ | 406.876 | | | |
| | | $d_3$ 0.100 | | |
| $r_4$ | 25.817 | | | |
| | | $d_4$ 4.000 | $N_3$ 1.69680 | $v_3$ 56.47 |
| $r_5^*$ | 35.048 | | | |
| | | $d_5$ 1.000~5.547~15.315 | | |
| $r_6^*$ | 47.975 | | | |
| | | $d_6$ 1.700 | $N_4$ 1.85000 | $v_4$ 40.04 |
| $r_7$ | 11.976 | | | |
| | | $d_7$ 6.000 | | |
| $r_8^*$ | 452.000 | | | |
| | | $d_8$ 2.500 | $N_5$ 1.72000 | $v_5$ 54.71 |
| $r_9^*$ | 20.735 | | | |
| | | $d_9$ 1.500 | | |
| $r_{10}^*$ | 30.815 | | | |
| | | $d_{10}$ 2.500 | $N_6$ 1.80518 | $v_6$ 25.43 |
| $r_{11}^*$ | 400.072 | | | |
| | | $d_{11}$ 11.304~5.441~1.500 | | |
| $r_{12}$ | ∞ (Aperture) | | | |
| | | $d_{12}$ 7.000~3.000~1.000 | | |
| $r_{13}^*$ | 18.014 | | | |
| | | $d_{13}$ 6.000 | $N_7$ 1.51823 | $v_7$ 58.96 |
| $r_{14}$ | −37.980 | | | |
| | | $d_{14}$ 0.200 | | |
| $r_{15}$ | −34.527 | | | |
| | | $d_{15}$ 2.000 | $N_8$ 1.68150 | $v_8$ 36.64 |
| $r_{16}^*$ | −77.673 | | | |
| | | $d_{16}$ 5.000~2.500~0.500 | | |
| $r_{17}^*$ | 31.242 | | | |
| | | $d_{17}$ 3.000 | $N_9$ 1.51823 | $v_9$ 58.96 |
| $r_{18}$ | −32.686 | | | |
| | | $d_{18}$ 1.500 | | |
| $r_{19}$ | 49.513 | | | |
| | | $d_{19}$ 2.000 | $N_{10}$ 1.84666 | $v_{10}$ 23.82 |
| $r_{20}$ | 17.759 | | | |

Aspherical coefficient $r_5$: $\epsilon = 0.10000 \times 10$
$A_4 = 0.81757 \times 10^{-8}$
$A_6 = 0.59226 \times 10^{-10}$
$A_8 = 0.93066 \times 10^{-13}$ $r_6$: $\epsilon$ 0.10000 × 10
$A_4 = -0.12560 \times 10^{-4}$ $r_8$: $\epsilon$ 0.10000 × 10
$A_4 = -0.27986 \times 10^{-4}$
$A_6 = 0.39793 \times 10^{-7}$
$A_8 = 0.10728 \times 10^{-8}$ $r_9$: $\epsilon = 0.10000 \times 10$
$A_4 = -0.43677 \times 10^{-4}$
$A_6 = 0.19763 \times 10^{-7}$
$A_8 = 0.20699 \times 10^{-8}$ $r_{10}$: $\epsilon = 0.10000 \times 10$
$A_4 = -0.21178 \times 10^{-4}$
$A_6 = 0.73876 \times 10^{-7}$
$A_8 = -0.62237 \times 10^{-9}$ $r_{11}$: $\epsilon = 0.10000 \times 10$
$A_4 = -0.45681 \times 10^{-4}$
$A_6 = 0.56120 \times 10^{-7}$
$A_8 = -0.15097 \times 10^{-8}$ $r_{13}$: $\epsilon = 0.10000 \times 10$
$A_4 = 0.36245 \times 10^{-5}$
$A_6 = 0.64820 \times 10^{-7}$
$A_8 = 0.23685 \times 10^{-8}$ $r_{16}$: $\epsilon = 0.10000 \times 10$
$A_4 = 0.28775 \times 10^{-4}$
$A_6 = 0.19246 \times 10^{-6}$
$A_8 = 0.24351 \times 10^{-8}$ $r_{17}$: $\epsilon = 0.10000 \times 10$
$A_4 = -0.35488 \times 10^{-4}$
$A_6 = 0.64172 \times 10^{-7}$
$A_8 = -0.13699 \times 10^{-9}$

TABLE 21 uz,11/22 <Embodiment 21>
$f = 28.8 \sim 44.0 \sim 68.5$    $F_{NO} = 4.6 \sim 5.2 \sim 5.83$

| | Radius of Curvature | | Axial Distance | Refractive Index | Abbe Number |
|---|---|---|---|---|---|
| $r_1$ | 220.287 | | | | |
| | | $d_1$ | 2.000 | $N_1$ 1.80741 | $\nu_1$ 31.59 |
| $r_2^*$ | 58.818 | | | | |
| | | $d_2$ | 1.200 | | |
| $r_3^*$ | 29.916 | | | | |
| | | $d_3$ | 6.000 | $N_2$ 1.69100 | $\nu_2$ 54.75 |
| $r_4^*$ | 158.683 | | | | |
| | | $d_4$ | $1.000 \sim 9.530 \sim 17.371$ | | |
| $r_5^*$ | 186.126 | | | | |
| | | $d_5$ | 1.700 | $N_3$ 1.72000 | $\nu_3$ 54.71 |
| $r_6$ | 12.071 | | | | |
| | | $d_6$ | 5.300 | | |
| $r_7^*$ | 25.724 | | | | |
| | | $d_7$ | 2.900 | $N_4$ 1.70055 | $\nu_4$ 27.58 |
| $r_8^*$ | 55.208 | | | | |
| | | $d_8$ | $15.274 \sim 7.322 \sim 1.499$ | | |
| $r_9$ | ∞ (Aperture) | | | | |
| | | $d_9$ | $7.000 \sim 4.000 \sim 1.000$ | | |
| $r_{10}^*$ | 16.247 | | | | |
| | | $d_{10}$ | 4.500 | $N_5$ 1.69680 | $\nu_5$ 56.47 |
| $r_{11}$ | −30.000 | | | | |
| | | $d_{11}$ | 0.250 | | |
| $r_{12}$ | −25.000 | | | | |
| | | $d_{12}$ | 1.300 | $N_6$ 1.70055 | $\nu_6$ 30.11 |
| $r_{13}$ | −335.105 | | | | |
| | | $d_{13}$ | 5.300 | | |
| $r_{14}^*$ | −55.479 | | | | |
| | | $d_{14}$ | 4.000 | $N_7$ 1.84666 | $\nu_7$ 23.82 |
| $r_{15}^*$ | −115.388 | | | | |

Aspherical coefficient $r_2$:
$\epsilon = 0.1000 \times 10$
$A_4 = -0.23456 \times 10^{-6}$
$A_6 = -0.10141 \times 10^{-7}$
$A_8 = 0.34769 \times 10^{-11}$ $r_3$:
$\epsilon\ 0.10000 \times 10$
$A_4 = -0.24097 \times 10^{-5}$
$A_6 = -0.36614 \times 10^{-8}$
$A_8 = -0.21252 \times 10^{-10}$ $r_4$:
$\epsilon\ 0.10000 \times 10$
$A_4 = -0.67758 \times 10^{-6}$
$A_6 = 0.95443 \times 10^{-8}$
$A_8 = -0.17914 \times 10^{-10}$ $r_5$:
$\epsilon\ 0.10000 \times 10$
$A_4 = 0.18741 \times 10^{-4}$
$A_6 = -0.14929 \times 10^{-6}$
$A_8 = 0.51558 \times 10^{-9}$
$A_{10} = -0.17733 \times 10^{-11}$
$A_{12} = 0.34899 \times 10^{-14}$ $r_7$:
$\epsilon = 0.10000 \times 10$
$A_4 = -0.40388 \times 10^{-4}$
$A_6 = 0.15626 \times 10^{-6}$
$A_8 = 0.11680 \times 10^{-8}$
$A_{10} = -0.77077 \times 10^{-11}$ $r_8$:
$\epsilon\ 0.10000 \times 10$
$A_4 = -0.58961 \times 10^{-4}$
$A_6 = 0.10863 \times 10^{-6}$
$A_8 = -0.14602 \times 10^{-8}$
$A_{10} = -0.26664 \times 10^{-11}$ $r_{10}$:
$\epsilon\ 0.10000 \times 10$
$A_4 = 0.29501 \times 10^{-6}$
$A_6 = 0.12667 \times 10^{-6}$
$A_8 = -0.28963 \times 10^{-8}$
$A_{10} = 0.25035 \times 10^{-10}$ $r_{14}$:
$\epsilon\ 0.10000 \times 10$
$A_4 = 0.51316 \times 10^{-4}$
$A_6 = -0.73616 \times 10^{-7}$
$A_8 = -0.18229 \times 10^{-8}$ $r_{15}$:
$\epsilon\ 0.10000 \times 10$
$A_4 = 0.11004 \times 10^{-3}$
$A_6 = 0.19278 \times 10^{-6}$
$A_8 = 0.22629 \times 10^{-8}$

TABLE 22

<Embodiment 22>
$f = 36.0 \sim 50.0 \sim 78.0$    $F_{NO} = 4.1 \sim 4.9 \sim 5.8$

| | Radius of Curvature | | Axial Distance | Refractive Index | Abbe Number |
|---|---|---|---|---|---|
| $r_1$ | 32.022 | | | | |
| | | $d_1$ | 1.700 | $N_1$ 1.846666 | $\nu_1$ 23.83 |
| $r_2^*$ | 25.464 | | | | |
| | | $d_2$ | 2.000 | | |
| $r_3^*$ | 29.277 | | | | |
| | | $d_3$ | 8.000 | $N_2$ 1.67100 | $\nu_2$ 51.73 |
| $r_4^*$ | 79.366 | | | | |
| | | $d_4$ | $4.000 \sim 12.908 \sim 28.995$ | | |
| $r_5^*$ | −369.615 | | | | |
| | | $d_5$ | 2.500 | $N_3$ 1.77250 | $\nu_3$ 49.77 |
| $r_6$ | 11.289 | | | | |
| | | $d_6$ | 3.938 | | |
| $r_7^*$ | 18.855 | | | | |
| | | $d_7$ | 3.000 | $N_4$ 1.78472 | $\nu_4$ 25.75 |
| $r_8^*$ | 30.698 | | | | |
| | | $d_8$ | $5.129 \sim 4.121 \sim 3.000$ | | |
| $r_9$ | ∞ (Aperture) | | | | |
| | | $d_9$ | $7.000 \sim 4.000 \sim 1.000$ | | |
| $r_{10}^*$ | 13.390 | | | | |
| | | $d_{10}$ | 8.000 | $N_5$ 1.51680 | $\nu_5$ 64.20 |
| $r_{11}^*$ | −23.279 | | | | |
| | | $d_{11}$ | 1.000 | | |
| $r_{12}^*$ | 32.005 | | | | |
| | | $d_{12}$ | 2.868 | $N_6$ 1.84666 | $\nu_6$ 23.83 |
| $r_{13}^*$ | 16.512 | | | | |

Aspherical coefficient $r_2$:
$\epsilon = 0.10000 \times 10$
$A_4 = 0.27231 \times 10^{-5}$ $r_3$:
$\epsilon = 0.1000 \times 10$
$A_4 = 0.27378 \times 10^{-5}$ $r_4$:
$\epsilon = 0.10000 \times 10$
$A_4 = -0.17930 \times 10^{-5}$ $r_5$:
$\epsilon = 0.10000 \times 10$
$A_4 = 0.12459 \times 10^{-5}$ $r_7$:
$\epsilon = 0.10000 \times 10$
$A_4 = 0.11473 \times 10^{-4}$
$A_6 = 0.82346 \times 10^{-7}$
$A_8 = -0.39547 \times 10^{-11}$
$A_{10} = -0.45996 \times 10^{-12}$
$A_{12} = 0.13712 \times 10^{-14}$ $r_8$:
$\epsilon = 0.10000 \times 10$
$A_4 = -0.13969 \times 10^{-4}$
$A_6 = -0.58404 \times 10^{-7}$
$A_8 = -0.11137 \times 10^{-9}$
$A_{10} = -0.11804 \times 10^{-11}$
$A_{12} = -0.20446 \times 10^{-13}$ $r_{10}$:
$\epsilon = 0.10000 \times 10$
$A_4 = -0.29267 \times 10^{-4}$
$A_6 = -0.11504 \times 10^{-6}$
$A_8 = -0.95693 \times 10^{-9}$
$A_{10} = -0.12897 \times 10^{-10}$
$A_{12} = -0.10886 \times 10^{-12}$ $r_{11}$:
$\epsilon = 0.10000 \times 10$
$A_4 = 0.31855 \times 10^{-4}$
$A_6 = 0.56476 \times 10^{-7}$
$A_8 = -0.15645 \times 10^{-8}$
$A_{10} = -0.31069 \times 10^{-10}$
$A_{12} = 0.27784 \times 10^{-12}$ $r_{12}$:
$\epsilon\ 0.10000 \times 10$
$A_4 = -0.45160 \times 10^{-4}$
$A_6 = -0.19246 \times 10^{-6}$
$A_8 = -0.51650 \times 10^{-8}$
$A_{10} = -0.14756 \times 10^{-10}$
$A_{12} = 0.73493 \times 10^{-13}$ $r_{13}$:
$\epsilon = 0.10000 \times 10$
$A_4 = 0.15193 \times 10^{-5}$
$A_6 = 0.13500 \times 10^{-7}$
$A_8 = 0.48974 \times 10^{-9}$
$A_{10} = 030209 \times 10^{-11}$
$A_{12} = 0.12523 \times 10^{-13}$

TABLE 23

<Embodiment 23>
$f = 28.8 \sim 50.0 \sim 82.5$  $F_{NO} = 4.1 \sim 4.9 \sim 5.8$

| Radius of Curvature | Axial Distance | Refractive Index | Abbe Number |
|---|---|---|---|
| $r_1$ 74.709 | | | |
| | $d_1$ 1.700 | $N_1$ 1.84666 | $\nu_1$ 23.82 |
| $r_2$ 51.000 | | | |
| | $d_2$ 10.000 | $N_2$ 1.67000 | $\nu_2$ 57.07 |
| $r_3$ 488.577 | | | |
| | $d_3$ 0.100 | | |
| $r_4$ 34.192 | | | |
| | $d_4$ 4.000 | $N_3$ 1.77250 | $\nu_3$ 49.77 |
| $r_5$ 35.939 | | | |
| | $d_5$ 0.500~17.615~33.381 | | |
| $r_6$* 22.823 | | | |
| | $d_6$ 2.500 | $N_4$ 1.77250 | $\nu_4$ 49.77 |
| $r_7$ 10.428 | | | |
| | $d_7$ 7.000 | | |
| $r_8$* 3773.584 | | | |
| | $d_8$ 2.000 | $N_5$ 1.77250 | $\nu_5$ 49.77 |
| $r_9$* 16.344 | | | |
| | $d_9$ 1.584 | | |
| $r_{10}$* 25.086 | | | |
| | $d_{10}$ 2.000 | $N_6$ 1.80515 | $\nu_6$ 25.43 |
| $r_{11}$* 109.599 | | | |
| | $d_{11}$ 6.644~3.974~3.000 | | |
| $r_{12}$ ∞ (Aperture) | | | |
| | $d_{12}$ 7.000~4.000~1.000 | | |
| $r_{13}$* 13.814 | | | |
| | $d_{13}$ 8.000 | $N_7$ 1.49310 | $\nu_7$ 83.58 |
| $r_{14}$* −19.221 | | | |
| | $d_{14}$ 1.000 | | |
| $r_{15}$* 37.466 | | | |
| | $d_{15}$ 2.868 | $N_8$ 1.84666 | $\nu_8$ 23.83 |
| $r_{16}$ 19.439 | | | |

| Aspherical coefficient |
|---|
| $r_6$: $\epsilon = 0.10000 \times 10$ |
| $A_4 = -0.20833 \times 10^{-4}$ |
| $r_8$: $\epsilon\ 0.10000 \times 10$ |
| $A_4 = -0.83496 \times 10^{-5}$ |
| $A_6 = -0.47661 \times 10^{-6}$ |
| $A_8 = -0.10715 \times 10^{-8}$ |
| $A_{10} = 0.11685 \times 10^{-10}$ |
| $A_{12} = 0.13728 \times 10^{-12}$ |
| $r_9$: $\epsilon = 0.10000 \times 10$ |
| $A_4 = 0.16433 \times 10^{-5}$ |
| $A_6 = 0.11940 \times 10^{-7}$ |
| $A_8 = 0.84074 \times 10^{-10}$ |
| $A_{10} = 0.39897 \times 10^{-12}$ |
| $A_{12} = 0.16964 \times 10^{-14}$ |
| $r_{10}$: $\epsilon = 0.10000 \times 10$ |
| $A_4 = 0.31900 \times 10^{-4}$ |
| $A_6 = 0.88766 \times 10^{-7}$ |
| $A_8 = 0.61897 \times 10^{-9}$ |
| $A_{10} = 0.29539 \times 10^{-12}$ |
| $A_{12} = -0.43688 \times 10^{-13}$ |
| $r_{11}$: $\epsilon = 0.10000 \times 10$ |
| $A_4 = -0.28654 \times 10^{-4}$ |
| $A_6 = -0.19850 \times 10^{-6}$ |
| $A_8 = -0.17410 \times 10^{-8}$ |
| $A_{10} = -0.38472 \times 10^{-11}$ |
| $A_{12} = 0.37983 \times 10^{-13}$ |
| $r_{13}$: $\epsilon = 0.10000 \times 10$ |
| $A_4 = -0.33410 \times 10^{-4}$ |
| $A_6 = -0.19936 \times 10^{-6}$ |
| $A_8 = -0.95660 \times 10^{-9}$ |
| $A_{10} = -0.99511 \times 10^{-11}$ |
| $A_{12} = -0.71292 \times 10^{-13}$ |
| $r_{14}$: $\epsilon = 0.10000 \times 10$ |
| $A_4 = 0.31770 \times 10^{-4}$ |
| $A_6 = 0.67516 \times 10^{-7}$ |
| $A_8 = 0.16717 \times 10^{-8}$ |
| $A_{10} = -0.33929 \times 10^{-10}$ |
| $A_{12} = -0.29236 \times 10^{-12}$ |
| $r_{15}$: $\epsilon = 0.10000 \times 10$ |
| $A_4 = -0.45926 \times 10^{-4}$ |
| $A_6 = -0.19910 \times 10^{-6}$ |
| $A_8 = -0.50390 \times 10^{-8}$ |
| $A_{10} = -0.14139 \times 10^{-10}$ |
| $A_{12} = 0.73896 \times 10^{-13}$ |

TABLE 24

<Embodiment 24>
$f = 28.8 \sim 50.0 \sim 82.5$  $F_{NO} = 4.1 \sim 4.9 \sim 5.8$

| Radius of Curvature | Axial Distance | Refractive Index | Abbe Number |
|---|---|---|---|
| $r_1$ 75.298 | | | |
| | $d_1$ 1.700 | $N_1$ 1.84666 | $\nu_1$ 23.82 |
| $r_2$ 51.000 | | | |
| | $d_2$ 7.700 | $N_2$ 1.67000 | $\nu_2$ 57.07 |
| $r_3$ 416.630 | | | |
| | $d_3$ 0.100 | | |
| $r_4$ 36.191 | | | |
| | $d_4$ 4.000 | $N_3$ 1.77250 | $\nu_3$ 49.77 |
| $r_5$ 39.138 | | | |
| | $d_5$ 0.890~18.880~35.822 | | |
| $r_6$* 24.723 | | | |
| | $d_6$ 2.500 | $N_4$ 1.77250 | $\nu_4$ 49.77 |
| $r_7$ 10.318 | | | |
| | $d_7$ 7.000 | | |
| $r_8$* 344.188 | | | |
| | $d_8$ 2.000 | $N_5$ 1.77250 | $\nu_5$ 49.77 |
| $r_9$ 20.880 | | | |
| | $d_9$ 1.500 | | |
| $r_{10}$* 35.553 | | | |
| | $d_{10}$ 2.000 | $N_6$ 1.80518 | $\nu_6$ 25.43 |
| $r_{11}$* 164.904 | | | |
| | $d_{11}$ 13.375~7.188~3.000 | | |
| $r_{12}$ ∞ (Aperture) | | | |
| | $d_{12}$ 1.000 | | |
| $r_{13}$* 13.625 | | | |
| | $d_{13}$ 8.000 | $N_7$ 1.49310 | $\nu_7$ 83.58 |
| $r_{14}$* −20.689 | | | |
| | $d_{14}$ 1.000 | | |
| $r_{15}$* 26.846 | | | |
| | $d_{15}$ 2.868 | $N_8$ 1.84666 | $\nu_8$ 23.83 |
| $r_{16}$ 16.899 | | | |
| | $d_{16}$ 3.415~10.602~15.790 | | |
| $r_{17}$* 18491.120 | | | |
| | $d_{17}$ 2.000 | $N_9$ 1.77250 | $\nu_9$ 49.77 |
| $r_{18}$ 153.213 | | | |

| Aspherical coefficient |
|---|
| $r_6$: $\epsilon = 0.10000 \times 10$ |
| $A_4 = -0.23949 \times 10^{-4}$ |
| $r_8$: $\epsilon\ 0.10000 \times 10$ |
| $A_4 = -0.58080 \times 10^{-5}$ |
| $A_6 = -0.47870 \times 10^{-6}$ |
| $A_8 = -0.13509 \times 10^{-8}$ |
| $A_{10} = 0.24740 \times 10^{-10}$ |
| $A_{12} = 0.19251 \times 10^{-12}$ |
| $r_{10}$: $\epsilon = 0.10000 \times 10$ |
| $A_4 = 0.34334 \times 10^{-4}$ |
| $A_6 = 0.10817 \times 10^{-6}$ |
| $A_8 = 0.57438 \times 10^{-9}$ |
| $A_{10} = -0.169516 \times 10^{-11}$ |
| $A_{12} = 0.26774 \times 10^{-12}$ |
| $r_{11}$: $\epsilon = 0.10000 \times 10$ |
| $A_4 = -0.26294 \times 10^{-4}$ |
| $A_6 = -0.22057 \times 10^{-6}$ |
| $A_8 = -0.17526 \times 10^{-8}$ |
| $A_{10} = 0.18059 \times 10^{-11}$ |
| $A_{12} = 0.19316 \times 10^{-12}$ |
| $r_{13}$: $\epsilon = 0.10000 \times 10$ |
| $A_4 = -0.31987 \times 10^{-4}$ |
| $A_6 = -0.17876 \times 10^{-6}$ |
| $A_8 = -0.10750 \times 10^{-9}$ |
| $A_{10} = -0.10750 \times 10^{-10}$ |
| $A_{12} = -0.79336 \times 10^{-13}$ |
| $r_{14}$: $\epsilon = 0.10000 \times 10$ |
| $A_4 = 0.32418 \times 10^{-4}$ |
| $A_6 = 0.64190 \times 10^{-7}$ |
| $A_8 = -0.17002 \times 10^{-8}$ |

TABLE 24-continued

<Embodiment 24> f = 28.8~50.0~82.5   $F_{NO} = 4.1$~4.9~5.8

| Radius of Curvature | Axial Distance | Refractive Index | Abbe Number |
|---|---|---|---|

$A_{10} = -0.33892 \times 10^{-10}$
$A_{12} = -0.29127 \times 10^{-12}$
$r_{15}$: $\epsilon = 0.10000 \times 10$
$A_4 = -0.44937 \times 10^{-4}$
$A_6 = -0.20549 \times 10^{-6}$
$A_8 = -0.49906 \times 10^{-8}$
$A_{10} = -0.13284 \times 10^{-10}$
$A_{12} = 0.81384 \times 10^{-13}$
$r_{17}$: $\epsilon = 0.10000 \times 10$
$A_4 = -0.22832 \times 10^{-6}$
$A_6 = -0.37973 \times 10^{-8}$
$A_8 = 0.12261 \times 10^{-9}$

TABLE 25

<Embodiment 25> f = 28.8~50.0~82.5   $F_{NO} = 4.1$~4.9~5.8

| | Radius of Curvature | | Axial Distance | Refractive Index | Abbe Number |
|---|---|---|---|---|---|
| $r_1$ | 80.496 | | | | |
| | | $d_1$ | 1.700 | $N_1$ 1.84666 | $\nu_1$ 23.82 |
| $r_2$ | 51.000 | | | | |
| | | $d_2$ | 10.000 | $N_2$ 1.67000 | $\nu_2$ 57.07 |
| $r_3$ | 1996.645 | | | | |
| | | $d_3$ | 0.100 | | |
| $r_4$ | 31.282 | | | | |
| | | $d_4$ | 4.000 | $N_3$ 1.77250 | $\nu_3$ 49.77 |
| $r_5$ | 33.687 | | | | |
| | | $d_5$ | 0.500~12.466~25.977 | | |
| $r_6^*$ | 25.225 | | | | |
| | | $d_6$ | 2.500 | $N_4$ 1.77250 | $\nu_4$ 49.77 |
| $r_7$ | 11.185 | | | | |
| | | $d_7$ | 8.000 | | |
| $r_8^*$ | −212.386 | | | | |
| | | $d_8$ | 2.000 | $N_5$ 1.77250 | $\nu_5$ 49.77 |
| $r_9^*$ | 16.958 | | | | |
| | | $d_9$ | 1.482 | | |
| $r_{10}^*$ | 39.912 | | | | |
| | | $d_{10}$ | 2.000 | $N_6$ 1.80518 | $\nu_6$ 25.43 |
| $r_{11}^*$ | −182.946 | | | | |
| | | $d_{11}$ | 8.501~4.480~3.000 | | |
| $r_{12}$ | ∞ (Aperture) | | | | |
| | | $d_{12}$ | 7.000~4.000~1.000 | | |
| $r_{13}^*$ | 15.304 | | | | |
| | | $d_{13}$ | 8.000 | $N_7$ 1.49310 | $\nu_7$ 83.58 |
| $r_{14}^*$ | −19.147 | | | | |
| | | $d_{14}$ | 1.000~2.000~3.000 | | |
| $r_{15}^*$ | 34.724 | | | | |
| | | $d_{15}$ | 2.868 | $N_8$ 1.84666 | $\nu_8$ 23.83 |
| $r_{16}$ | 19.097 | | | | |

Aspherical coefficient

$r_6$: $\epsilon = 0.10000 \times 10$
$A_4 = -0.17046 \times 10^{-4}$
$r_8$: $\epsilon = 0.10000 \times 10$
$A_4 = -0.12590 \times 10^{-4}$
$A_6 = -0.48651 \times 10^{-6}$
$A_8 = -0.11668 \times 10^{-8}$
$A_{10} = 0.10657 \times 10^{-10}$
$A_{12} = 0.12705 \times 10^{-12}$
$r_9$: $\epsilon = 0.10000 \times 10$
$A_4 = 0.31512 \times 10^{-5}$
$A_6 = -0.10468 \times 10^{-7}$
$A_8 = -0.94901 \times 10^{-10}$
$A_{10} = -0.66189 \times 10^{-12}$
$A_{12} = -0.35532 \times 10^{-14}$
$r_{10}$: $\epsilon = 0.10000 \times 10$
$A_4 = 0.27826 \times 10^{-4}$
$A_6 = 0.10050 \times 10^{-6}$
$A_8 = 0.75087 \times 10^{-9}$
$A_{10} = 0.12803 \times 10^{-11}$
$A_{12} = -0.37693 \times 10^{-13}$
$r_{11}$: $\epsilon = 0.10000 \times 10$
$A_4 = -0.27650 \times 10^{-4}$
$A_6 = -0.22315 \times 10^{-6}$

TABLE 25-continued

<Embodiment 25>

$A_8 = -0.18441 \times 10^{-8}$
$A_{10} = -0.43417 \times 10^{-11}$
$A_{12} = 0.35357 \times 10^{-13}$
$r_{13}$: $\epsilon = 0.10000 \times 10$
$A_4 = -0.31806 \times 10^{-4}$
$A_6 = -0.12051 \times 10^{-6}$
$A_8 = -0.10561 \times 10^{-8}$
$A_{10} = -0.14270 \times 10^{-10}$
$A_{12} = -0.11293 \times 10^{-12}$
$r_{14}$: $\epsilon = 0.10000 \times 10$
$A_4 = 0.22755 \times 10^{-4}$
$A_6 = 0.69468 \times 10^{-7}$
$A_8 = -0.10667 \times 10^{-8}$
$A_{10} = -0.26522 \times 10^{-10}$
$A_{12} = -0.23192 \times 10^{-12}$
$r_{15}$: $\epsilon = 0.10000 \times 10$
$A_4 = -0.31330 \times 10^{-4}$
$A_6 = -0.11349 \times 10^{-6}$
$A_8 = -0.45684 \times 10^{-8}$
$A_{10} = -0.11513 \times 10^{-10}$
$A_{12} = 0.87211 \times 10^{-13}$

TABLE 26

<Embodiment 26> f = 28.8~50.0~82.5   $F_{NO} = 4.1$~5.2~5.8

| | Radius of Curvature | | Axial Distance | Refractive Index | Abbe Number |
|---|---|---|---|---|---|
| $r_1$ | 71.567 | | | | |
| | | $d_1$ | 1.200 | $N_1$ 1.84666 | $\nu_1$ 23.82 |
| $r_2$ | 42.000 | | | | |
| | | $d_2$ | 5.000 | $N_2$ 1.67000 | $\nu_2$ 57.07 |
| $r_3$ | 125.805 | | | | |
| | | $d_3$ | 0.100 | | |
| $r_4$ | 26.527 | | | | |
| | | $d_4$ | 5.000 | $N_3$ 1.69680 | $\nu_3$ 56.47 |
| $r_5^*$ | 77.715 | | | | |
| | | $d_5$ | 1.000~6.099~12.333 | | |
| $r_6^*$ | 45.000 | | | | |
| | | $d_6$ | 1.700 | $N_4$ 1.77250 | $\nu_4$ 49.77 |
| $r_7$ | 10.494 | | | | |
| | | $d_7$ | 6.000 | | |
| $r_8^*$ | 1028.362 | | | | |
| | | $d_8$ | 2.500 | $N_5$ 1.72000 | $\nu_5$ 54.71 |
| $r_9^*$ | 22.712 | | | | |
| | | $d_9$ | 1.500 | | |
| $r_{10}^*$ | 32.159 | | | | |
| | | $d_{10}$ | 2.500 | $N_6$ 1.84666 | $\nu_6$ 23.82 |
| $r_{11}^*$ | 163.091 | | | | |
| | | $d_{11}$ | 11.811~6.506~1.500 | | |
| $r_{12}$ | ∞ (Aperture) | | | | |
| | | $d_{12}$ | 7.000~3.000~1.000 | | |
| $r_{13}^*$ | 16.164 | | | | |
| | | $d_{13}$ | 8.000 | $N_7$ 1.51680 | $\nu_7$ 64.20 |
| $r_{14}$ | −13.000 | | | | |
| | | $d_{14}$ | 2.000 | $N_8$ 1.65446 | $\nu_8$ 33.86 |
| $r_{15}^*$ | −22.981 | | | | |
| | | $d_{15}$ | 1.336 | | |
| $r_{16}^*$ | 41.898 | | | | |
| | | $d_{16}$ | 3.830 | $N_9$ 1.84666 | $\nu_9$ 23.83 |
| $r_{17}$ | 23.841 | | | | |

Aspherical coefficient

$r_5$: $\epsilon = 0.10000 \times 10$
$A_4 = 0.87409 \times 10^{-6}$
$A_6 = -0.13311 \times 10^{-8}$
$A_8 = 0.19402 \times 10^{-11}$
$r_6$: $\epsilon = 0.10000 \times 10$
$A_4 = -0.62856 \times 10^{-5}$
$r_8$: $\epsilon = 0.10000 \times 10$
$A_4 = -0.27796 \times 10^{-4}$
$A_6 = 0.29925 \times 10^{-7}$
$A_8 = 0.74042 \times 10^{-9}$
$r_9$: $\epsilon = 0.10000 \times 10$
$A_4 = -0.24344 \times 10^{-4}$
$A_6 = 0.31219 \times 10^{-7}$
$A_8 = 0.28284 \times 10^{-8}$
$r_{10}$: $\epsilon = 0.10000 \times 10$

TABLE 26-continued

<Embodiment 26>

|  |  |
|---|---|
|  | $A_4 = -0.17966 \times 10^{-4}$ |
|  | $A_6 = 0.31608 \times 10^{-7}$ |
|  | $A_8 = -0.14104 \times 10^{-8}$ |
| $r_{11}$: | $\epsilon = 0.10000 \times 10$ |
|  | $A_4 = -0.50795 \times 10^{-4}$ |
|  | $A_6 = -0.70049 \times 10^{-7}$ |
|  | $A_8 = -0.22029 \times 10^{-8}$ |
| $r_{13}$: | $\epsilon = 0.10000 \times 10$ |
|  | $A_4 = -0.14991 \times 10^{-4}$ |
|  | $A_6 = -0.15254 \times 10^{-6}$ |
|  | $A_8 = -0.23420 \times 10^{-9}$ |
| $r_{15}$: | $\epsilon = 0.10000 \times 10$ |
|  | $A_4 = -0.31119 \times 10^{-4}$ |
|  | $A_6 = 0.29796 \times 10^{-7}$ |
|  | $A_8 = 0.56235 \times 10^{-9}$ |
| $r_{16}$: | $\epsilon = 0.10000 \times 10$ |
|  | $A_4 = -0.63314 \times 10^{-4}$ |
|  | $A_6 = -0.19189 \times 10^{-6}$ |
|  | $A_8 = 0.17923 \times 10^{-9}$ |

TABLE 27

<Embodiment 27>

$f = 28.8 \sim 50.0 \sim 82.5$    $F_{NO} = 4.1 \sim 5.2 \sim 5.8$

| Radius of Curvature | Axial Distance | Refractive Index | Abbe Number |
|---|---|---|---|
| $r_1$ 64.316 |  |  |  |
|  | $d_1$ 1.200 | $N_1$ 1.84666 | $\nu_1$ 23.82 |
| $r_2$ 42.904 |  |  |  |
|  | $d_2$ 6.500 | $N_2$ 1.67000 | $\nu_2$ 57.07 |
| $r_3$ 361.175 |  |  |  |
|  | $d_3$ 0.100 |  |  |
| $r_4$ 27.590 |  |  |  |
|  | $d_4$ 4.000 | $N_3$ 1.69680 | $\nu_3$ 56.47 |
| $r_5^*$ 39.780 |  |  |  |
|  | $d_5$ 1.500~6.027~15.774 |  |  |
| $r_6^*$ 48.447 |  |  |  |
|  | $d_6$ 1.700 | $N_4$ 1.85000 | $\nu_4$ 40.04 |
| $r_7$ 11.953 |  |  |  |
|  | $d_7$ 6.000 |  |  |
| $r_8^*$ 472.775 |  |  |  |
|  | $d_8$ 2.500 | $N_5$ 1.72000 | $\nu_5$ 54.71 |
| $r_9^*$ 20.713 |  |  |  |
|  | $d_9$ 1.500 |  |  |
| $r_{10}^*$ 30.876 |  |  |  |
|  | $d_{10}$ 2.500 | $N_6$ 1.80518 | $\nu_6$ 25.43 |
| $r_{11}^*$ 454.370 |  |  |  |
|  | $d_{11}$ 11.280~5.427~1.500 |  |  |
| $r_{12}$ ∞ (Aperture) |  |  |  |
|  | $d_{12}$ 7.000~3.000~1.000 |  |  |
| $r_{13}^*$ 18.031 |  |  |  |
|  | $d_{13}$ 6.000 | $N_7$ 1.51823 | $\nu_7$ 58.96 |
| $r_{14}$ −37.982 |  |  |  |
|  | $d_{14}$ 0.200 |  |  |
| $r_{15}$ −34.529 |  |  |  |
|  | $d_{15}$ 2.000 | $N_8$ 1.68150 | $\nu_8$ 36.64 |
| $r_{16}^*$ −77.478 |  |  |  |
|  | $d_{16}$ 5.000~2.500~0.500 |  |  |
| $r_{17}^*$ 31.083 |  |  |  |
|  | $d_{17}$ 3.000 | $N_9$ 1.51823 | $\nu_9$ 58.96 |
| $r_{18}$ −32.429 |  |  |  |

TABLE 27-continued

<Embodiment 27>

|  |  |  |  |  |
|---|---|---|---|---|
|  | $d_{18}$ 1.500 |  |  |  |
| $r_{19}$ 49.174 |  |  |  |  |
|  | $d_{19}$ 2.000 | $N_{10}$ 1.84666 | $\nu_{10}$ 23.82 |  |
| $r_{20}$ 17.626 |  |  |  |  |

Aspherical coefficient

| $r_5$: | $\epsilon = 0.10000 \times 10$ |
|---|---|
|  | $A_4 = -0.86073 \times 10^{-7}$ |
|  | $A_6 = -0.96418 \times 10^{-10}$ |
|  | $A_8 = -0.14259 \times 10^{-12}$ |
| $r_6$: | $\epsilon = 0.10000 \times 10$ |
|  | $A_4 = -0.13820 \times 10^{-4}$ |
| $r_8$: | $\epsilon = 0.10000 \times 10$ |
|  | $A_4 = -0.26718 \times 10^{-4}$ |
|  | $A_6 = 0.40342 \times 10^{-7}$ |
|  | $A_8 = 0.13060 \times 10^{-8}$ |
| $r_9$: | $\epsilon = 0.10000 \times 10$ |
|  | $A_4 = -0.45869 \times 10^{-4}$ |
|  | $A_6 = 0.18981 \times 10^{-7}$ |
|  | $A_8 = 0.19735 \times 10^{-8}$ |
| $r_{10}$: | $\epsilon = 0.10000 \times 10$ |
|  | $A_4 = -0.21466 \times 10^{-4}$ |
|  | $A_6 = 0.64402 \times 10^{-7}$ |
|  | $A_8 = -0.60869 \times 10^{-9}$ |
| $r_{11}$: | $\epsilon = 0.10000 \times 10$ |
|  | $A_4 = -0.45505 \times 10^{-4}$ |
|  | $A_6 = 0.65520 \times 10^{-7}$ |
|  | $A_8 = -0.14962 \times 10^{-8}$ |
| $r_{13}$: | $\epsilon = 0.10000 \times 10$ |
|  | $A_4 = 0.33869 \times 10^{-5}$ |
|  | $A_6 = 0.70188 \times 10^{-7}$ |
|  | $A_8 = 0.23429 \times 10^{-8}$ |
| $r_{16}$: | $\epsilon = 0.10000 \times 10$ |
|  | $A_4 = 0.30011 \times 10^{-4}$ |
|  | $A_6 = 0.18399 \times 10^{-6}$ |
|  | $A_8 = 0.25275 \times 10^{-8}$ |
| $r_{17}$: | $\epsilon = 0.10000 \times 10$ |
|  | $A_4 = -0.34439 \times 10^{-4}$ |
|  | $A_6 = 0.51232 \times 10^{-7}$ |
|  | $A_8 = 0.56370 \times 10^{-10}$ |

TABLE 28

(Conditions (1) (2))

|  | $\phi_1/\phi_w$ | $\phi_3/\phi_w$ |
|---|---|---|
| Embodiment 1 | 0.418 | 1.033 |
| Embodiment 2 | 0.468 | 1.152 |
| Embodiment 3 | 0.461 | 1.094 |
| Embodiment 4 | 0.486 | 1.206 |

TABLE 29

|  | $\dfrac{(\phi_w \cdot \phi_T)^{\frac{1}{2}}}{\beta \cdot \phi_1}$ | $\dfrac{(\phi_w \cdot \phi_T)^{\frac{1}{2}}}{\beta \cdot \phi_3}$ |
|---|---|---|
| Embodiment 1 | 0.455 | 0.192 |
| Embodiment 2 | 0.431 | 0.174 |
| Embodiment 3 | 0.448 | 0.182 |
| Embodiment 4 | 0.502 | 0.203 |

TABLE 30

<Embodiment 1>

| | (I) | (II) | | | (III) | | |
|---|---|---|---|---|---|---|---|
| Y | 2nd surface | 5th surface | 7th surface | 8th surface | 9th surface | 11th surface | 12th surface |
| 0.1 Ymax | $-3.12 \times 10^{-7}$ | $-6.53 \times 10^{-6}$ | $4.48 \times 10^{-6}$ | $-4.40 \times 10^{-6}$ | $-9.58 \times 10^{-7}$ | $2.21 \times 10^{-6}$ | $-2.99 \times 10^{-6}$ |
| 0.2 Ymax | $-2.50 \times 10^{-6}$ | $-5.03 \times 10^{-5}$ | $3.56 \times 10^{-5}$ | $-3.52 \times 10^{-5}$ | $-7.68 \times 10^{-6}$ | $1.77 \times 10^{-5}$ | $-2.41 \times 10^{-5}$ |
| 0.3 Ymax | $-8.47 \times 10^{-6}$ | $-1.60 \times 10^{-4}$ | $1.19 \times 10^{-4}$ | $-1.18 \times 10^{-4}$ | $-2.58 \times 10^{-5}$ | $5.94 \times 10^{-5}$ | $-8.17 \times 10^{-5}$ |
| 0.4 Ymax | $-2.02 \times 10^{-5}$ | $-3.52 \times 10^{-4}$ | $2.81 \times 10^{-4}$ | $-2.81 \times 10^{-4}$ | $-6.15 \times 10^{-5}$ | $1.4 \times 10^{-4}$ | $-1.96 \times 10^{-4}$ |
| 0.5 Ymax | $-3.98 \times 10^{-5}$ | $-6.26 \times 10^{-4}$ | $5.46 \times 10^{-4}$ | $-5.51 \times 10^{-4}$ | $-1.23 \times 10^{-4}$ | $2.72 \times 10^{-4}$ | $-3.87 \times 10^{-4}$ |
| 0.6 Ymax | $-6.97 \times 10^{-5}$ | $-9.78 \times 10^{-4}$ | $9.40 \times 10^{-4}$ | $-9.63 \times 10^{-4}$ | $-2.21 \times 10^{-4}$ | $4.63 \times 10^{-4}$ | $-6.79 \times 10^{-4}$ |
| 0.7 Ymax | $-1.13 \times 10^{-4}$ | $-1.40 \times 10^{-3}$ | $1.50 \times 10^{-3}$ | $-1.57 \times 10^{-3}$ | $-3.73 \times 10^{-4}$ | $7.22 \times 10^{-4}$ | $-1.10 \times 10^{-3}$ |
| 0.8 Ymax | $-1.72 \times 10^{-4}$ | $-1.91 \times 10^{-3}$ | $2.28 \times 10^{-3}$ | $-2.43 \times 10^{-3}$ | $-6.03 \times 10^{-4}$ | $1.05 \times 10^{-3}$ | $-1.67 \times 10^{-3}$ |
| 0.9 Ymax | $-2.54 \times 10^{-4}$ | $-2.54 \times 10^{-3}$ | $3.38 \times 10^{-3}$ | $-3.67 \times 10^{-3}$ | $-9.39 \times 10^{-4}$ | $1.45 \times 10^{-3}$ | $-2.43 \times 10^{-3}$ |

TABLE 30-continued

<Embodiment 1>

| | (I) | (II) | | | (III) | | |
|---|---|---|---|---|---|---|---|
| Y | 2nd surface | 5th surface | 7th surface | 8th surface | 9th surface | 11th surface | 12th surface |
| 1.0 Ymax | $-3.62 \times 10^{-4}$ | $-3.41 \times 10^{-3}$ | $4.95 \times 10^{-3}$ | $-5.42 \times 10^{-3}$ | $-1.42 \times 10^{-3}$ | $1.91 \times 10^{-3}$ | $-3.42 \times 10^{-3}$ |

TABLE 31

<Embodiment 2>

| | (I) | | | (II) | | |
|---|---|---|---|---|---|---|
| Y | 2nd surface | 3rd surface | 4th surface | 5th surface | 7th surface | 8th surface |
| 0.1 Ymax | $-6.28 \times 10^{-7}$ | $-9.78 \times 10^{-8}$ | $3.38 \times 10^{-7}$ | $-1.97 \times 10^{-6}$ | $4.21 \times 10^{-6}$ | $-5.60 \times 10^{-6}$ |
| 0.2 Ymax | $-5.07 \times 10^{-6}$ | $-7.82 \times 10^{-7}$ | $2.63 \times 10^{-6}$ | $-1.47 \times 10^{-5}$ | $3.35 \times 10^{-5}$ | $-4.45 \times 10^{-5}$ |
| 0.3 Ymax | $-1.74 \times 10^{-5}$ | $-2.57 \times 10^{-6}$ | $8.68 \times 10^{-6}$ | $-4.38 \times 10^{-5}$ | $1.11 \times 10^{-4}$ | $-1.49 \times 10^{-4}$ |
| 0.4 Ymax | $-4.19 \times 10^{-5}$ | $-5.98 \times 10^{-6}$ | $2.08 \times 10^{-5}$ | $-8.58 \times 10^{-5}$ | $2.57 \times 10^{-4}$ | $-3.49 \times 10^{-4}$ |
| 0.5 Ymax | $-8.33 \times 10^{-5}$ | $-1.17 \times 10^{-5}$ | $3.73 \times 10^{-5}$ | $-1.28 \times 10^{-4}$ | $4.88 \times 10^{-4}$ | $-6.73 \times 10^{-4}$ |
| 0.6 Ymax | $-1.46 \times 10^{-4}$ | $-2.14 \times 10^{-5}$ | $6.12 \times 10^{-5}$ | $-1.50 \times 10^{-4}$ | $8.14 \times 10^{-4}$ | $-1.15 \times 10^{-3}$ |
| 0.7 Ymax | $-2.35 \times 10^{-4}$ | $-3.80 \times 10^{-5}$ | $9.18 \times 10^{-5}$ | $-1.26 \times 10^{-4}$ | $1.25 \times 10^{-3}$ | $-1.82 \times 10^{-3}$ |
| 0.8 Ymax | $-3.50 \times 10^{-4}$ | $-6.78 \times 10^{-5}$ | $1.29 \times 10^{-4}$ | $-2.97 \times 10^{-5}$ | $1.80 \times 10^{-3}$ | $-2.74 \times 10^{-3}$ |
| 0.9 Ymax | $-4.92 \times 10^{-4}$ | $-1.22 \times 10^{-4}$ | $1.71 \times 10^{-4}$ | $1.63 \times 10^{-4}$ | $2.53 \times 10^{-3}$ | $-3.99 \times 10^{-3}$ |
| 1.0 Ymax | $-6.52 \times 10^{-4}$ | $-2.20 \times 10^{-4}$ | $2.20 \times 10^{-4}$ | $4.68 \times 10^{-4}$ | $3.50 \times 10^{-3}$ | $-5.71 \times 10^{-3}$ |

| | (III) | | |
|---|---|---|---|
| Y | 9th surface | 11th surface | 12th surface |
| 0.1 Ymax | $-1.08 \times 10^{-6}$ | $8.23 \times 10^{-7}$ | $-2.30 \times 10^{-6}$ |
| 0.2 Ymax | $-8.65 \times 10^{-6}$ | $6.67 \times 10^{-6}$ | $-1.84 \times 10^{-5}$ |
| 0.3 Ymax | $-2.91 \times 10^{-5}$ | $2.28 \times 10^{-5}$ | $-6.28 \times 10^{-5}$ |
| 0.4 Ymax | $-6.96 \times 10^{-5}$ | $5.50 \times 10^{-5}$ | $-1.51 \times 10^{-4}$ |
| 0.5 Ymax | $-1.39 \times 10^{-4}$ | $1.10 \times 10^{-4}$ | $-3.00 \times 10^{-4}$ |
| 0.6 Ymax | $-2.51 \times 10^{-4}$ | $1.95 \times 10^{-4}$ | $-5.32 \times 10^{-4}$ |
| 0.7 Ymax | $-4.25 \times 10^{-4}$ | $3.20 \times 10^{-4}$ | $-8.69 \times 10^{-4}$ |
| 0.8 Ymax | $-6.95 \times 10^{-4}$ | $4.95 \times 10^{-4}$ | $-1.34 \times 10^{-3}$ |
| 0.9 Ymax | $-1.07 \times 10^{-3}$ | $7.35 \times 10^{-4}$ | $-1.99 \times 10^{-3}$ |
| 1.0 Ymax | $-1.61 \times 10^{-3}$ | $1.06 \times 10^{-3}$ | $-2.86 \times 10^{-3}$ |

TABLE 32

<Embodiment 3>

| | (I) | | | (II) | | |
|---|---|---|---|---|---|---|
| Y | 2nd surface | 3rd surface | 4th surface | 5th surface | 7th surface | 8th surface |
| 0.1 Ymax | $-6.64 \times 10^{-7}$ | $-1.17 \times 10^{-7}$ | $1.50 \times 10^{-7}$ | $-1.89 \times 10^{-6}$ | $3.24 \times 10^{-7}$ | $-4.49 \times 10^{-6}$ |
| 0.2 Ymax | $-5.33 \times 10^{-6}$ | $-9.35 \times 10^{-7}$ | $1.13 \times 10^{-6}$ | $-1.40 \times 10^{-5}$ | $2.54 \times 10^{-6}$ | $-3.56 \times 10^{-5}$ |
| 0.3 Ymax | $-1.80 \times 10^{-5}$ | $-3.22 \times 10^{-6}$ | $3.43 \times 10^{-6}$ | $-4.11 \times 10^{-5}$ | $8.29 \times 10^{-6}$ | $-1.18 \times 10^{-4}$ |
| 0.4 Ymax | $-4.27 \times 10^{-5}$ | $-7.96 \times 10^{-6}$ | $6.87 \times 10^{-6}$ | $-7.86 \times 10^{-5}$ | $1.88 \times 10^{-5}$ | $-2.74 \times 10^{-4}$ |
| 0.5 Ymax | $-8.22 \times 10^{-5}$ | $-1.68 \times 10^{-5}$ | $1.03 \times 10^{-5}$ | $-1.12 \times 10^{-4}$ | $3.44 \times 10^{-5}$ | $-5.19 \times 10^{-4}$ |
| 0.6 Ymax | $-1.37 \times 10^{-4}$ | $-3.29 \times 10^{-5}$ | $1.12 \times 10^{-5}$ | $-1.21 \times 10^{-4}$ | $5.46 \times 10^{-5}$ | $-8.69 \times 10^{-4}$ |
| 0.7 Ymax | $-2.03 \times 10^{-4}$ | $-6.19 \times 10^{-5}$ | $5.73 \times 10^{-6}$ | $-8.03 \times 10^{-5}$ | $7.81 \times 10^{-5}$ | $-1.33 \times 10^{-3}$ |
| 0.8 Ymax | $-2.67 \times 10^{-4}$ | $-1.14 \times 10^{-4}$ | $-1.18 \times 10^{-5}$ | $-3.30 \times 10^{-5}$ | $1.03 \times 10^{-4}$ | $-1.93 \times 10^{-3}$ |
| 0.9 Ymax | $-3.03 \times 10^{-4}$ | $-2.08 \times 10^{-4}$ | $-4.89 \times 10^{-5}$ | $2.35 \times 10^{-4}$ | $1.26 \times 10^{-4}$ | $-2.68 \times 10^{-3}$ |
| 1.0 Ymax | $-2.62 \times 10^{-4}$ | $-3.70 \times 10^{-4}$ | $-1.15 \times 10^{-4}$ | $5.25 \times 10^{-4}$ | $1.48 \times 10^{-4}$ | $-3.64 \times 10^{-3}$ |

| | (III) | | |
|---|---|---|---|
| Y | 9th surface | 11th surface | 12th surface |
| 0.1 Ymax | $-9.11 \times 10^{-7}$ | $8.23 \times 10^{-7}$ | $-2.30 \times 10^{-6}$ |
| 0.2 Ymax | $-7.27 \times 10^{-6}$ | $6.67 \times 10^{-6}$ | $-1.84 \times 10^{-5}$ |
| 0.3 Ymax | $-2.44 \times 10^{-5}$ | $2.27 \times 10^{-5}$ | $-6.26 \times 10^{-5}$ |
| 0.4 Ymax | $-5.83 \times 10^{-5}$ | $5.45 \times 10^{-5}$ | $-1.50 \times 10^{-4}$ |
| 0.5 Ymax | $-1.16 \times 10^{-4}$ | $1.08 \times 10^{-4}$ | $-2.98 \times 10^{-4}$ |
| 0.6 Ymax | $-2.09 \times 10^{-4}$ | $1.90 \times 10^{-4}$ | $-5.26 \times 10^{-4}$ |
| 0.7 Ymax | $-3.53 \times 10^{-4}$ | $3.08 \times 10^{-4}$ | $-8.57 \times 10^{-4}$ |
| 0.8 Ymax | $-5.70 \times 10^{-4}$ | $4.70 \times 10^{-4}$ | $-1.32 \times 10^{-3}$ |
| 0.9 Ymax | $-8.86 \times 10^{-4}$ | $6.84 \times 10^{-4}$ | $-1.96 \times 10^{-3}$ |
| 1.0 Ymax | $-1.34 \times 10^{-3}$ | $9.61 \times 10^{-4}$ | $-2.81 \times 10^{-3}$ |

TABLE 33

<Embodiment 4>

| | (I) | (II) | | | III | | |
|---|---|---|---|---|---|---|---|
| Y | 2nd surface | 5th surface | 7th surface | 8th surface | 9th surface | 11th surface | 12th surface |
| 0.1 Ymax | $-5.13 \times 10^{-7}$ | $-8.03 \times 10^{-6}$ | $5.89 \times 10^{-6}$ | $-5.66 \times 10^{-6}$ | $-9.58 \times 10^{-7}$ | $2.50 \times 10^{-6}$ | $-3.35 \times 10^{-6}$ |
| 0.2 Ymax | $-4.13 \times 10^{-6}$ | $-6.22 \times 10^{-5}$ | $4.71 \times 10^{-5}$ | $-4.52 \times 10^{-5}$ | $-7.23 \times 10^{-6}$ | $1.99 \times 10^{-5}$ | $-2.69 \times 10^{-5}$ |
| 0.3 Ymax | $-1.41 \times 10^{-5}$ | $-1.98 \times 10^{-4}$ | $1.58 \times 10^{-4}$ | $-1.53 \times 10^{-4}$ | $-2.55 \times 10^{-5}$ | $6.68 \times 10^{-5}$ | $-9.15 \times 10^{-5}$ |

TABLE 33-continued

<Embodiment 4>

| | (I) | (II) | | | III | | |
|---|---|---|---|---|---|---|---|
| Y | 2nd surface | 5th surface | 7th surface | 8th surface | 9th surface | 11th surface | 12th surface |
| 0.4 Ymax | $-3.40 \times 10^{-5}$ | $-4.37 \times 10^{-4}$ | $3.71 \times 10^{-4}$ | $-3.63 \times 10^{-4}$ | $-6.05 \times 10^{-5}$ | $1.57 \times 10^{-4}$ | $-2.19 \times 10^{-4}$ |
| 0.5 Ymax | $-6.79 \times 10^{-5}$ | $-7.79 \times 10^{-4}$ | $7.22 \times 10^{-4}$ | $-7.17 \times 10^{-4}$ | $-1.21 \times 10^{-4}$ | $3.04 \times 10^{-4}$ | $-4.35 \times 10^{-4}$ |
| 0.6 Ymax | $-1.21 \times 10^{-4}$ | $-1.21 \times 10^{-3}$ | $1.25 \times 10^{-3}$ | $-1.27 \times 10^{-3}$ | $-2.20 \times 10^{-4}$ | $5.17 \times 10^{-4}$ | $-7.66 \times 10^{-4}$ |
| 0.7 Ymax | $-1.98 \times 10^{-4}$ | $-1.73 \times 10^{-3}$ | $2.01 \times 10^{-3}$ | $-2.10 \times 10^{-3}$ | $-3.79 \times 10^{-4}$ | $8.04 \times 10^{-4}$ | $-1.24 \times 10^{-3}$ |
| 0.8 Ymax | $-3.07 \times 10^{-4}$ | $-2.31 \times 10^{-3}$ | $3.11 \times 10^{-3}$ | $-3.34 \times 10^{-3}$ | $-6.27 \times 10^{-4}$ | $1.17 \times 10^{-3}$ | $-1.90 \times 10^{-3}$ |
| 0.9 Ymax | $-4.56 \times 10^{-4}$ | $-2.97 \times 10^{-3}$ | $4.71 \times 10^{-3}$ | $-5.20 \times 10^{-3}$ | $-1.00 \times 10^{-3}$ | $1.59 \times 10^{-3}$ | $-2.78 \times 10^{-3}$ |
| 1.0 Ymax | $-6.57 \times 10^{-4}$ | $-3.79 \times 10^{-3}$ | $7.14 \times 10^{-3}$ | $-8.01 \times 10^{-3}$ | $-1.56 \times 10^{-3}$ | $2.07 \times 10^{-3}$ | $-3.94 \times 10^{-3}$ |

TABLE 34

| | Condition (14) | Condition (15) | Condition (16) | Condition (17) | Condition (18) | Condition (19) |
|---|---|---|---|---|---|---|
| Embodiment 5 | −1.260 | 0.609 | 2.097 | 0.386 | 0.449 | 0.072 |
| Embodiment 6 | −1.210 | 0.751 | 2.279 | 0.340 | 0.452 | 0.133 |
| Embodiment 7 | −1.210 | 0.751 | 2.279 | 0.348 | 0.470 | 0.058 |
| Embodiment 8 | −1.260 | 0.609 | 2.096 | 0.375 | 0.450 | 0.161 |
| Embodiment 9 | −1.260 | 0.609 | 2.097 | 0.372 | 0.463 | 0.070 |
| Embodiment 10 | −1.211 | 0.751 | 2.279 | 0.332 | 0.452 | 0.137 |
| Embodiment 11 | −1.210 | 0.751 | 2.279 | 0.343 | 0.463 | 0.062 |
| Embodiment 12 | −1.260 | 0.609 | 2.097 | 0.379 | 0.430 | 0.159 |
| Embodiment 13 | −1.210 | 0.751 | 2.279 | 0.339 | 0.445 | 0.136 |
| Embodiment 14 | −1.210 | 0.751 | 2.279 | 0.325 | 0.461 | 0.132 |
| Embodiment 15 | −0.745 | 0.751 | 2.257 | 0.570 | 0.607 | 0.074 |
| Embodiment 16 | −0.756 | 0.751 | 1.641 | 0.527 | 0.613 | 0.078 |
| Embodiment 17 | −0.719 | 0.751 | 2.257 | 0.571 | 0.612 | 0.077 |
| Embodiment 18 | −1.008 | 0.751 | 1.026 | 0.309 | 0.523 | 0.165 |
| Embodiment 19 | −0.763 | 0.751 | 2.477 | 0.608 | 0.630 | 0.101 |
| Embodiment 20 | −1.008 | 0.751 | 1.282 | 0.335 | 0.525 | 0.126 |
| Embodiment 21 | −1.31 | 0.75 | 2.48 | 0.60 | 0.64 | — |

TABLE 35

| | \|f12,W\|/fW | \|β 2, W\| | \|β S, W\| |
|---|---|---|---|
| Embodiment 22 | — | 0.257 | — |
| Embodiment 23 | — | — | 1.210 |
| Embodiment 24 | 0.827 | — | — |
| Embodiment 25 | — | — | 1.210 |
| Embodiment 26 | 0.992 | — | — |
| Embodiment 27 | — | 0.457 | — |

TABLE 36

| | Minimum Object Distance | Movement Amount at the Shortest Focal Length Condition | Movement Amount at the Longest Focal Length Condition |
|---|---|---|---|
| Embodiment 22 | 1.0 | 0.895 | 1.956 |
| Embodiment 23 | 1.5 | 1.407 | 1.564 |
| Embodiment 24 | 1.5 | 0.392 | 1.220 |
| Embodiment 25 | 1.5 | L3 0.890 | L3 1.165 |
| | | L4 0.979 | L4 1.281 |
| Embodiment 26 | 1.5 | L1 0.528 | L1 1.635 |
| | | L2 0.581 | L2 1.799 |
| Embodiment 27 | 1.5 | 0.686 | 2.544 |

Obviously, many modifications and variations of the present invention are possible in light of the above teachings. It is therefore to be understood that within the scope of the appended claims, the invention may be practiced other than as specifically described.

What we claim is:

1. A compact zoom lens system comprising, from the object side to the image side:
   a first lens component of a positive refractive power, said first lens component being shifted toward the object side monotonously in a zooming operation from a shorter focal length side to a longer focal length side;
   a second lens component of a negative refractive power; and
   a third lens component of a positive refractive power, said third lens component being shifted toward the object side monotonously in the zooming operation from the shorter focal length side to the longer focal length side and having at least two aspherical surfaces;
   and wherein the zoom lens system fulfills the following conditions:

$0.3 < \phi_1/\phi_W < 1.0$ $0.8 < \phi_3/\phi_W < 1.8$ wherein, $\phi_1$ and $\phi_3$ represent refractive powers of the first and third lens components, respectively, and $\phi_W$ represents a refractive power of the zoon lens system at the shortest focal length condition.

2. A compact zoom lens system claimed in claim 1, wherein the third lens component has a lens element whose both side surfaces are aspherical.

3. A compact zoom lens system claimed in claim 1, wherein the third lens component consists of from the object side to the image side a positive lens element whose object side surface is aspherical and a negative lens element whose image side surface is aspherical.

4. A compact zoom lens system comprising, from the object side to the image side:
- a first lens component of a positive refractive power;
- a second lens component of a negative refractive power with a variable air space between the first and second lens components; and
- a third lens component of a positive refractive power with a variable air space between the second and third lens components,
- and wherein at least one lens element whose both side surfaces are aspherical is included in the first or second lens components and the zoom lens system fulfills the following condition:

$$-2.0 < fW/f12,W < -0.55$$

wherein,
fW represents a focal length of the zoom lens system at the shortest focal length condition, and f12,W represents a composite focal length of the first and second lens components.

5. A compact zoom lens system claimed in claim 4, wherein the first lens component has the lens element whose both side surfaces are aspherical.

6. A compact zoom lens system claimed in claim 5, wherein the lens element is arranged at the most image side end in the first lens component.

7. A compact zoom lens system claimed in claim 4, wherein the second lens component has the lens element whose both side surfaces are aspherical.

8. A compact zoom lens system claimed in claim 7, wherein the second lens component consists of from the object side to the image side a negative lens element and a positive lens element whose both side surfaces are aspherical.

9. A compact zoom lens system comprising from the object side to the image side:
- a first lens component of a positive refractive power;
- a second lens component of a negative refractive power with a variable air space between the first and second lens components; and
- a third lens component of a positive refractive power with a variable air space between the second and third lens components,
- and wherein the first or second lens components has at least two aspherical surfaces and the zoom lens system fulfills the following conditions:

$$0.3 < \phi_1/\phi_w < 1.0$$

$$0.8 < \phi_3/\phi_w < 1.8$$

wherein,
$\phi_1$ and $\phi_3$ represent refractive powers of the first and third lens components, respectively and $\phi_w$ represents a refractive power of the zoom lens system at the shortest focal length condition.

10. A compact zoom lens system claimed in claim 9, wherein the first lens component has at least two aspherical surfaces.

11. A compact zoom lens system claimed in claim 9, wherein the second lens component has at least two aspherical surfaces.

12. A compact zoom lens system comprising, from the object side to the image side:
- a first lens component of a positive refractive power, said first lens component being shifted toward the object side monotonously in a zooming operation from a shorter focal length side to a longer focal length side;
- a second lens component of a negative refractive power; and
- at least one lens component;
- and wherein the zoom lens system has at least three aspherical surfaces in the first and second lens components and fulfills the following conditions:

$$-2.0 < fW/f12,W < -0.55$$

$$0.54 < B_{max}/fW < 0.91$$

wherein,
fW represents a focal length of the zoom lens system at the shortest focal length condition, f12,W represents a composite focal length of the first and second lens components, and $B_{max}$ represents the longest diagonal length of the image plane.

13. A compact zoom lens system comprising from the object side to the image side:
- a first lens component of a positive refractive power, said first lens component being shifted toward the object side monotonously at the zooming operation from a shorter focal length side to a longer focal length side;
- a second lens component of a negative refractive power, said second lens component has at least two aspherical surfaces; and
- at least one lens component, said lens component has at least two aspherical surfaces.

14. A compact zoom lens system comprising from the object side to the image side:
- a first lens component of a positive refractive power, said first lens component being shifted toward the object side monotonously at the zooming operation from a shorter focal length side to a longer focal length side;
- a second lens component of a negative refractive power, said second lens component has at one lens element whose both side surfaces are aspherical; and
- a third lens component of a positive refractive power, said third lens component being shifted toward the object side monotonously at the zooming operation from a shorter focal length side to a longer focal length side.

15. A compact zoom lens system comprising from the object side to the image side:
- a first lens component of a positive refractive power, said first lens component being shifted toward the object side monotonously at the zooming operation from a shorter focal length side to a longer focal length side;
- a second lens component of a negative refractive power; and
- a third lens component of a positive refractive power, said third lens component being shifted toward the object side monotonously at the zooming operation from a shorter focal length side to a longer focal length side, and having at least one lens element whose both side surface are aspherical;
- and wherein the zoom lens system fulfills the following condition:

$$-2.0 < fW/f12,W < -0.55$$

wherein, fW represents a focal length of the zoom lens system at the shortest focal length condition and f12, W represents a composite focal length of the first and second lens components.

16. A compact zoom lens system comprising from the object side to the image side:
- a first lens component of a positive refractive power, said first lens component being shifted toward the object side monotonously at the zooming operation from a shorter focal length side to a longer focal length side and having at least one aspherical surface;
- a second lens component of a negative refractive power, said second lens component having at least one aspherical surface; and
- at least one lens component, said lens component having at least one aspherical surface;
- and wherein the zoom lens system fulfills the following condition:

$$-2.0 < fW/f12, W < -0.55$$

wherein,
fW represents a focal length of the zoom lens system at the shortest focal length condition and f12, W represents a composite focal length of the first and second lens components.

17. A compact zoom lens system comprising, from the object side to the image side:
- a first lens component of a positive refractive power, said first lens component being shifted toward the object side monotonously in a zooming operation from a shorter focal length side to a longer focal length side;
- a second lens component of a negative refractive power, said second lens component consisting of two lens elements; and
- at least one lens component;
- and wherein the zoom lens system has at least three aspherical surfaces and fulfills the following conditions:

$$-2.0 < fW/f12,W < -0.55$$

$$0.54 < B_{max}/fW < 0.91$$

wherein,
fW represents a focal length of the zoom lens system at the shortest focal length condition, f12,W represents a composite focal length of the first and second lens components, and $B_{max}$ represents the longest diagonal length of the image plane.

18. A compact zoom lens system comprising, from the object side to the image side:
- a first lens component of a positive refractive power, said first lens component being shifted toward the object side monotonously at the zooming operation from a shorter focal length side to a longer focal length side;
- a second lens component of a negative refractive power; and
- a third lens component of a positive refractive power, said third lens component being shifted toward the object side monotonously at the zooming operation from a shorter focal length side to a longer focal length side, and consisting of two or three lens elements;

and wherein the zoom lens system has at least three aspherical surfaces.

19. A compact zoom lens system comprising from the object side to the image side:
- a first lens component of a positive refractive power, said first lens component being shifted toward the object side monotonously at the zooming operation from a shorter focal length side to a longer focal length side and having at least one lens element whose both side surfaces are aspherical;
- a second lens component of a negative refractive power; and
- at least one lens component.

20. A compact zoom lens system comprising from the object side to the image side:
- a first lens component of a positive refractive power, said first lens component being shifted toward the object side monotonously at the zooming operation from a shorter focal length side to a longer focal length side and consisting of from the object side to the image side a negative lens element and a positive lens element;
- a second lens component of a negative refractive power, said second lens component consisting of from the object side to the image side a negative lens element and a positive lens element; and
- a third lens component of a positive refractive power, said third lens component consisting of from the object side to the image side a positive lens unit and a negative lens element;

and wherein the zoom lens system has at least one aspherical surface.

21. A compact zoom lens system claimed in claim 20, wherein the positive lens unit of the third lens component is a doublet lens element consisting of from the object side to the image side a positive lens element and a negative lens element.

22. A compact zoom lens system claimed in claim 20, wherein the positive lens unit of the third lens component consisting of from the object side to the image side a positive lens element and a negative lens element with a thin air space.

23. A compact zoom lens system comprising from the object side to the image side:
- a first lens component of a positive refractive power, said first lens component being shifted toward the object side monotonously at the zooming operation from a shorter focal length side to a longer focal length side and consisting of from the object side to the image side a negative lens element and a positive lens element;
- a second lens component of a negative refractive power, said second lens component consisting of from the object side to the image side a negative lens element, a negative lens element and a positive lens element; and
- a third lens component of a positive refractive power, said third lens component consisting of from the object side to the image side a positive lens unit and a negative lens element;

and wherein the zoom lens system has at least one aspherical surface.

24. A compact zoom lens system claimed in claim 23, wherein the positive lens unit of the third lens component is a doublet lens element consisting of from the object side to the image side a positive lens element and a negative lens element.

25. A compact zoom lens system claimed in claim 23, wherein the positive lens unit of the third lens component consisting of from the object side to the image side a positive lens element and a negative lens element with a thin air space.

26. A compact zoom lens system comprising from the object side to the image side:
- a first lens component of a positive refractive power, said first lens component being shifted toward the object side monotonously at the zooming operation from a shorter focal length side to a longer focal length side;
- a second lens component of a negative refractive power; and
- at least one lens component;
- and wherein the zoom lens system has at least three aspherical surfaces and the first and second lens components shift toward the object side at the focusing operation from infinite object distance side to a nearer object distance side.

27. A compact zoom lens system comprising from the object side to the image side:
- a first lens component of a positive refractive power, said first lens component being shifted toward the object side monotonously at the zooming operation from a shorter focal length side to a longer focal length side;
- a second lens component of a negative refractive power; and
- at least one lens component;
- and wherein the zoom lens system has at least three aspherical surfaces and the second lens component shifts toward the object side at the focusing operation from infinite object distance side to a nearer object distance side.

28. A compact zoom lens system comprising, from the object side to the image side:
- a first lens unit of a positive refractive power, said first lens unit being shifted toward the object side monotonously in a zooming operation from a shorter focal length side to a longer focal length side;
- a second lens unit of a negative refractive power; and
- at least one lens component of one of said first and second lens units shifting toward the image side in a focusing operation from an infinite object distance side to a near object distance side;
- and wherein the zoom lens system has at least three aspherical surfaces and at least one aspherical surface is on the lens component shifting in the focusing operation.

* * * * *